United States Patent
Kojima et al.

(10) Patent No.: US 11,545,179 B2
(45) Date of Patent: Jan. 3, 2023

(54) INFORMATION STORAGE MEDIUM HAVING MULTIPLE RECORDING LAYERS

(71) Applicant: Panasonic Intellectual Property Management Co., Ltd., Osaka (JP)

(72) Inventors: Rie Kojima, Okayama (JP); Akio Tsuchino, Okayama (JP); Kazuki Aita, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/171,217

(22) Filed: Feb. 9, 2021

(65) Prior Publication Data

US 2021/0166728 A1 Jun. 3, 2021

Related U.S. Application Data

(63) Continuation of application No. PCT/JP2019/023386, filed on Jun. 12, 2019.

(30) Foreign Application Priority Data

Aug. 9, 2018 (JP) .............................. JP2018-150255

(51) Int. Cl.
*G11B 7/24* (2013.01)
*G11B 7/24038* (2013.01)
(Continued)

(52) U.S. Cl.
CPC ........ *G11B 7/24038* (2013.01); *G11B 7/2433* (2013.01); *G11B 7/24053* (2013.01);
(Continued)

(58) Field of Classification Search
CPC ..... G11B 7/24; G11B 7/2403; G11B 7/24035; G11B 7/24038; G11B 7/24053;
(Continued)

(56) References Cited

U.S. PATENT DOCUMENTS 6,312,780 B1 11/2001 Kasami et al.
6,632,583 B2 * 10/2003 Kunitomo ............ G11B 7/2578
204/192.15
(Continued)

FOREIGN PATENT DOCUMENTS

CN 1445767 10/2003
CN 1573993 2/2005
(Continued)

OTHER PUBLICATIONS

Data Archiver LB-DH8 series catalog, Sep. 2016, Panasonic Corporation, pp. 1-8, with Partial Translation.
(Continued)

*Primary Examiner* — Thang V Tran
(74) *Attorney, Agent, or Firm* — Wenderoth, Lind & Ponack, L.L.P.

(57) ABSTRACT

An information recording medium and a method for producing the same according to the present disclosure are configured to have an information layer in which a larger amount of light for reproduction can be obtained, so that the medium is suitable for recording information at high recording density and is useful for a multi-layer optical disc that records a large amount of contents.

12 Claims, 1 Drawing Sheet

(51) Int. Cl.
| | |
|---|---|
| *G11B 7/24053* | (2013.01) |
| *G11B 7/24067* | (2013.01) |
| *G11B 7/2433* | (2013.01) |
| *G11B 7/2578* | (2013.01) |
| *G11B 7/26* | (2006.01) |
| *G11B 7/00* | (2006.01) |

(52) U.S. Cl.
CPC ........ *G11B 7/24067* (2013.01); *G11B 7/2578* (2013.01); *G11B 7/26* (2013.01); *G11B 2007/0013* (2013.01)

(58) Field of Classification Search
CPC ..... G11B 7/24067; G11B 7/242; G11B 7/243; G11B 7/2433; G11B 7/257; G11B 7/2578; G11B 7/26; G11B 7/264; G11B 2007/0013; G11B 2007/24304; G11B 2007/24308; G11B 2007/24312; G11B 2007/27505
See application file for complete search history.

(56) References Cited

U.S. PATENT DOCUMENTS

| | | | |
|---|---|---|---|
| 6,633,514 | B1 | 10/2003 | Awano et al. |
| 7,608,385 | B2 * | 10/2009 | Kojima ................ G11B 7/2578 430/270.13 |
| 7,897,231 | B2 * | 3/2011 | Doi ........................ G11B 7/243 430/270.13 |
| 8,075,973 | B2 * | 12/2011 | Nishihara ............. G11C 13/04 430/270.13 |
| 8,133,566 | B2 * | 3/2012 | Nishihara .......... G11B 7/24038 430/270.13 |
| 8,323,763 | B2 * | 12/2012 | Tsuchino ............. G11B 7/2578 430/270.13 |
| 9,311,953 | B2 * | 4/2016 | Kurokawa ............. G11B 7/254 |
| 10,438,627 | B2 * | 10/2019 | Tsuchino ............. G11B 7/243 |
| 2003/0180473 | A1 | 9/2003 | Nishihara et al. |
| 2003/0190447 | A1 | 10/2003 | Kojima et al. |
| 2004/0253539 | A1 | 12/2004 | Uno et al. |
| 2004/0264322 | A1 | 12/2004 | Shishido et al. |
| 2005/0019695 | A1 | 1/2005 | Kojima et al. |
| 2007/0047430 | A1 | 3/2007 | Ohkubo |
| 2007/0231529 | A1 | 10/2007 | Kariyada et al. |
| 2008/0037406 | A1 | 2/2008 | Yuzurihara et al. |
| 2008/0170485 | A1 * | 7/2008 | Mishima ............ G11B 7/24038 |
| 2008/0292829 | A1 | 11/2008 | Shishido et al. |
| 2009/0246558 | A1 | 10/2009 | Nishihara et al. |
| 2009/0250339 | A1 | 10/2009 | Kojima et al. |
| 2010/0020668 | A1 * | 1/2010 | Narumi ................ G11B 7/0062 |
| 2010/0254252 | A1 | 10/2010 | Shishido et al. |
| 2010/0330303 | A1 | 12/2010 | Ohoshi et al. |
| 2012/0027980 | A1 | 2/2012 | Kurokawa et al. |
| 2013/0065008 | A1 | 3/2013 | Wang et al. |
| 2015/0132606 | A1 | 5/2015 | Kurokawa et al. |
| 2017/0323660 | A1 | 11/2017 | Tsuchino et al. |
| 2019/0108854 | A1 | 4/2019 | Tabata |
| 2019/0371360 | A1 * | 12/2019 | Tsuchino ............. G11B 7/2578 |

FOREIGN PATENT DOCUMENTS

| | | |
|---|---|---|
| CN | 1574053 | 2/2005 |
| CN | 101018672 | 8/2007 |
| CN | 101322190 | 12/2008 |
| JP | 2000-298875 | 10/2000 |
| JP | 2003-151175 | 5/2003 |
| JP | 2003-341241 | 12/2003 |
| JP | 2005-22409 | 1/2005 |
| JP | 4210620 | 1/2009 |
| JP | 4352343 | 8/2009 |
| JP | 2009-217862 | 9/2009 |
| JP | 2012-139876 | 7/2012 |
| JP | 2018-106794 | 7/2018 |
| TW | 200717509 | 5/2007 |
| TW | 201225077 | 6/2012 |
| TW | 201737245 | 10/2017 |
| TW | 201807255 | 3/2018 |
| WO | 2008/126573 | 10/2008 |
| WO | 2016/129237 | 8/2016 |
| WO | 2017/159561 | 9/2017 |

OTHER PUBLICATIONS

Archival Disc White Paper: Archival Disc Technology, 1st Edition, Jul. 2015, pp. 1-16, with Partial Translation.
Data Archiver LB-DH7 series catalog, Sep. 2016, Panasonic Corporation, pp. 1-4, with Partial Translation.
International Search Report dated Sep. 3, 2019 in International (PCT) Application No. PCT/JP2019/023386, with English Translation.
Office Action dated Feb. 23, 2022 in corresponding Chinese Patent Application No. 201980052193.6, with Machine Translation.
Office Action dated Aug. 15, 2022 in Taiwanese Patent Application No. 108125843, with English-language translation.
Office Action dated Aug. 17, 2022 in Chinese Patent Application No. 201980052193.6, with English-language translation.

* cited by examiner

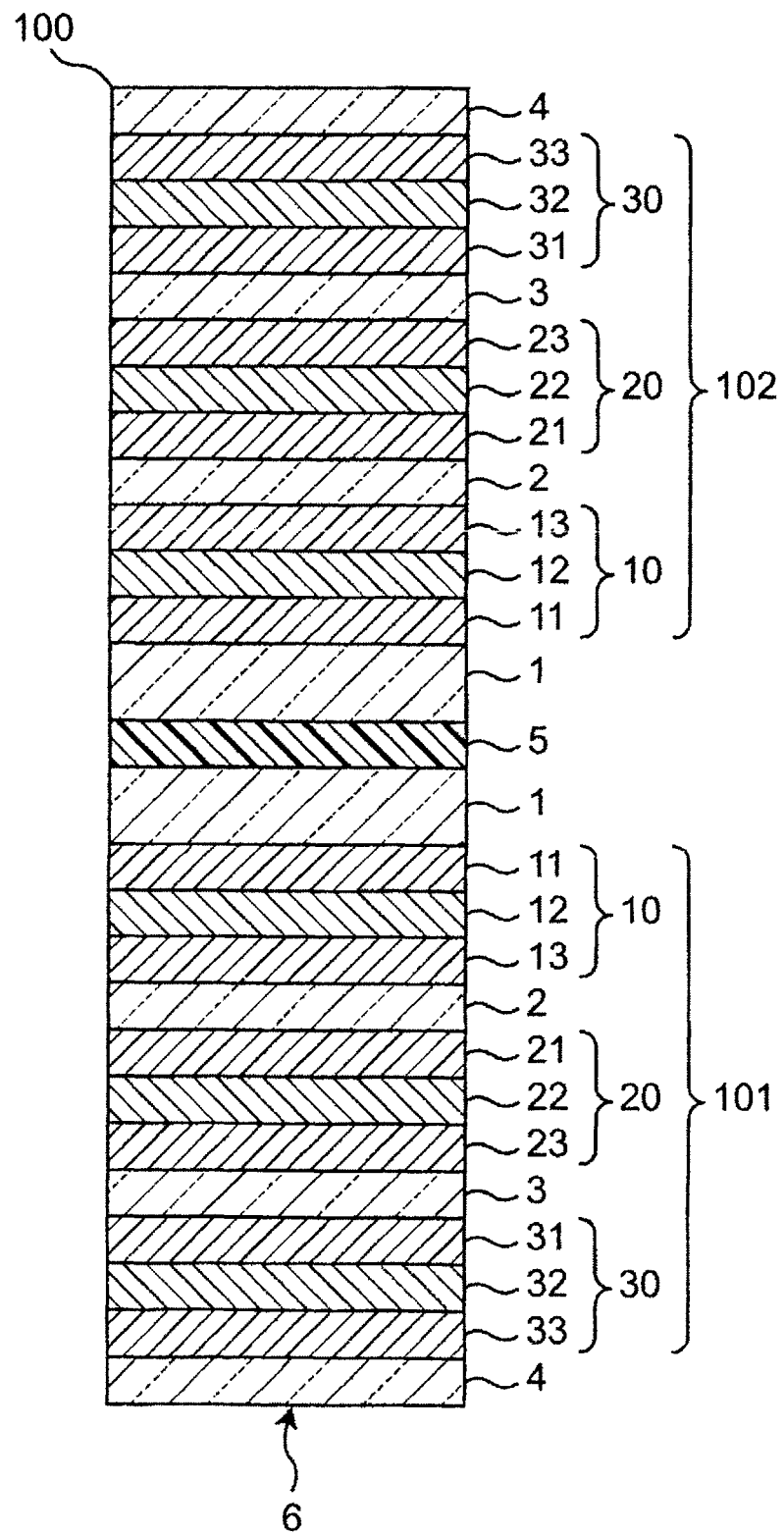

INFORMATION STORAGE MEDIUM HAVING MULTIPLE RECORDING LAYERS

CROSS-REFERENCE TO RELATED APPLICATION

This is a continuation application of International Application No. PCT/JP2019/023386 filed on Jun. 12, 2019 which claims priority from Japanese Patent Application No. 2018-150255 filed on Aug. 9, 2018. The entire contents of the earlier applications are incorporated herein by reference.

TECHNICAL FIELD

The present disclosure relates to a large-capacity information recording medium that records or reproduces information by an optical means and a method for producing the same.

BACKGROUND ART

A quantity of digital data usage is increasing every year due to, for example, spread of the Internet and digitalization of broadcasting. An optical disc that is an optical information recording medium has, as a highly-reliable information recording medium suitable for storing data for a long period, continuously evolved to attain a high capacity along with an increasing amount of information.

A BDXL standard (BD: Blu-ray (registered trademark) Disc) has been designed in June, 2010. A three-layer disc (an optical disc including three information layers) conforming to this standard has a recording capacity of 33.4 gigabytes (GB) per one information layer and is capable of storing data as large amount as 100 GB on one side. Regarding the three information layers constituting the three-layer disc, one that is farthest from a laser beam source is referred to as an "L0 layer", another that is next farthest is referred to as an "L1 layer", and the other that is nearest to the laser beam source is referred to as an "L2 layer".

For example, an optical disk library capable of realizing a large capacity of up to about 638 terabytes (TB) using a write-once BD-R XL disc has already been proposed for a data center (for example, see Non-Patent Document 1).

As a next standard of the BDXL standard, a professional optical disc standard "Archival Disc" was designed in March, 2014 (for example, see Non-Patent Document 2). The Archival Disc has higher reliability than BD (Blu-ray disc) and employs a land-and-groove recording method to have higher recording density. Further, the Archival Disc has a disc structure on both sides of a substrate and is thus provided as a larger-capacity recording medium. A roadmap of the Archival Disc standard is designed so as to sequentially increase the recording capacity per one disc. According to this roadmap, specifically, it is scheduled to develop a 300-GB system as a first generation, a 500-GB system as a second generation, and a 1-TB system as a third generation.

In the first-generation 300-GB Archival Disc, a three-layer disc capable of storing 150 GB of information is provided on both sides of the substrate, and thus this allows for recording and reproduction of 300 GB of information per disc. That is, this Archival Disc has a recording capacity of 50 GB per one information layer. Each information layer has a simple structure having an oxide recording film sandwiched between oxide dielectric films (for example, see Patent Documents 1 and 2). Irradiation of the recording film with a laser beam changes the recording film in shape and a signal is thus recorded. An optical disc library capable of realizing a capacity as large as up to 1.9 petabytes (PB) using this disc has already been proposed (for example, see Non-Patent Document 3).

BACKGROUND ART

Patent Documents

Patent Document 1: WO 2017/159561
Patent Document 2: Japanese Patent No. 4210620

Non-Patent Documents

Non-Patent Document 1: Data Archiver LB-DH8 series catalog, September 2016, Panasonic Corporation
Non-Patent Document 2: Archival Disc White Paper: Archival Disc Technology, 1st Edition, July 2015.
Non-Patent Document 3: Data Archiver LB-DH7 series catalog, September 2016, Panasonic Corporation

SUMMARY OF INVENTION

Problems to be Solved by the Invention

In the second-generation 500-GB-capacity Archival Disc, the three-layer disc provided on one side should realize a capacity of 250 GB. That is, it is necessary to increase the recording capacity per one information layer from the first-generation 50 GB to 83.4 GB. One measure of increasing the recording capacity is a method of reducing the size of the shortest recording mark to increase the recording density in one information layer. A problem in that case includes reproduction durability.

The dielectric film contained in the information layer has conventionally used a material containing $ZrO_2$, $SiO_2$, and $In_2O_3$ ($ZrO_2$—$SiO_2$—$In_2O_3$). $ZrO_2$—$SiO_2$—$In_2O_3$ can be sputtered by either DC sputtering or pulse DC sputtering, and has a high film-forming rate.

The material is also an excellent dielectric material having high transparency and high moisture resistance. The reason why the material can be DC-sputtered is that $ZrO_2$—$SiO_2$—$In_2O_3$ contains $In_2O_3$, which is a transparent conductive material. Reducing or removing $In_2O_3$ makes DC sputtering or pulse DC sputtering of $ZrO_2$—$SiO_2$—$In_2O_3$ difficult. However, as a result of extensive studies focusing on the content of $In_2O_3$, the present inventors have found that $In_2O_3$ deteriorates the reproduction durability. Thus, it has been concluded that a new dielectric material, which can be put into practical use as a dielectric film, is needed in place of the conventional $ZrO_2$—$SiO_2$—$In_2O_3$.

An object of the present disclosure is to provide a large-capacity multi-layer information recording medium of 500 GB or more, which is capable of DC sputtering or pulse DC sputtering, has excellent reproduction durability, and has high productivity and high reliability.

Means for Solving the Problems

Accordingly, the present inventors have studied various combinations of a first dielectric film and a recording film. As a result, they have completed the present invention with use of an information layer in which composition of the first dielectric film and composition of the recording film are specified.

The present invention has been accomplished by the following means.

[1] An information recording medium comprising two or more information layers, wherein the information recording medium records or reproduces information by irradiation with a laser beam, wherein at least one of the two or more information layers is determined as a first information layer and the first information layer includes a first dielectric film and a recording film in this order from a farther end toward a nearer end of a laser beam-irradiated surface, wherein the first dielectric film contains at least Zr and oxygen and further contains at least one element D1 selected from Zn and Sn, wherein when the total number of atoms of Zr, oxygen and the element D1 is defined as 100 atom %, the first dielectric film contains Zr in an amount of 3 atom % or more and 26 atom % or less and contains the element D1 in an amount of 10 atom % or more and 43 atom % or less, and wherein the recording film contains at least W, Cu, Mn, and oxygen and further contains at least one element M selected from Zn, Nb, Mo, Ta, and Ti.

[2] The information recording medium according to [1], wherein the first dielectric film further contains at least one element D2 selected from Si, Y, Ca, and Mg.

[3] The information recording medium according to [1] or [2], wherein the first dielectric film further contains at least one element D3 selected from Ga and Al, and when the total number of atoms of Zr, oxygen, the element D1, the element D2, and the element D3 is defined as 100 atom %, the first dielectric film contains the element D3 in an amount of 7 atom % or less.

[4] The information recording medium according to [1], wherein the first information layer contains the first dielectric film, the recording film, and a second dielectric film in this order from a farther end toward a nearer end of the laser beam-irradiated surface, and the second dielectric film contains at least Zr and oxygen and further contains at least one element D1 selected from Zn and Sn, and when the total number of atoms of Zr, oxygen and the element D1 is defined as 100 atom %, the second dielectric film contains Zr in an amount of 3 atom % or more and 26 atom % or less and contains the element D1 in an amount of 10 atom % or more and 43 atom % or less.

[5] The information recording medium according to [4], wherein the second dielectric film further contains at least one element D2 selected from Si, Y, Ca, and Mg.

[6] The information recording medium according to [4] or [5], wherein the second dielectric film further contains at least one element D3 selected from Ga and Al, and when the total number of atoms of Zr, oxygen, the element D1, the element D2, and the element D3 is defined as 100 atom %, the second dielectric film contains the element D3 in an amount of 7 atom % or less.

[7] The information recording medium according to [1], wherein the first information layer contains the first dielectric film, the recording film, and a second dielectric film in this order from a farther end toward a nearer end of the surface irradiated with the laser beam, and the second dielectric film contains at least Zr, oxygen, and In.

[8] The information recording medium according to [7], wherein the second dielectric film further contains at least one element D2 selected from Si, Y, Ca, and Mg.

[9] The information recording medium according to [1], wherein W, Cu, Mn, and the element M in the recording film satisfy the following formula (1):

$$W_xCu_yMn_zM_{100-x-y-z} \text{ (atom \%)} \quad (1)$$

where $15 \leq x < 60$, $0 < y \leq 30$, $10 \leq z \leq 40$, and $10 \leq 100-x-y-z \leq 50$.

[10] The information recording medium according to [1] or [9], wherein the element M in the recording film is at least one selected from Ta and Zn.

[11] The information recording medium according to any one of [1] to [10], wherein the first information layer is disposed at a position nearer to the laser beam-irradiated surface than an information layer disposed at the farthest position from the laser beam-irradiated surface.

[12] The information recording medium according to any one of [1] to [11], wherein the first information layer is disposed at the nearest position to the laser beam-irradiated surface.

[13] A method for producing an information recording medium that includes two or more information layers, the method comprising individually forming the two or more information layers, wherein at least one of the two or more information layers is determined as a first information layer and the step of forming the first information layer includes at least a step of forming a first dielectric film and a step of forming a recording film, wherein the first dielectric film containing at least Zr and oxygen and further containing at least one element D1 selected from Zn and Sn is formed in the step of forming a first dielectric film, wherein a recording film containing at least W, Cu, and Mn and further containing at least one element M selected from Zn, Nb, Mo, Ta, and Ti is formed in the step of forming a first dielectric film, and wherein the step of forming the first dielectric film and the step of forming the recording film are performed by sputtering using a DC power source.

[14] The method for producing an information recording medium according to [13], wherein the first dielectric film formed in the step of forming the first dielectric film further contains at least one element D2 selected from Si, Y, Ca, and Mg.

Effects of the Invention

The information recording medium according to the embodiment of the present invention has an information layer exhibiting excellent reproduction durability, and makes it possible to realize a multi-layer information recording medium having large capacity and high reliability. In addition, it also realizes a multi-layer information recording medium that also has high productivity.

BRIEF DESCRIPTION OF THE DRAWINGS

The FIGURE is sectional view of information recording medium 100 according to embodiment 1 of the present disclosure.

EMBODIMENTS FOR CARRYING OUT THE INVENTION

Hereinafter, embodiments of the present disclosure are described with reference to drawings. The following embodiments are exemplary and the present disclosure is not limited to the following embodiments.

Embodiment 1

The information recording medium according to the embodiment of the present invention is an information recording medium comprising two or more information layers, wherein the information recording medium records or reproduces information by irradiation with a laser beam, wherein at least one of the two or more information layers is determined as a first information layer and the first information layer includes a first dielectric film and a recording film in this order from a farther end toward a nearer end of a laser beam-irradiated surface, wherein the first dielectric film contains at least Zr and oxygen and further contains at least one element D1 selected from Zn and Sn, wherein when the total number of atoms of Zr, oxygen and the element D1 is defined as 100 atom %, the first dielectric film contains Zr in an amount of 3 atom % or more and 26 atom % or less and contains the element D1 in an amount of 10 atom % or more and 43 atom % or less, and wherein the recording film contains at least W, Cu, Mn, and oxygen and further contains at least one element M selected from Zn, Nb, Mo, Ta, and Ti.

The use of the information layer in which composition of the first dielectric film and composition of recording film are specified as described above can afford the effects of the present invention.

As embodiment 1, described is one example of the information recording medium that records and reproduces information with laser beam 6.

The FIGURE shows a sectional view of the information recording medium 100 according to the embodiment of the present invention.

Information recording medium 100 according to the present embodiment may have substrate 1.

Information recording medium 100 according to the present embodiment includes, on each side of substrate 1, three information layers that records and reproduces information, with substrate 1 interposed (6 layers in total), and is a multi-layer optical information recording medium capable of recording and reproducing information in each of the information layers by irradiation with laser beam 6 from a cover layer 4 side. Laser beam 6 is a laser beam in a blue-violet region with a wavelength of about 405 nm.

Information recording medium 100 is a double-side information recording medium obtained by bonding A-side information recording medium 101 and B-side information recording medium 102 to each other. A-side information recording medium 101 and B-side information recording medium 102 are bonded to each other at back surfaces of their substrates 1 (a side opposite to a surface on which the information layers are provided) with a bonding layer 5 in between. Each of A-side information recording medium 101 and B-side information recording medium 102 includes, on substrate 1, L0 layer 10, L1 layer 20, and L2 layer 30 sequentially stacked as the information layers via, for example, intermediate separation layers 2 and 3 and further includes cover layer 4 provided in contact with L2 layer 30. L1 layer 20 and L2 layer 30 are transmissive information layers.

L0 layer 10 includes first dielectric film 11, recording film 12, and second dielectric film 13 in this order from a farther end toward a nearer end of a surface irradiated with laser beam 6. Similarly, L1 layer 20 includes first dielectric film 21, recording film 22, and second dielectric film 23 and L2 layer 30 includes first dielectric film 31, recording film 32, and second dielectric film 33 in this order.

That is, Each of A-side information recording medium 101 and B-side information recording medium 102 has a structure having substrate 1, L0 layer 10, intermediate separation layer 2, L1 layer 20, intermediate separation layer 3, L2 layer 30, and the cover layer 4 formed in this order, from a farther end toward a nearer end of a surface irradiated with laser beam 6. Further, L0 layer 10 has a structure having first dielectric film 11, recording film 12, and second dielectric film 13 formed on substrate 1, L1 layer 20 has a structure having first dielectric film 21, recording film 22, and second dielectric film 23 formed on intermediate separation layer 2, and L2 layer 30 has a structure having first dielectric film 31, recording film 32, and second dielectric film 33 formed on intermediate separation layer 3, from a farther end toward a nearer end of a surface irradiated with laser beam 6. First dielectric film 21, first dielectric film 31, recording film 22, recording film 32, second dielectric film 23, and second dielectric film 33 can be formed by sputtering.

In L1 layer 20 and L2 layer 30, first dielectric film 21 and first dielectric film 31 can be formed on intermediate separation layer 2 and intermediate separation layer 3, respectively. The longer sputtering time equates to the higher substrate temperature during sputtering owing to the thermal radiation of the sputtering target (target). In order to increase the film-forming rate, it is preferable to employ DC (DC: Direct Current) sputtering or pulse DC sputtering, and the sputtering elevates the substrate temperature as compared with the case of the radio frequency sputtering. The intermediate separation layer is made of, for example, an ultraviolet-curable resin such as an acrylic resin. At the time of forming first dielectric film 21 of L1 layer 20, the surface of intermediate separation layer 2 is exposed to a high temperature. Also, at the time of forming first dielectric film 31 of L2 layer 30, the surface of intermediate separation layer 3 is exposed to a high temperature. Intermediate separation layer 2 and intermediate separation layer 3 made of an ultraviolet-curable resin have undergone a curing step by ultraviolet light, but when they are exposed to a high temperature during sputtering, some uncured components and low-molecular-weight components of the photopolymerization initiator may volatilize. The longer sputtering time equates to the higher surface temperature of intermediate separation layer 2 and intermediate separation layer 3, and this increases the volatilization amount of these components. Hereinafter, some uncured components and low-molecular-weight components of the photopolymerization initiator are referred to as "organic matters".

First dielectric film 21 and first dielectric film 31 of L1 layer 20 and L2 layer 30 have conventionally used a material ($ZrO_2$—$SiO_2$—$In_2O_3$) containing $ZrO_2$, $SiO_2$, and $In_2O_3$. When first dielectric film 31 using $ZrO_2$—$SiO_2$—$In_2O_3$ of L2 layer 30 in the conventional information recording medium was qualitatively analyzed by the secondary ion mass spectrometry, carbon not contained in the target component was detected. From this result, it was estimated that the organic matters volatilized during the sputtering were incorporated into first dielectric film 31, and was also estimated that the organic matters were incorporated into first dielectric film 21 of L1 layer 20, similarly.

Based on the experiments of the inventors, when first dielectric film 31 was sputtered for a longer time in L2 layer 30, the reproduction durability was further deteriorated. The same tendency was obtained in L1 layer 20. From this result, it is considered that the longer sputtering time causes volatilization of more organic matters from the intermediate separation layer owing to the thermal radiation and thus causes incorporation of them into first dielectric film 31 of L2 layer 30 to deteriorate the reproduction durability.

In the embodiment of the present invention, at least one information layer selected from L0 layer 10, L1 layer 20, and L2 layer 30 is determined as the first information layer.

The first information layer is preferably disposed at a nearer position to the surface irradiated with laser beam 6 than the information layer disposed at the farthest position from the surface irradiated with laser beam 6, L1 layer 20 or L2 layer 30 is more preferably the first information layer, at least L2 layer 30 is further preferably the first information layer, and L1 layer 20 and L2 layer 30 are particularly preferably the first information layers.

The first information layer is preferably disposed at a nearest position to the surface irradiated with laser beam 6, and at least L2 layer 30 is preferably the first information layer. For example, L0 layer 10 and L2 layer 30 are preferably the first information layer, L1 layer 20 and L2 layer 30 are more preferably the first information layer, and L0 layer 10, L1 layer 20 and L2 layer 30 are more preferably the first information layers.

In information recording medium 100, when a guide groove is formed in substrate 1, a surface of substrate 1 that is nearer to the surface irradiated with laser beam 6 is referred to as a "groove" for convenience and a surface that is farther from the surface irradiated with laser beam 6 is referred to as a "land" for convenience. Forming pits on a recording film at positions corresponding to both the groove and the land (land-groove recording) with the recording density increased (that is, shortening the mark length) allows a capacity per one information layer to be, for example, 83.4 GB. Since information recording medium 100 is capable of recording and reproducing information with the six information layers, it is possible to provide information recording medium 100 as one having a capacity of 500 GB. As described later, the guide groove may also be formed in intermediate separation layers 2 and 3. Particularly, when the land-groove recording is performed on L1 layer 20 and L2 layer 30, the guide groove is preferably formed in intermediate separation layers 2 and 3.

The effective reflectance of the three information layers can be controlled by adjusting the reflectance of each of L0 layer 10, L1 layer 20, and L2 layer 30 and the transmittance of each of L1 layer 20 and L2 layer 30. In the present specification, the effective reflectance is, as described above, defined as the reflectance of each of the three information layers stacked on one another. The reflectance without the term "effective" refers to a reflectance measured without stacking the layers, unless otherwise noted. A reflectance $R_g$ denotes a groove reflectance of an unrecorded groove portion and a reflectance $R_l$ denotes a groove reflectance of an unrecorded land portion.

The present embodiment, as one example, describes a configuration designed such that L0 layer 10 has an effective reflectance $R_g$ of 3.5% and an effective reflectance $R_l$ of 3.8%, L1 layer 20 has an effective reflectance $R_g$ of 4.0% and an effective reflectance $R_l$ of 4.3%, and L2 layer 30 has an effective reflectance $R_g$ of 5.8% and an effective reflectance $R_l$ of 6.1%.

When L2 layer 30 has a transmittance of 80% and L1 layer 20 has a transmittance of 77%, it is possible to obtain the effective reflectance described above by designing L0 layer 10 to have a reflectance $R_g$ of 8.0% and a reflectance $R_l$ of 8.5%, L1 layer 20 to have a reflectance $R_g$ of 6.0% and a reflectance $R_l$ of 6.3%, and L2 layer 30 to have a reflectance $R_g$ of 5.8% and a reflectance $R_l$ of 6.1%. The transmittances herein represent average values of the groove portion and the land portion in recording films 32, 22, 12 that are unrecorded.

Here, an amount of light for reproduction is described. The amount of light for reproduction can be determined by obtaining a product of the effective reflectance and the power for reproduction of each layer and dividing the product by 100 (effective reflectance R (%)×power for reproduction Pr (mW)/100).

The second-generation Archival Disc is supposed to need a larger amount of light for reproduction. When a 500-GB land-and-groove recording Archival Disc is prepared, the amount of light for reproduction at quadruple speed is as follows.

Amount of light for reproduction of L0 layer 10: 0.070 (2.8%×2.5 mW/100)

Amount of light for reproduction of L1 layer 20: 0.070 (3.2%×2.2 mW/100)

Amount of light for reproduction of L2 layer 30: 0.070 (4.6%×1.6 mW/100)

Hereinafter, substrate 1, intermediate separation layers 2 and 3, cover layer 4, and bonding layer 5 are described in terms of a function, a material, and thickness.

As the material for substrate 1, for example, a resin such as polycarbonate, an amorphous polyolefin, and PMMA, or glass can be used. Substrate 1 is preferably transparent but may be translucent, and is not limited in terms of transparency. A shape of substrate 1 is not also limited and may be disc-shaped. Substrate 1 has, for example, a disc shape having a thickness of about 0.5 mm and a diameter of about 120 mm.

A recess-and-projection guide groove for guiding laser beam 6 may be formed, as necessary, on a L0 layer 10-side surface of substrate 1. When the guide groove is formed in substrate 1, a groove (surface) of substrate 1 that is nearer to the surface irradiated with laser beam 6 is referred to as a "groove" and a groove (surface) that is farther from the surface irradiated with laser beam 6 is referred to as a "land" as described above. A depth of the groove (difference in height between a groove surface and a land surface) may be, for example, 10 nm or more and 50 nm or less. When the land-groove recording is employed and recording is performed at high recording density, the depth of the groove may be designed deeper so as to reduce the influence of crosstalk. When the groove is deepened, however, the reflectance tends to decrease. In order to allow for reducing the crosstalk and maintaining the reflectance, the depth of the groove is preferably 20 nm or more and 40 nm or less. In embodiment 1, a land-groove distance (distance between a width-wise center of a groove and a width-wise center of a land adjacent to the groove) is about 0.225 μm, however, is not limited to this value.

Intermediate separation layers 2 and 3 are made of a resin such as a photo-curable resin (particularly, an ultraviolet-curable resin) and a slow-acting thermosetting resin and are made of, for example, an acrylic resin. When intermediate separation layers 2 and 3 have low optical absorption for laser beam 6 having a wavelength λ used for recording and reproduction, the layers enable laser beam 6 to efficiently reach L0 layer 10 and L1 layer 20. Intermediate separation layers 2 and 3 are provided to discriminate focus positions on L0 layer 10, L1 layer 20, and L2 layer 30. Thus, intermediate separation layers 2 and 3 may have a thickness of, for example, more than or equal to a focus depth $\Delta Z$ determined according to a numerical aperture (NA) of an objective lens and the wavelength λ of laser beam 6. When a reference for optical intensity at a focus is assumed to be 80% of optical intensity in a case of no aberration, it is possible to approximate the focus depth $\Delta Z$ as $\Delta Z = \lambda / \{2 (NA)^2\}$. In order to prevent an influence of a back focus on L1 layer 20, intermediate separation layers 2 and 3 may have different thickness.

In intermediate separation layers 2 and 3, a recess-and-projection guide groove may be formed at a laser beam 6 incident-side. The difference in height and the land-groove distance of the guide groove formed in intermediate separation layers 2 and 3 are as described for the guide groove formed in substrate 1. In embodiment 1, the depth of the groove (difference in height between the groove surface and the land surface) is set at 30 nm and the land-groove distance is set at about 0.225 μm, but they are not limited to these values.

Cover layer 4 is made of a resin such as a photo-curable resin (particularly, an ultraviolet-curable resin) and a slow-acting thermosetting resin, or a dielectric, for example. Cover layer 4 may have low optical absorption for laser beam 6 used. Alternatively, cover layer 4 may be formed using a resin such as polycarbonate, an amorphous polyolefin, and polymethyl methacrylate (PMMA), or glass. When these materials are used, cover layer 4 may be sheet-shaped or thin plate-shaped. Sheet-shaped or thin plate-shaped cover layer 4 may be formed by, for example, bonding to second dielectric film 33 in L2 layer 30 using a resin such as a photo-curable resin (particularly, an ultraviolet-curable resin) or a slow-acting thermosetting resin as an adhesive. Cover layer 4 may have a thickness ranging, for example, from about 40 μm to 80 μm, particularly from about 50 μm to 65 μm that enables good recording and reproduction at a NA of 0.91 described above.

Bonding layer 5 is made of, for example, a resin such as a photo-curable resin (particularly, an ultraviolet-curable resin) and a slow-acting thermosetting resin and bonds A-side information recording medium 101 to B-side information recording medium 102. Bonding layer 5 is not limited in terms of transparency and may be transparent or translucent. Bonding layer 5 may be provided with a film that blocks laser beam 6. Bonding layer 5 may have a thickness ranging from about 5 μm to 80 μm, particularly from about 20 μm to 50 μm.

When information recording medium 100 has about the same thickness as that of a BD-standard medium, the total thickness of intermediate separation layers 2 and 3 and cover layer 4 may be set at 100 μm. For example, the thickness of intermediate separation layer 2 may be set at about 25 μm, the thickness of intermediate separation layer 3 at about 18 μm, and the thickness of cover layer 4 at about 57 μm.

A configuration of L2 layer 30 is described in order, when L2 layer 30 is the first information layer, in which the present invention is more preferably applied.

L2 layer 30 is formed by stacking at least first dielectric film 31 and recording film 32 on the surface of intermediate separation layer 3 in this order. Further, second dielectric film 33 may be stacked on the surface of recording film 32.

When L2 layer 30 is the first information layer, first dielectric film 31 according to the present embodiment is such an excellent dielectric material that it does not deteriorate the reproduction durability of the L2 layer even if organic matters (a part of the uncured components and the low-molecular-weight components of the photopolymerization initiator) volatilized from intermediate separation layer 3 during sputtering are incorporated into first dielectric film 31. As a reason for this, the present inventors have presumed that first dielectric film 31 have a specific composition, so that even if organic matter (C or the like) is incorporated into first dielectric film 31, the reproduction durability does not decrease because the organic matters and the components in first dielectric film 31 do not bond during the continuous irradiation with laser beam 6 having a power for reproduction.

The reproduction durability of the information layer in the information recording medium 100 can be evaluated by continuously irradiating the recording mark, which has been previously recorded with laser beam 6 having the optimum power, with laser beam 6 having the power for reproduction. Specifically, it is defined as the maximum power for reproduction with which reproduction can be performed 1 million times (1 million passes). Whether or not the reproduction of 1 million passes is possible can be judged by the amount of deterioration of d-MLSE value of the recorded signal after 1 million passes. When the deterioration of the d-MLSE value is 1.5% or less after one pass, it may be judged that the reproduction of 1 million passes can be performed with the power for reproduction. It is judged that the higher maximum power for reproduction equates to the better reproduction durability. Here, d-MLSE is an evaluation index of the recorded signal quality of a 500-GB-capacity Archival Disc, and is an abbreviation for Distribution Derived-Maximum Likelihood Sequence Error Estimation.

As mentioned previously, the reproduction durability becomes an issue. The smaller size of the recording mark, when the recording mark is irradiated with laser beam 6 for reproduction in many passes, causes the larger amount of deterioration of the d-MLSE value as compared with the case of the large size recording mark. This is because the smaller recording mark equates to the larger proportion of the deteriorated area occupying the recording mark.

When L2 layer 30 is the first information layer, first dielectric film 31 according to the present embodiment contains at least Zr and oxygen, and further contains at least one element D1 selected from Zn and Sn. When the total number of atoms of Zr, oxygen and the element D1 is defined as 100 atom %, Zr is contained in an amount of 3 atom % or more and 26 atom % or less, and the element D1 is contained in an amount of 10 atom % or more and 43 atom % or less.

As first dielectric film 31, Zr—O—Zn, Zr—O—Sn, Zr—O—Zn—Sn, and the like may be used, and Zr—O—Zn—Sn is preferably used. O is oxygen. Here, "-" means "mix". Therefore, Zr—O—Zn means that Zr, oxygen, and Zn are mixed. Since a Zr mineral contains a small amount of Hf, first dielectric film 31 may contain Hf.

First dielectric film 31 according to the present embodiment contains Zr, oxygen, and element D1, so that, preferably, Zr and oxygen form an oxide of Zr and element D1 and oxygen form an oxide of element D1. In that case, the oxide of Zr is preferably contained in an amount of 10 mol % or more and 70 mol % or less, and the oxide of the element D1 is preferably contained in an amount of 30 mol % or more and 90 mol % or less.

When the oxide of Zr is contained in an amount of 10 mol % or more, L2 layer 30 can realize excellent reproduction durability. When the oxide of Zr is contained in an amount of more than 70 mol %, the specific resistance becomes large and pulse DC sputtering cannot be performed. In addition, the film-forming rate is remarkably slowed down, so that the productivity is lowered. When the amount of Zr oxide is less than 10 mol %, the reproduction durability is deteriorated.

When the oxide of the element D1 is further contained in an amount of 30 mol % or more in addition to the oxide of Zr, the specific resistance of the target can be lowered and the conductivity can be imparted. This allows for pulse DC sputtering, and makes the film-forming rate faster than that of the high frequency sputtering. Furthermore, 40 mol % or more of the oxide of the element D1 allows the specific resistance of the target to be further decreased, and this allows for DC sputtering. This makes film-forming rate faster than that of the pulse DC sputtering method to increase the productivity.

The oxide of element D1 may be at least one of an oxide of Zn and an oxide of Sn. The oxide of Zn has a function of imparting conductivity. The oxide of Sn has a function of increasing the film-forming rate.

The oxide of Zr may include $ZrO_2$. Further, the oxide of the element D1 may include at least one selected from ZnO, SnO and $SnO_2$. The oxide of Sn more preferably include $SnO_2$, which has a high melting point and is transparent.

First dielectric film 31 may be made of a mixture of two or more oxides selected from these oxides, or may be made of a composite oxide formed of two or more oxides. For example, it may be $ZrO_2$—ZnO.

Since a Zr mineral contains a small amount of Hf, first dielectric film 31 may contain an oxide of Hf.

As first dielectric film 31, $ZrO_2$—ZnO, $ZrO_2$—$SnO_2$, $ZrO_2$—ZnO—$SnO_2$, and the like may be used, and $ZrO_2$—ZnO—$SnO_2$ is preferable.

When 70 mol % of the oxide of the element D1 is contained (40 mol % of ZnO and 30 mol % of $SnO_2$), the composition is expressed as $(ZrO_2)_{30}(ZnO)_{40}(SnO_2)_{30}$ mol %.

First dielectric film 31 according to the embodiment of the present invention may further contain at least one element D2 selected from Si, Y, Ca, and Mg, and preferably contains Mg. This is because the production efficiency is improved when Mg is contained as the element D2 as described later.

As first dielectric film 31, Zr—Y—O—Zn, Zr—Ca—O—Zn, Zr—Mg—O—Zn, Zr—Y—O—Sn, Zr—Ca—O—Sn, Zr—Mg—O—Sn, Zr—Y—O—Zn—Sn, Zr—Ca—O—Zn—Sn, Zr—Mg—O—Zn—Sn, Zr—Si—O—Zn, Zr—Si—O—Sn, Zr—Si—O—Zn—Sn, and the like may be used, Zr—Mg—O—Zn, Zr—Mg—O—Sn, or Zr—Mg—O—Zn—Sn is preferable, and Zr—Mg—O—Zn—Sn is more preferable.

It is preferred that first dielectric film 31 according to the embodiment of the present invention further contains the element D2 and the element D2 and oxygen form an oxide of the element D2. The oxide of the element D2 may be at least one of an oxide of Si, an oxide of Y, an oxide of Ca, and an oxide of Mg.

$ZrO_2$ undergoes a phase transition reversibly from a low temperature type (monoclinic crystal system) crystal structure to a high temperature type (cubic crystal system) crystal structure at around 1000° C. At this time, the volume changes. When a few percent of a rare earth oxide, CaO, MgO, or the like is added to $ZrO_2$, a cubic crystal structure is formed and the phase transition does not occur. This is called stabilized zirconia or partially stabilized zirconia.

Also in first dielectric film 31 according to the embodiment of the present invention, the oxide of Zr and the oxide of the element D2 preferably form stabilized zirconia or partially stabilized zirconia. This makes the target to be less likely to crack even if high power (high current, high voltage) is applied to perform mass production. Among the elements D2, which are oxides of rare earth elements, an oxide of Y is more preferable, but oxides of other rare earth elements such as an oxide of Ce may be used. The oxide of Y may include $Y_2O_3$, the oxide of Ca may include CaO, and the oxide of Mg may include MgO.

When the target contains an oxide of Zr as stabilized zirconia or partially stabilized zirconia, the reversible volume change associated with the phase transition can be suppressed on the target surface that becomes high temperature during sputtering. This allows for using the target up to the end since cracks are less likely to occur from the target surface even if DC sputtering or pulse DC sputtering is repeated with applying high power in order to increase productivity. Among the oxides of the elements D2, stabilized zirconia or partially stabilized zirconia to which $Y_2O_3$ is added is more preferable because it has excellent ionic conductivity, when DC sputtering or pulse DC sputtering is performed.

In addition, according to the study of the present inventors, it was found that when DC sputtering or pulse DC sputtering is performed with applying high sputtering power at the time of forming first dielectric film 31, cracks are less likely to occur on the target surface of the target containing an oxide of Mg even at a higher sputtering power, as compared with the case of the target containing an oxide of Y and the target containing an oxide of Ca.

Therefore, stabilized zirconia or partially stabilized zirconia to which an oxide of Mg is added is preferably contained, as the target material corresponding to first dielectric film 31, because it improves the production efficiency.

Similarly, respective target materials corresponding to second dielectric film 33, first dielectric film 21 of L1 layer 20, second dielectric film 23, first dielectric film 11 of L0 layer 10, and second dielectric film 13 described later preferably contain stabilized zirconia or partially stabilized zirconia to which an oxide of Mg is added.

An oxide of the element D2 may be added in a ratio of 1 mol % to 10 mol % to $ZrO_2$.

Above 10%, the phase transition reappears.

For example, when first dielectric film 31 contains 10 mol % of $Y_2O_3$ to $ZrO_2$, the composition of the case is expressed as $(ZrO_2)_{27.3}(Y_2O_3)_{2.7}(ZnO)_{40}(SnO_2)_{30}$ mol %.

For example, when first dielectric film 31 contains 8.7 mol % of MgO to $ZrO_2$, the composition of the case is expressed as $(ZrO_2)_{23}(MgO)_2(ZnO)_{50}(SnO_2)_{25}$ mol %.

Alternatively, $SiO_2$ may be contained as an oxide of Si, which may combine with $ZrO_2$ to form a composite oxide $ZrSiO_4$. It has a stable tetragonal crystal structure and no phase transition occurs up to about 1700° C. Further, this composite oxide may also contain a small amount of Hf.

$SiO_2$ is preferably contained together with $ZrO_2$ in a molar ratio of 1:1 and is preferably contained in a molar ratio of 3% or more and 35% or less. For example, when first dielectric film 31 contains $SiO_2$ in $(ZrO_2)_{30}(ZnO)_{40}(SnO_2)_{30}$ mol %, the composition expressed as $(ZrO_2)_{15}(SiO_2)_{15}(ZnO)_{40}(SnO_2)_{30}$ mol % is preferable.

The molar ratio of $SiO_2$ to $ZrO_2$ may deviate from the ratio of 1:1. In that case, at least one selected from $SiO_2$ and $ZrO_2$ and $ZrSiO_4$ may be present.

As first dielectric film 31, $ZrO_2$—$Y_2O_3$—ZnO, $ZrO_2$—CaO—ZnO, $ZrO_2$—MgO—ZnO, $ZrO_2$—$Y_2O_3$—$SnO_2$, $ZrO_2$—CaO—$SnO_2$, $ZrO_2$—MgO—$SnO_2$, $ZrO_2$—$Y_2O_3$—ZnO—$SnO_2$, $ZrO_2$—CaO—ZnO—$SnO_2$, $ZrO_2$—MgO—ZnO—$SnO_2$, $ZrO_2$—$SiO_2$—ZnO, $ZrO_2$—$SiO_2$—$SnO_2$, $ZrO_2$—$SiO_2$—ZnO—$SnO_2$, $ZrSiO_4$—ZnO, $ZrSiO_4$—$SnO_2$, $ZrSiO_4$—ZnO—$SnO_2$, and the like may be used.

From the viewpoint of production efficiency, first dielectric film 31 preferably contains MgO, more preferably contains $ZrO_2$—MgO—ZnO, $ZrO_2$—MgO—$SnO_2$, or $ZrO_2$—MgO—ZnO—$SnO_2$, and more preferably contains $ZrO_2$—MgO—ZnO—$SnO_2$.

Since Hf is similar to Zr in chemical properties, a part or all of $ZrO_2$ of first dielectric film 31 may be replaced with $HfO_2$. The phase structural change of $HfO_2$ occurs at around 1700° C., and the high temperature phase is more stable than that of $ZrO_2$. Thus, by replacing a part or all of $ZrO_2$ with $HfO_2$, it can be expected that the target is less likely to crack. However, since Hf has a low abundance in the earth's crust, $HfO_2$ is considerably more expensive than $ZrO_2$.

First dielectric film 31 according to the embodiment of the present invention further contains at least one element D3 selected from Ga and Al, and when the total number of atoms of Zr, oxygen, element D1, element D2, and element D3 is defined as 100 atom %, the element D3 may be contained in an amount of 7 atom % or less. Ga is preferable as the element D3.

As the elements contained in first dielectric film 31, Zr—O—Zn—Ga, Zr—O—Zn—Al, Zr—O—Sn—Ga, Zr—O—Sn—Al, Zr—O—Zn—Sn—Ga, Zr—O—Zn—Sn—Al, Zr—Y—O—Zn—Ga, Zr—Y—O—Zn—Al, Zr—Ca—O—Zn—Ga, Zr—Ca—O—Zn—Al, Zr—Mg—O—Zn—Ga, Zr—Mg—O—Zn—Al, Zr—Y—O—Sn—Ga, Zr—Y—O—Sn—Al, Zr—Ca—O—Sn—Ga, Zr—Ca—O—Sn—Al, Zr—Mg—O—Sn—Ga, Zr—Mg—O—Sn—Al, Zr—Y—O—Zn—Sn—Ga, Zr—Y—O—Zn—Sn—Al, Zr—Ca—O—Zn—Sn—Ga, Zr—Ca—O—Zn—Sn—Al, Zr—Mg—O—Zn—Sn—Ga, Zr—Mg—O—Zn—Sn—Al, Zr—Si—O—Zn—Ga, Zr—Si—O—Zn—Al, Zr—Si—O—Sn—Ga, Zr—Si—O—Sn—Al, Zr—Si—O—Zn—Sn—Ga, Zr—Si—O—Zn—Sn—Al, and the like may be used.

From the viewpoint of production efficiency, first dielectric film 31 preferably contains Mg, and more preferably contains Mg and Ga. First dielectric film 31 preferably contains Zr—Mg—O—Zn—Ga, Zr—Mg—O—Zn—Al, Zr—Mg—O—Sn—Ga, Zr—Mg—O—Sn—Al, Zr—Mg—O—Zn—Sn—Ga, or Zr—Mg—O—Zn—Sn—Al, and more preferably contains Zr—Mg—O—Zn—Sn—Ga.

First dielectric film 31 according to the embodiment of the present invention preferably further contains the element D3 so that the element D3 and oxygen form an oxide of the element D3. The oxide of element D3 may be at least one of an oxide of Ga and an oxide of Al. The oxide of Ga may be $Ga_2O_3$, and the oxide of Al may be $Al_2O_3$. When first dielectric film 31 according to the present embodiment contains 7 atom % or less of the element D3, when the total number of moles of the oxide of Zr, the oxide of the element D1, the oxide of the element D2, and the oxide of the element D3 is defined as 100 mol %, the oxide of the element D3 is contained in an amount of 8 mol % or less.

The addition of the element D3 to the oxide of Zn decreases the specific resistance of the oxide of Zn. That is, the element D3 plays a role of improving the conductivity of the oxide of Zn. Furthermore, since the conductivity of the entire system is improved, the target is easily subjected to DC sputtering. The film-forming rate is increased and the productivity is enhanced. The oxide of the element D3 may be added in such a manner that a part of the oxide of Zn is replaced.

The amount of the oxide of the element D3 to be added is preferably 8 mol % or less, since the oxide of the element D3 gives the effect in a small amount. When the amount is more than 8 mol %, the specific resistance will not decrease.

As first dielectric film 31, $ZrO_2$—ZnO—$Ga_2O_3$, $ZrO_2$—ZnO—$Al_2O_3$, $ZrO_2$—$SnO_2$—$Ga_2O_3$, $ZrO_2$—$SnO_2$—$Al_2O_3$, $ZrO_2$—ZnO—$Ga_2O_3$—$SnO_2$, $ZrO_2$—ZnO—$Al_2O_3$—$SnO_2$, and the like may be used.

Alternatively, as first dielectric film 31, with an oxide of the element D2 mixed, $ZrO_2$—$Y_2O_3$—ZnO—$Ga_2O_3$, $ZrO_2$—$Y_2O_3$—ZnO—$Al_2O_3$, $ZrO_2$—CaO—ZnO—$Ga_2O_3$, $ZrO_2$—CaO—ZnO—$Al_2O_3$, $ZrO_2$—MgO—ZnO—$Ga_2O_3$, $ZrO_2$—MgO—ZnO—$Al_2O_3$, $ZrO_2$—$Y_2O_3$—$SnO_2$—$Ga_2O_3$, $ZrO_2$—$Y_2O_3$—$SnO_2$—$Al_2O_3$, $ZrO_2$—CaO—$SnO_2$—$Ga_2O_3$, $ZrO_2$—CaO—$SnO_2$—$Al_2O_3$, $ZrO_2$—MgO—$SnO_2$—$Ga_2O_3$, $ZrO_2$—MgO—$SnO_2$—$Al_2O_3$, $ZrO_2$—$Y_2O_3$—ZnO—$Ga_2O_3$—$SnO_2$, $ZrO_2$—$Y_2O_3$—ZnO—$Al_2O_3$—$SnO_2$, $ZrO_2$—CaO—ZnO—$Ga_2O_3$—$SnO_2$, $ZrO_2$—CaO—ZnO—$Al_2O_3$—$SnO_2$, $ZrO_2$—MgO—ZnO—$Ga_2O_3$—$SnO_2$, $ZrO_2$—MgO—ZnO—$Al_2O_3$—$SnO_2$, $ZrO_2$—$SiO_2$—ZnO—$Ga_2O_3$, $ZrO_2$—$SiO_2$—ZnO—$Al_2O_3$, $ZrO_2$—$SiO_2$—$SnO_2$—$Ga_2O_3$, $ZrO_2$—$SiO_2$—$SnO_2$—$Al_2O_3$, $ZrO_2$—$SiO_2$—ZnO—$Ga_2O_3$—$SnO_2$, $ZrO_2$—$SiO_2$—ZnO—$Al_2O_3$—$SnO_2$, $ZrSiO_4$—ZnO—$Ga_2O_3$, $ZrSiO_4$—ZnO—$Al_2O_3$, $ZrSiO_4$—$SnO_2$—$Ga_2O_3$, $ZrSiO_4$—$SnO_2$—$Al_2O_3$, $ZrSiO_4$—ZnO—$Ga_2O_3$—$SnO_2$, $ZrSiO_4$—ZnO—$Al_2O_3$—$SnO_2$, $ZrSiO_4$—$SiO_2$—ZnO—$Ga_2O_3$—$SnO_2$, $ZrSiO_4$—$ZrO_2$—ZnO—$Ga_2O_3$—$SnO_2$, and the like may be used.

From the viewpoint of production efficiency, first dielectric film 31 preferably contains MgO, and preferably contains MgO and $Ga_2O_3$. First dielectric film 31 preferably contains $ZrO_2$—MgO—ZnO—$Ga_2O_3$, $ZrO_2$—MgO—ZnO—$Al_2O_3$, $ZrO_2$—MgO—$SnO_2$—$Ga_2O_3$, $ZrO_2$—MgO—$SnO_2$—$Al_2O_3$, $ZrO_2$—MgO—ZnO—$Ga_2O_3$—$SnO_2$, or $ZrO_2$—MgO—ZnO—$Al_2O_3$—$SnO_2$, and more preferably contains $ZrO_2$—MgO—ZnO—$Ga_2O_3$—$SnO_2$.

For example, when first dielectric film 31 contains 2 mol % of $Ga_2O_3$, the composition of the case is expressed as $(ZrO_2)_{30}(ZnO)_{38}(Ga_2O_3)_2(SnO_2)_{30}$ mol % or $(ZrO_2)_{27.3}(Y_2O_3)_{2.7}(ZnO)_{38}(Ga_2O_3)_2(SnO_2)_{30}$ mol %.

For example, when first dielectric film 31 contains 1.1 mol % of $Ga_2O_3$, the composition expressed as $(ZrO_2)_{23}(MgO)_2(ZnO)_{48.9}(Ga_2O_3)_{1.1}(SnO_2)_{25}$ mol % may be used.

The thickness of first dielectric film 31 may be, for example, 5 nm or more and 40 nm or less. More preferably, the thickness is 8 nm or more and 30 nm or less. Less than 5 nm of the thickness may decrease a protection function, and this may not allow for suppressing the ingress of moisture into recording film 32. More than 40 nm of thickness may decrease the reflectance of L2 layer 30. Further, more than 40 nm of the thickness of first dielectric film 31 may make the time required for film formation of first dielectric film 31 (sputtering time) long to decrease the productivity.

The composition of first dielectric film 31 can be analyzed, for example, with an X-ray micro analyzer (XMA) or an electron probe micro analyzer (EPMA) or by EDS (energy dispersive X-ray spectrometry) or Rutherford backscattering spectrometry (RBS). The elements contained in first dielectric films 21, 11, recording films 32, 22, 12, and second dielectric films 33, 23, 13 described later and the composition thereof can be similarly analyzed by these measures.

For example, with XMA, the composition of each element can be examined by analyzing first dielectric film 31 according to the embodiment of the present invention. For example, when first dielectric film 31 having the following (a) composition (mol %) is analyzed by XMA, approximately (b) composition (atom %) is obtained.

$$(ZrO_2)_{30}(ZnO)_{40}(SnO_2)_{30} \text{ mol \%} \quad (a),$$

$$Zr_{11.5}Zn_{15.4}Sn_{11.5}O_{61.6} \text{ atom \%} \quad (b).$$

Alternatively, analysis of (c) composition (mol %) gives approximately (d) composition (atom %).

$$(ZrO_2)_{27.3}(Y_2O_3)_{2.7}(ZnO)_{38}(Ga_2O_3)_2(SnO_2)_{30} \text{ mol \%} \quad (c),$$

$$Zr_{10.1}Y_{2.0}Zn_{14.0}Ga_{1.5}Sn_{11.1}O_{61.3} \text{ atom \%} \quad (d).$$

Alternatively, analysis of (r) composition (mol %) gives approximately (s) composition (atom %).

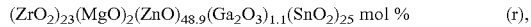

$(ZrO_2)_{23}(MgO)_2(ZnO)_{48.9}(Ga_2O_3)_{1.1}(SnO_2)_{25}$ mol % (r),

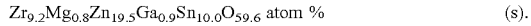

$Zr_{9.2}Mg_{0.8}Zn_{19.5}Ga_{0.9}Sn_{10.0}O_{59.6}$ atom % (s).

If Zr is contained, Hf may also be detected.

For an amorphous film, it is difficult to specify the oxides formed, so the composition is for each element. It is also conceivable that composite oxides, mixed oxides, suboxides, and high oxidation number oxides are formed in the film of first dielectric film 31, and in some cases, the calculated values of (b), (d), and (s) and the actual analysis values do not match.

As described above, when first dielectric film 31 is formed on the surface of intermediate separation layer 3 by sputtering, organic matters may volatilize from intermediate separation layer 3 due to the radiant heat during the sputtering. In this case, organic matters are incorporated into the vicinity of the boundary between first dielectric film 31 and intermediate separation layer 3. This can be verified by the detection of carbon upon elemental analysis in the film thickness direction by secondary ion mass spectrometry.

First dielectric film 31 has a function of adjusting an optical phase difference to control signal amplitude of grooves and lands and a function of adjusting rigidity to control a bulge of a recording mark, and a function of controlling the reflectance and transmittance of L2 layer 30. Further, first dielectric film 31 also has a function of suppressing ingress of moisture into recording film 32 and a function of suppressing escape of oxygen in recording film 32 to exterior.

The conductivity of the target was obtained by using an oxide of the element D1 and, if necessary, an oxide of the element D3, instead of using $In_2O_3$, which is conventional. The target preferably has a specific resistance of 1 Ω·cm or less. This also similarly applies to first dielectric films 21, 11 described later.

First dielectric film 31 is, for example, a nanometer-order thin film formed by sputtering. Thus, the oxide contained in first dielectric film 31 sometimes does not strictly give a stoichiometric composition due to deficiency of oxygen and/or a metal during sputtering and due to incorporation of inevitable impurities. Because of this reason, the oxide contained in first dielectric film 31 does not necessarily have to be one having a stoichiometric composition in the present embodiment and the other embodiments. The materials represented by stoichiometric compositions in the present specification include one that does not strictly have a stoichiometric composition due to deficiency of oxygen and/or a metal and due to incorporation of impurities. This also similarly applies to first dielectric films 21, 11 to be described later.

First dielectric film 31 may be substantially made of Zr, oxygen, and the element D1.

Here, the term "substantially" is used in consideration of cases in which when first dielectric film 31 is formed by, for example, sputtering, first dielectric film 31 sometimes inevitably contains other elements derived from a rare gas (Ar, Kr, or Xe), moisture, organic matters (C), air and impurities contained in a jig and a sputtering target that are disposed in a sputtering chamber, which are present in a sputtering atmosphere. When all atoms contained in first dielectric film 31 are defined as 100 atom %, these inevitable components may be contained up to 10 atom % as an upper limit. This also similarly applies to cases where the elements D2, D3 are contained. Further, this also similarly applies to cases where the term "substantially" is used for first dielectric films 21, 11 described later.

When L2 layer 30 is the first information layer, recording film 32 according to the embodiment of the present invention contains at least W, Cu, Mn, and oxygen, and further contains at least one element M selected from Zn, Nb, Mo, Ta, and Ti.

Since recording film 32 contains at least W, Cu, Mn, and oxygen, for example, oxygen (O) is separated by irradiation with laser beam 6 or O atoms are combined with each other to form an expansion portion to be a recording mark. This formation of the expansion portion is an irreversible change, so that the L2 layer that includes this recording film 32 becomes write-once type.

In recording film 32, W, Cu, and Mn may be present in oxide forms of W—O, Cu—O, and Mn—O, respectively.

W—O in recording film 32 is a transparent oxide and has a function of generating oxygen to expand recording film 32 when recording film 32 is irradiated with a laser beam 6. Further, when recording film 32 is formed by DC sputtering with use of a target containing W, W in the target has a function of stably maintaining the DC sputtering. When recording film 32 contains no W, the film 32 is not expanded to make formation of a recording mark difficult. When recording film 32 is formed by sputtering with use of the target containing W while introducing oxygen, the W is converted into W—O or at least part of the W is combined with another element to form a composite oxide in recording film 32.

Cu—O in recording film 32 is an oxide having an optical absorbency and plays a role of making recording film 32 absorb laser beam 6. Cu in a target imparts conductivity to the target, and when recording film 32 is formed by DC sputtering, the Cu has a function of stably maintaining the DC sputtering. A target that contains no Cu in recording film 32 makes the DC sputtering very difficult. When recording film 32 is formed by sputtering with use of the target containing Cu in recording film 32 while introducing oxygen, the Cu is converted into Cu—O or at least part of the Cu is combined with another element to form a composite oxide in recording film 32.

Mn—O in recording film 32 is an oxide having optical absorbency and has a function of generating oxygen to expand recording film 32 when recording film 32 is irradiated with laser beam 6. The modulation degree becomes larger along with an increase of the content of Mn—O in recording film 32, to improve the signal quality. When recording film 32 contains no Mn—O, a good-quality recording mark cannot be formed. When recording film 32 is formed by sputtering with use of a target containing Mn—O in recording film 32 while introducing oxygen, the Mn—O remain unchanged or at least part of the Mn—O is combined with another element to form a composite oxide in recording film 32.

When recording film 32 further contains at least one element M selected from Zn, Nb, Mo, Ta, and Ti, a large modulation degree is obtained.

In recording film 32, Zn may be present in an oxide form of Zn—O.

Zn—O in recording film 32 is a conductive oxide, and formation of recording film 32 by DC sputtering with use of a target containing Zn—O further stabilizes the maintenance of the DC sputtering. Moreover, adjustment of an amount of Zn—O enables adjustment of the transmittance and the optical absorptance of recording film 32. Even when the target contains no Zn—O, however, it is possible to perform the DC sputtering. When recording film 32 is formed by sputtering with use of the target containing Zn—O while introducing oxygen, the Zn—O remain unchanged or at least part of the Zn—O is combined with another element to form a composite oxide in recording film 32.

In recording film 32, Nb, Mo, Ta, and Ti may be present in oxide forms of Nb—O, Mo—O, Ta—O, and Ti—O, respectively. Nb, Mo, Ta, and Ti are each capable of forming a plurality of oxides having different oxidation numbers. In general, an oxide containing much oxygen is transparent. For example, NbO (divalent niobium) and $NbO_2$ (tetravalent niobium) are black, whereas $Nb_2O_5$ (pentavalent niobium) is colorless. A Magneli-phase oxide $Nb_{3n+1}O_{5n-2}$ also exists. $MoO_2$ (tetravalent molybdenum) is black, whereas $MoO_3$ (hexavalent molybdenum) is colorless. A blue Magneli-phase oxide obtained by reduction of $MoO_3$ also exists. $TaO_2$ (tetravalent tantalum) is black, whereas $Ta_2O_5$ (pentavalent tantalum) is colorless. TiO (divalent titanium) is black and $Ti_2O_3$ (trivalent titanium) is black-violet, whereas $TiO_2$ (tetravalent titanium) is colorless.

Furthermore, W, Cu, Mn, and the element M in recording film 32 according to the embodiment of the present invention preferably satisfy the following formula (1):

$$W_xCu_yMn_zM_{100-x-y-z} \text{ (atom \%)} \quad (1)$$

in the formula (1), 15≤x<60, 0<y≤30, 10≤z≤40, and 10≤100-x-y-z≤50.

In the recording film 32 that W, Cu, Mn, and the element M satisfy the above formula, the recording and reproduction characteristics of L2 layer 30 is improved.

In the formula (1), x (amount of W) is preferably 15 or more and 60 or less. x in this range allows recording film 32 to be formed by stable DC sputtering and this allows for providing the L2 layer having good recording and reproduction characteristics. 15 or more of x enables performing good DC sputtering. Further, 15 or more of x allows for easily forming a recording mark and imparting good recording and reproduction characteristics.

Less than 15 of x may make the sputtering in performing DC sputtering unstable to easily cause abnormal electrical discharge. Further, less than 15 of x makes recording film 32 to be less likely to expand and makes formation of a recording mark difficult. More than 60 of x may cause L2 layer 30 to require large laser power for recording.

y (amount of Cu) satisfies 0<y≤30. For recording film 32, more preferred is 5≤y≤25. 25 or less of y enables adjustment of the optical absorptance of recording film 32 and optimization of the recording sensitivity of the L2 layer to impart good reproduction durability under the power for reproduction satisfying the standard. Setting y to be larger than 0 allows for easily performing pulse DC sputtering of recording film 32. Further, setting y to be 5 or more allows for easily performing DC sputtering of recording film 32. More than 30 of y increases light absorption of recording film 32 to improve the recording sensitivity and decrease the power for recording. At the same time, the maximum power for reproduction also decreases, so the reproduction durability becomes inferior.

z (amount of Mn) satisfies 10≤z≤40. Since L2 layer 30 is located nearest to the surface irradiated with laser beam 6, L2 layer 30 has a priority to have optically high transmittance. Thus, recording film 32 of L2 layer 30 may be formed with a composition having a smaller z value than the values of recording film 12 of L0 layer 10 and recording film 22 of L1 layer 20. For recording film 32, more preferred is 10≤z≤5. This range allows for suppressing the optical absorptance of L2 layer 30, achieving a high transmittance, and increasing the power for reproduction.

100-x-y-z (amount of element M) satisfies 10≤100-x-y-z≤50. 10≤100-x-y-z≤50 allows the recording and reproduction characteristics of L2 layer 30 to be satisfactory. Further, 10≤100-x-y-z≤50 enables optimization of the refractive index and extinction coefficient of recording film 32 to increase the transmittance of L2 layer 30 and also reduce the absorptance, so that the power for reproduction can be increased. The element M also has a function of separating or binding more oxygen and promoting the expansion of the irradiated portion of recording film 32 with laser beam 6. When 100-x-y-z is larger than 50, the element M is too much, the recording mark on recording film 32 may be excessively expanded, and the recording mark may reduce the amplitude of the recording mark on an adjacent track. As a result, the recording and reproduction characteristics of L2 layer 30 are deteriorated. Further, when 100-x-y-z is 10 or more, the ratio of the element M is sufficient, the recording mark on recording film 32 is likely to expand, and the recording and reproduction characteristics are improved.

The element M may be at least one selected from Ta and Zn.

When Ta is contained as Ta—O, it is a more preferable material having the best function of expanding the recording mark among the elements M.

Regarding Zn, incorporation of Zn enables a further improvement in stability of sputtering when recording film 32 is formed by DC sputtering. Thus, this allows abnormal electrical discharge to be less likely to occur to improve the productivity, even when sputtering power is increased or an Ar gas is reduced. Alternatively, Zn also has a function of increasing the transmittance of L2 layer 30.

When the elements M are Ta and Zn, the total number of atoms of Ta and Zn may be 10≤100-x-y-z≤50.

The film thickness of recording film 32 may be 15 nm or more and 50 nm or less, and particularly 25 nm or more and 45 nm or less. When the thickness is smaller than 15 nm, recording film 32 does not expand sufficiently and a good recording mark is not formed, so that d-MLSE is deteriorated. More than 50 nm of the thickness allows for improving the recording sensitivity and reducing the power for recording. Instead, the power for reproduction is reduced and the amount of light for reproduction may be decreased. Further, more than 50 nm of the thickness of recording film 32 may make the time required for forming recording film 32 (sputtering time) long to decrease the productivity.

Recording film 32 may have a composition of, for example, W—Cu—Mn—Zn—O (O: oxygen), W—Cu—Mn—Nb—O, W—Cu—Mn—Nb—Zn—O, W—Cu—Mn—Nb—Ta—O, W—Cu—Mn—Nb—Ta—Zn—O, W—Cu—Mn—Mo—O, W—Cu—Mn—Mo—Zn—O, W—Cu—Mn—Mo—Ta—O, W—Cu—Mn—Mo—Ta—Zn—O, W—Cu—Mn—Ta—O, W—Cu—Mn—Ta—Zn—O, W—Cu—Mn—Ti—O, W—Cu—Mn—Ti—Zn—O, W—Cu—Mn—Ti—Ta—O, W—Cu—Mn—Ti—Ta—Zn—O, or the like.

W in recording film 32 may be present in a $WO_3$ form that gives high transparency. Recording film 32 may also contain metal W, $WO_2$, an intermediate oxide between $WO_2$ and $WO_3$ (e.g., $W_{18}O_{49}$, $W_{20}O_{58}$, $W_{50}O_{148}$, or $W_{40}O_{119}$), or a Magneli phase ($W_nO_{3n-1}$).

Cu in recording film 32 may be present in a CuO or $Cu_2O$ form. Recording film 32 may also contain metal Cu.

Mn in recording film 32 may be present in a form of at least one oxide selected from MnO, $Mn_3O_4$, $Mn_2O_3$, and $MnO_2$. Recording film 32 may also contain metal Mn.

Nb in recording film 32 may be present in a colorless $Nb_2O_5$ form or in an $NbO_x$ form. $Nb_2O_5$ and $NbO_x$ may be mixed. Recording film 32 may also contain NbO, $NbO_2$, or a Magneli phase ($Nb_{3n+1}O_{8n-2}$). Recording film 32 may also contain metal Nb.

Mo in recording film 32 may be present in a colorless $MoO_3$ form. Recording film 32 may also contain $MoO_2$, an intermediate oxide between $MoO_2$ and $MoO_3$ (e.g., $Mo_3O_8$, $Mo_4O_{11}$, $Mo_5O_{14}$, $Mo_8O_{23}$, $Mo_9O_{26}$, and $Mo_{17}O_{47}$), or a Magneli phase ($Mo_nO_{3n-2}$). Recording film 32 may also contain metal Mo.

Ta in recording film 32 may be present in a colorless $Ta_2O_5$ form. Recording film 32 may also contain $TaO_2$. Recording film 32 may also contain metal Ta.

Ti in recording film 32 may be present in a colorless $TiO_2$ form or in a $TiO_x$ form. $TiO_2$ and $TiO_x$ may be mixed. Recording film 32 may also contain TiO, $Ti_2O_3$, $Ti_2O_5$ or a Magneli phase ($Ti_nO_{2n-1}$). Recording film 32 may also contain metal Ti.

In recording film 32, a composite oxide may also be present that contains two or more metals selected from W, Cu, Mn, and the element M.

When recording film 32 has a composition of, for example, W—Cu—Mn—Zn—O, the system of the film may be $WO_3$—CuO—$MnO_2$—ZnO, $WO_3$—CuO—$Mn_2O_3$—ZnO, $WO_3$—CuO—$Mn_3O_4$—ZnO, $WO_3$—CuO—MnO—ZnO, $WO_3$—$Cu_2O$—$MnO_2$—ZnO, $WO_3$—$Cu_2O$—$Mn_2O_3$—ZnO, $WO_3$—$Cu_2O$—$Mn_3O_4$—ZnO, $WO_3$—$Cu_2O$—MnO—ZnO, or the like. Alternatively, it may contain a Magneli phase of tungsten oxide. Composite oxides, mixed oxides, suboxides, and high oxidation number oxides may be formed in these systems.

When recording film 32 has a composition of, for example, W—Cu—Mn—Nb—O, the system of the film 32 may be $WO_3$—CuO—$MnO_2$—$Nb_2O_5$, $WO_3$—CuO—$Mn_2O_3$—$Nb_2O_5$, $WO_3$—CuO—$Mn_3O_4$—$Nb_2O_5$, $WO_3$—CuO—MnO—$Nb_2O_5$, $WO_3$—$Cu_2O$—$MnO_2$—$Nb_2O_5$, $WO_3$—$Cu_2O$—$Mn_2O_3$—$Nb_2O_5$, $WO_3$—$Cu_2O$—$Mn_3O_4$—$Nb_2O_5$, $WO_3$—$Cu_2O$—MnO—$Nb_2O_5$, $WO_3$—CuO—$MnO_2$—NbO, $WO_3$—CuO—$Mn_2O_3$—NbO, $WO_3$—CuO—$Mn_3O_4$—NbO, $WO_3$—CuO—MnO—NbO, $WO_3$—$Cu_2O$—$MnO_2$—NbO, $WO_3$—$Cu_2O$—$Mn_2O_3$—NbO, $WO_3$—$Cu_2O$—$Mn_3O_4$—NbO, $WO_3$—$Cu_2O$—MnO—NbO, $WO_3$—CuO—$MnO_2$—$NbO_2$, $WO_3$—CuO—$Mn_2O_3$—$NbO_2$, $WO_3$—CuO—$Mn_3O_4$—$NbO_2$, $WO_3$—CuO—MnO—$NbO_2$, $WO_3$—$Cu_2O$—$MnO_2$—$NbO_2$, $WO_3$—$Cu_2O$—$Mn_2O_3$—$NbO_2$, $WO_3$—$Cu_2O$—$Mn_3O_4$—$NbO_2$, $WO_3$—$Cu_2O$—MnO—$NbO_2$, or the like. In the system shown here, $NbO_x$ may be present instead of $Nb_2O_5$, or $Nb_2O_5$ and $NbO_x$ may be mixed. Alternatively, it may contain a Magneli phase of tungsten oxide or niobium oxide. Composite oxides, mixed oxides, suboxides, and high oxidation number oxides may be formed in these systems. Further, the system shown here may contain ZnO.

When recording film 32 has a composition of, for example, W—Cu—Mn—Mo—O, the system of the film 32 may be $WO_3$—CuO—$MnO_2$—$MoO_3$, $WO_3$—CuO—$Mn_2O_3$—$MoO_3$, $WO_3$—CuO—$Mn_3O_4$—$MoO_3$, $WO_3$—CuO—MnO—$MoO_3$, $WO_3$—$Cu_2O$—$MnO_2$—$MoO_3$, $WO_3$—$Cu_2O$—$Mn_2O_3$—$MoO_3$, $WO_3$—$Cu_2O$—$Mn_3O_4$—$MoO_3$, $WO_3$—$Cu_2O$—MnO—$MoO_3$, $WO_3$—CuO—$MnO_2$—$MoO_2$, $WO_3$—CuO—$Mn_2O_3$—$MoO_2$, $WO_3$—CuO—$Mn_3O_4$—$MoO_2$, $WO_3$—CuO—MnO—$MoO_2$, $WO_3$—$Cu_2O$—$MnO_2$—$MoO_2$, $WO_3$—$Cu_2O$—$Mn_2O_3$—$MoO_2$, $WO_3$—$Cu_2O$—$Mn_3O_4$—$MoO_2$, $WO_3$—$Cu_2O$—MnO—$MoO_2$, or the like. Alternatively, it may contain a Magneli phase of tungsten oxide or niobium oxide. Composite oxides, mixed oxides, suboxides, and high oxidation number oxides may be formed in these systems. Further, the system shown here may contain ZnO.

When recording film 32 has a composition of, for example, W—Cu—Mn—Ta—O, the system of the film 32 may be $WO_3$—CuO—$MnO_2$—$Ta_2O_5$, $WO_3$—CuO—$Mn_2O_3$—$Ta_2O_5$, $WO_3$—CuO-$Mn_3O_4$—$Ta_2O_5$, $WO_3$—CuO—MnO—$Ta_2O_5$, $WO_3$—$Cu_2O$—$MnO_2$—$Ta_2O_5$, $WO_3$—$Cu_2O$—$Mn_2O_3$—$Ta_2O_5$, $WO_3$—$Cu_2O$—$Mn_3O_4$—$Ta_2O_5$, $WO_3$—$Cu_2O$—MnO—$Ta_2O_5$, $WO_3$—CuO—$MnO_2$—$TaO_2$, $WO_3$—CuO—$Mn_2O_3$—$TaO_2$, $WO_3$—CuO—$Mn_3O_4$—$TaO_2$, $WO_3$—CuO—MnO—$TaO_2$, $WO_3$—$Cu_2O$—$MnO_2$—$TaO_2$, $WO_3$—$Cu_2O$—$Mn_2O_3$—$TaO_2$, $WO_3$—$Cu_2O$—$Mn_3O_4$—$TaO_2$, $WO_3$—$Cu_2O$—MnO—$TaO_2$, or the like. Alternatively, it may contain a Magneli phase of tungsten oxide. Composite oxides, mixed oxides, suboxides, and high oxidation number oxides may be formed in these systems.

When recording film 32 has a composition of, for example, W—Cu—Mn—Ti—O, the system of the film 32 may be $WO_3$—CuO—$MnO_2$—$TiO_2$, $WO_3$—CuO—$Mn_2O_3$—$TiO_2$, $WO_3$—CuO—$Mn_3O_4$—$TiO_2$, $WO_3$—CuO—MnO—$TiO_2$, $WO_3$—$Cu_2O$—$MnO_2$—$TiO_2$, $WO_3$—$Cu_2O$—$Mn_2O_3$—$TiO_2$, $WO_3$—$Cu_2O$—$Mn_3O_4$—$TiO_2$, $WO_3$—$Cu_2O$—MnO—$TiO_2$, or the like. $TiO_x$ may be present instead of $TiO_2$, or $TiO_2$ and $TiO_x$ may be mixed. Alternatively, it may contain a Magneli phase of tungsten oxide or titanium oxide. Composite oxides, mixed oxides, suboxides, and high oxidation number oxides may be formed in these systems. Further, the system shown here may contain ZnO.

When recording film 32 has a composition of, for example, W—Cu—Mn—Ta—Zn—O, the system of the film 32 may be $WO_3$—CuO—$MnO_2$—$Ta_2O_5$—ZnO, $WO_3$—CuO—$Mn_2O_3$—$Ta_2O_5$—ZnO, $WO_3$—CuO—$Mn_3O_4$—$Ta_2O_5$—ZnO, $WO_3$—CuO—MnO—$Ta_2O_5$—ZnO, $WO_3$—$Cu_2O$—$MnO_2$—$Ta_2O_5$—ZnO, $WO_3$—$Cu_2O$—$Mn_2O_3$—$Ta_2O_5$—ZnO, $WO_3$—$Cu_2O$—$Mn_3O_4$—$Ta_2O_5$—ZnO, $WO_3$—$Cu_2O$—MnO—$Ta_2O_5$—ZnO, $WO_3$—CuO—$MnO_2$—$TaO_2$—ZnO, $WO_3$—CuO—$Mn_2O_3$—$TaO_2$—ZnO, $WO_3$—CuO—$Mn_3O_4$—$TaO_2$—ZnO, $WO_3$—CuO—MnO—$TaO_2$—ZnO, $WO_3$—$Cu_2O$—$MnO_2$—$TaO_2$—ZnO, $WO_3$—$Cu_2O$—$Mn_2O_3$—$TaO_2$—ZnO, $WO_3$—$Cu_2O$—$Mn_3O_4$—$TaO_2$—ZnO, $WO_3$—$Cu_2O$—MnO—$TaO_2$—ZnO, or the like.

Alternatively, it may contain a Magneli phase of tungsten oxide. Composite oxides, mixed oxides, suboxides, and high oxidation number oxides may be formed in these systems.

As described above, when recording film 32 contains a plurality of oxides and the composition of the elements except oxygen, i.e., W, Cu, Mn, and M satisfy the following formula (1):

$$W_xCu_yMn_zM_{100-x-y-z} \text{ (atom \%)} \tag{1}$$

where $15 \leq x \leq 60$, $0 < y \leq 30$, $10 \leq z \leq 40$, and $10 \leq 100-x-y-z \leq 50$, it is possible to obtain an amount of light for reproduction that allows a S/N to be necessary for recording and reproducing a large amount (for example, 500 GB per one disc) of information.

A ratio of the oxygen contained in recording film 32 may be 60 atom % or more and 80 atom % or less, when a total number of atoms of the metal elements and the oxygen is defined as 100 atom %. Less than 60 atom % of the proportion of the oxygen allows the recording sensitivity to be good to decrease the power for recording. Instead, this decreases the power for reproduction, so that the amount of light for reproduction is sometimes decreased. More than 80 atom % of the proportion of the oxygen causes the recording sensitivity to be excessively deteriorated to require high power for recording and thus high-speed recording becomes difficult.

Recording film 32 may be substantially made of W, Cu, Mn, oxygen, and the element M. Here, the term "substantially" is used in consideration of cases in which when recording film 32 is formed by, for example, sputtering, recording film 32 sometimes inevitably contains other elements derived from a rare gas (Ar, Kr, or Xe), moisture, organic matters (C), air and impurities contained in a jig and a sputtering target that are disposed in a sputtering chamber, which are present in a sputtering atmosphere. When all atoms contained in recording film 32 are defined as 100 atom %, these inevitable components may be contained up to 10 atom % as an upper limit. This also similarly applies to cases in which the term "substantially" is used for recording films 22, 12 described later.

Recording film 32 is a nanometer-order thin film formed by, for example, sputtering. Thus, the oxide contained in recording film 32 sometimes does not strictly give a stoichiometric composition due to deficiency of oxygen and/or a metal during sputtering and due to incorporation of inevitable impurities. Because of this reason, the oxide contained in recording film 32 does not necessarily have to be one having a stoichiometric composition in the present embodiment and the other embodiments. The materials represented by stoichiometric compositions in the present specification include one that does not strictly have a stoichiometric composition due to deficiency of oxygen and/or a metal and due to incorporation of impurities. Further, composite oxides, mixed oxides, suboxides, and high oxidation number oxides may be formed. This also similarly applies to recording films 22, 12 described later.

Second dielectric film 33 according to the present embodiment may be disposed on the laser beam 6-irradiated surface side of recording film 32.

When L2 layer 30 is the first information layer, the first information layer has first dielectric film 31, recording film 32, and second dielectric layer 33 in this order from the farther side to the nearer side of the surface irradiated with laser beam 6. Second dielectric film 33 contains at least Zr and oxygen, and further contains at least one element D1 selected from Zn and Sn. When the total number of atoms of Zr, oxygen and the element D1 is defined as 100 atom %, preferably, Zr is contained in an amount of 3 atom % or more and 26 atom % or less and the element D1 is contained in an amount of 10 atom % or more and 43 atom % or less.

As second dielectric film 33 according to the present embodiment, similarly to first dielectric film 31, Zr—O—Zn, Zr—O—Sn, Zr—O—Zn—Sn, and the like may be used, and Zr—O—Zn—Sn is preferably used. O is oxygen. Here, "-" means "mix". Thus, Zr—O—Zn means that Zr, oxygen, and Zn are mixed. Since a Zr mineral contains a small amount of Hf, second dielectric film 33 may contain Hf.

Second dielectric film 33 contains Zr, oxygen, and the element D1, so that, preferably, Zr and oxygen form an oxide of Zr and the element D1 and oxygen form an oxide of the element D1. In that case, the oxide of Zr is preferably contained in an amount of 10 mol % or more and 70 mol % or less, and the oxide of the element D1 is preferably contained in an amount of 30 mol % or more and 90 mol % or less.

When 10 mol % or more of the oxide of Zr is contained, L2 layer 30 can realize excellent reproduction durability. Containing more than 70 mol % of the oxide of Zr increases the specific resistance and thus this disables pulse DC sputtering. In addition, the film-forming rate becomes remarkably slow, so that the productivity is decreased. When the amount of Zr oxide is less than 10 mol %, the reproduction durability is deteriorated.

When 30 mol % or more of the oxide of the element D1 is further contained in addition to the oxide of Zr, the specific resistance of the target can be decreased and the conductivity can be imparted. This enables pulse DC sputtering. The film-forming rate becomes faster than that of the high frequency sputtering. Furthermore, containing 40 mol % or more of the oxide of the element D1 allows for further decreasing the specific resistance of the target to enables DC sputtering. The film-forming rate becomes faster than that of the pulse DC sputtering, and the productivity is enhanced.

The oxide of element D1 may be at least one of an oxide of Zn and an oxide of Sn. The oxide of Zn has a function of imparting conductivity. The oxide of Sn has a function of increasing the film-forming rate.

The oxide of Zr may include $ZrO_2$. Further, the oxide of the element D1 may include at least one selected from ZnO, SnO, and $SnO_2$. The oxide of Sn more preferably includes $SnO_2$, which has a high melting point and is transparent.

Second dielectric film 33 may be made of a mixture of two or more oxides selected from these oxides, or may be made of a composite oxide formed of two or more oxides. For example, it may be $ZrO_2$—ZnO.

Since a Zr mineral contains a small amount of Hf, second dielectric film 33 may contain an oxide of Hf.

As second dielectric film 33, similarly to first dielectric film 31, $ZrO_2$—ZnO, $ZrO_2$—$SnO_2$, $ZrO_2$—ZnO—$SnO_2$, and the like may be used.

When 70 mol % of the oxide of the element D1 (40 mol % of ZnO and 30 mol % of $SnO_2$) is contained, the composition is expressed as $(ZrO_2)_{30}(ZnO)_{40}(SnO_2)_{30}$ mol %.

Second dielectric film 33 may further contain at least one element D2 selected from Si, Y, Ca, and Mg.

As second dielectric film 33, Zr—Y—O—Zn, Zr—Ca—O—Zn, Zr—Mg—O—Zn, Zr—Y—O—Sn, Zr—Ca—O—Sn, Zr—Mg—O—Sn, Zr—Y—O—Zn—Sn, Zr—Ca—O—Zn—Sn, Zr—Mg—O—Zn—Sn, Zr—Si—O—Zn, Zr—Si—O—Sn, Zr—Si—O—Zn—Sn, and the like may be used.

Second dielectric film 33 preferably contains Mg from the viewpoint of production efficiency. Second dielectric film 33 preferably contains Zr—Mg—O—Zn, Zr—Mg—O—Sn, or Zr—Mg—O—Zn—Sn, and more preferably contains Zr—Mg—O—Zn—Sn.

It is preferred that second dielectric film 33 further contains the element D2 and the element D2 and oxygen form an oxide of the element D2. The oxide of the element D2 may be at least one of an oxide of Si, an oxide of Y, an oxide of Ca, and an oxide of Mg.

Also in second dielectric film 33, the oxide of Zr and the oxide of the element D2 preferably form stabilized zirconia or partially stabilized zirconia. This allows the target to be less likely to crack even if high power is applied to perform mass production. Among oxides of rare earth elements, an oxide of Y is more preferable, but oxides of other rare earth elements such as an oxide of Ce may be used. The oxide of Y may include $Y_2O_3$, the oxide of Ca may include CaO, and the oxide of Mg may include MgO.

When the target contains an oxide of Zr as stabilized zirconia or partially stabilized zirconia, a reversible volume change associated with a phase transition can be suppressed on the target surface that becomes high temperature during sputtering. This allows for using the target up to the end since cracks are less likely to occur from the target surface even if DC sputtering or pulse DC sputtering is repeated with applying high power in order to increase productivity. Among the oxides of the element D2, stabilized zirconia or partially stabilized zirconia to which $Y_2O_3$ is added is more preferable because it has excellent ionic conductivity, when DC sputtering or pulse DC sputtering is performed.

Moreover, from the viewpoint of production efficiency, stabilized zirconia or partially stabilized zirconia to which an oxide of Mg is added is preferably contained.

An oxide of the element D2 may be added in a ratio of 1 mol % to 10 mol % to $ZrO_2$. For example, when second dielectric film 33 contains 10 mol % of $Y_2O_3$ to $ZrO_2$, the composition of the case is expressed as $(ZrO_2)_{27.3}(Y_2O_3)_{2.7}(ZnO)_{40}(SnO_2)_{30}$ mol %.

For example, when second dielectric film 33 contains 8.7 mol % of MgO to $ZrO_2$, the composition of the case is expressed as $(ZrO_2)_{23}(MgO)_2(ZnO)_{50}(SnO_2)_{25}$ mol %.

As second dielectric film 33, $ZrO_2$—$Y_2O_3$—ZnO, $ZrO_2$—CaO—ZnO, $ZrO_2$—MgO—ZnO, $ZrO_2$—$Y_2O_3$—$SnO_2$, $ZrO_2$—CaO—$SnO_2$, $ZrO_2$—MgO—$SnO_2$, $ZrO_2$—$Y_2O_3$—ZnO—$SnO_2$, $ZrO_2$—CaO—ZnO—$SnO_2$, $ZrO_2$—MgO—ZnO—$SnO_2$, $ZrO_2$—$SiO_2$—ZnO, $ZrO_2$—$SiO_2$—$SnO_2$, $ZrO_2$—$SiO_2$—ZnO—$SnO_2$, $ZrSiO_4$—ZnO, $ZrSiO_4$—$SnO_2$, $ZrSiO_4$—ZnO—$SnO_2$, and the like may be used.

From the viewpoint of production efficiency, second dielectric film 33 preferably contains MgO. Second dielectric film 33 preferably contains $ZrO_2$—MgO—ZnO, $ZrO_2$—MgO—$SnO_2$, or $ZrO_2$—MgO—ZnO—$SnO_2$, and more preferably contains $ZrO_2$—MgO—ZnO—$SnO_2$.

Since Hf is similar to Zr in chemical properties, a part or all of $ZrO_2$ of second dielectric film 33 may be replaced with $HfO_2$. $HfO_2$ is described in first dielectric film 31 and is thus not described.

Second dielectric film 33 further contains at least one element D3 selected from Ga and Al, and when the total number of atoms of Zr, oxygen, element D1, element D2, and element D3 is defined as 100 atom %, the element D3 may be contained in an amount of 7 atom % or less.

As the elements contained in second dielectric film 33, Zr—O—Zn—Ga, Zr—O—Zn—Al, Zr—O—Sn—Ga, Zr—O—Sn—Al, Zr—O—Zn—Sn—Ga, Zr—O—Zn—Sn—Al, Zr—Y—O—Zn—Ga, Zr—Y—O—Zn—Al, Zr—Ca—O—Zn—Ga, Zr—Ca—O—Zn—Al, Zr—Mg—O—Zn—Ga, Zr—Mg—O—Zn—Al, Zr—Y—O—Sn—Ga, Zr—Ca—O—Sn—Ga, Zr—Ca—O—Sn—Al, Zr—Mg—O—Sn—Ga, Zr—Mg—O—Sn—Al, Zr—Y—O—Zn—Sn—Ga, Zr—Y—O—Zn—Sn—Al, Zr—Ca—O—Zn—Sn—Ga, Zr—Ca—O—Zn—Sn—Al, Zr—Mg—O—Zn—Sn—Ga, Zr—Mg—O—Zn—Sn—Al, Zr—Si—O—Zn—Ga, Zr—Si—O—Zn—Al, Zr—Si—O—Sn—Ga, Zr—Si—O—Sn—Al, Zr—Si—O—Zn—Sn—Ga, Zr—Si—O—Zn—Sn—Al, and the like may be used.

From the viewpoint of production efficiency, second dielectric film 33 preferably contains Mg, and more preferably contains Mg and Ga. Second dielectric film 33 preferably contains Zr—Mg—O—Zn—Ga, Zr—Mg—O—Zn—Al, Zr—Mg—O—Sn—Ga, Zr—Mg—O—Sn—Al, Zr—Mg—O—Zn—Sn—Ga, or Zr—Mg—O—Zn—Sn—Al, and more preferably contains Zr—Mg—O—Zn—Sn—Ga.

Second dielectric film 33 according to the embodiment of the present invention preferably further contains the element D3 and the element D3 and oxygen form an oxide of the element D3. The oxide of element D3 may be at least one of an oxide of Ga and an oxide of Al. The oxide of Ga may be $Ga_2O_3$, and the oxide of Al may be $Al_2O_3$.

When second dielectric film 33 contains 7 atom % or less of the element D3, when the total number of moles of the oxide of Zr, the oxide of the element D1, the oxide of the element D2, and the oxide of the element D3 is defined as 100 mol %, the oxide of the element D3 is contained in an amount of 8 mol % or less.

When the element D3 is added to the oxide of Zn, the specific resistance of the oxide of Zn is decreased. That is, the element D3 plays a role of improving the conductivity of the oxide of Zn. Furthermore, since the conductivity of the entire system is improved, the target is easily subjected to DC sputtering. The film-forming rate is increased and the productivity is enhanced. The element D3 may be added in such a manner that a part of the oxide of Zn is replaced.

The amount of the oxide of the element D3 to be added is preferably 8 mol % or less, since the oxide of the element D3 gives the effect in a small amount. More than 8 mol % of the oxide of the element D3 does not decrease the specific resistance.

As second dielectric film 33, $ZrO_2$—ZnO—$Ga_2O_3$, $ZrO_2$—ZnO—$Al_2O_3$, $ZrO_2$—$SnO_2$—$Ga_2O_3$, $ZrO_2$—$SnO_2$—$Al_2O_3$, $ZrO_2$—ZnO—$Ga_2O_3$—$SnO_2$, $ZrO_2$—ZnO—$Al_2O_3$—$SnO_2$, and the like may be used.

Alternatively, as second dielectric film 33, while mixing with an oxide of the element D2, $ZrO_2$—$Y_2O_3$—ZnO—$Ga_2O_3$, $ZrO_2$—$Y_2O_3$—ZnO—$Al_2O_3$, $ZrO_2$—CaO—ZnO—$Ga_2O_3$, $ZrO_2$—CaO—ZnO—$Al_2O_3$, $ZrO_2$—MgO—ZnO—$Ga_2O_3$, $ZrO_2$—MgO—ZnO—$Al_2O_3$, $ZrO_2$—$Y_2O_3$—$SnO_2$—$Ga_2O_3$, $ZrO_2$—$Y_2O_3$—$SnO_2$—$Al_2O_3$, $ZrO_2$—CaO—$SnO_2$—$Ga_2O_3$, $ZrO_2$—CaO—$SnO_2$—$Al_2O_3$, $ZrO_2$—MgO—$SnO_2$—$Ga_2O_3$, $ZrO_2$—MgO—$SnO_2$—$Al_2O_3$, $ZrO_2$—$Y_2O_3$—ZnO—$Ga_2O_3$—$SnO_2$, $ZrO_2$—$Y_2O_3$—ZnO—$Al_2O_3$—$SnO_2$, $ZrO_2$—CaO—ZnO—$Ga_2O_3$—$SnO_2$, $ZrO_2$—CaO—ZnO—$Al_2O_3$—$SnO_2$, $ZrO_2$—MgO—ZnO—$Ga_2O_3$—$SnO_2$, $ZrO_2$—MgO—ZnO—$Al_2O_3$—$SnO_2$, $ZrO_2$—$SiO_2$—ZnO—$Ga_2O_3$, $ZrO_2$—$SiO_2$—ZnO—$Al_2O_3$, $ZrO_2$—$SiO_2$—$SnO_2$—$Ga_2O_3$, $ZrO_2$—$SiO_2$—$SnO_2$—$Al_2O_3$, $ZrO_2$—$SiO_2$—ZnO—$Ga_2O_3$—$SnO_2$, $ZrO_2$—$SiO_2$—ZnO—$Al_2O_3$—$SnO_2$, $ZrSiO_4$—ZnO—$Ga_2O_3$, $ZrSiO_4$—ZnO—$Al_2O_3$, $ZrSiO_4$—$SnO_2$—$Ga_2O_3$, $ZrSiO_4$—$SnO_2$—$Al_2O_3$, $ZrSiO_4$—ZnO—$Ga_2O_3$—$SnO_2$, $ZrSiO_4$—ZnO—$Al_2O_3$—$SnO_2$, $ZrSiO_4$—$SiO_2$—ZnO—$Ga_2O_3$—$SnO_2$, $ZrSiO_4$—$ZrO_2$—ZnO—$Ga_2O_3$—$SnO_2$, and the like may be used.

Second dielectric film 33 preferably contains MgO, and more preferably contains MgO and $Ga_2O_3$. Second dielectric film 33 preferably contains $ZrO_2$—MgO—ZnO—$Ga_2O_3$, $ZrO_2$—MgO—ZnO—$Al_2O_3$, $ZrO_2$—MgO—$SnO_2$—$Ga_2O_3$, $ZrO_2$—MgO—$SnO_2$—$Al_2O_3$, $ZrO_2$—MgO—ZnO—$Ga_2O_3$—$SnO_2$, or $ZrO_2$—MgO—ZnO—$Al_2O_3$—$SnO_2$, and more preferably contains $ZrO_2$—MgO—ZnO—$Ga_2O_3$—$SnO_2$.

For example, when second dielectric film 33 contains 2 mol % of $Ga_2O_3$, the composition of the case is expressed as $(ZrO_2)_{30}(ZnO)_{38}(Ga_2O_3)_2(SnO_2)_{30}$ mol % or $(ZrO_2)_{27.3}(Y_2O_3)_{2.7}(ZnO)_{38}(Ga_2O_3)_2(SnO_2)_{30}$ mol %.

For example, when second dielectric film 33 contains 1.1 mol % of $Ga_2O_3$, the composition expressed as $(ZrO_2)_{23}(MgO)_2(ZnO)_{48.9}(Ga_2O_3)_{1.1}(SnO_2)_{25}$ mol % may be used.

Second dielectric film 33 has, similarly to first dielectric film 31, a function of adjusting an optical phase difference to control signal amplitude, a function of controlling a bulge of a recording pit to control signal amplitude, and a function of controlling the reflectance and transmittance of L2 layer 30.

Second dielectric film 33 also has a function of suppressing ingress of moisture from cover layer 4 side into recording film 32 and a function of suppressing escape of oxygen in recording film 32 to exterior. Second dielectric film 33 also has functions of suppressing incorporation of organic matters from cover layer 4 into recording film 32 and enabling adhesiveness between L2 layer 30 and cover layer 4.

Since second dielectric film 33 is formed on the surface of recording film 32 by sputtering, the amount of organic matters volatilized from intermediate separation layer 3 is smaller as compared with the case of first dielectric film 31. This is because the volatile organic matters are also exhausted by the vacuum exhaust while first dielectric film 31 and recording film 32 are sputtered in this order. When the gas component in the vacuum chamber was actually measured by a quadrupole mass spectrometer during the sputtering of second dielectric film 33, the amount of carbon (C) was smaller than that during the sputtering of first dielectric film 31. Therefore, since second dielectric film 33 is less affected by organic matters, the material may be the same as or different from the material of first dielectric film 31.

The thickness of second dielectric film 33 may be, for example, 5 nm or more and 40 nm or less. More preferably, the thickness is 5 nm or more and 30 nm or less. Less than 5 nm of the thickness may decrease the protection function to fail to suppress the ingress of moisture into recording film 32. More than 40 nm of the thickness may decrease the reflectance of L2 layer 30.

For example, with XMA, the composition of each element can be examined by analyzing second dielectric film 33 according to the embodiment of the present invention. For example, when second dielectric film 33 having the following (e) composition (mol %) is analyzed by XMA, approximately (f) composition (atom %) can be determined.

$(ZrO_2)_{25}(ZnO)_{50}(SnO_2)_{25}$ mol % (e), $Zr_{10}Zn_{20}Sn_{10}O_{60}$ atom % (f).

Alternatively, analysis of (g) composition (mol %) gives approximately (h) composition (atom %).

$\{(ZrO_2)_{0.95}(Y_2O_3)_{0.05}\}_{25}(ZnO)_{46}(Al_2O_3)_4(SnO_2)_{25}$ mol % (g), $Zr_{9.0}Y_{0.9}Zn_{17.4}Al_{3.0}Sn_{9.5}O_{60.2}$ atom % (h).

Alternatively, analysis of (t) composition (mol %) gives approximately (u) composition (atom %).

$(ZrO_2)_{23}(MgO)_2(ZnO)_{47.5}(Ga_2O_3)_{2.5}(SnO_2)_{25}$ mol % (t), $Zr_{9.0}Mg_{0.8}Zn_{18.6}Ga_{2.0}Sn_{9.8}O_{59.8}$ atom % (u).

If Zr is contained, Hf may also be sometimes detected.

For an amorphous film, it is difficult to specify the oxides formed, so the composition is for each element. It is also conceivable that composite oxides, mixed oxides, suboxides, and high oxidation number oxides are formed in the film of second dielectric film 33, and in some cases, the calculated values of (f), (h), and (u) and actual analysis values do not match.

The conductivity of the target was obtained by using an oxide of the element D1 and, if necessary, an oxide of the element D3, instead of using $In_2O_3$, which is conventional.

The target preferably has a specific resistance of 1 Ω·cm or less. This also similarly applies to second dielectric films 23, 13 described later.

Second dielectric film 33 may be substantially made of the oxide of Zr and the element D1. Here, the term "substantially" is used in consideration of cases in which when second dielectric film 33 is formed by, for example, sputtering, second dielectric film 33 sometimes inevitably contains other elements derived from a rare gas (Ar, Kr, or Xe), moisture, organic matters (C), air and impurities contained in a jig and a sputtering target that are disposed in a sputtering chamber, which are present in a sputtering atmosphere. When all atoms contained in second dielectric film 33 are defined as 100 atom %, these inevitable components may be contained in a ratio of up to 10 atom % as an upper limit. This also similarly applies to cases where the elements D2 and D3 are contained. Further, this also similarly applies to cases where the term "substantially" is used for second dielectric films 23, 13 described later.

Second dielectric film 33 may use a material different from that of first dielectric film 31, and in that case, may contain at least Zr, oxygen, and In. As described above, second dielectric film 33 may contain In because the influence of organic matters volatilized from intermediate separation layer 3 is smaller as compared with the case of first dielectric film 31. Since Zr mineral contains a small amount of Hf, second dielectric film 33 may contain Hf.

As second dielectric film 33, Zr—O—In may be used. In second dielectric film 33, preferably, Zr and oxygen form an oxide of Zr, and In and oxygen form an oxide of In. The oxide of In is useful for improving the conductivity of the target.

The oxide of Zr may be $ZrO_2$, and the oxide of In may be $In_2O_3$. The oxide of Zr and the oxide of In are transparent oxides, and can enhance the adhesiveness between second dielectric film 33 and the cover layer 4. Since a Zr mineral contains a small amount of Hf, second dielectric film 33 may contain $HfO_2$.

As second dielectric film 33, $ZrO_2$—$In_2O_3$ may be used.

Second dielectric film 33 may further contain at least one element D2 selected from Si, Y, Ca and Mg.

As second dielectric film 33, Zr—O—In—Si, Zr—O—In—Y, Zr—O—In—Ca, Zr—O—In—Mg, and the like may be used.

In second dielectric film 33, an oxide of the element D2 is preferably formed. The oxide of the element D2 may be at least one of an oxide of Si, an oxide of Y, an oxide of Ca, and an oxide of Mg.

The oxide of Si may be $SiO_2$, the oxide of Y may be $Y_2O_3$, the oxide of Ca may be CaO, and the oxide of Mg may be MgO.

When the oxide of the element D2 is at least one oxide selected from the oxide of Si, the oxide of Y, the oxide of Ca, and the oxide of Mg, stabilized zirconia or partially stabilized zirconia is preferably formed in the form of the oxide of the element D2 added to the oxide of Zr. An oxide of a rare earth metal other than Y may be used. For example, $CeO_2$ may be used.

As second dielectric film 33, $ZrO_2$—$In_2O_3$—$SiO_2$, $(ZrO_2$—$Y_2O_3)$—$In_2O_3$, $(ZrO_2$—CaO)—$In_2O_3$, $(ZrO_2$—MgO)—$In_2O_3$, $(ZrO_2$—$Y_2O_3)$—$In_2O_3$—$SiO_2$, $(ZrO_2$—CaO)—$In_2O_3$—$SiO_2$, $(ZrO_2$—MgO)—$In_2O_3$—$SiO_2$, and the like may be used.

For example, with XMA, the composition of each element can be examine by analyzing second dielectric film 33 according to the embodiment of the present invention. For example, when second dielectric film 33 having the following (i) composition (mol %) is analyzed with XMA, approximately (j) composition (atom %) can be determined.

$$(ZrO_2)_{25}(In_2O_3)_{50}(SiO_2)_{25} \text{ mol \%} \quad (i),$$

$$Zr_{6.3}In_{25}Si_{6.3}O_{62.4} \text{ atom \%} \quad (j).$$

Alternatively, analysis of (k) composition (mol %) gives approximately (m) composition (atom %).

$$(ZrO_2)_{22.7}(Y_2O_3)_{2.3}(In_2O_3)_{50}(SiO_2)_{25} \text{ mol \%} \quad (k),$$

$$Zr_{5.6}Y_{1.1}In_{24.7}Si_{6.2}O_{62.4} \text{ atom \%} \quad (m).$$

For an amorphous film, it is difficult to specify the oxides formed, so the composition is for each element. It is also conceivable that composite oxides, mixed oxides, suboxides, and high oxidation number oxides are formed in the film of second dielectric film 33, and in some cases, the calculated values of (j) and (m) and actual analysis values do not match.

Containing $In_2O_3$ in second dielectric film 33 can reduce the specific resistance of the target to enhance conductivity. Second dielectric film 33 may contain the element D1 while reducing $In_2O_3$ contained in second dielectric film 33.

For example, $ZrO_2$—$In_2O_3$—$ZnO$, $ZrO_2$—$In_2O_3$—$SnO_2$, $ZrO_2$—$In_2O_3$—$ZnO$—$SnO_2$, $ZrO_2$—$In_2O_3$—$ZnO$—$SiO_2$, $ZrO_2$—$In_2O_3$—$SnO_2$—$SiO_2$, $ZrO_2$—$In_2O_3$—$ZnO$—$SnO_2$—$SiO_2$, and the like may be used.

Alternatively, second dielectric film 33 may contain an oxide of In and an oxide of Sn, and for example, $In_2O_3$—$SnO_2$, $(In_2O_3)_{90}(SnO_2)_{10}$% by weight (ITO), or the like may be used.

Second dielectric film 33 may contain at least Zr, oxygen, and In, and may be substantially composed of an oxide of Zr and an oxide of In. This also applies to the case of containing the element D2. The same applies to second dielectric films 23, 13 described later.

Second dielectric film 33 is a nanometer-order thin film formed by, for example, sputtering. Thus, the oxide contained in second dielectric film 33 sometimes does not strictly give a stoichiometric composition due to deficiency of oxygen and/or a metal during sputtering and due to incorporation of inevitable impurities. Because of this reason, the oxide contained in second dielectric film 33 does not necessarily have to be one having a stoichiometric composition in the present embodiment and the other embodiments. The materials represented by stoichiometric compositions in the present specification include one that does not strictly have a stoichiometric composition due to deficiency of oxygen and/or a metal and due to incorporation of impurities. This applies to the same materials as those of first dielectric film 31 and also applies to the different materials from those of first dielectric film 31. The same applies to second dielectric films 23, 13 described later.

Specific thickness of each of first dielectric film 31, recording film 32, and second dielectric film 33 can be designed by calculation based on a matrix method (for example, see "Wave Optics" by Hiroshi Kubota, Section 3, Iwanami Shoten, 1971). Adjustment of the thickness of each film enables adjustment of the reflectance of recorded or unrecorded recording film 32 and a phase difference of reflected light between a recorded portion and an unrecorded portion to optimize the signal quality of a reproduction signal.

Next, a configuration of L1 layer 20 is described. L1 layer 20 is formed by stacking, on a surface of intermediate separation layer 2, at least first dielectric film 21 and recording film 22 in this order. Further, second dielectric film 23 may be stacked on recording film 22.

First dielectric film 21 has the same functions as those of first dielectric film 31 in L2 layer 30 described above. First dielectric film 21 also has a role of adhering intermediate separation layer 2 to L1 layer 20. As the material of first dielectric film 21, it is more preferable to use the same material as that of first dielectric film 31. This is because, in L1 layer 20, since first dielectric film 21 is also formed on the surface of intermediate separation layer 2 by sputtering, first dielectric film 21 is affected by organic matters volatilized from intermediate separation layer 2.

Thus, when first dielectric film 21 contains at least Zr and oxygen, further contains the element D1, and when the total number of atoms of Zr, oxygen, and element D1 is defined as 100 atom %, the film may contain Zr in an amount of 3 atom % or more and 26 atom % or less and the element D1 in an amount of 10 atom % or more and 43 atom % or less. Further, the element D2 may be contained, and the element D3 may be further contained. When the total number of atoms of Zr, the element D1, the element D2, and the element D3 is defined as 100 atom %, the element D3 may be contained in an amount of 7 atom % or less Similarly to L2 layer 30, this embodiment allows for imparting good reproduction durability to L1 layer 20 even if organic matters volatilize from intermediate separation layer 2 during the sputtering of first dielectric film 21.

The thickness of first dielectric film 21 may be 5 nm or more and 40 nm or less. Less than 5 nm of the thickness may decrease the adhesiveness to intermediate separation layer 2 to decrease the protection function of suppressing the ingress of moisture into recording film 22. When it exceeds 40 nm, the reflectance of L1 layer 20 may decrease. Further, when the thickness of first dielectric film 21 exceeds 40 nm, the time required for forming first dielectric film 21 (sputtering time) may become long and the productivity may be decreased.

The functions of recording film 22 are the same as those of recording film 32 of L2 layer 30 described above. Further, recording film 22 contains at least W, Cu, Mn, and oxygen, and preferably further contains the element M.

Since recording film 22 contains at least W, Cu, Mn, and oxygen, for example, oxygen (O) is separated by irradiation with laser beam 6 or O atoms are combined with each other to form an expansion portion to be a recording mark. This formation of the expansion portion is an irreversible change, so that L1 layer 20 that includes this recording film 22 becomes write-once type.

The material of recording film 22 is preferably the same as that of recording film 32. Since L1 layer 20 is sandwiched between the intermediate separation layers 2 and 3, when both are hard, the recording mark on recording film 22 is less likely to expand. In that case, recording film 22 more preferably contains Ta, which has the best function of expanding the recording mark, as the element M.

The proportion of oxygen contained in recording film 22 may be, for example, 60 atom % or more and 80 atom % or less when the total number of atoms of the metal element and oxygen is defined as 100 atom %.

The thickness of recording film 22 may be preferably 15 nm or more and 50 nm or less, and more preferably 25 nm or more and 45 nm or less. Less than 15 nm of thickness disables recording film 22 to expand sufficiently and good recording marks are not formed, so that d-MLSE is deteriorated. More than 50 nm of the thickness allows for improving the recording sensitivity and reducing the power for recording. Instead, the power for reproduction is reduced and the amount of light for reproduction may be decreased. Further, more than 50 nm of the thickness of recording film 22 may make the time required for film formation of recording film 22 (sputtering time) long to decrease the productivity.

The functions of second dielectric film 23 are the same as those of second dielectric film 33 of L2 layer 30 described above. As the material of second dielectric film 23, the same material as that of second dielectric film 33 may be used. Further, the same material as first dielectric film 21 may be used, or a different material may be used.

The thickness of second dielectric film 23 may be 5 nm or more and 30 nm or less. Less than 5 nm of the thickness may decrease the protection function to fail to suppress the ingress of moisture into recording film 22, and more than 30 nm of the thickness may decrease the reflectance of L1 layer 20.

Next, a configuration of L0 layer 10 is described. L0 layer 10 is formed by stacking, on a surface of substrate 1, at least first dielectric film 11 and recording film 12 in this order.

Further, second dielectric film 13 may be stacked on recording film 12.

First dielectric film 11 has a function of adjusting an optical phase difference to control signal amplitude and a function of adjusting a bulge of a recording mark to control signal amplitude. First dielectric film 11 also has a function of suppressing ingress of moisture into recording film 12 and a function of suppressing escape of oxygen in recording film 12 to exterior. Moreover, first dielectric film 11 also has a role of adhering substrate 1 to L0 layer 10.

First dielectric film 11 may be formed on the surface of substrate 1 by sputtering. Substrate 1 is a molded substrate, and for example, polycarbonate is preferably used. Polycarbonate is a thermoplastic resin and does not contain a photopolymerization initiator. Since polycarbonate has few components that may volatilize during sputtering of first dielectric film 11 because of containing few low-molecular-weight components, first dielectric film 11 is, unlike first dielectric films 21 and 31, less susceptible to organic matters. Thus, as first dielectric film 11, the same materials as those of first dielectric film 31, or the same materials as those of second dielectric film 33 may be used.

First dielectric film 11 contains, for example, Zr, oxygen, and element D1.

Further, according to the study by the present inventors, it was found that when a material containing Zr, oxygen, and the element D1 was used as first dielectric film 11, L0 layer 10 exhibits better reproduction durability as compared with the case using a material containing Zr, oxygen, and In.

For example, Zr—O—Zn—Sn or the like may be used as first dielectric film 11.

When the material forms an oxide, $ZrO_2$—ZnO—$SnO_2$ is preferably used as first dielectric film 11.

Alternatively, the element D2 may be contained, and Zr—O—Zn—Sn—Y or the like may be used as first dielectric film 11.

Similarly to first dielectric films 21 and 31, Zr—O—Zn—Sn—Mg, which contains Mg, is more preferably used as first dielectric film 11 since crack generation of the target can be suppressed.

When the material forms an oxide, $ZrO_2$—MgO—ZnO—$SnO_2$ is more preferably used as first dielectric film 11.

Alternatively, first dielectric film 11 may contain the element D3, and Zr—O—Zn—Sn—Y—Ga, or the like may be used.

Similarly to first dielectric films 21 and 31, Zr—O—Zn—Sn—Mg—Ga in which Ga capable of further improving the conductivity is added is further preferably used as first dielectric film 11.

When the material forms an oxide, $ZrO_2$—MgO—ZnO—$Ga_2O_3$—$SnO_2$ is further preferably used as first dielectric film 11.

Alternatively, Zr, oxygen and In may be contained, and Zr—O—In and the like may be used.

Alternatively, the element D2 may be contained, and Zr—O—In—Si, Zr—O—In—Y, Zr—O—In—Y—Si, and the like may be used.

Alternatively, Zr, oxygen, In, and element D1 may be contained, and Zr—O—In—Zn, Zr—O—In—Sn, Zr—O—In—Zn—Sn, and the like may be used.

Alternatively, $SiO_2$ may be contained, and Zr—O—In—Zn—Si, Zr—O—In—Sn—Si, Zr—O—In—Zn—Sn—Si, and the like may be used.

First dielectric film 11 may contain Hf in the above system, similarly to first dielectric films 21 and 31.

The thickness of first dielectric film 11 may be 5 nm or more and 40 nm or less. Less than 5 nm of the thickness may decrease the protection function to fail to suppress the ingress of moisture into recording film 12, and more than 40 nm of the thickness may decrease the reflectance of L0 layer 10.

L0 layer 10 positioned farthest from a laser beam 6 incident surface (surface of cover layer 4) tends to have a smallest amount of light for reproduction.

Recording film 12 has the same functions as those of recording film 32 and the material to be used is also the same as in the film 32.

W, Cu, Mn, and the element M in recording film 12 preferably satisfy the following formula (1):

$$W_xCu_yMn_zM_{100-x-y-z} \text{ (atom \%)} \qquad (1)$$

in the formula (1), $15 \geq x < 60$, $0 < y \leq 30$, $10 \leq z \leq 40$, and $10 \leq 100-x-y-z \leq 50$.

Since L0 layer 10 is positioned farthest from a laser beam 6 incident surface (surface of cover layer 4), optically, L0 layer 10 has a priority to have higher reflectance and larger absorptance as compared with L2 layer 30 and L1 layer 20. Thus, recording film 12 of L0 layer 10 may be formed with a composition in which the value of x in the formula (1) is smaller than that of recording film 32 of L2 layer 30 and recording film 22 of L1 layer 20.

In the formula (1), x (amount of W) is more preferably 15 or more and 40 or less. x in this range allows for adjusting optical absorption of recording film 12 to optimize power for recording of L0 layer 10. 15 or more of x enables performing good DC sputtering. Further, 15 or more of x allows a recording mark to be easily formed and allows for imparting good recording and reproduction characteristics.

Less than 15 of x may make the sputtering in performing DC sputtering unstable to easily cause abnormal electrical discharge. Further, less than 15 of x causes recording film 12 to be less likely to expand and makes the formation of a recording mark difficult. More than 40 of x reduces optical absorption of recording film 12 and thus L0 layer 10 sometimes requires large laser power for recording.

Recording film 12 may be formed with a composition in which y is larger than that of recording films 32 and 22. y (amount of Cu) is more preferably 10 or more and 30 or less. 30 or less of y enables adjustment of the optical absorptance of recording film 12 and optimization of the recording sensitivity of L0 layer 10 to impart good reproduction durability under the power for reproduction satisfying the standard. Setting y to be 10 or more allows for increasing optical absorption of recording film 12 and optimizing the power for recording. More than 30 of y improves the recording sensitivity to decrease the power for reproduction, and this reduces the amount of light for reproduction of L0 layer 10. Less than 10 of y deteriorates the recording sensitivity and thus L0 layer 10 sometimes requires large laser power for recording.

Recording film 12 may be formed with a composition in which z is larger than that of recording films 32 and 22. z (amount of Mn) is more preferably 15 or more and 40 or less. This range enables adjustment of the optical absorptance of L0 layer 10, optimization of the power for recording, achievement of a high reflectance and increase of the amount of light for reproduction.

$100-x-y-z$ (amount of element M) satisfies $10 \leq 100-x-y-z \leq 50$. When $100-x-y-z$ is 10 or more and 50 or less, the recording and reproduction characteristics of L0 layer 10 is satisfactory. Further, when $100-x-y-z$ is 10 or more and 50 or less, the refractive index and extinction coefficient of recording film 12 are optimized to increase the reflectance of L0 layer 10, and the optical absorptance are optimized to enable increase of the amount of light for reproduction. The element M also has a function of separating or binding more oxygen and promoting the expansion of the irradiated portion of recording film 12 with laser beam 6. Further, since Nb and Ti have a large refractive index, they have an effect of increasing the reflectance. When $100-x-y-z$ is more than 50, the element M becomes too much, the recording mark on recording film 12 may be excessively expanded, and the recording mark may reduce the amplitude of a recording mark on an adjacent track. As a result, the recording and reproduction characteristics of L0 layer 10 are deteriorated. Further, when $100-x-y-z$ is less than 10, the ratio of the element M decreases, the recording mark on recording film 12 is less likely to expand, and the recording and reproduction characteristics are deteriorated.

The proportion of oxygen contained in recording film 12 may be, for example, 60 atom % or more and 80 atom % or less, when the total number of atoms of the metal elements and oxygen is defined as 100 atom %.

The thickness of recording film 12 may be 15 nm or more and 50 nm or less, and particularly 25 nm or more and 45 nm or less. Less than 15 nm of the thickness causes recording film 12 to fail to expand sufficiently and to fail to form, and thus this deteriorates d-MLSE. More than 50 nm of the thickness allows for improving the recording sensitivity and reducing the power for recording. Instead, the power for reproduction is reduced and the amount of light for reproduction may be decreased. Further, more than 50 nm of the thickness of recording film 12 may make the time required for forming recording film 12 (sputtering time) long to decrease the productivity.

The functions of second dielectric film 13 are the same as those of second dielectric film 33 of L2 layer 30 described above. As the material of second dielectric film 13, the same material as that of second dielectric film 33 may be used. Further, the same material as that of first dielectric film 11 may be used, or a different material may be used.

The thickness of second dielectric film 13 may be 5 nm or more and 30 nm or less. Less than 5 nm of the thickness may decrease the protection function to fail to suppress the ingress of water into recording film 12, and more than 30 nm of the thickness may decrease the reflectance of L0 layer 10.

First dielectric films 31, 21, 11, recording films 32, 22, 12, and second dielectric films 33, 23, 13 according to the embodiment of the present invention may be, without limitation to the 500-GB Archival Disc, applied to an Archival Disc having a capacity of 300 GB or 100 GB, which is smaller than 500 GB, if necessary. W—Cu—Mn—Zn—O, which contains Zn as the element M, may be used for at least one of recording films 32, 22, 12.

In the combinations of first dielectric films 11, 21, 31 according to embodiments of the present invention, recording films 12, 22, 32 according to embodiments of the present invention, and second dielectric films 13, 23, 33 according to embodiments of the present invention, it is sufficient that at least one of L1 layer 20 and L2 layer 30, excluding L0 layer 10, which is farthest from the light source of laser beam 6, is the first information layer. Similarly, when four or more information layers are included, it is also sufficient that at least one of the information layers nearer to the light source of laser beam 6, excluding L0 layer 10, is the first information layer.

The combinations of first dielectric films 11, 21, 31, recording films 12, 22, 32, and second dielectric films 13, 23, 33 according to the embodiments of the present invention are effective for overcoming the influence of organic matters volatilized from the intermediate separation layers 2, 3 and improving the reproduction durability. Therefore, a more excellent effect is exhibited by using the information layers formed on the intermediate separation layers 2 and 3, such as L1 layer 20 and L2 layer 30, as the first information layer.

As a matter of course, when a component containing carbon volatilizes from substrate 1 during sputtering of first dielectric film 11 of L0 layer 10, application of first dielectric film 11 according to the embodiment of the present invention to L0 layer 10 allows for imparting excellent reproduction durability.

The refractive index of each of first dielectric films 31, 21, 11 at a wavelength of 405 nm is preferably 1.90 or more and 2.30 or less, and the extinction coefficient is preferably 0.20 or less. Similarly, the refractive index of each of recording films 32, 22 is preferably 2.00 or more and 2.40 or less, and the extinction coefficient is preferably 0.30 or less. Similarly, the refractive index of recording film 12 is preferably 2.10 or more and 2.50 or less, and the extinction coefficient is preferably 0.40 or less. The refractive index of each of second dielectric films 33, 23, 13 is preferably 1.90 or more and 2.30 or less, and the extinction coefficient is preferably 0.20 or less.

Each of first dielectric films 11, 21, 31, recording films 12, 22, 32, and second dielectric films 13, 23, 33 may be formed by RF sputtering or DC sputtering, using a target obtained by mixing oxides that constitute each of these films. Alternatively, each of these films may be formed by RF sputtering while introducing oxygen or DC sputtering while introducing oxygen, using an alloy target containing no oxygen. Alternatively, each of these films may be formed by a method of attaching targets of oxides to respective separate power sources and simultaneously performing RF sputtering or DC sputtering (multi-sputtering). RF sputtering and DC sputtering may be performed at the same time. Further, exemplified as other film forming methods are a method of attaching targets made of metal simple substances or alloys, or targets of oxides to respective separate power sources and simultaneously performing RF sputtering or simultaneously performing DC sputtering while introducing oxygen as needed. Alternatively, each of these films may be formed by a method of performing RF sputtering or DC sputtering, using a target made by mixing a metal with an oxide while introducing oxygen.

In a modified example of embodiment 1, in information recording medium 100 according to the present embodiment, the recording film of any of the information layers other than the first information layer may be another recording film made of, for example, Te—O—Pd or Ge—Bi—O, that is, a recording film other than the W—O recording film according to the embodiment of the present invention. Alternatively, in another modified example, a reflective film or a dielectric film made of a material not exemplified above may be provided, if necessary. Effects of the technique according to the present disclosure are achieved also in these modified examples.

A recording method of information recording medium 100 may be any one of Constant Linear Velocity (CLV) where linear velocity is constant, Constant Angular Velocity (CAV) where a rotation rate is constant, Zoned CLV, and Zoned CAV. Applicable data bit length is 47.7 nm. It can also be used for multi-value recording.

Recording and reproduction of information on and from information recording medium 100 according to the present embodiment may be performed in an optical system with an objective lens having a numerical aperture NA of 0.91 or in an optical system with an NA of more than 1. As the optical system, a solid immersion lens (SIL) or a solid immersion mirror (SIM) may be used. In this case, intermediate separation layers 2 and 3 and cover layer 4 may have a thickness of 5 μm or less. Alternatively, an optical system utilizing near-field light may be used.

Embodiment 2

Next, a method for producing information recording medium 100 described in embodiment 1 is described as embodiment 2.

The method for producing an information recording medium according to the embodiment of the present invention is a method for producing an information recording medium that includes two or more information layers, the method comprising individually forming the two or more information layers, wherein at least one of the two or more information layers is determined as a first information layer and the step of forming the first information layer includes at least a step of forming a first dielectric film and a step of forming a recording film, wherein the first dielectric film containing at least Zr and oxygen and further containing at least one element D1 selected from Zn and Sn is formed in the step of forming a first dielectric film, wherein a recording film containing at least W, Cu, and Mn and further containing at least one element M selected from Zn, Nb, Mo, Ta, and Ti is formed in the step of forming a first dielectric film, and wherein the step of forming the first dielectric film and the step of forming the recording film are performed by sputtering using a DC power source.

First dielectric film 11, recording film 12, and second dielectric film 13 that constitute L0 layer 10 can be formed by a sputtering method (sputtering) that is one of vapor-phase film forming methods.

Information recording medium 100 according to the embodiment of the present invention may have substrate 1.

First, substrate 1 (for example, thickness: 0.5 mm, diameter: 120 mm) is disposed in a film-forming apparatus.

Subsequently, first dielectric film 11 is formed. At this time, when substrate 1 includes a spiral guide groove, first dielectric film 11 is formed on the guide-groove side of the substrate 1.

First dielectric film 11 can be formed by sputtering in a rare-gas atmosphere or in a mixed-gas atmosphere of a rare gas and a reactive gas (for example, an oxygen gas), using a sputtering target according to the composition to be obtained. The rare gas is, for example, an Ar gas, a Kr gas, or a Xe gas, and an Ar gas is advantageous in terms of cost. This also applies to any sputtering that employs a rare gas or a mixed gas thereof as an atmosphere gas for sputtering.

The target may contain the element in an oxide form or in a simple substance of metal or alloy form. When a target that is made of a metal (including an alloy) is used, an oxide may be formed by reactive sputtering performed in an atmosphere containing an oxygen gas.

The specific resistance of the target is preferably 1 Ω·cm or less. This facilitates DC sputtering or pulse DC sputtering.

The target having a composition containing the element D1 has high conductivity, and first dielectric film 11 can be stably form by DC sputtering with ease. Thus, a high film-forming rate can be expected when first dielectric film 11 is formed.

The composition of the target may be adjusted so that the desired composition of first dielectric film 11 can be obtained.

Subsequently, recording film 12 is formed on first dielectric film 11.

Recording film 12 can be formed by sputtering in a rare-gas atmosphere or in a mixed-gas atmosphere of a rare gas and a reactive gas, using a target made of a metal alloy or a metal-oxide mixture according to the composition of recording film 12. Recording film 12 is thicker than the dielectric films such as first dielectric film 11, and it is preferable, in consideration of the productivity, to form recording film 12 by DC sputtering or pulse DC sputtering that is expected to give a high film-forming rate than RF sputtering. In order to make recording film 12 contain much oxygen, it is preferable to mix a large amount of an oxygen gas in an atmosphere gas. Recording film 12 may be formed by performing multi-sputtering.

Specifically, when an alloy target or a mixture target is used for forming recording film 12, the target may have a composition of W—Cu—Mn—Nb, W—Cu—Mn—Zn, W—Cu—Mn—Mo, W—Cu—Mn—Ta, W—Cu—Mn—Ti, W—Cu—Mn$_3$O$_4$—Nb, W—Cu—Mn$_3$O$_4$—ZnO, W—Cu—Mn$_3$O$_4$—Mo, W—Cu—Mn$_3$O$_4$—Ta, W—Cu—Mn$_3$O$_4$—Ti, W—Cu—Mn$_3$O$_4$—Ta, W—Cu—Mn$_3$O$_4$—Ta—ZnO, or the like.

Subsequently, second dielectric film 13 is formed on recording film 12. Second dielectric film 13 can be formed by sputtering in a rare-gas atmosphere or in a mixed-gas atmosphere of a rare gas and a reactive gas, using a sputtering target according to the composition of second dielectric film 13. Further, second dielectric film 13 may be formed by performing multi-sputtering.

As the target used for forming second dielectric film 13, the targets that form first dielectric film 11 described above may be used.

Subsequently, intermediate separation layer 2 is formed on second dielectric film 13. Intermediate separation layer 2 can be formed by applying a resin such as a photo-curable resin (particularly, an ultraviolet-curable resin) or a slow-acting thermosetting resin (for example, an acrylic resin) onto L0 layer 10, followed by spin coating, and then curing the resin. When a guide groove is formed in intermediate separation layer 2, intermediate separation layer 2 may be formed by a method of performing spin coating in a state that a transfer substrate (mold) whose surface includes a groove with a prescribed shape, is brought into close contact with an uncured resin, then curing the resin, and thereafter debonding the transfer substrate from the cured resin. Alternatively, intermediate separation layer 2 may be formed in two steps. Specifically, a large-thickness portion is first formed by a spin coating and a portion having a guide groove is next formed by a combination of a spin coating with transfer using a transfer substrate.

Subsequently, L1 layer 20 is formed. Specifically, first dielectric film 21 is first formed on intermediate separation layer 2. First dielectric film 21 can be formed by the same method as described above for first dielectric film 11, using a target according to the composition to be obtained. Subsequently, recording film 22 is formed on first dielectric film 21. Recording film 22 can be formed by the same method as described above for recording film 12, using a target according to the composition to be obtained. Subsequently, second dielectric film 23 is formed on recording film 22. Second dielectric film 23 can be formed by the same method as described above for second dielectric film 13, using a target according to the composition to be obtained. Subsequently, intermediate separation layer 3 is formed on second dielectric film 23. Intermediate separation layer 3 can be formed by the same method as described above for intermediate separation layer 2.

Subsequently, L2 layer 30 is formed. L2 layer 30 can be basically formed by the same method as described above for L1 layer 20. First, first dielectric film 31 is formed on intermediate separation layer 3. First dielectric film 31 can be formed by the same method as described above for first dielectric film 11, using a target corresponding to the composition to be obtained.

For example, as the composition of the target for forming first dielectric film 31, Zr—O—Zn—Sn, Zr—O—Zn—Sn—Y, Zr—O—Zn—Sn—Mg, Zr—O—Zn—Sn—Ga, Zr—O—Zn—Sn—Y—Ga, Zr—O—Zn—Sn—Mg—Ga, and the like are preferably used.

Further, when DC sputtering or pulse DC sputtering with applying high sputtering power is performed at the time of forming first dielectric film 31, a crack is less likely to occur on the target surface of the target containing an oxide of Mg even at a higher sputtering power, as compared with the cases of a target containing an oxide of Y and a target containing an oxide of Ca. A crack is less likely to occur even when the target is used up to the end.

An oxide of Mg is more preferably used for suppressing a crack.

In the present embodiment, as the target material corresponding to first dielectric film 31, it is more preferable to use a target containing stabilized zirconia or partially stabilized zirconia to which an oxide of Mg is added.

In the target materials respectively corresponding to second dielectric film 33, first dielectric film 21 of L1 layer 20, second dielectric film 23, first dielectric film 11 of L0 layer 10, and second dielectric film 13, similarly, it is preferable to contain stabilized zirconia or partially stabilized zirconia to which an oxide of Mg is added.

Therefore, as the composition of the target for forming first dielectric film 31, Zr—O—Zn—Sn—Mg is preferably used and Zr—O—Zn—Sn—Mg—Ga is more preferably used.

Alternatively, it is preferable that these form oxides in the structure of the target, and as the composition of the target for forming first dielectric film 31, for example, $ZrO_2$—$ZnO$—$SnO_2$, $ZrO_2$—$Y_2O_3$—$ZnO$—$SnO_2$, $ZrO_2$—$MgO$—$ZnO$—$SnO_2$, $ZrO_2$—$ZnO$—$Ga_2O_3$—$SnO_2$, $ZrO_2$—$Y_2O_3$—$ZnO$—$Ga_2O_3$—$SnO_2$, $ZrO_2$—$MgO$—$ZnO$—$Ga_2O_3$—$SnO_2$, and the like are preferably used.

As the composition of the target for forming first dielectric film 31, $ZrO_2$—$MgO$—$ZnO$—$SnO_2$ that contains MgO is more preferably used, and $ZrO_2$—$MgO$—$ZnO$—$Ga_2O_3$—$SnO_2$ that contains MgO and $Ga_2O_3$ is further preferably used.

When the powder or the sintered body with regard to the target is in a crystalline phase, oxides contained in the target can be investigated by, for example, X-ray diffraction. In addition, the target structure may contain composite oxides, mixed oxides, suboxides, and high oxidation number oxides. This also applies to targets for forming first dielectric films 11, 21, recording films 12, 22, 32, and second dielectric films 13, 23, 33.

Subsequently, recording film 32 is formed on first dielectric film 31. Recording film 32 can be formed by the same method as described above for recording film 12, using a target according to the composition to be obtained. Subsequently, second dielectric film 33 is formed on recording film 32. Second dielectric film 33 can be formed by the same method as described above for second dielectric film 13, using a target according to the composition to be obtained.

Any of the dielectric films and recording films 12, 22, 32 may be formed with supplied power during sputtering set at 10 W to 10 kW and pressure in a film-forming chamber set at 0.01 Pa to 10 Pa.

Subsequently, cover layer 4 is formed on second dielectric film 33. Cover layer 4 can be formed by applying a resin such as a photo-curable resin (particularly, an ultraviolet-curable resin) or a slow-acting thermosetting resin onto second dielectric film 33, followed by spin coating, and then curing the resin. Alternatively, cover layer 4 may be formed by a method of bonding a disc-shaped substrate 1 made of a resin such as polycarbonate, an amorphous polyolefin and polymethyl methacrylate (PMMA), or glass to second dielectric film 33. Specifically, cover layer 4 can be formed by a method of applying a resin such as a photo-curable resin (particularly, an ultraviolet-curable resin) or a slow-acting thermosetting resin to second dielectric film 33, performing a spin coating to uniformly spread the resin in a state that substrate 1 is brought into close contact with the applied resin, and thereafter curing the resin.

As a method for forming each layer, in addition to the sputtering, a vacuum vapor deposition, an ion plating, a chemical vapor deposition (CVD), and a molecular beam epitaxy (MBE) can also be used.

In this manner, A-side information recording medium 101 can be formed. Substrate 1 and L0 layer 10 may be formed to include a disc identification code (for example, a burst cutting area (BCA)) as needed. For example, when an identification code is assigned to polycarbonate-made substrate 1, the identification code can be assign by dissolving and vaporizing polycarbonate after substrate 1 is formed, with use of, for example, a $CO_2$ laser. Alternatively, when an identification code is assigned to L0 layer 10, the identification code can be assigned by performing recording on recording film 12 or decomposing recording film 12 with use of, for example, a semiconductor laser. The assigning of an identification code to L0 layer 10 may be performed after formation of second dielectric film 13, after formation of intermediate separation layer 2, after formation of cover layer 4, or after formation of bonding layer 5 described later.

Similarly, B-side information recording medium 102 can be produced. When a guide groove is formed in substrate 1 of B-side information recording medium 102, a spiral rotation direction of the guide groove may be opposite to or the same as that of the guide groove in substrate 1 of A-side information recording medium 101 described above.

Lastly, a photo-curable resin (particularly, an ultraviolet-curable resin) is uniformly applied to a surface opposite to the guide groove-formed surface of substrate 1 in A-side information recording medium 101, and the resin is bonded to a surface opposite to the guide groove-formed surface of substrate 1 in B-side information recording medium 102. Thereafter, the resin is irradiated with light and thus cured to form bonding layer 5. Alternatively, a slow-acting thermosetting photo-curable resin may be uniformly applied to A-side information recording medium 101, then irradiated with light, and thereafter bonded to B-side information recording medium 102, to form bonding layer 5. In this manner, information recording medium 100 according to embodiment 1 that includes the information layers on both sides can be produced.

The embodiments have been heretofore described as examples of the technique according to the present disclosure. For that purpose, the accompanying drawings and the detailed description have been provided.

Accordingly, the constituent parts illustrated in the accompanying drawings and described in the detailed description can include not only constituent parts essential for solving the problems but also constituent parts inessential for solving the problems, for exemplifying the above technique. Therefore, it should not immediately be construed that these inessential constituent parts are essential based on a fact that the inessential constituent parts are illustrated in the accompanying drawings or described in the detailed description.

Since the embodiments described above are intended to illustrate the technique according to the present disclosure, various modifications, replacements, additions, removals, or the like are allowed within a scope of claims or an equivalent to the claims.

Next, the technique according to the present disclosure is described in detail by using examples.

EXAMPLES

More specific embodiments of the present invention are described further in detail by using examples.

Example 1

In the present example, an example of information recording medium 100 shown in the FIGURE is described. The following is a method for producing information recording medium 100 of the present example.

First, a configuration of A-side information recording medium 101 is described. As substrate 1, a polycarbonate substrate (diameter: 120 mm, thickness 0.5 mm) was prepared, in which a spiral guide groove (depth: 27 nm, track pitch (land-groove distance): 0.225 μm) was formed. L0 layer 10 was formed on substrate 1. A film of $(ZrO_2)_{25}(SiO_2)_{25}(In_2O_3)_{50}$ (mol %) of 13 nm as first dielectric film 11 using a target substantially composed of $(ZrO_2)_{25}(SiO_2)_{25}(In_2O_3)_{50}$ (mol %), a film of $W_{25}Cu_{21}Ta_{21}Zn_5Mn_{28}$—O of 34 nm as recording film 12 using a target substantially composed of $W_{25}Cu_{21}Ta_{21}Zn_5Mn_{28}$—O, and a film of $(ZrO_2)_{25}(SiO_2)_{25}(In_2O_3)_{50}$ (mol %) of 10 nm as second dielectric film 13 using a target substantially composed of $(ZrO_2)_{25}(SiO_2)_{25}(In_2O_3)_{50}$ (mol %) were sequentially formed by a sputtering.

Here, the composition of recording film 12 is expressed in a form representing, as an element proportion, only a metal element proportion (atom %), and the same expression applies below. For example, an oxide of $W_{19}Cu_{25}Zn_{20}Mn_{36}$ (atom %) is expressed as $W_{19}Cu_{25}Zn_{20}Mn_{36}$—O.

In laser beam 6 having a wavelength of 405 nm, L0 layer 10 in the absence of L1 layer 20 and L2 layer 30 has, in an unrecorded state, a reflectance $R_g$ of nearly equal to 8.0% and a reflectance $R_l$ of nearly equal to 8.5%.

Formation of first dielectric film 11 was performed in an Ar atmosphere (flow rate: 12 sccm), using a DC power source (3 kW). Formation of recording film 12 was performed in an Ar and $O_2$ mixed-gas atmosphere (flow rate: 12+30 sccm), using a pulse DC power source (5 kW). Formation of second dielectric film 13 was performed in an Ar atmosphere (flow rate: 12 sccm), using a DC power source (2 kW).

Subsequently, intermediate separation layer 2 in which a spiral guide groove (depth: 27 nm, track pitch (land-groove distance): 0.225 μm) was formed, was formed on L0 layer 10. For intermediate separation layer 2, after an ultraviolet-curable resin forming the thickness of a main portion was first applied by spin coating, the resin was cured by irradiation with ultraviolet light. Next, an ultraviolet-curable resin to which a guide groove was to be transferred was applied by spin-coating, a stamper substrate that includes a guide groove and is made of polycarbonate is bonded onto the resin, the resin is cured with ultraviolet light, and then the stamper substrate is debonded, to form intermediate separation layer 2. Intermediate separation layer 2 has a thickness of about 25 μM.

Next, L1 layer 20 was formed on intermediate separation layer 2. A dielectric film of 17 nm according to the embodiment of the present invention as first dielectric film 21 of L1 layer 20 using a target according to each composition described in Table 1, a film of $W_{31}Cu_{18}Ta_{21}Zn_{11}Mn_{19}$—O of 35 nm as recording film 22 using a target substantially composed of $W_{31}Cu_{18}Ta_{21}Zn_{11}Mn_{19}$—O according to the embodiment of the present invention, and a film of $(ZrO_2)_{25}(SiO_2)_{25}(In_2O_3)_{50}$ (mol %) of 13 nm as second dielectric film 23 using a target substantially composed of $(ZrO_2)_{25}(SiO_2)_{25}(In_2O_3)_{50}$ (mol %) were sequentially formed by a sputtering.

In laser beam 6 having a wavelength of 405 nm, L1 layer 20 in the absence of L2 layer 30 has, in an unrecorded state of recording film 22, a reflectance $R_g$ of nearly equal to 6.0% and a reflectance $R_l$ of nearly equal to 6.3% and has a transmittance of about 77%.

Further, formation of first dielectric film 21 was performed in an Ar atmosphere (flow rate: 12 sccm), using a pulse DC power source (3 kW). Formation of recording film 22 was performed in an Ar and $O_2$ mixed-gas atmosphere (flow rate: 12+36 sccm), using a pulse DC power source (5 kW). Formation of second dielectric film 23 was performed in an Ar atmosphere (flow rate: 12 sccm), using a DC power source (2 kW).

Subsequently, intermediate separation layer 3 in which a spiral guide groove (depth: 27 nm, track pitch (land-groove distance): 0.225 mm) was formed, was formed on L1 layer 20. For intermediate separation layer 3, after an ultraviolet-curable resin forming the thickness of a main portion is first applied by spin coating, the resin is cured by irradiation with ultraviolet light. Next, an ultraviolet-curable resin to which a guide groove was to be transferred was applied by spin-coating, a stamper substrate that included a guide groove and was made of polycarbonate was bonded onto the resin, the resin was cured with ultraviolet light, and then the stamper substrate was debonded, to form intermediate separation layer 3. Intermediate separation layer 3 has a thickness of about 18 μM.

L2 layer 30 was formed on intermediate separation layer 3. A dielectric film of 15 nm according to the embodiment of the present invention as first dielectric film 31 using a target according to each composition described in Table 1, a film of $W_{32}Cu_{17}Ta_{22}Zn_{11}Mn_{18}$—O of 34 nm as recording film 32 using a target substantially composed of $W_{32}Cu_{17}Ta_{22}Zn_{11}Mn_{18}$—O, and a film of $(ZrO_2)_{25}(SiO_2)_{25}(In_2O_3)_{50}$ (mol %) of 13 nm as second dielectric film 33 using a target substantially composed of $(ZrO_2)_{25}(SiO_2)_{25}(In_2O_3)_{50}$ (mol %) were sequentially formed by a sputtering.

In laser beam 6 having a wavelength of 405 nm, it was set that L2 layer 30 had, in an unrecorded state of recording film 32, a reflectance $R_g$ of nearly equal to 5.8%, a reflectance $R_l$ of nearly equal to 6.1%, and a transmittance of about 80%.

Further, formation of first dielectric film 31 was performed in an Ar atmosphere (flow rate: 12 sccm), using a pulse DC power source (3 kW). Formation of recording film 32 was performed in an Ar and $O_2$ mixed-gas atmosphere (flow rate: 12+36 sccm), using a pulse DC power source. Formation of second dielectric film 33 was performed in an Ar atmosphere (flow rate: 12 sccm), using a DC power source (2 kW).

Thereafter, an ultraviolet-curable resin was applied onto second dielectric film 33, followed by spin coating, and was then cured with ultraviolet light, to form cover layer 4 having a thickness of about 57 thereby preparing A-side information recording medium 101.

Next, a configuration of B-side information recording medium 102 is described. As substrate 1, a polycarbonate substrate (thickness 0.5 mm) was prepared, in which a spiral guide groove (depth: 27 nm, track pitch (land-groove distance): 0.225 μm) was formed. The spiral rotation direction of the guide groove was made opposite to the spiral rotation direction of the guide groove formed in substrate 1 of A-side information recording medium 101 described above. L0 layer 10 was formed on substrate 1. A film of $(ZrO_2)_{25}(SiO_2)_{25}(In_2O_3)_{50}$ (mol %) of 13 nm as first dielectric film 11 using a target substantially composed of $(ZrO_2)_{25}(SiO_2)_{25}(In_2O_3)_{50}$ (mol %), a film of $W_{25}Cu_{21}Ta_{21}Zn_5Mn_{28}$—O of 34 nm as recording film 12 using a target substantially composed of $W_{25}Cu_{21}Ta_{21}Zn_5Mn_{28}$—O, and a film of $(ZrO_2)_{25}(SiO_2)_{25}(In_2O_3)_{50}$ (mol %) of 10 nm as second dielectric film 13 using a target substantially composed of $(ZrO_2)_{25}(SiO_2)_{25}(In_2O_3)_{50}$ (mol %) were sequentially formed by a sputtering.

In laser beam 6 having a wavelength of 405 nm, L0 layer 10 in the absence of L1 layer 20 and L2 layer 30 has, in an unrecorded state, a reflectance $R_g$ of nearly equal to 8.0% and a reflectance $R_l$ of nearly equal to 8.5%.

Formation of first dielectric film 11 was performed in an Ar atmosphere (flow rate: 12 sccm), using a DC power source (3 kW). Formation of recording film 12 was performed in an Ar and $O_2$ mixed-gas atmosphere (flow rate: 12+30 sccm), using a pulse DC power source (5 kW). Formation of second dielectric film 13 was performed in an Ar atmosphere (flow rate: 12 sccm), using a DC power source (2 kW).

Subsequently, intermediate separation layer 2 in which a spiral guide groove (depth: 27 nm, track pitch (land-groove distance): 0.225 μm) was formed, was formed on L0 layer 10. Formation method of intermediate separation layer 2 was the same as that of intermediate separation layer 2 of A-side information recording medium 101 described before but the spiral rotation direction of the guide groove was opposite to that in intermediate separation layer 2 of A-side information recording medium 101 described before. This allows for simultaneous reproduction of double sides.

Next, L1 layer 20 was formed on intermediate separation layer 2. A dielectric film of 17 nm according to the embodiment of the present invention as first dielectric film 21 of L1 layer 20 using a target according to each composition described in Table 2, a film of $W_{31}Cu_{18}Ta_{21}Zn_{11}Mn_{19}$—O of 35 nm as recording film 22 using a target substantially composed of $W_{31}Cu_{18}Ta_{21}Zn_{11}Mn_{19}$—O according to the embodiment of the present invention, and a film of $(ZrO_2)_{25}(SiO_2)_{25}(In_2O_3)_{50}$ (mol %) of 13 nm as second dielectric film 23 using a target substantially composed of $(ZrO_2)_{25}(SiO_2)_{25}(In_2O_3)_{50}$ (mol %) were sequentially formed by a sputtering.

In laser beam 6 having a wavelength of 405 nm, L1 layer 20 in the absence of L2 layer 30 has, in an unrecorded state of recording film 22, a reflectance $R_g$ of nearly equal to 6.0% and a reflectance $R_l$ of nearly equal to 6.3%, and a transmittance of about 77%.

Further, formation of first dielectric film 21 was performed in an Ar atmosphere (flow rate: 12 sccm), using a pulse DC power source (3 kW). Formation of recording film 22 was performed in an Ar and $O_2$ mixed-gas atmosphere (flow rate: 12+36 sccm), using a pulse DC power source (5 kW). Formation of second dielectric film 23 was performed in an Ar atmosphere (flow rate: 12 sccm), using a DC power source (2 kW).

Subsequently, intermediate separation layer 3 in which a spiral guide groove (depth: 27 nm, track pitch (land-groove distance): 0.225 μm) was formed, was formed on L1 layer 20. For intermediate separation layer 3, after an ultraviolet-curable resin forming the thickness of a main portion is first applied by spin coating, the resin is cured by irradiation with ultraviolet light. Next, an ultraviolet-curable resin to which a guide groove was to be transferred was applied by spin coating, a stamper substrate that included a guide groove and was made of polycarbonate was bonded onto the resin, the resin was cured with ultraviolet light, and then the stamper substrate was debonded, to form intermediate separation layer 3. Intermediate separation layer 3 has a thickness of about 18 μM.

L2 layer 30 was formed on intermediate separation layer 3. A dielectric film of 15 nm according to the embodiment of the present invention as first dielectric film 31 using a target according to each composition described in Table 2, a film of $W_{32}Cu_{17}Ta_{22}Zn_{11}Mn_{18}$—O of 34 nm as recording film 32 using a target substantially composed of $W_{32}Cu_{17}Ta_{22}Zn_{11}Mn_{18}$—O, and a film of $(ZrO_2)_{25}(SiO_2)_{25}(In_2O_3)_{50}$ (mol %) of 13 nm as second dielectric film 33 using a target substantially composed of $(ZrO_2)_{25}(SiO_2)_{25}(In_2O_3)_{50}$ (mol %) were sequentially formed by a sputtering.

Film thickness of first dielectric film 31 and second dielectric film 33 was determined by calculation based on a matrix method. Specifically, in laser beam 6 having a wavelength of 405 nm, it was set that L2 layer 30 had, in an unrecorded state of recording film 32, a reflectance $R_g$ of nearly equal to 5.8%, a reflectance $R_l$ of nearly equal to 6.1%, and a transmittance of about 80%.

Further, formation of first dielectric film 31 was performed in an Ar atmosphere (flow rate: 12 sccm), using a pulse DC power source (3 kW). Formation of recording film 32 was performed in an Ar and $O_2$ mixed-gas atmosphere (flow rate: 12+36 sccm), using a pulse DC power source (5 kW). Formation of second dielectric film 33 was performed in an Ar atmosphere (flow rate: 12 sccm), using a pulse DC power source (2 kW).

Thereafter, an ultraviolet-curable resin was applied onto second dielectric film 33, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 101 were prepared in which $Zr_{10}Zn_{20}Sn_{10}O_{60}$ (atom %), $Zr_{9.3}Y_{1.2}Zn_{19.8}Sn_{9.9}O_{59.8}$ (atom %), $Zr_{9.5}Mg_{0.6}Zn_{20.1}Sn_{10.1}O_{59.7}$ (atom %), $Zr_{9.7}Zn_{18.5}Sn_{9.7}Ga_{1.9}O_{60.2}$ (atom %), $Zr_{9.0}Y_{1.2}Zn_{18.2}Sn_{9.6}Ga_{1.9}O_{60.1}$ (atom %), and $Zr_5Si_5Zn_{20}Sn_{10}O_{60}$ (atom %) was applied to first dielectric films 21 and first dielectric films 31 of A-side information recording medium 101 and B-side information recording medium 102. Nos. of these discs are defined as 1-101 to 1-106, respectively. As a comparative example, a disc No. Comparative Example 1-1 was prepared in which $Zr_{3.4}Si_{3.4}In_{31.8}O_{61.4}$ (atom %) was applied to first dielectric films 21 and first dielectric films 31 of A-side information recording medium 101 and B-side information recording medium 102.

In these 1-101 to 1-106 and Comparative Example 1-1, reproduction durability at octuple speed was evaluated. The evaluation of the reproduction durability was performed using an evaluation apparatus (ODU-1000) manufactured by Pulstec Industrial Co., Ltd.

Laser beam 6 of the evaluation apparatus has a wavelength of 405 nm and an objective lens has a numerical aperture NA of 0.91, and information was recorded on a groove and a land. The evaluation was performed at a linear velocity for recording of 18.06 m/s (500 GB-octuple speed) and at a linear velocity for reproduction of 18.06 m/s (500 GB-octuple speed). Data bit length was set at 47.7 nm and recording was performed at a density of 83.4 GB per one information layer. Laser beam 6 subjected to high frequency superposition (modulation) at 2:1 was used as light for reproduction. Recording with random signals (2T to 12T) was performed and the signal quality was evaluated as d-MLSE (Distribution Derived-Maximum Likelihood Sequence Error Estimation).

In the evaluation of the reproduction durability of L2 layer 30, random signals were recorded on adjacent grooves and lands, and the random signal of the groove positioned at a center of a recorded track was reproduced at a power for reproduction of 2.3 mW and a linear velocity of 18.06 m/s. The quality was judged based on the amount of change between d-MLSE at first time of reproduction and d-MLSE at one millionth time of repeated reproduction. The method for evaluating the reproduction durability of L1 layer 20 was performed at a power for reproduction of 3.1 mW.

Specifically, when the amount of change was defined as Δd-MLSE, a value of 0.5% or less was defined as A (very good), a value of more than 0.5% and 1.0% or less as B (good), and a value of more than 1.0% and 1.5% or less as C (practical level), and a value more than 1.5% as D (impractical).

Incidentally, the reason why the evaluation was performed by groove reproduction instead of land is that, in the present example, a groove exhibits a higher light absorptance and the reproduction durability tends to be deteriorated. Further, the same applies to the following examples, and the reproduction durability in a groove was evaluated.

Table 1 shows the results in A-side information recording medium 101.

TABLE 1

| | A-side information recording medium 101 First dielectric film 21 and First dielectric film 31 | | Reproduction durability of L2 layer 30 | Reproduction durability of L1 layer 20 |
|---|---|---|---|---|
| Disc No. | Expression by atom % | Expression by mol % | (Δd-MLSE) | (Δd-MLSE) |
| 1-101 | $Zr_{10}Zn_{20}Sn_{10}O_{60}$ (atom %) | $(ZrO_2)_{25}(ZnO)_{50}(SnO_2)_{25}$ (mol %) | A | A |
| 1-102 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) | A | A |
| 1-103 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | B | B |
| 1-104 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) | A | A |
| 1-105 | $Zr_{9.0}Y_{1.2}Zn_{18.2}Sn_{9.6}Ga_{1.9}O_{60.1}$ (atom %) | $(ZrO_2)_{23.5}(Y_2O_3)_{1.5}(ZnO)_{47.5}(SnO_2)_{25}(Ga_2O_3)_{2.5}$ (mol %) | A | A |
| 1-106 | $Zr_5Si_5Zn_{20}Sn_{10}O_{60}$ (atom %) | $(ZrO_2)_{12.5}(SiO_2)_{12.5}(ZnO)_{50}(SnO_2)_{25}$ (mol %) | B | B |
| Comparative Example 1-1 | $Zr_{3.4}Si_{3.4}In_{31.8}O_{61.4}$ (atom %) | $(ZrO_2)_{15}(SiO_2)_{15}(In_2O_3)_{70}$ (mol %) | D | D |

In disc Nos. 1-101 to 1-106, results of very good reproduction durability were obtained in all discs, as compared with Comparative Example 1-1, and the effect of improving the reproduction durability in the information recording medium according to the embodiment of the present invention could be confirmed.

Table 2 shows the results in B-side information recording medium 102.

TABLE 2

| | B-side information recording medium 102 First dielectric film 21 and First dielectric film 31 | | Reproduction durability of L2 layer 30 | Reproduction durability of L1 layer 20 |
|---|---|---|---|---|
| Disc No. | Expression by atom % | Expression by mol % | (Δd-MLSE) | (Δd-MLSE) |
| 1-101 | $Zr_{10}Zn_{20}Sn_{10}O_{60}$ (atom %) | $(ZrO_2)_{25}(ZnO)_{50}(SnO_2)_{25}$ (mol %) | A | A |
| 1-102 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) | A | A |
| 1-103 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | B | B |
| 1-104 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) | A | A |
| 1-105 | $Zr_{9.0}Y_{1.2}Zn_{18.2}Sn_{9.6}Ga_{1.9}O_{60.1}$ (atom %) | $(ZrO_2)_{23.5}(Y_2O_3)_{1.5}(ZnO)_{47.5}(SnO_2)_{25}(Ga_2O_3)_{2.5}$ (mol %) | A | A |

TABLE 2-continued

| | B-side information recording medium 102 First dielectric film 21 and First dielectric film 31 | | Reproduction durability of L2 layer 30 | Reproduction durability of L1 layer 20 |
|---|---|---|---|---|
| Disc No. | Expression by atom % | Expression by mol % | ($\Delta$d-MLSE) | ($\Delta$d-MLSE) |
| 1-106 | $Zr_5Si_5Zn_{20}Sn_{10}O_{60}$ (atom %) | $(ZrO_2)_{12.5}(SiO_2)_{12.5}(ZnO)_{50}(SnO_2)_{25}$ (mol %) | A | A |
| Comparative Example 1-1 | $Zr_{3.4}Si_{3.4}In_{31.8}O_{61.4}$ (atom %) | $(ZrO_2)_{15}(SiO_2)_{15}(In_2O_3)_{70}$ (mol %) | D | D |

In disc Nos. 1-101 to 1-106, results of very good reproduction durability were obtained in all discs, as compared with Comparative Example 1-1, and the effect of improving the reproduction durability in the information recording medium according to the embodiment of the present invention could be confirmed.

Example 2

In the present example, another example of information recording medium 100 shown in the FIGURE is described. The following is a method for producing information recording medium 100 of the present example.

First, a configuration of A-side information recording medium 101 is described.

As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A film of $(ZrO_2)_{30}(SiO_2)_{30}(In_2O_3)_{40}$ (mol %) of 17 nm as first dielectric film 21 of L1 layer 20 using a target substantially composed of $(ZrO_2)_{30}(SiO_2)_{30}(In_2O_3)_{40}$ (mol %), a film of $W_{31}Cu_{18}Ta_{21}Zn_{11}Mn_{19}$—O of 35 nm as recording film 22 using a target substantially composed of $W_{31}Cu_{18}Ta_{21}Zn_{11}Mn_{19}$—O according to the embodiment of the present invention, and a film of $(ZrO_2)_{25}(SiO_2)_{25}(In_2O_3)_{50}$ (mol %) of 13 nm as second dielectric film 23 using a target substantially composed of $(ZrO_2)_{25}(SiO_2)_{25}(In_2O_3)_{50}$ (mol %) were sequentially formed by a sputtering.

In laser beam 6 having a wavelength of 405 nm, L1 layer 20 in the absence of L2 layer 30 has, in an unrecorded state of recording film 22, a reflectance $R_g$ of nearly equal to 6.0%, a reflectance $R_l$ of nearly equal to 6.3%, and a transmittance of about 77%.

Further, formation of first dielectric film 21 was performed in an Ar atmosphere (flow rate: 12 sccm), using a pulse DC power source (3 kW). Formation of recording film 22 was performed in an Ar and $O_2$ mixed-gas atmosphere (flow rate: 12+36 sccm), using a pulse DC power source (5 kW). Formation of second dielectric film 23 was performed in an Ar atmosphere (flow rate: 12 sccm), using a DC power source (2 kW).

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A dielectric film of 11 to 17 nm according to the embodiment of the present invention as first dielectric film 31 using a target according to each composition described in Tables 3, 5, a film of $W_{32}Cu_{17}Ta_{22}Zn_{11}Mn_{18}$—O of 34 nm as recording film 32 using a target substantially composed of $W_{32}Cu_{17}Ta_{22}Zn_{11}Mn_{18}$—O, and a film of $(ZrO_2)_{25}(SiO_2)_{25}(In_2O_3)_{50}$ (mol %) of 9 to 15 nm as second dielectric film 33 using a target substantially composed of $(ZrO_2)_{25}(SiO_2)_{25}(In_2O_3)_{50}$ (mol %) were sequentially formed by a sputtering.

The thickness of first dielectric film 31 and second dielectric film 33 was determined by calculation based on the matrix method. Specifically, in laser beam 6 having a wavelength of 405 nm, it was set that L2 layer 30 had, in an unrecorded state of recording film 32, a reflectance $R_g$ of nearly equal to 5.8%, a reflectance $R_l$ of nearly equal to 6.1%, and a transmittance of about 80%.

Further, formation of first dielectric film 31 was performed in an Ar atmosphere (flow rate: 12 sccm), using a pulse DC power source (3 kW). Formation of recording film 32 was performed in an Ar and $O_2$ mixed-gas atmosphere (flow rate: 12+36 sccm), using a pulse DC power source. Formation of second dielectric film 33 was performed in an Ar atmosphere (flow rate: 12 sccm), using a DC power source (2 kW).

Thereafter, an ultraviolet-curable resin was applied onto second dielectric film 33, followed by spin coating, and was then cured with ultraviolet light, to form cover layer 4 having a thickness of about 57 μm, thereby preparing A-side information recording medium 101.

Next, a configuration of B-side information recording medium 102 is described. As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A film of $(ZrO_2)_{30}(SiO_2)_{30}(In_2O_3)_{40}$ (mol %) of 17 nm as first dielectric film 21 of L1 layer 20 using a target substantially composed of $(ZrO_2)_{30}(SiO_2)_{30}(In_2O_3)_{40}$ (mol %) according to the embodiment of the present invention, a film of $W_{31}Cu_{18}Ta_{21}Zn_{11}Mn_{19}$—O of 35 nm as recording film 22 using a target substantially composed of $W_{31}Cu_{18}Ta_{21}Zn_{11}Mn_{19}$—O according to the present invention, and a film of $(ZrO_2)_{25}(SiO_2)_{25}(In_2O_3)_{50}$ (mol %) of 13 nm as second dielectric film 23 using a target substantially composed of $(ZrO_2)_{25}(SiO_2)_{25}(In_2O_3)_{50}$ (mol %) were sequentially formed by a sputtering.

In laser beam 6 having a wavelength of 405 nm, L1 layer 20 in the absence of L2 layer 30 has, in an unrecorded state of recording film 22, a reflectance $R_g$ of nearly equal to 6.0%, a reflectance $R_l$ of nearly equal to 6.3%, and a transmittance of about 77%.

Further, formation of first dielectric film 21 was performed in an Ar atmosphere (flow rate: 12 sccm), using a pulse DC power source (3 kW). Formation of recording film 22 was performed in an Ar and $O_2$ mixed-gas atmosphere (flow rate: 12+36 sccm), using a pulse DC power source (5 kW). Formation of second dielectric film 23 was performed in an Ar atmosphere (flow rate: 12 sccm), using a DC power source (2 kW).

Subsequently, intermediate separation layer 3 in which a spiral guide groove (depth: 27 nm, track pitch (land-groove distance): 0.225 μm) was formed, was formed on L1 layer 20. Formation method of intermediate separation layer 3 was the same as that of intermediate separation layer 3 of A-side information recording medium 101 described before but the spiral rotation direction of the guide groove was opposite to that in intermediate separation layer 3 of A-side information recording medium 101 described before.

L2 layer 30 was formed on intermediate separation layer 3. A dielectric film according to the embodiment of the present invention of 11 to 17 nm as first dielectric film 31 using a target according to each composition described in Tables 4, 6, a film of $W_{32}Cu_{17}Ta_{22}Zn_{11}Mn_{18}$—O of 34 nm as recording film 32 using a target substantially composed of $W_{32}Cu_{17}Ta_{22}Zn_{11}Mn_{18}$—O, and a film of $(ZrO_2)_{25}(SiO_2)_{25}(In_2O_3)_{50}$ (mol %) of 9 to 15 nm as second dielectric film 33 using a target substantially composed of $(ZrO_2)_{25}(SiO_2)_{25}(In_2O_3)_{50}$ (mol %) were sequentially formed by a sputtering.

Film thickness of first dielectric film 31 and second dielectric film 33 was determined by calculation based on a matrix method as in Example 1.

Further, formation of first dielectric film 31 was performed in an Ar atmosphere (flow rate: 12 sccm), using a pulse DC power source (3 kW). Formation of recording film 32 was performed in an Ar and $O_2$ mixed-gas atmosphere (flow rate: 12+36 sccm), using a pulse DC power source (5 kW). Formation of second dielectric film 33 was performed in an Ar atmosphere (flow rate: 12 sccm), using a pulse DC power source (2 kW).

Thereafter, an ultraviolet-curable resin was applied onto second dielectric film 33, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 101 were prepared in which $Zr_{10}Zn_{20}Sn_{10}O_{60}$ (atom %), $Zr_{20}Zn_{20}O_{60}$ (atom %), $Zr_{16.7}Zn_{16.7}O_{66.6}$ (atom %), $Zr_{18.4}Y_{2.3}Zn_{19.5}O_{59.8}$ (atom %), $Zr_{9.3}Y_{1.2}Zn_{19.8}Sn_{9.9}O_{59.8}$ (atom %), $Zr_{9.5}Ca_{0.6}Zn_{20.1}Sn_{10.1}O_{59.7}$ (atom %), $Zr_{9.5}Mg_{0.6}Zn_{20.1}Sn_{10.1}O_{59.7}$ (atom %), $Zr_{9.7}Zn_{18.5}Sn_{9.7}Ga_{1.9}O_{60.2}$ (atom %), $Zr_{9.7}Zn_{18.5}Sn_{9.7}Al_{1.9}O_{60.2}$ (atom %), $Zr_{9.0}Y_{1.2}Zn_{18.2}Sn_{9.6}Ga_{1.9}O_{60.1}$ (atom %), $Zr_5Si_5Zn_{20}Sn_{10}O_{60}$ (containing $ZrO_2$ and $SiO_2$) (atom %), and $Zr_5Si_5Zn_{20}Sn_{10}O_{60}$ (containing $ZrSiO_4$) (atom %) were applied to first dielectric films 31 of A-side information recording medium 101 and B-side information recording medium 102. Nos. of these discs are defined as 2-101 to 2-112, respectively.

In these 2-101 to 2-112 and Comparative Example 1-1, evaluation of reproduction durability was performed as described in Example 1.

In the evaluation of the reproduction durability of L2 layer 30, random signals were recorded on adjacent grooves and lands, and the random signals of the groove positioned at a center of a recorded track were reproduced at a power for reproduction of 2.3 mW and a linear velocity of 18.06 m/s. The quality was judged based on the amount of change between d-MLSE at first time of reproduction and d-MLSE at one millionth time of repeated reproduction.

Specifically, when the amount of change was defined as Δd-MLSE, a value of 0.5% or less was defined as A (very good), a value of more than 0.5% and 1.0% or less as B (good), and a value of more than 1.0% and 1.5% or less as C (practical level), and a value more than 1.5% as D (impractical).

Incidentally, the reason why the evaluation was performed by groove reproduction instead of land is that, in the present example, a groove exhibits a higher light absorptance and the reproduction durability tends to be deteriorated. Further, the same applies to the following examples, and the reproduction durability in a groove was evaluated.

Table 3 shows the results in A-side information recording medium 101.

TABLE 3

| Disc No. | A-side information recording medium 101 First dielectric film 31 Expression by atom % | Expression by mol % | A-side information recording medium 101 Thickness of First dielectric film 31/ Second dielectric film 33 | Reproduction durability (Δd-MLSE) |
|---|---|---|---|---|
| 2-101 | $Zr_{10}Zn_{20}Sn_{10}O_{60}$ (atom %) | $(ZrO_2)_{25}(ZnO)_{50}(SnO_2)_{25}$ (mol %) | 15 nm/13 nm | A |
| 2-102 | $Zr_{20}Zn_{20}O_{60}$ (atom %) | $(ZrO_2)_{50}(ZnO)_{50}$ (mol %) | 15 nm/13 nm | B |
| 2-103 | $Zr_{16.7}Zn_{16.7}O_{66.6}$ (atom %) | $(ZrO_2)_{50}(SnO_2)_{50}$ (mol %) | 15 nm/13 nm | B |
| 2-104 | $Zr_{18.4}Y_{2.3}Zn_{19.5}O_{59.8}$ (atom %) | $(ZrO_2)_{47}(Y_2O_3)_3(ZnO)_{50}$ (mol %) | 15 nm/13 nm | A |
| 2-105 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) | 15 nm/13 nm | A |
| 2-106 | $Zr_{9.5}Ca_{0.6}Zn_{20.1}Sn_{10.1}O_{59.7}$ (atom %) | $(ZrO_2)_{23.5}(CaO)_{1.5}(ZnO)_{50}(SnO_2)_{25}$ (mol %) | 15 nm/13 nm | B |
| 2-107 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | 15 nm/13 nm | B |
| 2-108 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) | 15 nm/13 nm | A |
| 2-109 | $Zr_{9.7}Zn_{18.5}Sn_{9.7}Al_{1.9}O_{60.2}$ (atom %) | $(ZrO_2)_{25}(ZnO)_{47.5}(SnO_2)_{25}(Al_2O_3)_{2.5}$ (mol %) | 13 nm/11 nm | B |
| 2-110 | $Zr_{9.0}Y_{1.2}Zn_{18.2}Sn_{9.6}Ga_{1.9}O_{60.1}$ (atom %) | $(ZrO_2)_{23.5}(Y_2O_3)_{1.5}(ZnO)_{47.5}(SnO_2)_{25}(Ga_2O_3)_{2.5}$ (mol %) | 15 nm/13 nm | A |
| 2-111 | $Zr_5Si_5Zn_{20}Sn_{10}O_{60}$ (atom %) | $(ZrO_2)_{12.5}(SiO_2)_{12.5}(ZnO)_{50}(SnO_2)_{25}$ (mol %) | 15 nm/13 nm | B |

TABLE 3-continued

| Disc No. | A-side information recording medium 101 First dielectric film 31 | | A-side information recording medium 101 Thickness of First dielectric film 31/ Second dielectric film 33 | Reproduction durability ($\Delta$d-MLSE) |
|---|---|---|---|---|
| | Expression by atom % | Expression by mol % | | |
| 2-112 | $Zr_5Si_5Zn_{20}Sn_{10}O_{60}$ (atom %) | $(ZrSiO_4)_{25}(ZnO)_{50}(SnO_2)_{25}$ (mol %) | 15 nm/13 nm | B |
| Comparative Example 1-1 | $Zr_{3.4}Si_{3.4}In_{31.8}O_{61.4}$ (atom %) | $(ZrO_2)_{15}(SiO_2)_{15}(In_2O_3)_{70}$ (mol %) | 15 nm/13 nm | D |

In disc Nos. 2-101 to 2-112, results of very good reproduction durability were obtained in all discs, as compared with Comparative Example 1-1, and the effect of improving the reproduction durability in the information recording medium according to the embodiment of the present invention could be confirmed.

Table 4 shows the results in B-side information recording medium 102.

TABLE 4

| Disc No. | B-side information recording medium 102 First dielectric film 31 | | B-side information recording medium 102 Thickness of First dielectric film 31/ Second dielectric film 33 | Reproduction durability ($\Delta$d-MLSE) |
|---|---|---|---|---|
| | Expression by atom % | Expression by mol % | | |
| 2-101 | $Zr_{10}Zn_{20}Sn_{10}O_{60}$ (atom %) | $(ZrO_2)_{25}(ZnO)_{50}(SnO_2)_{25}$ (mol %) | 15 nm/13 nm | A |
| 2-102 | $Zr_{20}Zn_{20}O_{60}$ (atom %) | $(ZrO_2)_{50}(ZnO)_{50}$ (mol %) | 15 nm/13 nm | B |
| 2-103 | $Zr_{16.7}Zn_{16.7}O_{66.6}$ (atom %) | $(ZrO_2)_{50}(SnO_2)_{50}$ (mol %) | 15 nm/13 nm | B |
| 2-104 | $Zr_{18.4}Y_{2.3}Zn_{19.5}O_{59.8}$ (atom %) | $(ZrO_2)_{47}(Y_2O_3)_3(ZnO)_{50}$ (mol %) | 15 nm/13 nm | A |
| 2-105 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) | 15 nm/13 nm | A |
| 2-106 | $Zr_{9.5}Ca_{0.6}Zn_{20.1}Sn_{10.1}O_{59.7}$ (atom %) | $(ZrO_2)_{23.5}(CaO)_{1.5}(ZnO)_{50}(SnO_2)_{25}$ (mol %) | 15 nm/13 nm | B |
| 2-107 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | 15 nm/13 nm | B |
| 2-108 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) | 15 nm/13 nm | A |
| 2-109 | $Zr_{9.7}Zn_{18.5}Sn_{9.7}Al_{1.9}O_{60.2}$ (atom %) | $(ZrO_2)_{25}(ZnO)_{47.5}(SnO_2)_{25}(Al_2O_3)_{2.5}$ (mol %) | 13 nm/11 nm | B |
| 2-110 | $Zr_{9.0}Y_{1.2}Zn_{18.2}Sn_{9.6}Ga_{1.9}O_{60.1}$ (atom %) | $(ZrO_2)_{23.5}(Y_2O_3)_{1.5}(ZnO)_{47.5}(SnO_2)_{25}(Ga_2O_3)_{2.5}$ (mol %) | 15 nm/13 nm | A |
| 2-111 | $Zr_5Si_5Zn_{20}Sn_{10}O_{60}$ (atom %) | $(ZrO_2)_{12.5}(SiO_2)_{12.5}(ZnO)_{50}(SnO_2)_{25}$ (mol %) | 15 nm/13 nm | B |
| 2-112 | $Zr_5Si_5Zn_{20}Sn_{10}O_{60}$ (atom %) | $(ZrSiO_4)_{25}(ZnO)_{50}(SnO_2)_{25}$ (mol %) | 15 nm/13 nm | B |
| Comparative Example 1-1 | $Zr_{3.4}Si_{3.4}In_{31.8}O_{61.4}$ (atom %) | $(ZrO_2)_{15}(SiO_2)_{15}(In_2O_3)_{70}$ (mol %) | 15 nm/13 nm | D |

In disc Nos. 2-101 to 2-112, results of very good reproduction durability were obtained in all discs, as compared with Comparative Example 1-1, and the effect of improving the reproduction durability in the information recording medium according to the embodiment of the present invention could be confirmed.

Further, with respect to the targets used for forming first dielectric film 31 of 2-105, 2-106 and 2-107, higher sputtering power was applied and the power at which a crack was generated on the targets was evaluated. As a result, the highest power could be applied to the target for 2-107. That is, the highest power can be applied to a target containing MgO, and this enables achieving a higher film-forming rate to increase the productivity of the information recording medium.

As an example of the information recording medium 100 of the present example, information recording media 100 were prepared in which $Zr_{10}Zn_{20}Sn_{10}O_{60}$ (atom %), $Zr_{7.4}Zn_{23.5}Sn_{10.3}O_{58.8}$ (atom %), $Zr_{3.3}Sn_{30.0}O_{66.7}$ (atom %), $Zr_{2.3}Sn_{31.0}O_{66.7}$ (atom %), $Zr_{17.8}Zn_{6.7}Sn_{11.1}O_{64.4}$ (atom %), $Zr_{25.9}Zn_{11.1}O_{63.0}$ (atom %), $Zr_{26.5}Zn_{10.3}O_{63.2}$ (atom %), $Zr_{9.3}Y_{1.2}Zn_{19.8}Sn_{9.9}O_{59.8}$ (atom %), $Zr_{6.7}Y_{1.2}Zn_{23.2}Sn_{10.2}O_{58.7}$ (atom %), $Zr_{12.7}Y_{1.1}Zn_{15.2}Sn_{9.5}O_{61.5}$ (atom %), $Zr_{17.5}Y_{1.4}Zn_{9.0}Sn_{9.0}O_{63.4}$ (atom %), $Zr_{9.7}Zn_{18.5}Sn_{9.7}Ga_{1.9}O_{60.2}$ (atom %), $Zr_{7.2}Zn_{21.8}Sn_{10.0}Ga_{2.0}O_{59.0}$ (atom %), $Zr_{13.1}Zn_{14.0}Sn_{9.4}Ga_{1.9}O_{61.6}$ (atom %), $Zr_{17.7}Zn_{8.0}Sn_{8.9}Ga_{1.8}O_{63.7}$ (atom %), $Zr_{9.4}Zn_{17.0}Sn_{9.4}Ga_{3.8}O_{60.4}$ (atom %), $Zr_{9.1}Zn_{15.3}Sn_{9.1}Ga_{5.8}O_{60.7}$ (atom %), and $Zr_{8.9}Zn_{14.0}Sn_{8.9}Ga_{7.5}O_{60.7}$ (atom %) were applied to first dielectric films 31 of A-side information recording medium 101 and B-side information recording medium 102. Nos. of these discs are defined as 2-201 to 2-218, respectively. Disc Nos. 2-204 and 2-207 are Comparative Examples.

In these 2-201 to 2-218, reproduction durability at octuple speed was evaluated. The evaluation method is the same as the method described before.

Furthermore, d-MLSE was evaluated in the 500 GB density octuple speed recording in 2-201 to 2-218. In the evaluation of d-MLSE, a value of 14.0% or less was defined as A (very good), a value of more than 14.0% and 14.5% or less as B (good), and a value of more than 14.5% and 15.0% or less as C (practical level), and a value more than 15% as D (impractical).

Further, the film-forming rate of the dielectric materials applied to first dielectric films 31 of 2-201 to 2-218 was evaluated. The film-forming rate was calculated by forming a first dielectric film 31 on a glass substrate and measuring the film thickness with a step profiler. A case where a film-forming rate that enables the formation of first dielectric film 31 within the time for producing one disc, which was predetermined in the production of the information recording medium 100, was achieved was defined as A, and a case where the film-forming rate is insufficient was defined as D (impractical).

Overall, in the evaluation of reproduction durability, d-MLSE, and film-forming rate, those containing D were judged as D (impractical), those containing C without D as C (practical level), those having two or more Bs without C or D as B (good), and those having two or more As without C or D as A (very good).

Table 5 shows the results in A-side information recording medium 101.

TABLE 5

A-side information recording medium 101
First dielectric film 31

| Disc No. | Expression by atom % | Expression by mol % |
|---|---|---|
| 2-201 | $Zr_{10}Zn_{20}Sn_{10}O_{60}$ (atom %) | $(ZrO_2)_{25}(ZnO)_{50}(SnO_2)_{25}$ (mol %) |
| 2-202 | $Zr_{7.4}Zn_{23.5}Sn_{10.3}O_{58.8}$ (atom %) | $(ZrO_2)_{18}(ZnO)_{57}(SnO_2)_{25}$ (mol %) |
| 2-203 | $Zr_{3.3}Sn_{30.0}O_{66.7}$ (atom %) | $(ZrO_2)_{10}(SnO_2)_{90}$ (mol %) |
| 2-204 (Comparative Example) | $Zr_{2.3}Sn_{31.0}O_{66.7}$ (atom %) | $((ZrO_2)_{7}(SnO_2)_{93}$ (mol %) |
| 2-205 | $Zn_{7.8}Zn_{6.7}Sn_{11.1}O_{64.4}$ (atom %) | $(ZrO_2)_{40}(ZnO)_{15}(SnO_2)_{25}$ (mol %) |
| 2-206 | $Zr_{25.9}Zn_{11.1}O_{63.0}$ (atom %) | $(ZrO_2)_{70}(ZnO)_{30}$ (mol %) |
| 2-207 (Comparative Example) | $Zr_{26.5}Zn_{10.3}O_{63.2}$ (atom %) | $(ZrO_2)_{72}(ZnO)_{28}$ (mol %) |
| 2-208 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) |
| 2-209 | $Zr_{6.7}Y_{1.2}Zn_{23.2}Sn_{10.2}O_{58.7}$ (atom %) | $(ZrO_2)_{16.5}(Y_2O_3)_{1.5}(ZnO)_{57}(SnO_2)_{25}$ (mol %) |
| 2-210 | $Zr_{12.7}Y_{1.1}Zn_{15.2}Sn_{9.5}O_{61.5}$ (atom %) | $(ZrO_2)_{33.5}(Y_2O_3)_{1.5}(ZnO)_{40}(SnO_2)_{25}$ (mol %) |
| 2-211 | $Zr_{17.5}Y_{1.1}Zn_{9.0}Sn_{9.0}O_{63.4}$ (atom %) | $(ZrO_2)_{48.5}(Y_2O_3)_{1.5}(ZnO)_{25}(SnO_2)_{25}$ (mol %) |
| 2-212 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) |
| 2-213 | $Zr_{7.2}Zn_{21.8}Sn_{10.0}Ga_{2.0}O_{59.0}$ (atom %) | $(ZrO_2)_{18}(ZnO)_{54.5}(SnO_2)_{25}(Ga_2O_3)_{2.5}$ (mol %) |
| 2-214 | $Zr_{13.1}Zn_{14.0}Sn_{9.4}Ga_{1.9}O_{61.6}$ (atom %) | $(ZrO_2)_{35}(ZnO)_{37.5}(SnO_2)_{25}(Ga_2O_3)_{2.5}$ (mol %) |
| 2-215 | $Zr_{17.7}Zn_{8.0}Sn_{8.9}Ga_{1.8}O_{63.7}$ (atom %) | $(ZrO_2)_{50}(ZnO)_{22.5}(SnO_2)_{25}(Ga_2O_3)_{2.5}$ (mol %) |
| 2-216 | $Zr_{9.4}Zn_{17.0}Sn_{9.4}Ga_{3.8}O_{60.4}$ (atom %) | $(ZrO_2)_{25}(ZnO)_{45}(SnO_2)_{25}(Ga_2O_3)_{5}$ (mol %) |
| 2-217 | $Zr_{9.1}Zn_{15.3}Sn_{9.1}Ga_{5.8}O_{60.7}$ (atom %) | $(ZrO_2)_{25}(ZnO)_{42}(SnO_2)_{25}(Ga_2O_3)_{8}$ (mol %) |
| 2-218 | $Zr_{8.9}Zn_{14.0}Sn_{8.9}Ga_{7.5}O_{60.7}$ (atom %) | $(ZrO_2)_{25}(ZnO)_{39.5}(SnO_2)_{25}(Ga_2O_3)_{10.5}$ (mol %) |

| Disc No. | A-side information recording medium 101 Thickness of First dielectric film 31/ Second dielectric film 33 | Reproduction durability (Δd-MLSE) | d-MLSE | Film-forming rate | Judgment |
|---|---|---|---|---|---|
| 2-201 | 15 nm/13 nm | A | A | A | A |
| 2-202 | 15 nm/13 nm | B | B | A | B |
| 2-203 | 17 nm/15 nm | B | C | A | C |
| 2-204 (Comparative Example) | 17 nm/15 nm | B | D | A | D |
| 2-205 | 15 nm/13 nm | A | A | A | A |
| 2-206 | 13 nm/11 nm | B | C | A | C |
| 2-207 (Comparative Example) | 13 nm/11 nm | B | C | D | D |
| 2-208 | 15 nm/13 nm | A | A | A | A |
| 2-209 | 15 nm/13 nm | B | B | A | B |
| 2-210 | 15 nm/13 nm | A | A | A | A |
| 2-211 | 15 nm/13 nm | A | A | A | A |
| 2-212 | 15 nm/13 nm | A | A | A | A |
| 2-213 | 13 nm/11 nm | B | B | A | B |
| 2-214 | 15 nm/13 nm | A | A | A | A |
| 2-215 | 15 nm/13 nm | B | B | A | B |
| 2-216 | 15 nm/13 nm | B | B | A | B |
| 2-217 | 11 nm/9 nm | B | B | A | B |
| 2-218 | 11 nm/9 nm | B | C | A | C |

In disc No. 2-204, it is observed that less than 3 atom % of the amount of Zr deteriorates d-MLSE and this makes the disc impractical. Thus, the amount of Zr needs to be 3 atom % or more. Further, in 2-207, it is observed that more than 26 atom % of the amount of Zr decreases the film-forming rate and this makes the disc impractical. Thus, the amount of Zr needs to be 26 atom % or less.

Further, in 2-218, it is observed that more than 7 atom % of the amount of Ga deteriorates d-MLSE and this makes the disc impractical. Thus, the amount of Ga is preferably 7 atom % or less.

Table 6 shows the results in B-side information recording medium 102.

TABLE 6

| Disc No. | B-side information recording medium 102 First dielectric film 31 Expression by atom % | B-side information recording medium 102 First dielectric film 31 Expression by mol % |
|---|---|---|
| 2-201 | $Zr_{10}Zn_{20}Sn_{10}O_{60}$ (atom %) | $(ZrO_2)_{25}(ZnO)_{50}(SnO_2)_{25}$ (mol %) |
| 2-202 | $Zr_{7.4}Zn_{23.5}Sn_{10.3}O_{58.8}$ (atom %) | $(ZrO_2)_{18}(ZnO)_{57}(SnO_2)_{25}$ (mol %) |
| 2-203 | $Zr_{3.3}Sn_{30.0}O_{66.7}$ (atom %) | $(ZrO_2)_{10}(SnO_2)_{90}$ (mol %) |
| 2-204 (Comparative Example) | $Zr_{2.3}Sn_{31.0}O_{66.7}$ (atom %) | $((ZrO_2)_7(SnO_2)_{93}$ (mol %) |
| 2-205 | $Zr_{17.8}Zn_{6.7}Sn_{11.1}O_{64.4}$ (atom %) | $(ZrO_2)_{40}(ZnO)_{15}(SnO_2)_{25}$ (mol %) |
| 2-206 | $Zr_{25.9}Zn_{11.1}O_{63.0}$ (atom %) | $(ZrO_2)_{70}(ZnO)_{30}$ (mol %) |
| 2-207 (Comparative Example) | $Zr_{26.5}Zn_{10.3}O_{63.2}$ (atom %) | $(ZrO_2)_{72}(ZnO)_{28}$ (mol %) |
| 2-208 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) |
| 2-209 | $Zr_{6.7}Y_{1.2}Zn_{23.2}Sn_{10.2}O_{58.7}$ (atom %) | $(ZrO_2)_{16.5}(Y_2O_3)_{1.5}(ZnO)_{57}(SnO_2)_{25}$ (mol %) |
| 2-210 | $Zr_{12.7}Y_{1.1}Zn_{15.2}Sn_{9.5}O_{61.5}$ (atom %) | $(ZrO_2)_{33.5}(Y_2O_3)_{1.5}(ZnO)_{40}(SnO_2)_{25}$ (mol %) |
| 2-211 | $Zr_{17.5}Y_{1.1}Zn_{9.0}Sn_{9.0}O_{63.4}$ (atom %) | $(ZrO_2)_{48.5}(Y_2O_3)_{1.5}(ZnO)_{25}(SnO_2)_{25}$ (mol %) |
| 2-212 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) |
| 2-213 | $Zr_{7.2}Zn_{21.8}Sn_{10.0}Ga_{2.0}O_{59.0}$ (atom %) | $(ZrO_2)_{18}(ZnO)_{54.5}(SnO_2)_{25}(Ga_2O_3)_{2.5}$ (mol %) |
| 2-214 | $Zr_{13.1}Zn_{14.0}Sn_{9.4}Ga_{1.9}O_{61.6}$ (atom %), | $(ZrO_2)_{35}(ZnO)_{37.5}(SnO_2)_{25}(Ga_2O_3)_{2.5}$ (mol %) |
| 2-215 | $Zr_{17.7}Zn_{8.0}Sn_{8.9}Ga_{1.8}O_{63.7}$ (atom %) | $(ZrO_2)_{50}(ZnO)_{22.5}(SnO_2)_{25}(Ga_2O_3)_{2.5}$ (mol %) |
| 2-216 | $Zr_{9.4}Zn_{17.0}Sn_{9.4}Ga_{3.8}O_{60.4}$ (atom %) | $(ZrO_2)_{25}(ZnO)_{45}(SnO_2)_{25}(Ga_2O_3)_5$ (mol %) |
| 2-217 | $Zr_{9.1}Zn_{15.3}Sn_{9.1}Ga_{5.8}O_{60.7}$ (atom %) | $(ZrO_2)_{25}(ZnO)_{42}(SnO_2)_{25}(Ga_2O_3)_8$ (mol %) |
| 2-218 | $Zr_{8.9}Zn_{14.0}Sn_{8.9}Ga_{7.5}O_{60.7}$ (atom %) | $(ZrO_2)_{25}(ZnO)_{39.5}(SnO_2)_{25}(Ga_2O_3)_{10.5}$ (mol %) |

| Disc No. | B-side information recording medium 102 Thickness of First dielectric film 31/ Second dielectric film 33 | Reproduction durability (Δd-MLSE) | d-MLSE | Film-forming rate | Judgment |
|---|---|---|---|---|---|
| 2-201 | 15 nm/13 nm | A | A | A | A |
| 2-202 | 15 nm/13 nm | B | B | A | B |
| 2-203 | 17 nm/15 nm | B | C | A | C |
| 2-204 (Comparative Example) | 17 nm/15 nm | B | D | A | D |
| 2-205 | 15 nm/13 nm | A | A | A | A |
| 2-206 | 13 nm/11 nm | B | C | A | C |
| 2-207 (Comparative Example) | 13 nm/11 nm | B | C | D | D |
| 2-208 | 15 nm/13 nm | A | A | A | A |
| 2-209 | 15 nm/13 nm | B | B | A | B |
| 2-210 | 15 nm/13 nm | A | A | A | A |
| 2-211 | 15 nm/13 nm | A | A | A | A |
| 2-212 | 15 nm/13 nm | A | A | A | A |
| 2-213 | 13 nm/11 nm | B | B | A | B |
| 2-214 | 15 nm/13 nm | A | A | A | A |
| 2-215 | 15 nm/13 nm | B | B | A | B |
| 2-216 | 15 nm/13 nm | B | B | A | B |
| 2-217 | 11 nm/9 nm | B | B | A | B |
| 2-218 | 11 nm/9 nm | B | C | A | C |

The same results as those in A-side information recording medium 101 was obtained in B-side information recording medium 102.

Further, when $Zr_{16.8}Y_{4.6}Zn_{19.1}O_{59.5}$ (atom %) (= $(ZrO_2)_{44}(Y_2O_3)_6(ZnO)_{50}$ (mol %)) is applied to first dielectric film 31, the target was cracked in the film forming process of first dielectric film 31, and stable production was difficult. From this, the amount of $Y_2O_3$ is preferably 10% or less with respect to the amount of $ZrO_2$ in terms of the molar concentration.

Example 3

In the present example, another example of information recording medium 100 shown in the FIGURE is described. The following is a method for producing information recording medium 100 of the present example.

First, a configuration of A-side information recording medium 101 is described.

As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. The configuration and production method of L1 layer 20 are the same as in Example 2.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A film of $(ZrO_2)_{25}(ZnO)_{50}(SnO_2)_{25}$ (mol %) of 15 nm as first dielectric film 31 using a target substantially composed of $(ZrO_2)_{25}(ZnO)_{50}(SnO_2)_{25}$ (mol %), a film of 34 nm as recording film 32 using a target according to each composition described in Table 7, and a film of $(ZrO_2)_{25}(SiO_2)_{25}(In_2O_3)_{50}$ (mol %) of 13 nm as second dielectric film 33 using a target substantially composed of $(ZrO_2)_{25}(SiO_2)_{25}(In_2O_3)_{50}$ (mol %) were sequentially formed by a sputtering.

Formation of first dielectric film 31 was performed in an Ar atmosphere (flow rate: 12 sccm), using a pulse DC power source (3 kW). Further, formation of recording film 32 was performed in an Ar and $O_2$ mixed-gas atmosphere (flow rate: 12+36 sccm), using a pulse DC power source (5 kW). Moreover, formation of second dielectric film 33 was performed in an Ar atmosphere (flow rate: 12 sccm), using a DC power source (2 kW).

Thereafter, an ultraviolet-curable resin was applied onto second dielectric film 33, followed by spin coating, and was then cured with ultraviolet light, to form cover layer 4 having a thickness of about 57 thereby preparing A-side information recording medium 101.

Next, a configuration of B-side information recording medium 102 is described.

As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. The configuration and production method of L1 layer 20 are the same as in Example 2.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A film of $(ZrO_2)_{25}(ZnO)_{50}(SnO_2)_{25}$ (mol %) of 15 nm as first dielectric film 31 using a target substantially composed of $(ZrO_2)_{25}(ZnO)_{50}(SnO_2)_{25}$ (mol %), a film of 34 nm as recording film 32 using a target according to each composition described in Table 8, and a film of $(ZrO_2)_{25}(SiO_2)_{25}(In_2O_3)_{50}$ (mol %) of 13 nm as second dielectric film 33 using a target substantially composed of $(ZrO_2)_{25}(SiO_2)_{25}(In_2O_3)_{50}$ (mol %) were sequentially formed by a sputtering.

Formation of first dielectric film 31 was performed in an Ar atmosphere (flow rate: 12 sccm), using a pulse DC power source (3 kW). Further, formation of recording film 32 was performed in an Ar and $O_2$ mixed-gas atmosphere (flow rate: 12+36 sccm), using a pulse DC power source (5 kW). Moreover, formation of second dielectric film 33 was performed in an Ar atmosphere (flow rate: 12 sccm), using a DC power source (2 kW).

Thereafter, an ultraviolet-curable resin was applied onto second dielectric film 33, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 100 were prepared in which $W_{32}Cu_{17}Zn_{33}Mn_{18}$ (atom %), $W_{32}Cu_{17}Nb_{33}Mn_{18}$ (atom %), $W_{32}Cu_{17}Mo_{33}Mn_{18}$ (atom %), $W_{32}Cu_{17}Ta_{33}Mn_{18}$ (atom %), $W_{32}Cu_{17}Ti_{33}Mn_{18}$ (atom %), $W_{32}Cu_{17}Nb_{22}Zn_{11}Mn_{18}$ (atom %), $W_{32}Cu_{17}Ta_{22}Zn_{11}Mn_{18}$ (atom %), $W_{15}Cu_{22}Ta_{40}Mn_{23}$ (atom %), $W_{14}Cu_{23}Ta_{40}Mn_{23}$ (atom %), $W_{59}Cu_{20}Ta_{10}Mn_{21}$ (atom %), $W_{60}Cu_{20}Ta_{10}Mn_{20}$ (atom %), $W_{32}Ta_{33}Mn_{35}$ (atom %), $W_{32}Cu_{30}Ta_{28}Mn_{10}$ (atom %), $W_{32}Cu_{31}Ta_{27}Mn_{10}$ (atom %), $W_{32}Cu_{30}Ta_{29}Mn_{9}$ (atom %), $W_{29}Cu_{1}Ta_{30}Mn_{40}$ (atom %), $W_{29}Cu_{1}Ta_{29}Mn_{41}$ (atom %), $W_{55}Cu_{17}Ta_{10}Mn_{18}$ (atom %), $W_{56}Cu_{17}Ta_{9}Mn_{18}$ (atom %), $W_{15}Cu_{17}Zn_{25}Ta_{25}Mn_{18}$ (atom %), and $W_{15}Cu_{17}Zn_{25}Ta_{26}Mn_{17}$ (atom %) were applied to first dielectric films 32 of A-side information recording medium 101 and B-side information recording medium 102. Nos. of these discs are defined as 2-301 to 2-321, respectively. Disc No. 2-312 is Comparative Example.

In these 2-301 to 2-321, the reproduction durability, d-MLSE, and film-forming rate were defined as described in Example 1.

Furthermore, transmittance was evaluated. In the evaluation of the transmittance, a sample in which L2 layer 30 to which each recording film material had been applied was formed on a polycarbonate substrate having a thickness of 1.1 mm and the cover layer 4 was formed was measured using a spectrophotometer. Those having a transmittance of 67% or more were judged as A, those having a transmittance of 60% or more and less than 67% as B, those having a transmittance of 50% or more and less than 60% as C, and those having a transmittance of less than 50% as D (impractical).

Overall, those containing D were judged as D (impractical), those containing C without D as C (practical level), those containing two or more Bs without C or D as B (good), and other ones as A (very good).

Table 7 shows the results in A-side information recording medium 101.

TABLE 7

| Disc No. | A-side information recording medium 101 Recording film 32 | Reproduction durability (Δd-MLSE) | d-MLSE | Film-forming rate | Transmittance | Judgment |
|---|---|---|---|---|---|---|
| 2-301 | $W_{32}Cu_{17}Zn_{33}Mn_{18}$ (atom %) | B | B | A | A | B |
| 2-302 | $W_{32}Cu_{17}Nb_{33}Mn_{18}$ (atom %) | A | C | A | A | C |
| 2-303 | $W_{32}Cu_{17}Mo_{33}Mn_{18}$ (atom %) | A | C | A | A | C |
| 2-304 | $W_{32}Cu_{17}Ta_{33}Mn_{18}$ (atom %) | A | A | A | A | A |
| 2-305 | $W_{32}Cu_{17}Ti_{33}Mn_{18}$ (atom %) | A | C | A | A | C |
| 2-306 | $W_{32}Cu_{17}Nb_{22}Zn_{11}Mn_{18}$ (atom %) | A | C | A | A | C |

TABLE 7-continued

| Disc No. | A-side information recording medium 101 Recording film 32 | Reproduction durability (Δd-MLSE) | d-MLSE | Film-forming rate | Transmittance | Judgment |
|---|---|---|---|---|---|---|
| 2-307 | $W_{32}Cu_{17}Ta_{22}Zn_{11}Mn_{18}$ (atom %) | A | A | A | A | A |
| 2-308 | $W_{15}Cu_{22}Ta_{40}Mn_{23}$ (atom %) | B | B | A | B | B |
| 2-309 | $W_{14}Cu_{23}Ta_{40}Mn_{23}$ (atom %) | C | B | A | C | C |
| 2-310 | $W_{59}Cu_{20}Ta_{10}Mn_{21}$ (atom %) | B | B | A | B | B |
| 2-311 | $W_{60}Cu_{20}Ta_{10}Mn_{20}$ (atom %) | B | C | A | B | C |
| 2-312 (Comparative Example) | $W_{32}Ta_{33}Mn_{35}$ (atom %) | D | B | D | C | D |
| 2-313 | $W_{32}Cu_{30}Ta_{28}Mn_{10}$ (atom %) | B | B | A | B | B |
| 2-314 | $W_{32}Cu_{31}Ta_{27}Mn_{10}$ (atom %) | C | C | A | C | C |
| 2-315 | $W_{32}Cu_{30}Ta_{29}Mn_{9}$ (atom %) | C | C | A | C | C |
| 2-316 | $W_{29}Cu_{1}Ta_{30}Mn_{40}$ (atom %) | B | B | A | B | B |
| 2-317 | $W_{29}Cu_{1}Ta_{29}Mn_{41}$ (atom %) | C | B | A | C | C |
| 2-318 | $W_{55}Cu_{17}Ta_{10}Mn_{18}$ (atom %) | B | B | A | A | B |
| 2-319 | $W_{56}Cu_{17}Ta_{9}Mn_{18}$ (atom %) | A | C | A | A | C |
| 2-320 | $W_{15}Cu_{17}Zn_{25}Ta_{25}Mn_{18}$ (atom %) | A | B | A | B | B |
| 2-321 | $W_{15}Cu_{17}Zn_{25}Ta_{26}Mn_{17}$ (atom %) | A | C | A | C | C |

In disc No. 2-309, when W is decreased, the reproduction durability and transmittance tend to be deteriorated, and in 2-311, when W is increased, d-MLSE tends to be deteriorated. From this, the amount of W is preferably 15 atom % or more and less than 60 atom %.

Further, in 2-312, when Cu is not contained, stable film formation cannot be performed, the film-forming rate is deteriorated, and the reproduction durability is deteriorated. Thus, Cu needs to be contained in recording film 32. Moreover, in 2-314, when the amount of Cu is increased, the reproduction durability tends to be deteriorated. Thus, the amount of Cu is preferably 30 atom % or less.

Moreover, in 2-315, when Mn is decreased, the reproduction durability and d-MLSE are deteriorated, and in 2-317, when Mn is increased, the reproduction durability and the film-forming rate tend to be deteriorated. Therefore, the amount of Mn is preferably 10 atom % or more and 40 atom % or less.

Table 8 shows the results in B-side information recording medium 102.

The same results as that in A-side information recording medium 101 were obtained also in B-side information recording medium 102.

Example 4

In the present example, another example of information recording medium 100 shown in the FIGURE is described. The following is a method for producing information recording medium 100 of the present example.

First, a configuration of A-side information recording medium 101 is described.

As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

TABLE 8

| Disc No. | B-side information recording medium 102 Recording film 32 | Reproduction durability (Δd-MLSE) | d-MLSE | Film-forming rate | Transmittance | Judgment |
|---|---|---|---|---|---|---|
| 2-301 | $W_{32}Cu_{17}Zn_{33}Mn_{18}$ (atom %) | B | B | A | A | B |
| 2-302 | $W_{32}Cu_{17}Nb_{33}Mn_{18}$ (atom %) | A | C | A | A | C |
| 2-303 | $W_{32}Cu_{17}Mo_{33}Mn_{18}$ (atom %) | A | C | A | A | C |
| 2-304 | $W_{32}Cu_{17}Ta_{33}Mn_{18}$ (atom %) | A | A | A | A | A |
| 2-305 | $W_{32}Cu_{17}Ti_{33}Mn_{18}$ (atom %) | A | C | A | A | C |
| 2-306 | $W_{32}Cu_{17}Nb_{22}Zn_{11}Mn_{18}$ (atom %) | A | C | A | A | C |
| 2-307 | $W_{32}Cu_{17}Ta_{22}Zn_{11}Mn_{18}$ (atom %) | A | A | A | A | A |
| 2-308 | $W_{15}Cu_{22}Ta_{40}Mn_{23}$ (atom %) | B | B | A | B | B |
| 2-309 | $W_{14}Cu_{23}Ta_{40}Mn_{23}$ (atom %) | C | B | A | C | C |
| 2-310 | $W_{59}Cu_{20}Ta_{10}Mn_{21}$ (atom %) | B | B | A | B | B |
| 2-311 | $W_{60}Cu_{20}Ta_{10}Mn_{20}$ (atom %) | B | C | A | B | C |
| 2-312 (Comparative Example) | $W_{32}Ta_{33}Mn_{35}$ (atom %) | D | B | D | C | D |
| 2-313 | $W_{32}Cu_{30}Ta_{28}Mn_{10}$ (atom %) | B | B | A | B | B |
| 2-314 | $W_{32}Cu_{31}Ta_{27}Mn_{10}$ (atom %) | C | C | A | C | C |
| 2-315 | $W_{32}Cu_{30}Ta_{29}Mn_{9}$ (atom %) | C | C | A | C | C |
| 2-316 | $W_{29}Cu_{1}Ta_{30}Mn_{40}$ (atom %) | B | B | A | B | B |
| 2-317 | $W_{29}Cu_{1}Ta_{29}Mn_{41}$ (atom %) | C | B | A | C | C |
| 2-318 | $W_{55}Cu_{17}Ta_{10}Mn_{18}$ (atom %) | B | B | A | A | B |
| 2-319 | $W_{56}Cu_{17}Ta_{9}Mn_{18}$ (atom %) | A | C | A | A | C |
| 2-320 | $W_{15}Cu_{17}Zn_{25}Ta_{25}Mn_{18}$ (atom %) | A | B | A | B | B |
| 2-321 | $W_{15}Cu_{17}Zn_{25}Ta_{26}Mn_{17}$ (atom %) | A | C | A | C | C |

Next, L1 layer 20 was formed on intermediate separation layer 2. The configuration and production method of L1 layer 20 are the same as in Example 2.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A dielectric film of 13 to 17 nm according to the embodiment of the present invention as first dielectric film 31 using a target according to each composition described in Tables 9 and 10, a film of $W_{32}Cu_{17}Ta_{22}Zn_{11}Mn_{18}$—O of 34 nm as recording film 32 using a target substantially composed of $W_{32}Cu_{17}Ta_{22}Zn_{11}Mn_{18}$—O, and a dielectric film of 11 to 15 nm according to the embodiment of the present invention as the second dielectric film 33 using a target according to each composition described in Tables 9 and 10 were sequentially formed by a sputtering.

Formation of first dielectric film 31 was performed in an Ar atmosphere (flow rate: 12 sccm), using a pulse DC power source (3 kW). Further, formation of recording film 32 was performed in an Ar and $O_2$ mixed-gas atmosphere (flow rate: 12+36 sccm), using a pulse DC power source (5 kW). Moreover, formation of second dielectric film 33 was performed in an Ar atmosphere (flow rate: 12 sccm), using a pulse DC power source (2 kW).

Thereafter, an ultraviolet-curable resin was applied onto second dielectric film 33, followed by spin coating, and was then cured with ultraviolet light, to form cover layer 4 having a thickness of about 57 μm, thereby preparing A-side information recording medium 101.

Next, a configuration of B-side information recording medium 102 is described.

As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. The configuration and production method of L01 layer 20 are the same as in Example 2.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A dielectric film of 13 to 17 nm according to the embodiment of the present invention as first dielectric film 31 using a target according to each composition described in Tables 11 and 12, a film of $W_{32}Cu_{17}Ta_{22}Zn_{11}Mn_{18}$—O of 34 nm as recording film 32 using a target substantially composed of $W_{32}Cu_{17}Ta_{22}Zn_{11}Mn_{18}$—O, and a dielectric film of 11 to 15 nm according to the embodiment of the present invention as the second dielectric film 33 using a target according to each composition described in Tables 11 and 12 were sequentially formed by a sputtering.

Formation of first dielectric film 31 was performed in an Ar atmosphere (flow rate: 12 sccm), using a pulse DC power source (3 kW). Further, formation of recording film 32 was performed in an Ar and $O_2$ mixed-gas atmosphere (flow rate: 12+36 sccm), using a pulse DC power source (5 kW). Moreover, formation of second dielectric film 33 was performed in an Ar atmosphere (flow rate: 12 sccm), using a pulse DC power source (2 kW).

Thereafter, an ultraviolet-curable resin was applied onto second dielectric film 33, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 100 were prepared in which, in the order of (first dielectric film 31, second dielectric film 33), $(Zr_{10}Zn_{20}Sn_{10}O_{60}$ (atom %), $Zr_{10}Zn_{20}Sn_{10}O_{60}$ (atom %)), $(Zr_{9.3}Y_{1.2}Zn_{19.8}Sn_{9.9}O_{59.8}$ (atom %), $Zr_{9.3}Y_{1.2}Zn_{19.8}Sn_{9.9}O_{59.8}$ (atom %)), $(Zr_{9.7}Zn_{18.5}Sn_{9.7}Ga_{1.9}O_{60.2}$ (atom %), $Zr_{9.7}Zn_{18.5}Sn_{9.7}Ga_{1.9}O_{60.2}$ (atom %)), $(Zr_{9.0}Y_{1.2}Zn_{18.2}Sn_{9.6}Ga_{1.9}O_{60.1}$ (atom %), $Zr_{9.0}Y_{1.2}Zn_{18.2}Sn_{9.6}Ga_{1.9}O_{60.1}$ (atom %)), $(Zr_{20}Zn_{20}O_{60}$ (atom %), $Zr_{10}Zn_{20}Sn_{10}O_{60}$ (atom %)), $(Zr_{16.7}Zn_{16.7}O_{66.6}$ (atom %), $Zr_{10}Zn_{20}Sn_{10}O_{60}$ (atom %)), $(Zr_{18.4}Y_{2.3}Zn_{19.5}O_{59.8}$ (atom %), $Zr_{10}Zn_{20}Sn_{10}O_{60}$ (atom %)), $(Zr_{9.3}Y_{1.2}Zn_{19.8}Sn_{9.9}O_{59.8}$ (atom %), $Zr_{10}Zn_{20}Sn_{10}O_{60}$ (atom %)), $(Zr_{9.5}Ca_{0.6}Zn_{20.1}Sn_{10.1}O_{59.7}$ (atom %), $Zr_{10}Zn_{20}Sn_{10}O_{60}$ (atom %)), $(Zr_{9.5}Mg_{0.6}Zn_{20.1}Sn_{10.1}O_{59.7}$ (atom %), $Zr_{10}Zn_{20}Sn_{10}O_{60}$ (atom %)), $(Zr_{9.7}Zn_{18.5}Sn_{9.7}Ga_{1.9}O_{60.2}$ (atom %), $Zr_{10}Zn_{20}Sn_{10}O_{60}$ (atom %)), $(Zr_{9.7}Zn_{18.5}Sn_{9.7}Al_{1.9}O_{60.2}$ (atom %), $Zr_{10}Zn_{20}Sn_{10}O_{60}$ (atom %)), $(Zr_{9.0}Y_{1.2}Zn_{18.2}Sn_{9.6}Ga_{1.9}O_{60.1}$ (atom %), $Zr_{10}Zn_{20}Sn_{10}O_{60}$ (atom %)), $(Zr_{10}Zn_{20}Sn_{10}O_{60}$ (atom %), $Zr_{20}Zn_{20}O_{60}$ (atom %)), $(Zr_{10}Zn_{20}Sn_{10}O_{60}$ (atom %), $Zr_{16.7}Zn_{16.7}O_{66.6}$ (atom %)), $(Zr_{10}Zn_{20}Sn_{10}O_{60}$ (atom %), $Zr_{18.4}Y_{2.3}Zn_{19.5}O_{59.8}$ (atom %)), $(Zr_{10}Zn_{20}Sn_{10}O_{60}$ (atom %), $Zr_{9.3}Y_{1.2}Zn_{19.8}Sn_{9.9}O_{59.8}$ (atom %)), $(Zr_{10}Zn_{20}Sn_{10}O_{60}$ (atom %), $Zr_{9.5}Ca_{0.6}Zn_{20.1}Sn_{10.1}O_{59.7}$ (atom %)), $(Zr_{10}Zn_{20}Sn_{10}O_{60}$ (atom %), $Zr_{9.5}Mg_{0.6}Zn_{20.1}Sn_{10.1}O_{59.7}$ (atom %)), $(Zr_{10}Zn_{20}Sn_{10}O_{60}$ (atom %), $Zr_{9.7}Zn_{18.5}Sn_{9.7}Ga_{1.9}O_{60.2}$ (atom %)), $(Zr_{10}Zn_{20}Sn_{10}O_{60}$ (atom %), $Zr_{9.7}Zn_{18.5}Sn_{9.7}Al_{1.9}O_{60.2}$ (atom %)), and $(Zr_{10}Zn_{20}Sn_{10}O_{60}$ (atom %), $Zr_{9.0}Y_{1.2}Zn_{18.2}Sn_{9.6}Ga_{1.9}O_{60.1}$ (atom %)) were applied to first dielectric films 31 and second dielectric films 33 of A-side information recording medium 101 and B-side information recording medium 102. Nos. of these discs are defined as 2-401 to 2-422, respectively.

In these 2-401 to 2-422 and Comparative Example 1-1 shown in Example 1, evaluation of reproduction durability was performed as described in Example 1.

Tables 9 and 10 show the results in A-side information recording medium 101.

TABLE 9

| Disc No. | A-side information recording medium 101 First dielectric film 31 Expression by atom % | A-side information recording medium 101 Second dielectric film 33 Expression by atom % | A-side information recording medium 101 Thickness of First dielectric film 31/ Second dielectric film 33 | Reproduction durability ($\Delta$d-MLSE) |
|---|---|---|---|---|
| 2-401 | $Zr_{10}Zn_{20}Sn_{10}O_{60}$ (atom %) | $Zr_{10}Zn_{20}Sn_{10}O_{60}$ (atom %) | 15 nm/13 nm | A |
| 2-402 | $Zr_{9.3}Y_{1.2}Zn_{19.8}Sn_{9.9}O_{59.8}$ (atom %) | $Zr_{9.3}Y_{1.2}Zn_{19.8}Sn_{9.9}O_{59.8}$ (atom %) | 15 nm/13 nm | A |
| 2-403 | $Zr_{9.7}Zn_{18.5}Sn_{9.7}Ga_{1.9}O_{60.2}$ (atom %) | $Zr_{9.7}Zn_{18.5}Sn_{9.7}Ga_{1.9}O_{60.2}$ (atom %) | 15 nm/13 nm | A |
| 2-404 | $Zr_{9.0}Y_{1.2}Zn_{18.2}Sn_{9.6}Ga_{1.9}O_{60.1}$ (atom %) | $Zr_{9.0}Y_{1.2}Zn_{18.2}Sn_{9.6}Ga_{1.9}O_{60.0}$ (atom %) | 15 nm/13 nm | A |
| 2-405 | $Zr_{20}Zn_{20}O_{60}$ (atom %) | $Zr_{10}Zn_{20}Sn_{10}O_{60}$ (atom %) | 13 nm/11 nm | B |
| 2-406 | $Zr_{16.7}Zn_{16.7}O_{66.6}$ (atom %) | $Zr_{10}Zn_{20}Sn_{10}O_{60}$ (atom %) | 17 nm/15 nm | B |
| 2-407 | $Zr_{18.4}Y_{2.3}Zn_{19.5}O_{59.8}$ (atom %) | $Zr_{10}Zn_{20}Sn_{10}O_{60}$ (atom %) | 13 nm/11 nm | B |
| 2-408 | $Zr_{9.3}Y_{1.2}Zn_{19.8}Sn_{9.9}O_{59.8}$ (atom %) | $Zr_{10}Zn_{20}Sn_{10}O_{60}$ (atom %) | 15 nm/13 nm | A |
| 2-409 | $Zr_{9.5}Ca_{0.6}Zn_{20.1}Sn_{10.1}O_{59.7}$ (atom %) | $Zr_{10}Zn_{20}Sn_{10}O_{60}$ (atom %) | 15 nm/13 nm | B |
| 2-410 | $Zr_{9.5}Mg_{0.6}Zn_{20.1}Sn_{10.1}O_{59.7}$ (atom %) | $Zr_{10}Zn_{20}Sn_{10}O_{60}$ (atom %) | 15 nm/13 nm | B |
| 2-411 | $Zr_{9.7}Zn_{18.5}Sn_{9.7}Ga_{1.9}O_{60.2}$ (atom %) | $Zr_{10}Zn_{20}Sn_{10}O_{60}$ (atom %) | 15 nm/13 nm | A |
| 2-412 | $Zr_{9.7}Zn_{18.5}Sn_{9.7}Al_{1.9}O_{60.2}$ (atom %) | $Zr_{10}Zn_{20}Sn_{10}O_{60}$ (atom %) | 13 nm/11 nm | B |
| 2-413 | $Zr_{9.0}Y_{1.2}Zn_{18.2}Sn_{9.6}Ga_{1.9}O_{60.1}$ (atom %) | $Zr_{10}Zn_{20}Sn_{10}O_{60}$ (atom %) | 15 nm/13 nm | A |
| 2-414 | $Zr_{10}Zn_{20}Sn_{10}O_{60}$ (atom %) | $Zr_{20}Zn_{20}O_{60}$ (atom %) | 13 nm/11 nm | B |
| 2-415 | $Zr_{10}Zn_{20}Sn_{10}O_{60}$ (atom %) | $Zr_{16.7}Zn_{16.7}O_{66.6}$ (atom %) | 17 nm/15 nm | B |
| 2-416 | $Zr_{10}Zn_{20}Sn_{10}O_{60}$ (atom %) | $Zr_{18.4}Y_{2.3}Zn_{19.5}O_{59.8}$ (atom %) | 13 nm/11 nm | B |
| 2-417 | $Zr_{10}Zn_{20}Sn_{10}O_{60}$ (atom %) | $Zr_{9.3}Y_{1.2}Zn_{19.8}Sn_{9.9}O_{59.8}$ (atom %) | 15 nm/13 nm | A |
| 2-418 | $Zr_{10}Zn_{20}Sn_{10}O_{60}$ (atom %) | $Zr_{9.5}Ca_{0.6}Zn_{20.1}Sn_{10.1}O_{59.7}$ (atom %) | 15 nm/13 nm | B |
| 2-419 | $Zr_{10}Zn_{20}Sn_{10}O_{60}$ (atom %) | $Zr_{9.5}Mg_{0.6}Zn_{20.1}Sn_{10.1}O_{59.7}$ (atom %) | 15 nm/13 nm | B |
| 2-420 | $Zr_{10}Zn_{20}Sn_{10}O_{60}$ (atom %) | $Zr_{9.7}Zn_{18.5}Sn_{9.7}Ga_{1.9}O_{60.2}$ (atom %) | 15 nm/13 nm | A |
| 2-421 | $Zr_{10}Zn_{20}Sn_{10}O_{60}$ (atom %) | $Zr_{9.7}Zn_{18.5}Sn_{9.7}Al_{1.9}O_{60.2}$ (atom %) | 13 nm/11 nm | B |
| 2-422 | $Zr_{10}Zn_{20}Sn_{10}O_{60}$ (atom %) | $Zr_{9.0}Y_{1.2}Zn_{18.2}Sn_{9.6}Ga_{1.9}O_{60.1}$ (atom %) | 15 nm/13 nm | A |
| Comparative Example 1-1 | $Zr_{3.4}Si_{3.4}In_{31.8}O_{61.4}$ (atom %) | $Zr_{6.3}Si_{6.3}In_{25.0}O_{62.4}$ (atom %) | 15 nm/13 nm | D |

TABLE 10

| Disc No. | A-side information recording medium 101 First dielectric film 31 Expression by mol % | A-side information recording medium 101 Second dielectric film 33 Expression by mol % |
|---|---|---|
| 2-401 | $(ZrO_2)_{25}(ZnO)_{50}(SnO_2)_{25}$ (mol %) | $(ZrO_2)_{25}(ZnO)_{50}(SnO_2)_{25}$ (mol %) |
| 2-402 | $(ZrO_2)_{23.5}(Y_2O_3)_{1.5}(ZnO)_{50}(SnO_2)_{25}$ (mol %) | $(ZrO_2)_{23.5}(Y_2O_3)_{1.5}(ZnO)_{50}(SnO_2)_{25}$ (mol %) |
| 2-403 | $(ZrO_2)_{25}(ZnO)_{47.5}(SnO_2)_{25}(Ga_2O_3)_{2.5}$ (mol %) | $(ZrO_2)_{25}(ZnO)_{47.5}(SnO_2)_{25}(Ga_2O_3)_{2.5}$ (mol %) |
| 2-404 | $(ZrO_2)_{23.5}(Y_2O_3)_{1.5}(ZnO)_{47.5}(SnO_2)_{25}(Ga_2O_3)_{2.5}$ (mol %) | $(ZrO_2)_{23.5}(Y_2O_3)_{1.5}(ZnO)_{47.5}(SnO_2)_{25}(Ga_2O_3)_{2.5}$ (mol %) |
| 2-405 | $(ZrO_2)_{50}(ZnO)_{50}$ (mol %) | $(ZrO_2)_{25}(ZnO)_{50}(SnO_2)_{25}$ (mol %) |
| 2-406 | $(ZrO_2)_{50}(SnO_2)_{50}$ (mol %) | $(ZrO_2)_{25}(ZnO)_{50}(SnO_2)_{25}$ (mol %) |
| 2-407 | $(ZrO_2)_{47}(Y_2O_3)_{3}(ZnO)_{50}$ (mol %) | $(ZrO_2)_{25}(ZnO)_{50}(SnO_2)_{25}$ (mol %) |
| 2-408 | $(ZrO_2)_{23.5}(Y_2O_3)_{1.5}(ZnO)_{50}(SnO_2)_{25}$ (mol %) | $(ZrO_2)_{25}(ZnO)_{50}(SnO_2)_{25}$ (mol %) |
| 2-409 | $(ZrO_2)_{23.5}(CaO)_{1.5}(ZnO)_{50}(SnO_2)_{25}$ (mol %) | $(ZrO_2)_{25}(ZnO)_{50}(SnO_2)_{25}$ (mol %) |
| 2-410 | $(ZrO_2)_{23.5}(MgO)_{1.5}(ZnO)_{50}(SnO_2)_{25}$ (mol %) | $(ZrO_2)_{25}(ZnO)_{50}(SnO_2)_{25}$ (mol %) |
| 2-411 | $(ZrO_2)_{25}(ZnO)_{47.5}(SnO_2)_{25}(Ga_2O_3)_{2.5}$ (mol %) | $(ZrO_2)_{25}(ZnO)_{50}(SnO_2)_{25}$ (mol %) |
| 2-412 | $(ZrO_2)_{25}(ZnO)_{47.5}(SnO_2)_{25}(Al_2O_3)_{2.5}$ (mol %) | $(ZrO_2)_{25}(ZnO)_{50}(SnO_2)_{25}$ (mol %) |
| 2-413 | $(ZrO_2)_{23.5}(Y_2O_3)_{1.5}(ZnO)_{47.5}(SnO_2)_{25}(Ga_2O_3)_{2.5}$ (mol %) | $(ZrO_2)_{25}(ZnO)_{50}(SnO_2)_{25}$ (mol %) |
| 2-414 | $(ZrO_2)_{25}(ZnO)_{50}(SnO_2)_{25}$ (mol %) | $(ZrO_2)_{50}(ZnO)_{50}$ (mol %) |
| 2-415 | $(ZrO_2)_{25}(ZnO)_{50}(SnO_2)_{25}$ (mol %) | $(ZrO_2)_{50}(SnO_2)_{50}$ (mol %) |
| 2-416 | $(ZrO_2)_{25}(ZnO)_{50}(SnO_2)_{25}$ (mol %) | $(ZrO_2)_{47}(Y_2O_3)_{3}(ZnO)_{50}$ (mol %) |
| 2-417 | $(ZrO_2)_{25}(ZnO)_{50}(SnO_2)_{25}$ (mol %) | $(ZrO_2)_{23.5}(Y_2O_3)_{1.5}(ZnO)_{50}(SnO_2)_{25}$ (mol %) |
| 2-418 | $(ZrO_2)_{25}(ZnO)_{50}(SnO_2)_{25}$ (mol %) | $(ZrO_2)_{23.5}(CaO)_{1.5}(ZnO)_{50}(SnO_2)_{25}$ (mol %) |
| 2-419 | $(ZrO_2)_{25}(ZnO)_{50}(SnO_2)_{25}$ (mol %) | $(ZrO_2)_{23.5}(MgO)_{1.5}(ZnO)_{50}(SnO_2)_{25}$ (mol %) |
| 2-420 | $(ZrO_2)_{25}(ZnO)_{50}(SnO_2)_{25}$ (mol %) | $(ZrO_2)_{25}(ZnO)_{47.5}(SnO_2)_{25}(Ga_2O_3)_{2.5}$ (mol %) |
| 2-421 | $(ZrO_2)_{25}(ZnO)_{50}(SnO_2)_{25}$ (mol %) | $(ZrO_2)_{25}(ZnO)_{47.5}(SnO_2)_{25}(Al_2O_3)_{2.5}$ (mol %) |
| 2-422 | $(ZrO_2)_{25}(ZnO)_{50}(SnO_2)_{25}$ (mol %) | $(ZrO_2)_{23.5}(Y_2O_3)_{1.5}(ZnO)_{47.5}(SnO_2)_{25}(Ga_2O_3)_{2.5}$ (mol %) |
| Comparative Example 1-1 | $(ZrO_2)_{15}(SiO_2)_{15}(In_2O_3)_{70}$ (mol %) | $(ZrO_2)_{25}(SiO_2)_{25}(In_2O_3)_{50}$ (mol %) |

In disc Nos. 2-401 to 2-422, results of very good reproduction durability were obtained in all discs, as compared with Comparative Example 1-1, and the effect of improving the reproduction durability in the information recording medium according to the embodiment of the present invention could be confirmed.

Tables 11 and 12 show the results in B-side information recording medium 102.

TABLE 11

| Disc No. | B-side information recording medium 102 First dielectric film 31 | B-side information recording medium 102 Second dielectric film 33 | B-side information recording medium 102 Thickness of First dielectric film 31/ Second dielectric film 33 | Reproduction durability (Δd-MLSE) |
|---|---|---|---|---|
| | Expression by atom % | | | |
| 2-401 | $Zr_{10}Zn_{20}Sn_{10}O_{60}$ (atom %) | $Zr_{10}Zn_{20}Sn_{10}O_{60}$ (atom %) | 15 nm/13 nm | A |
| 2-402 | $Zr_{9.3}Y_{1.2}Zn_{19.8}Sn_{9.9}O_{59.8}$ (atom %) | $Zr_{9.3}Y_{1.2}Zn_{19.8}Sn_{9.9}O_{59.8}$ (atom %) | 15 nm/13 nm | A |
| 2-403 | $Zr_{9.7}Zn_{18.5}Sn_{9.7}Ga_{1.9}O_{60.2}$ (atom %) | $Zr_{9.7}Zn_{18.5}Sn_{9.7}Ga_{1.9}O_{60.2}$ (atom %) | 15 nm/13 nm | A |
| 2-404 | $Zr_{9.0}Y_{1.2}Zn_{18.2}Sn_{9.6}Ga_{1.9}O_{60.1}$ (atom %) | $Zr_{9.0}Y_{1.2}Zn_{18.2}Sn_{9.6}Ga_{1.9}O_{60.1}$ (atom %) | 15 nm/13 nm | A |
| 2-405 | $Zr_{20}Zn_{20}O_{60}$ (atom %) | $Zr_{10}Zn_{20}Sn_{10}O_{60}$ (atom %) | 13 nm/11 nm | B |
| 2-406 | $Zr_{16.7}Zn_{16.7}O_{66.6}$ (atom %) | $Zr_{10}Zn_{20}Sn_{10}O_{60}$ (atom %) | 17 nm/15 nm | B |
| 2-407 | $Zr_{18.4}Y_{2.3}Zn_{19.5}O_{59.8}$ (atom %) | $Zr_{10}Zn_{20}Sn_{10}O_{60}$ (atom %) | 13 nm/11 nm | B |
| 2-408 | $Zr_{9.3}Y_{1.2}Zn_{19.8}Sn_{9.9}O_{59.8}$ (atom %) | $Zr_{10}Zn_{20}Sn_{10}O_{60}$ (atom %) | 15 nm/13 nm | A |
| 2-409 | $Zr_{9.5}Ca_{0.6}Zn_{20.1}Sn_{10.1}O_{59.7}$ (atom %) | $Zr_{10}Zn_{20}Sn_{10}O_{60}$ (atom %) | 15 nm/13 nm | B |
| 2-410 | $Zr_{9.5}Mg_{0.6}Zn_{20.1}Sn_{10.1}O_{59.7}$ (atom %) | $Zr_{10}Zn_{20}Sn_{10}O_{60}$ (atom %) | 15 nm/13 nm | B |
| 2-411 | $Zr_{9.7}Zn_{18.5}Sn_{9.7}Ga_{1.9}O_{60.2}$ (atom %) | $Zr_{10}Zn_{20}Sn_{10}O_{60}$ (atom %) | 15 nm/13 nm | A |
| 2-412 | $Zr_{9.7}Zn_{18.5}Sn_{9.7}Al_{1.9}O_{60.2}$ (atom %) | $Zr_{10}Zn_{20}Sn_{10}O_{60}$ (atom %) | 13 nm/11 nm | B |
| 2-413 | $Zr_{9.0}Y_{1.2}Zn_{18.2}Sn_{9.6}Ga_{1.9}O_{60.1}$ (atom %) | $Zr_{10}Zn_{20}Sn_{10}O_{60}$ (atom %) | 15 nm/13 nm | A |
| 2-414 | $Zr_{10}Zn_{20}Sn_{10}O_{60}$ (atom %) | $Zr_{20}Zn_{20}O_{60}$ (atom %) | 13 nm/11 nm | B |
| 2-415 | $Zr_{10}Zn_{20}Sn_{10}O_{60}$ (atom %) | $Zr_{16.7}Zn_{16.7}O_{66.6}$ (atom %) | 17 nm/15 nm | B |
| 2-416 | $Zr_{10}Zn_{20}Sn_{10}O_{60}$ (atom %) | $Zr_{18.4}Y_{2.3}Zn_{19.5}O_{59.8}$ (atom %) | 13 nm/11 nm | B |
| 2-417 | $Zr_{10}Zn_{20}Sn_{10}O_{60}$ (atom %) | $Zr_{9.3}Y_{1.2}Zn_{19.8}Sn_{9.9}O_{59.8}$ (atom %) | 15 nm/13 nm | A |
| 2-418 | $Zr_{10}Zn_{20}Sn_{10}O_{60}$ (atom %) | $Zr_{9.5}Ca_{0.6}Zn_{20.1}Sn_{10.1}O_{59.7}$ (atom %) | 15 nm/13 nm | B |
| 2-419 | $Zr_{10}Zn_{20}Sn_{10}O_{60}$ (atom %) | $Zr_{9.5}Mg_{0.6}Zn_{20.1}Sn_{10.1}O_{59.7}$ (atom %) | 15 nm/13 nm | B |
| 2-420 | $Zr_{10}Zn_{20}Sn_{10}O_{60}$ (atom %) | $Zr_{9.7}Zn_{18.5}Sn_{9.7}Ga_{1.9}O_{60.2}$ (atom %) | 15 nm/13 nm | A |
| 2-421 | $Zr_{10}Zn_{20}Sn_{10}O_{60}$ (atom %) | $Zr_{9.7}Zn_{18.5}Sn_{9.7}Al_{1.9}O_{60.2}$ (atom %) | 13 nm/11 nm | B |
| 2-422 | $Zr_{10}Zn_{20}Sn_{10}O_{60}$ (atom %) | $Zr_{9.0}Y_{1.2}Zn_{18.2}Sn_{9.6}Ga_{1.9}O_{60.1}$ (atom %) | 15 nm/13 nm | A |
| Comparative Example 1-1 | $Zr_{3.4}Si_{3.4}In_{31.8}O_{61.4}$ (atom %) | $Zr_{6.3}Si_{6.3}In_{25.0}O_{62.4}$ (atom %) | 15 nm/13 nm | D |

TABLE 12

| Disc No. | B-side information recording medium 102 First dielectric film 31 | B-side information recording medium 102 Second dielectric film 33 |
|---|---|---|
| | Expression by mol % | |
| 2-401 | $(ZrO_2)_{25}(ZnO)_{50}(SnO_2)_{25}$ (mol %) | $(ZrO_2)_{25}(ZnO)_{50}(SnO_2)_{25}$ (mol %) |
| 2-402 | $(ZrO_2)_{23.5}(Y_2O_3)_{1.5}(ZnO)_{50}(SnO_2)_{25}$ (mol %) | $(ZrO_2)_{23.5}(Y_2O_3)_{1.5}(ZnO)_{50}(SnO_2)_{25}$ (mol %) |
| 2-403 | $(ZrO_2)_{25}(ZnO)_{47.5}(SnO_2)_{25}(Ga_2O_3)_{2.5}$ (mol %) | $(ZrO_2)_{25}(ZnO)_{47.5}(SnO_2)_{25}(Ga_2O_3)_{2.5}$ (mol %) |
| 2-404 | $(ZrO_2)_{23.5}(Y_2O_3)_{1.5}(ZnO)_{47.5}(SnO_2)_{25}(Ga_2O_3)_{2.5}$ (mol %) | $(ZrO_2)_{23.5}(Y_2O_3)_{1.5}(ZnO)_{47.5}(SnO_2)_{25}(Ga_2O_3)_{2.5}$ (mol %) |
| 2-405 | $(ZrO_2)_{50}(ZnO)_{50}$ (mol %) | $(ZrO_2)_{25}(ZnO)_{50}(SnO_2)_{25}$ (mol %) |
| 2-406 | $(ZrO_2)_{50}(SnO_2)_{50}$ (mol %) | $(ZrO_2)_{25}(ZnO)_{50}(SnO_2)_{25}$ (mol %) |
| 2-407 | $(ZrO_2)_{47}(Y_2O_3)_3(ZnO)_{50}$ (mol %) | $(ZrO_2)_{25}(ZnO)_{50}(SnO_2)_{25}$ (mol %) |
| 2-408 | $(ZrO_2)_{23.5}(Y_2O_3)_{1.5}(ZnO)_{50}(SnO_2)_{25}$ (mol %) | $(ZrO_2)_{25}(ZnO)_{50}(SnO_2)_{25}$ (mol %) |
| 2-409 | $(ZrO_2)_{23.5}(CaO)_{1.5}(ZnO)_{50}(SnO_2)_{25}$ (mol %) | $(ZrO_2)_{25}(ZnO)_{50}(SnO_2)_{25}$ (mol %) |
| 2-410 | $(ZrO_2)_{23.5}(MgO)_{1.5}(ZnO)_{50}(SnO_2)_{25}$ (mol %) | $(ZrO_2)_{25}(ZnO)_{50}(SnO_2)_{25}$ (mol %) |
| 2-411 | $(ZrO_2)_{25}(ZnO)_{47.5}(SnO_2)_{25}(Ga_2O_3)_{2.5}$ (mol %) | $(ZrO_2)_{25}(ZnO)_{50}(SnO_2)_{25}$ (mol %) |
| 2-412 | $(ZrO_2)_{25}(ZnO)_{47.5}(SnO_2)_{25}(Al_2O_3)_{2.5}$ (mol %) | $(ZrO_2)_{25}(ZnO)_{50}(SnO_2)_{25}$ (mol %) |
| 2-413 | $(ZrO_2)_{23.5}(Y_2O_3)_{1.5}(ZnO)_{47.5}(SnO_2)_{25}(Ga_2O_3)_{2.5}$ (mol %) | $(ZrO_2)_{25}(ZnO)_{50}(SnO_2)_{25}$ (mol %) |
| 2-414 | $(ZrO_2)_{25}(ZnO)_{50}(SnO_2)_{25}$ (mol %) | $(ZrO_2)_{50}(ZnO)_{50}$ (mol %) |
| 2-415 | $(ZrO_2)_{25}(ZnO)_{50}(SnO_2)_{25}$ (mol %) | $(ZrO_2)_{50}(SnO_2)_{50}$ (mol %) |
| 2-416 | $(ZrO_2)_{25}(ZnO)_{50}(SnO_2)_{25}$ (mol %) | $(ZrO_2)_{47}(Y_2O_3)_3(ZnO)_{50}$ (mol %) |
| 2-417 | $(ZrO_2)_{25}(ZnO)_{50}(SnO_2)_{25}$ (mol %) | $(ZrO_2)_{23.5}(Y_2O_3)_{1.5}(ZnO)_{50}(SnO_2)_{25}$ (mol %) |
| 2-418 | $(ZrO_2)_{25}(ZnO)_{50}(SnO_2)_{25}$ (mol %) | $(ZrO_2)_{23.5}(CaO)_{1.5}(ZnO)_{50}(SnO_2)_{25}$ (mol %) |
| 2-419 | $(ZrO_2)_{25}(ZnO)_{50}(SnO_2)_{25}$ (mol %) | $(ZrO_2)_{23.5}(MgO)_{1.5}(ZnO)_{50}(SnO_2)_{25}$ (mol %) |
| 2-420 | $(ZrO_2)_{25}(ZnO)_{50}(SnO_2)_{25}$ (mol %) | $(ZrO_2)_{25}(ZnO)_{47.5}(SnO_2)_{25}(Ga_2O_3)_{2.5}$ (mol %) |
| 2-421 | $(ZrO_2)_{25}(ZnO)_{50}(SnO_2)_{25}$ (mol %) | $(ZrO_2)_{25}(ZnO)_{47.5}(SnO_2)_{25}(Al_2O_3)_{2.5}$ (mol %) |
| 2-422 | $(ZrO_2)_{25}(ZnO)_{50}(SnO_2)_{25}$ (mol %) | $(ZrO_2)_{23.5}(Y_2O_3)_{1.5}(ZnO)_{47.5}(SnO_2)_{25}(Ga_2O_3)_{2.5}$ (mol %) |
| Comparative Example 1-1 | $(ZrO_2)_{15}(SiO_2)_{15}(In_2O_3)_{70}$ (mol %) | $(ZrO_2)_{25}(SiO_2)_{25}(In_2O_3)_{50}$ (mol %) |

In disc Nos. 2-401 to 2-422, results of very good reproduction durability were obtained in all discs, as compared with Comparative Example 1-1, and the effect of improving the reproduction durability in the information recording medium according to the embodiment of the present invention could be confirmed.

Example 5

In the present example, another example of information recording medium 100 shown in the FIGURE is described.

The following is a method for producing information recording medium 100 of the present example.

First, a configuration of A-side information recording medium 101 is described.

As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A dielectric film of 13 to 19 nm according to the embodiment of the present invention as first dielectric film 21 using a target according to each composition described in Tables 13 and 15, a film of $W_{31}Cu_{18}Ta_{21}Zn_{11}Mn_{19}$—O of 35 nm as recording film 22 using a target substantially composed of $W_{31}Cu_{18}Ta_{21}Zn_{11}Mn_{19}$—O, and a film of $(ZrO_2)_{25}(SiO_2)_{25}(In_2O_3)_{50}$ (mol %) of 9 to 15 nm as second dielectric film 23 using a target substantially composed of $(ZrO_2)_{25}(SiO_2)_{25}(In_2O_3)_{50}$ (mol %) were sequentially formed by a sputtering.

Formation of first dielectric film 21 was performed in an Ar atmosphere (flow rate: 12 sccm), using a pulse DC power source (3 kW). Further, formation of recording film 22 was performed in an Ar and $O_2$ mixed-gas atmosphere (flow rate: 12+36 sccm), using a pulse DC power source (5 kW). Moreover, formation of second dielectric film 23 was performed in an Ar atmosphere (flow rate: 12 sccm), using a DC power source (2 kW).

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A film of $(ZrO_2)_{30}(SiO_2)_{30}(In_2O_3)_{40}$ (mol %) of 14 nm as first dielectric film 31 using a target substantially composed of $(ZrO_2)_{30}(SiO_2)_{30}(In_2O_3)_{40}$ (mol %), a film of $W_{32}Cu_{17}Ta_{22}Zn_{11}Mn_{18}$—O of 34 nm as recording film 32 using a target substantially composed of $W_{32}Cu_{17}Ta_{22}Zn_{11}Mn_{18}$—O, and a film of $(ZrO_2)_{25}(SiO_2)_{25}(In_2O_3)_{50}$ (mol %) of 12 nm as second dielectric film 33 using a target substantially composed of $(ZrO_2)_{25}(SiO_2)_{25}(In_2O_3)_{50}$ (mol %) were sequentially formed by a sputtering.

Formation of first dielectric film 31 was performed in an Ar atmosphere (flow rate: 12 sccm), using a pulse DC power source (3 kW). Further, formation of recording film 32 was performed in an Ar and $O_2$ mixed-gas atmosphere (flow rate: 12+36 sccm), using a pulse DC power source (5 kW). Moreover, formation of second dielectric film 33 was performed in an Ar atmosphere (flow rate: 12 sccm), using a DC power source (2 kW).

Thereafter, an ultraviolet-curable resin was applied onto second dielectric film 33, followed by spin coating, and was then cured with ultraviolet light, to form cover layer 4 having a thickness of about 57 μm, thereby preparing A-side information recording medium 101.

Next, a configuration of B-side information recording medium 102 is described.

As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A film of 13 to 19 nm as first dielectric film 21 using a target according to each composition described in Tables 12, 14, a film of $W_{31}Cu_{18}Ta_{21}Zn_{11}Mn_{19}$—O of 35 nm as recording film 22 using a target substantially composed of $W_{31}Cu_{18}Ta_{21}Zn_{11}Mn_{19}$—O, and a film of $(ZrO_2)_{25}(SiO_2)_{25}(In_2O_3)_{50}$ (mol %) of 9 to 15 nm as second dielectric film 23 using a target substantially composed of $(ZrO_2)_{25}(SiO_2)_{25}(In_2O_3)_{50}$ (mol %) were sequentially formed by a sputtering.

Formation of first dielectric film 21 was performed in an Ar atmosphere, using a pulse DC power source (3 kW). Further, formation of recording film 22 was performed in an Ar and $O_2$ mixed-gas atmosphere (flow rate: 12+36 sccm), using a pulse DC power source (5 kW). Moreover, formation of second dielectric film 23 was performed in an Ar atmosphere (flow rate: 12 sccm), using a DC power source (2 kW).

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A film of $(ZrO_2)_{30}(SiO_2)_{30}(In_2O_3)_{40}$ (mol %) of 14 nm as first dielectric film 31 using a target substantially composed of $(ZrO_2)_{30}(SiO_2)_{30}(In_2O_3)_{40}$ (mol %), a film of $W_{32}Cu_{17}Ta_{22}Zn_{11}Mn_{18}$—O of 34 nm as recording film 32 using a target substantially composed of $W_{32}Cu_{17}Ta_{22}Zn_{11}Mn_{18}$—O, and a film of $(ZrO_2)_{25}(SiO_2)_{25}(In_2O_3)_{50}$ (mol %) of 12 nm as second dielectric film 33 using a target substantially composed of $(ZrO_2)_{25}(SiO_2)_{25}(In_2O_3)_{50}$ (mol %) were sequentially formed by a sputtering.

Formation of first dielectric film 31 was performed in an Ar atmosphere (flow rate: 12 sccm), using a pulse DC power source (3 kW). Further, formation of recording film 32 was performed in an Ar and $O_2$ mixed-gas atmosphere (flow rate: 12+36 sccm), using a pulse DC power source (5 kW). Moreover, formation of second dielectric film 33 was performed in an Ar atmosphere (flow rate: 12 sccm), using a DC power source (2 kW).

Thereafter, an ultraviolet-curable resin was applied onto second dielectric film 33, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

As an example of the information recording medium 100 of the present example, information recording media 100 were prepared in which $Zr_{10}Zn_{20}Sn_{10}O_{60}$ (atom %), $Zr_{20}Zn_{20}O_{60}$ (atom %), $Zr_{16.7}Zn_{16.7}O_{66.6}$ (atom %), $Zr_{18.4}Y_{2.3}Zn_{19.5}O_{59.8}$ (atom %), $Zr_{9.3}Y_{1.2}Zn_{19.8}Sn_{9.9}O_{59.8}$ (atom %), $Zr_{9.5}Ca_{0.6}Zn_{20.1}Sn_{10.1}O_{59.7}$ (atom %), $Zr_{9.5}Mg_{0.6}Zn_{20.1}Sn_{10.1}O_{59.7}$ (atom %), $Zr_{9.7}Zn_{18.5}Sn_{9.7}Ga_{1.9}O_{60.2}$ (atom %), $Zr_{9.7}Zn_{18.5}Sn_{9.7}Al_{1.9}O_{60.2}$ (atom %), $Zr_{9.0}Y_{1.2}Zn_{18.2}Sn_{9.6}Ga_{1.9}O_{60.1}$ (atom %), $Zr_5Si_5Zn_{20}Sn_{10}O_{60}$ (containing $ZrO_2$ and $SiO_2$) (atom %), and $Zr_5Si_5Zn_{20}Sn_{10}O_{60}$ (containing $ZrSiO_4$) (atom %) were applied to first dielectric films 21 of L1 layer 20 of A-side information recording medium 101 and B-side information recording medium 102. Nos. of these discs are defined as 3-101 to 3-112, respectively. As a comparative example, a disc No. Comparative Example 2-1 was prepared in which $Zr_{3.4}Si_{3.4}In_{31.8}O_{61.4}$ (atom %) was applied to first dielectric films 21 of A-side information recording medium 101 and B-side information recording medium 102.

In these 3-101 to 3-112 and Comparative Example 2-1, reproduction durability at octuple speed was evaluated. The evaluation of the reproduction durability was performed using an evaluation apparatus (ODU-1000) manufactured by Pulstec Industrial Co., Ltd. The evaluation was performed by the same method as in Example 1 except that power for reproduction in L1 layer 20 was changed to 3.1 mW.

Table 13 shows the results in A-side information recording medium 101.

with Comparative Example 2-1, and the effect of improving the reproduction durability in the information recording medium according to the embodiment of the present invention could be confirmed.

Furthermore, as an example of the information recording medium 100 of the present example, information recording media 100 were prepared in which $Zr_{10}Zn_{20}Sn_{10}O_{60}$ (atom %), $Zr_{7.4}Zn_{23.5}Sn_{10.3}O_{58.8}$ (atom %), $Zr_{3.3}Sn_{30.0}O_{66.7}$ (atom %), $Zr_{2.3}Sn_{31.0}O_{66.7}$ (atom %), $Zr_{17.8}Zn_{6.7}Sn_{11.1}O_{64.4}$ (atom

TABLE 13

| Disc No. | A-side information recording medium 101 First dielectric film 21 | | A-side information recording medium 101 Thickness of First dielectric film 21/ Second dielectric film 23 | Reproduction durability (Δd-MLSE) |
|---|---|---|---|---|
| | Expression by atom % | Expression by mol % | | |
| 3-101 | $Zr_{10}Zn_{20}Sn_{10}O_{60}$ (atom %) | $(ZrO_2)_{25}(ZnO)_{50}(SnO_2)_{25}$ (mol %) | 17 nm/13 nm | A |
| 3-102 | $Zr_{20}Zn_{20}O_{60}$ (atom %) | $(ZrO2)_{50}(ZnO)_{50}$ (mol %) | 17 nm/13 nm | B |
| 3-103 | $Zr_{16.7}Zn_{16.7}O_{66.6}$ (atom %) | $(ZrO_2)_{50}(SnO_2)_{50}$ (mol %) | 17 nm/13 nm | B |
| 3-104 | $Zr_{18.4}Y_{2.3}Zn_{19.5}O_{59.8}$ (atom %) | $(ZrO_2)_{47}(Y_2O_3)_3(ZnO)_{50}$ (mol %) | 17 nm/13 nm | A |
| 3-105 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) | 17 nm/13 nm | A |
| 3-106 | $Zr_{9.5}Ca_{0.6}Zn_{20.1}Sn_{10.1}O_{59.7}$ (atom %) | $(ZrO_2)_{23.5}(CaO)_{1.5}(ZnO)_{50}(SnO_2)_{25}$ (mol %) | 17 nm/13 nm | B |
| 3-107 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | 17 nm/13 nm | B |
| 3-108 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) | 17 nm/13 nm | A |
| 3-109 | $Zr_{9.7}Zn_{18.5}Sn_{9.7}Al_{1.9}O_{60.2}$ (atom %) | $(ZrO_2)_{25}(ZnO)_{47.5}(SnO_2)_{25}(Al_2O_3)_{2.5}$ (mol %) | 15 nm/11 nm | B |
| 3-110 | $Zr_{9.0}Y_{1.2}Zn_{18.2}Sn_{9.6}Ga_{1.9}O_{60.1}$ (atom %) | $(ZrO_2)_{23.5}(Y_2O_3)_{1.5}(ZnO)_{47.5}(SnO_2)_{25}(Ga_2O_3)_{2.5}$ (mol %) | 17 nm/13 nm | A |
| 3-111 | $Zr_5Si_5Zn_{20}Sn_{10}O_{60}$ (atom %) | $(ZrO_2)_{12.5}(SiO_2)_{12.5}(ZnO)_{50}(SnO_2)_{25}$ (mol %) | 17 nm/13 nm | B |
| 3-112 | $Zr_5Si_5Zn_{20}Sn_{10}O_{60}$ (atom %) | $(ZrSiO_4)_{25}(ZnO)_{50}(SnO_2)_{25}$ (mol %) | 17 nm/13 nm | B |
| Comparative Example 2-1 | $Zr_{3.4}Si_{3.4}In_{31.8}O_{61.4}$ (atom %) | $(ZrO_2)_{15}(SiO_2)_{15}(In_2O_3)_{70}$ (mol %) | 17 nm/13 nm | D |

In disc Nos. 3-101 to 3-112, results of very good reproduction durability were obtained in all discs, as compared with Comparative Example 2-1, and the effect of improving the reproduction durability in the information recording medium according to the embodiment of the present invention could be confirmed.

Table 14 shows the results in B-side information recording medium 102.

%), $Zr_{25.9}Zn_{11.1}O_{63.0}$ (atom %), $Zr_{26.5}Zn_{10.3}O_{63.2}$ (atom %), $Zr_{9.3}Y_{1.2}Zn_{19.8}Sn_{9.9}O_{59.8}$ (atom %), $Zr_{6.7}Y_{1.2}Zn_{23.2}Sn_{10.2}O_{58.7}$ (atom %), $Zr_{12.7}Y_{1.1}Zn_{15.2}Sn_{9.5}O_{61.5}$ (atom %), $Zr_{17.5}Y_{1.1}Zn_{9.0}Sn_{9.0}O_{63.4}$ (atom %), $Zr_{9.7}Zn_{18.5}Sn_{9.7}Ga_{1.9}O_{60.2}$ (atom %), $Zr_{7.2}Zn_{21.8}Sn_{10.0}Ga_{2.0}O_{59.0}$ (atom %), $Zr_{13.1}Zn_{14.0}Sn_{9.4}Ga_{1.9}O_{61.6}$ (atom %), $Zr_{17.7}Zn_{8.0}Sn_{8.0}Ga_{1.8}O_{63.7}$ (atom %), $Zr_{9.4}Zn_{17.0}Sn_{9.4}Ga_{3.8}O_{60.4}$ (atom %), $Zr_{9.1}Zn_{15.3}Sn_{9.1}Ga_{5.8}O_{60.7}$ (atom %), and

TABLE 14

| Disc No. | B-side information recording medium 102 First dielectric film 21 | | B-side information recording medium 102 Thickness of First dielectric film 21/ Second dielectric film 23 | Reproduction durability (Δd-MLSE) |
|---|---|---|---|---|
| | Expression by atom % | Expression by mol % | | |
| 3-101 | $Zr_{10}Zn_{20}Sn_{10}O_{60}$ (atom %) | $(ZrO_2)_{25}(ZnO)_{50}(SnO_2)_{25}$ (mol %) | 17 nm/13 nm | A |
| 3-102 | $Zr_{20}Zn_{20}O_{60}$ (atom %) | $(ZrO_2)_{50}(ZnO)_{50}$ (mol %) | 17 nm/13 nm | B |
| 3-103 | $Zr_{16.7}Zn_{16.7}O_{66.6}$ (atom %) | $(ZrO_2)_{50}(SnO_2)_{50}$ (mol %) | 17 nm/13 nm | B |
| 3-104 | $Zr_{18.4}Y_{2.3}Zn_{19.5}O_{59.8}$ (atom %) | $(ZrO_2)_{47}(Y_2O_3)_3(ZnO)_{50}$ (mol %) | 17 nm/13 nm | A |
| 3-105 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) | 17 nm/13 nm | A |
| 3-106 | $Zr_{9.5}Ca_{0.6}Zn_{20.1}Sn_{10.1}O_{59.7}$ (atom %) | $(ZrO_2)_{23.5}(CaO)_{1.5}(ZnO)_{50}(SnO_2)_{25}$ (mol %) | 17 nm/13 nm | B |
| 3-107 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | 17 nm/13 nm | B |
| 3-108 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) | 17 nm/13 nm | A |
| 3-109 | $Zr_{9.7}Zn_{18.5}Sn_{9.7}Al_{1.9}O_{60.2}$ (atom %) | $(ZrO_2)_{25}(ZnO)_{47.5}(SnO_2)_{25}(Al_2O_3)_{2.5}$ (mol %) | 15 nm/11 nm | B |
| 3-110 | $Zr_{9.0}Y_{1.2}Zn_{18.2}Sn_{9.6}Ga_{1.9}O_{60.1}$ (atom %) | $(ZrO_2)_{23.5}(Y_2O_3)_{1.5}(ZnO)_{47.5}(SnO_2)_{25}(Ga_2O_3)_{2.5}$ (mol %) | 17 nm/13 nm | A |
| 3-111 | $Zr_5Si_5Zn_{20}Sn_{10}O_{60}$ (atom %) | $(ZrO_2)_{12.5}(SiO_2)_{12.5}(ZnO)_{50}(SnO_2)_{25}$ (mol %) | 17 nm/13 nm | B |
| 3-112 | $Zr_5Si_5Zn_{20}Sn_{10}O_{60}$ (atom %) | $(ZrSiO_4)_{25}(ZnO)_{50}(SnO_2)_{25}$ (mol %) | 17 nm/13 nm | B |
| Comparative Example 2-1 | $Zr_{3.4}Si_{3.4}In_{31.8}O_{61.4}$ (atom %) | $(ZrO_2)_{15}(SiO_2)_{15}(In_2O_3)_{70}$ (mol %) | 17 nm/13 nm | D |

In disc Nos. 3-101 to 3-112, results of very good reproduction durability were obtained in all discs, as compared $Zr_{8.9}Zn_{14.0}Sn_{8.9}Ga_{7.5}O_{60.7}$ (atom %) were applied to first dielectric films 21 of A-side information recording medium 101 and B-side information recording medium 102. Nos. of these discs are defined as 3-201 to 3-218, respectively. Disc Nos. 3-204 and 3-207 are Comparative Examples.

In these 3-201 to 3-218, reproduction durability at octuple speed was evaluated. The evaluation method is the same as the method described before.

Furthermore, d-MLSE was evaluated in the 500 GB density octuple speed recording in 3-201 to 3-218. In the evaluation of d-MLSE, a value of 14.0% or less was defined as A (very good), a value of more than 14.0% and 14.5% or less as B (good), and a value of more than 14.5% and 15.0% or less as C (practical level), and a value more than 15% as D (impractical).

Further, the film-forming rate of the dielectric materials applied to first dielectric films 21 of 3-201 to 3-218 was evaluated. The film-forming rate was calculated by forming a first dielectric film 21 on a glass substrate and measuring the film thickness with a step profiler. A case where a film-forming rate that might enable the formation of first dielectric film 21 within the time for producing one disc, which is predetermined in the production of the information recording medium 100, was achieved was defined as A, and a case where the film-forming rate is insufficient was defined as D (impractical).

Overall, in the evaluation of reproduction durability, d-MLSE, and film-forming rate, those containing D were judged as D (impractical), those containing C without D were as C (practical level), those having two or more Bs without C or D were as B (good), and those having two or more As without C or D were as A (very good).

Table 15 shows the results in A-side information recording medium 101.

TABLE 15

| | A-side information recording medium 101 First dielectric film 21 | |
|---|---|---|
| Disc No. | Expression by atom % | Expression by mol % |
| 3-201 | $Zr_{10}Zn_{20}Sn_{10}O_{60}$ (atom %) | $(ZrO_2)_{25}(ZnO)_{50}(SnO_2)_{25}$ (mol %) |
| 3-202 | $Zr_{7.4}Zn_{23.5}Sn_{10.3}O_{58.8}$ (atom %) | $(ZrO_2)_{18}(ZnO)_{57}(SnO_2)_{25}$ (mol %) |
| 3-203 | $Zr_{3.3}Sn_{30.0}O_{66.7}$ (atom %) | $(ZrO_2)_{10}(SnO_2)_{90}$ (mol %) |
| 3-204 (Comparative Example) | $Zr_{2.3}Sn_{31.0}O_{66.7}$ (atom %) | $((ZrO_2)_7(SnO_2)_{93}$ (mol %) |
| 3-205 | $Zn_{7.8}Zn_{6.7}Sn_{11.1}O_{64.4}$ (atom %) | $(ZrO_2)_{40}(ZnO)_{15}(SnO_2)_{25}$ (mol %) |
| 3-206 | $Zr_{25.9}Zn_{11.1}O_{63.0}$ (atom %) | $(ZrO_2)_{70}(ZnO)_{30}$ (mol %) |
| 3-207 (Comparative Example) | $Zr_{26.5}Zn_{10.3}O_{63.2}$ (atom %) | $(ZrO_2)_{72}(ZnO)_{28}$ (mol %) |
| 3-208 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) |
| 3-209 | $Zr_{6.7}Y_{1.2}Zn_{23.2}Sn_{10.2}O_{58.7}$ (atom %) | $(ZrO_2)_{16.5}(Y_2O_3)_{1.5}(ZnO)_{57}(SnO_2)_{25}$ (mol %) |
| 3-210 | $Zr_{12.7}Y_{1.1}Zn_{15.2}Sn_{9.5}O_{61.5}$ (atom %) | $(ZrO_2)_{33.5}(Y_2O_3)_{1.5}(ZnO)_{40}(SnO_2)_{25}$ (mol %) |
| 3-211 | $Zr_{17.5}Y_{1.1}Zn_{9.0}Sn_{9.0}O_{63.4}$ (atom %) | $(ZrO_2)_{48.5}(Y_2O_3)_{1.5}(ZnO)_{25}(SnO_2)_{25}$ (mol %) |
| 3-212 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) |
| 3-213 | $Zr_{7.2}Zn_{21.8}Sn_{10.0}Ga_{2.0}O_{59.0}$ (atom %) | $(ZrO_2)_{18}(ZnO)_{54.5}(SnO_2)_{25}(Ga_2O_3)_{2.5}$ (mol %) |
| 3-214 | $Zr_{13.1}Zn_{14.0}Sn_{9.4}Ga_{1.9}O_{61.6}$ (atom %), | $(ZrO_2)_{35}(ZnO)_{37.5}(SnO_2)_{25}(Ga_2O_3)_{2.5}$ (mol %) |
| 3-215 | $Zr_{17.7}Zn_{8.0}Sn_{8.9}Ga_{1.8}O_{63.7}$ (atom %) | $(ZrO_2)_{50}(ZnO)_{22.5}(SnO_2)_{25}(Ga_2O_3)_{2.5}$ (mol %) |
| 3-216 | $Zr_{9.4}Zn_{17.0}Sn_{9.4}Ga_{3.8}O_{60.4}$ (atom %) | $(ZrO_2)_{25}(ZnO)_{45}(SnO_2)_{25}(Ga_2O_3)_5$ (mol %) |
| 3-217 | $Zr_{9.1}Zn_{15.3}Sn_{9.1}Ga_{5.8}O_{60.7}$ (atom %) | $(ZrO_2)_{25}(ZnO)_{42}(SnO_2)_{25}(Ga_2O_3)_8$ (mol %) |
| 3-218 | $Zr_{8.9}Zn_{14.0}Sn_{8.9}Ga_{7.5}O_{60.7}$ (atom %) | $(ZrO_2)_{25}(ZnO)_{39.5}(SnO_2)_{25}(Ga_2O_3)_{10.5}$ (mol %) |

| Disc No. | A-side information recording medium 101 Thickness of First dielectric film 21/ Second dielectric film 23 | Reproduction durability (Δd-MLSE) | d-MLSE | Film-forming rate | Judgment |
|---|---|---|---|---|---|
| 3-201 | 17 nm/13 nm | A | A | A | A |
| 3-202 | 17 nm/13 nm | B | B | A | B |
| 3-203 | 19 nm/15 nm | B | C | A | C |
| 3-204 (Comparative Example) | 19 nm/15 nm | B | D | A | D |
| 3-205 | 17 nm/13 nm | A | A | A | A |
| 3-206 | 15 nm/11 nm | B | C | A | C |
| 3-207 (Comparative Example) | 15 nm/11 nm | B | C | D | D |
| 3-208 | 17 nm/13 nm | A | A | A | A |
| 3-209 | 17 nm/13 nm | B | B | A | B |
| 3-210 | 17 nm/13 nm | A | A | A | A |
| 3-211 | 17 nm/13 nm | A | A | A | A |
| 3-212 | 17 nm/13 nm | A | A | A | A |
| 3-213 | 15 nm/11 nm | B | B | A | B |
| 3-214 | 17 nm/13 nm | A | A | A | A |
| 3-215 | 17 nm/13 nm | B | B | A | B |
| 3-216 | 17 nm/13 nm | B | B | A | B |
| 3-217 | 13 nm/9 nm | B | B | A | B |
| 3-218 | 13 nm/9 nm | B | C | A | C |

In disc No. 3-204, it is observed that less than 3 atom % of the amount of Zr deteriorates d-MLSE to make the disc impractical. Thus, the amount of Zr needs to be 3 atom % or more. Further, in 3-207, it is observed that more than 26 atom % of the amount of Zr decreases the film-forming rate to make the disc impractical. Thus, the amount of Zr needs to be 26 atom % or less.

Moreover, in 3-218, it is observed that more than 7 atom % of the amount of Ga deteriorates d-MLSE and this makes the disc impractical. Thus, the amount of Ga is preferably 7 atom % or less.

Table 16 shows the results in B-side information recording medium 102.

TABLE 16

B-side information recording medium 102
First dielectric film 21

| Disc No. | Expression by atom % | Expression by mol % |
|---|---|---|
| 3-201 | $Zr_{10}Zn_{20}Sn_{10}O_{60}$ (atom %) | $(ZrO_2)_{25}(ZnO)_{50}(SnO_2)_{25}$ (mol %) |
| 3-202 | $Zr_{7.4}Zn_{23.5}Sn_{10.3}O_{58.8}$ (atom %) | $(ZrO_2)_{18}(ZnO)_{57}(SnO_2)_{25}$ (mol %) |
| 3-203 | $Zr_{3.3}Sn_{30.0}O_{66.7}$ (atom %) | $(ZrO_2)_{10}(SnO_2)_{90}$ (mol %) |
| 3-204 (Comparative Example) | $Zr_{2.3}Sn_{31.0}O_{66.7}$ (atom %) | $(ZrO_2)_7(SnO_2)_{93}$ (mol %) |
| 3-205 | $Zr_{17.8}Zn_{6.7}Sn_{11.1}O_{64.4}$ (atom %) | $(ZrO_2)_{40}(ZnO)_{15}(SnO_2)_{25}$ (mol %) |
| 3-206 | $Zr_{25.9}Zn_{11.1}O_{63.0}$ (atom %) | $(ZrO_2)_{70}(ZnO)_{30}$ (mol %) |
| 3-207 (Comparative Example) | $Zr_{26.5}Zn_{10.3}O_{63.2}$ (atom %) | $(ZrO_2)_{72}(ZnO)_{28}$ (mol %) |
| 3-208 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) |
| 3-209 | $Zr_{6.7}Y_{1.2}Zn_{23.2}Sn_{10.2}O_{58.7}$ (atom %) | $(ZrO_2)_{16.5}(Y_2O_3)_{1.5}(ZnO)_{57}(SnO_2)_{25}$ (mol %) |
| 3-210 | $Zr_{12.7}Y_{1.1}Zn_{15.2}Sn_{9.5}O_{61.5}$ (atom %) | $(ZrO_2)_{33.5}(Y_2O_3)_{1.5}(ZnO)_{40}(SnO_2)_{25}$ (mol %) |
| 3-211 | $Zr_{17.5}Y_{1.1}Zn_{9.0}Sn_{9.0}O_{63.4}$ (atom %) | $(ZrO_2)_{48.5}(Y_2O_3)_{1.5}(ZnO)_{25}(SnO_2)_{25}$ (mol %) |
| 3-212 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) |
| 3-213 | $Zr_{7.2}Zn_{21.8}Sn_{10.0}Ga_{2.0}O_{59.0}$ (atom %) | $(ZrO_2)_{18}(ZnO)_{54.5}(SnO_2)_{25}(Ga_2O_3)_{2.5}$ (mol %) |
| 3-214 | $Zr_{13.1}Zn_{14.0}Sn_{9.4}Ga_{1.9}O_{61.6}$ (atom %) | $(ZrO_2)_{35}(ZnO)_{37.5}(SnO_2)_{25}(Ga_2O_3)_{2.5}$ (mol %) |
| 3-215 | $Zr_{17.7}Zn_{8.0}Sn_{8.9}Ga_{1.8}O_{63.7}$ (atom %) | $(ZrO_2)_{50}(ZnO)_{22.5}(SnO_2)_{25}(Ga_2O_3)_{2.5}$ (mol %) |
| 3-216 | $Zr_{9.4}Zn_{17.0}Sn_{9.4}Ga_{3.8}O_{60.4}$ (atom %) | $(ZrO_2)_{25}(ZnO)_{45}(SnO_2)_{25}(Ga_2O_3)_5$ (mol %) |
| 3-217 | $Zr_{9.1}Zn_{15.3}Sn_{9.1}Ga_{5.8}O_{60.7}$ (atom %) | $(ZrO_2)_{25}(ZnO)_{42}(SnO_2)_{25}(Ga_2O_3)_8$ (mol %) |
| 3-218 | $Zr_{8.9}Zn_{14.0}Sn_{8.9}Ga_{7.5}O_{60.7}$ (atom %) | $(ZrO_2)_{25}(ZnO)_{39.5}(SnO_2)_{25}(Ga_2O_3)_{10.5}$ (mol %) |

| Disc No. | B-side information recording medium 102 Thickness of First dielectric film 21/ Second dielectric film 23 | Reproduction durability (Δd-MLSE) | d-MLSE | Film-forming rate | Judgment |
|---|---|---|---|---|---|
| 3-201 | 17 nm/13 nm | A | A | A | A |
| 3-202 | 17 nm/13 nm | B | B | A | B |
| 3-203 | 19 nm/15 nm | B | C | A | C |
| 3-204 (Comparative Example) | 19 nm/15 nm | B | D | A | D |
| 3-205 | 17 nm/13 nm | A | A | A | A |
| 3-206 | 15 nm/11 nm | B | C | A | C |
| 3-207 (Comparative Example) | 15 nm/11 nm | B | C | D | D |
| 3-208 | 17 nm/13 nm | A | A | A | A |
| 3-209 | 17 nm/13 nm | B | B | A | B |
| 3-210 | 17 nm/13 nm | A | A | A | A |
| 3-211 | 17 nm/13 nm | A | A | A | A |
| 3-212 | 17 nm/13 nm | A | A | A | A |
| 3-213 | 15 nm/11 nm | B | B | A | B |
| 3-214 | 17 nm/13 nm | A | A | A | A |
| 3-215 | 17 nm/13 nm | B | B | A | B |
| 3-216 | 17 nm/13 nm | B | B | A | B |
| 3-217 | 13 nm/9 nm | B | B | A | B |
| 3-218 | 13 nm/9 nm | B | C | A | C |

The same results as those in A-side information recording medium 101 were obtained in B-side information recording medium 102.

Example 6

In the present example, another example of information recording medium 100 shown in the FIGURE is described. The following is a method for producing information recording medium 100 of the present example.

First, a configuration of A-side information recording medium 101 is described.

As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A dielectric film of 13 to 19 nm according to the embodiment of the present invention as first dielectric film 21 using a target according to each composition described in Tables 17 and 18, a film of $W_{31}Cu_{17}Ta_{22}Zn_{11}Mn_{19}$—O of 35 nm as recording film 22 using a target substantially composed of $W_{31}Cu_{17}Ta_{22}Zn_{11}Mn_{19}$—O, and a dielectric film of 11 to 15 nm according to the embodiment of the present invention as second dielectric film 23 using a target according to each composition described in Tables 17 and 18 were sequentially formed by a sputtering.

Formation of first dielectric film 21 was performed in an Ar atmosphere (flow rate: 12 sccm), using a pulse DC power source (3 kW). Further, formation of recording film 22 was performed in an Ar and $O_2$ mixed-gas atmosphere (flow rate: 12+36 sccm), using a pulse DC power source (5 kW). Moreover, formation of second dielectric film 23 was performed in an Ar atmosphere (flow rate: 12 sccm), using a pulse DC power source (2 kW).

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. The configuration and production method of L2 layer 30 are the same as in Example 4.

Thereafter, an ultraviolet-curable resin was applied onto second dielectric film 33, followed by spin coating, and was then cured with ultraviolet light, to form cover layer 4 having a thickness of about 57 thereby preparing A-side information recording medium 101.

Next, a configuration of B-side information recording medium 102 is described.

As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A dielectric film of 13 to 19 nm according to the embodiment of the present invention as first dielectric film 21 using a target according to each composition described in Tables 19 and 20, a film of $W_{31}Cu_{17}Ta_{22}Zn_{11}Mn_{19}$—O of 35 nm as recording film 22 using a target substantially composed of $W_{31}Cu_{17}Ta_{22}Zn_{11}Mn_{19}$—O, and a dielectric film of 11 to 15 nm according to the embodiment of the present invention as second dielectric film 23 using a target according to each composition described in Tables 19 and 20 were sequentially formed by a sputtering.

Formation of first dielectric film 21 was performed in an Ar atmosphere (flow rate: 12 sccm), using a pulse DC power source (3 kW). Further, formation of recording film 22 was performed in an Ar and $O_2$ mixed-gas atmosphere (flow rate: 12+36 sccm), using a pulse DC power source (5 kW). Moreover, formation of second dielectric film 23 was performed in an Ar atmosphere (flow rate: 12 sccm), using a pulse DC power source (2 kW).

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. The configuration and production method of L2 layer 30 are the same as in Example 5.

Thereafter, an ultraviolet-curable resin was applied onto second dielectric film 33, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 100 were prepared in which, in the order of (first dielectric film 21, second dielectric film 23), $(Zr_{10}Zn_{20}Sn_{10}O_{60}$ (atom %), $Zr_{10}Zn_{20}Sn_{10}O_{60}$ (atom %)), $(Zr_{9.3}Y_{1.2}Zn_{19.8}Sn_{9.9}O_{59.8}$ (atom %), $Zr_{9.3}Y_{1.2}Zn_{19.8}Sn_{9.9}O_{59.8}$ (atom %)), $(Zr_{9.7}Zn_{18.5}Zn_{9.7}Ga_{1.9}O_{60.2}$ (atom %), $Zr_{9.7}Zn_{18.5}Sn_{9.7}Ga_{1.9}O_{60.2}$ (atom %)), $(Zr_{9.0}Y_{1.2}Zn_{18.2}Zn_{9.6}Ga_{1.9}O_{60.1}$ (atom %), $Zr_{9.0}Y_{1.2}Zn_{18.2}Sn_{9.6}Ga_{1.9}O_{60.1}$ (atom %)), $(Zr_{20}Zn_{20}O_{60}$ (atom %), $Zr_{10}Zn_{20}Sn_{10}O_{60}$ (atom %)), $(Zr_{16.7}Zn_{16.7}O_{66.6}$ (atom %), $Zr_{10}Zn_{20}Sn_{10}O_{60}$ (atom %)), $(Zr_{18.4}Y_{2.3}Zn_{19.5}O_{59.8}$ (atom %), $Zr_{10}Zn_{20}Sn_{10}O_{60}$ (atom %)), $(Zr_{9.3}Y_{1.2}Zn_{19.8}Zn_{9.9}O_{59.8}$ (atom %), $Zr_{10}Zn_{20}Sn_{10}O_{60}$ (atom %)), $(Zr_{9.5}Ca_{0.6}Zn_{20.1}Sn_{10.1}O_{59.7}$ (atom %), $Zr_{10}Zn_{20}Sn_{10}O_{60}$ (atom %)), $(Zr_{9.5}Mg_{0.6}Zn_{20.1}Sn_{10.1}O_{59.7}$ (atom %), $Zr_{10}Zn_{20}Sn_{10}O_{60}$ (atom %)), $(Zr_{9.7}Zn_{18.5}Sn_{9.7}Ga_{1.9}O_{60.2}$ (atom %), $Zr_{10}Zn_{20}Sn_{10}O_{60}$ (atom %)), $(Zr_{9.7}Zn_{18.5}Sn_{9.7}Al_{1.9}O_{60.2}$ (atom %), $Zr_{10}Zn_{20}Sn_{10}O_{60}$ (atom %)), $(Zr_{9.0}Y_{1.2}Zn_{18.2}Zn_{9.6}Ga_{1.9}O_{60.1}$ (atom %), $Zr_{10}Zn_{20}Sn_{10}O_{60}$ (atom %)), $(Zr_{10}Zn_{20}Sn_{10}O_{60}$ (atom %), $Zr_{20}Zn_{20}O_{60}$ (atom %)), $(Zr_{10}Zn_{20}Sn_{10}O_{60}$ (atom %), $Zr_{16.7}Zn_{16.7}O_{66.6}$ (atom %)), $(Zr_{10}Zn_{20}Sn_{10}O_{60}$ (atom %), $Zr_{18.4}Y_{2.3}Zn_{19.5}O_{59.8}$ (atom %)), $(Zr_{10}Zn_{20}Sn_{10}O_{60}$ (atom %), $Zr_{9.3}Y_{1.2}Zn_{19.8}Sn_{9.9}O_{59.8}$ (atom %)), $(Zr_{10}Zn_{20}Sn_{10}O_{60}$ (atom %), $Zr_{9.5}Ca_{0.6}Zn_{20.1}$ $Sn_{10.1}O_{59.7}$ (atom %)), $(Zr_{10}Zn_{20}Sn_{10}O_{60}$ (atom %), $Zr_{9.5}Mg_{0.6}Zn_{20.1}Sn_{10.1}O_{59.7}$ (atom %)), $(Zr_{10}Zn_{20}Sn_{10}O_{60}$ (atom %), $Zr_{9.7}Zn_{18.5}Sn_{9.7}Ga_{1.9}O_{60.2}$ (atom %)), $(Zr_{10}Zn_{20}Sn_{10}O_{60}$ (atom %), $Zr_{9.7}Zn_{18.5}Zn_{9.7}Al_{1.9}O_{60.2}$ (atom %)), and $(Zr_{10}Zn_{20}Sn_{10}O_{60}$ (atom %), $Zr_{9.0}Y_{1.2}Zn_{18.2}Sn_{9.6}Ga_{1.9}O_{60.1}$ (atom %)) were applied to first dielectric films 21 and second dielectric films 23 of A-side information recording medium 101 and B-side information recording medium 102. Nos. of these discs are defined as 3-301 to 3-322, respectively.

In these 3-301 to 3-322 and Comparative Example 2-1 shown in Example 5, evaluation of reproduction durability was performed as described in Example 5.

Tables 17 and 18 show the results in A-side information recording medium 101.

TABLE 17

| Disc No. | A-side information recording medium 101 First dielectric film 21 Expression by atom % | A-side information recording medium 101 Second dielectric film 23 | A-side information recording medium 101 Thickness of First dielectric film 21/ Second dielectric film 23 | Reproduction durability ($\Delta$d-MLSE) |
|---|---|---|---|---|
| 3-301 | $Zr_{10}Zn_{20}Sn_{10}O_{60}$ (atom %) | $Zr_{10}Zn_{20}Sn_{10}O_{60}$ (atom %) | 17 nm/13 nm | A |
| 3-302 | $Zr_{9.3}Y_{1.2}Zn_{19.8}Sn_{9.9}O_{59.8}$ (atom %) | $Zr_{9.3}Y_{1.2}Zn_{19.8}Sn_{9.9}O_{59.8}$ (atom %) | 17 nm/13 nm | A |
| 3-303 | $Zr_{9.7}Zn_{18.5}Sn_{9.7}Ga_{1.9}O_{60.2}$ (atom %) | $Zr_{9.7}Zn_{18.5}Sn_{9.7}Ga_{1.9}O_{60.2}$ (atom %) | 17 nm/13 nm | A |
| 3-304 | $Zr_{9.0}Y_{1.2}Zn_{18.2}Sn_{9.6}Ga_{1.9}O_{60.1}$ (atom %) | $Zr_{9.0}Y_{1.2}Zn_{18.2}Sn_{9.6}Ga_{1.9}O_{60.1}$ (atom %) | 17 nm/13 nm | A |
| 3-305 | $Zr_{20}Zn_{20}O_{60}$ (atom %) | $Zr_{10}Zn_{20}Sn_{10}O_{60}$ (atom %) | 15 nm/11 nm | B |
| 3-306 | $Zr_{16.7}Zn_{16.7}O_{66.6}$ (atom %) | $Zr_{10}Zn_{20}Sn_{10}O_{60}$ (atom %) | 19 nm/15 nm | B |
| 3-307 | $Zr_{18.4}Y_{2.3}Zn_{19.5}O_{59.8}$ (atom %) | $Zr_{10}Zn_{20}Sn_{10}O_{60}$ (atom %) | 15 nm/11 nm | B |
| 3-308 | $Zr_{9.3}Y_{1.2}Zn_{19.8}Sn_{9.9}O_{59.8}$ (atom %) | $Zr_{10}Zn_{20}Sn_{10}O_{60}$ (atom %) | 17 nm/13 nm | A |
| 3-309 | $Zr_{9.5}Ca_{0.6}Zn_{20.1}Sn_{10.1}O_{59.7}$ (atom %) | $Zr_{10}Zn_{20}Sn_{10}O_{60}$ (atom %) | 17 nm/13 nm | B |
| 3-310 | $Zr_{9.5}Mg_{0.6}Zn_{20.1}Sn_{10.1}O_{59.7}$ (atom %) | $Zr_{10}Zn_{20}Sn_{10}O_{60}$ (atom %) | 17 nm/13 nm | B |
| 3-311 | $Zr_{9.7}Zn_{18.5}Sn_{9.7}Ga_{1.9}O_{60.2}$ (atom %) | $Zr_{10}Zn_{20}Sn_{10}O_{60}$ (atom %) | 17 nm/13 nm | A |
| 3-312 | $Zr_{9.7}Zn_{18.5}Sn_{9.7}Al_{1.9}O_{60.2}$ (atom %) | $Zr_{10}Zn_{20}Sn_{10}O_{60}$ (atom %) | 15 nm/11 nm | B |
| 3-313 | $Zr_{9.0}Y_{1.2}Zn_{18.2}Sn_{9.6}Ga_{1.9}O_{60.1}$ (atom %) | $Zr_{10}Zn_{20}Sn_{10}O_{60}$ (atom %) | 17 nm/13 nm | A |
| 3-314 | $Zr_{10}Zn_{20}Sn_{10}O_{60}$ (atom %) | $Zr_{20}Zn_{20}O_{60}$ (atom %) | 13 nm/11 nm | B |
| 3-315 | $Zr_{10}Zn_{20}Sn_{10}O_{60}$ (atom %) | $Zr_{16.7}Zn_{16.7}O_{66.6}$ (atom %) | 19 nm/15 nm | B |
| 3-316 | $Zr_{10}Zn_{20}Sn_{10}O_{60}$ (atom %) | $Zr_{18.4}Y_{2.3}Zn_{19.5}O_{59.8}$ (atom %) | 13 nm/11 nm | B |
| 3-317 | $Zr_{10}Zn_{20}Sn_{10}O_{60}$ (atom %) | $Zr_{9.3}Y_{1.2}Zn_{19.8}Sn_{9.9}O_{59.8}$ (atom %) | 17 nm/13 nm | A |
| 3-318 | $Zr_{10}Zn_{20}Sn_{10}O_{60}$ (atom %) | $Zr_{9.5}Ca_{0.6}Zn_{20.1}Sn_{10.1}O_{59.7}$ (atom %) | 17 nm/13 nm | B |
| 3-319 | $Zr_{10}Zn_{20}Sn_{10}O_{60}$ (atom %) | $Zr_{9.5}Mg_{0.6}Zn_{20.1}Sn_{10.1}O_{59.7}$ (atom %) | 17 nm/13 nm | B |
| 3-320 | $Zr_{10}Zn_{20}Sn_{10}O_{60}$ (atom %) | $Zr_{9.7}Zn_{18.5}Sn_{9.7}Ga_{1.9}O_{60.2}$ (atom %) | 17 nm/13 nm | A |
| 3-321 | $Zr_{10}Zn_{20}Sn_{10}O_{60}$ (atom %) | $Zr_{9.7}Zn_{18.5}Sn_{9.7}Al_{1.9}O_{60.2}$ (atom %) | 15 nm/11 nm | B |
| 3-322 | $Zr_{10}Zn_{20}Sn_{10}O_{60}$ (atom %) | $Zr_{9.0}Y_{1.2}Zn_{18.2}Sn_{9.6}Ga_{1.9}O_{60.1}$ (atom %) | 17 nm/13 nm | A |
| Comparative Example 2-1 | $Zr_{3.4}Si_{3.4}In_{31.8}O_{61.4}$ (atom %) | $Zr_{6.3}Si_{6.3}In_{25.0}O_{62.4}$ (atom %) | 17 nm/13 nm | D |

TABLE 18

| Disc No. | A-side information recording medium 101 First dielectric film 21 Expression by mol % | A-side information recording medium 101 Second dielectric film 23 |
|---|---|---|
| 3-301 | $(ZrO_2)_{25}(ZnO)_{50}(SnO_2)_{25}$ (mol %) | $(ZrO_2)_{25}(ZnO)_{50}(SnO_2)_{25}$ (mol %) |
| 3-302 | $(ZrO_2)_{23.5}(Y_2O_3)_{1.5}(ZnO)_{50}(SnO_2)_{25}$ (mol %) | $(ZrO_2)_{23.5}(Y_2O_3)_{1.5}(ZnO)_{50}(SnO_2)_{25}$ (mol %) |
| 3-303 | $(ZrO_2)_{25}(ZnO)_{47.5}(SnO_2)_{25}(Ga_2O_3)_{2.5}$ (mol %) | $(ZrO_2)_{25}(ZnO)_{47.5}(SnO_2)_{25}(Ga_2O_3)_{2.5}$ (mol %) |
| 3-304 | $(ZrO_2)_{23.5}(Y_2O_3)_{1.5}(ZnO)_{47.5}(SnO_2)_{25}(Ga_2O_3)_{2.5}$ (mol %) | $(ZrO_2)_{23.5}(Y_2O_3)_{1.5}(ZnO)_{47.5}(SnO_2)_{25}(Ga_2O_3)_{2.5}$ (mol %) |
| 3-305 | $(ZrO_2)_{50}(ZnO)_{50}$ (mol %) | $(ZrO_2)_{25}(ZnO)_{50}(SnO_2)_{25}$ (mol %) |
| 3-306 | $(ZrO_2)_{50}(SnO_2)_{50}$ (mol %) | $(ZrO_2)_{25}(ZnO)_{50}(SnO_2)_{25}$ (mol %) |
| 3-307 | $(ZrO_2)_{47}(Y_2O_3)_3(ZnO)_{50}$ (mol %) | $(ZrO_2)_{25}(ZnO)_{50}(SnO_2)_{25}$ (mol %) |
| 3-308 | $(ZrO_2)_{23.5}(Y_2O_3)_{1.5}(ZnO)_{50}(SnO_2)_{25}$ (mol %) | $(ZrO_2)_{25}(ZnO)_{50}(SnO_2)_{25}$ (mol %) |
| 3-309 | $(ZrO_2)_{23.5}(CaO)_{1.5}(ZnO)_{50}(SnO_2)_{25}$ (mol %) | $(ZrO_2)_{25}(ZnO)_{50}(SnO_2)_{25}$ (mol %) |
| 3-310 | $(ZrO_2)_{23.5}(MgO)_{1.5}(ZnO)_{50}(SnO_2)_{25}$ (mol %) | $(ZrO_2)_{25}(ZnO)_{50}(SnO_2)_{25}$ (mol %) |
| 3-311 | $(ZrO_2)_{25}(ZnO)_{47.5}(SnO_2)_{25}(Ga_2O_3)_{2.5}$ (mol %) | $(ZrO_2)_{25}(ZnO)_{50}(SnO_2)_{25}$ (mol %) |
| 3-312 | $(ZrO_2)_{25}(ZnO)_{47.5}(SnO_2)_{25}(Al_2O_3)_{2.5}$ (mol %) | $(ZrO_2)_{25}(ZnO)_{50}(SnO_2)_{25}$ (mol %) |
| 3-313 | $(ZrO_2)_{23.5}(Y_2O_3)_{1.5}(ZnO)_{47.5}(SnO_2)_{25}(Ga_2O_3)_{2.5}$ (mol %) | $(ZrO_2)_{25}(ZnO)_{50}(SnO_2)_{25}$ (mol %) |
| 3-314 | $(ZrO_2)_{25}(ZnO)_{50}(SnO_2)_{25}$ (mol %) | $(ZrO_2)_{50}(ZnO)_{50}$ (mol %) |
| 3-315 | $(ZrO_2)_{25}(ZnO)_{50}(SnO_2)_{25}$ (mol %) | $(ZrO_2)_{50}(SnO_2)_{50}$ (mol %) |
| 3-316 | $(ZrO_2)_{25}(ZnO)_{50}(SnO_2)_{25}$ (mol %) | $(ZrO_2)_{47}(Y_2O_3)_3(ZnO)_{50}$ (mol %) |
| 3-317 | $(ZrO_2)_{25}(ZnO)_{50}(SnO_2)_{25}$ (mol %) | $(ZrO_2)_{23.5}(Y_2O_3)_{1.5}(ZnO)_{50}(SnO_2)_{25}$ (mol %) |
| 3-318 | $(ZrO_2)_{25}(ZnO)_{50}(SnO_2)_{25}$ (mol %) | $(ZrO_2)_{23.5}(CaO)_{1.5}(ZnO)_{50}(SnO_2)_{25}$ (mol %) |
| 3-319 | $(ZrO_2)_{25}(ZnO)_{50}(SnO_2)_{25}$ (mol %) | $(ZrO_2)_{23.5}(MgO)_{1.5}(ZnO)_{50}(SnO_2)_{25}$ (mol %) |
| 3-320 | $(ZrO_2)_{25}(ZnO)_{50}(SnO_2)_{25}$ (mol %) | $(ZrO_2)_{25}(ZnO)_{47.5}(SnO_2)_{25}(Ga_2O_3)_{2.5}$ (mol %) |
| 3-321 | $(ZrO_2)_{25}(ZnO)_{50}(SnO_2)_{25}$ (mol %) | $(ZrO_2)_{25}(ZnO)_{47.5}(SnO_2)_{25}(Al_2O_3)_{2.5}$ (mol %) |
| 3-322 | $(ZrO_2)_{25}(ZnO)_{50}(SnO_2)_{25}$ (mol %) | $(ZrO_2)_{23.5}(Y_2O_3)_{1.5}(ZnO)_{47.5}(SnO_2)_{25}(Ga_2O_3)_{2.5}$ (mol %) |
| Comparative Example 2-1 | $(ZrO_2)_{15}(SiO_2)_{15}(In_2O_3)_{70}$ (mol %) | $(ZrO_2)_{25}(SiO_2)_{25}(In_2O_3)_{50}$ (mol %) |

In disc Nos. 3-301 to 3-322, results of very good reproduction durability were obtained in all discs, as compared with Comparative Example 2-1, and the effect of improving the reproduction durability in the information recording medium according to the embodiment of the present invention could be confirmed.

Tables 19 and 20 show the results in B-side information recording medium 102.

TABLE 19

| Disc No. | B-side information recording medium 102 First dielectric film 21 | B-side information recording medium 102 Second dielectric film 23 | B-side information recording medium 102 Thickness of First dielectric film 21/ Second dielectric film 23 | Reproduction durability (Δd-MLSE) |
|---|---|---|---|---|
| | Expression by atom % | | | |
| 3-301 | $Zr_{10}Zn_{20}Sn_{10}O_{60}$ (atom %) | $Zr_{10}Zn_{20}Sn_{10}O_{60}$ (atom %) | 17 nm/13 nm | A |
| 3-302 | $Zr_{9.3}Y_{1.2}Zn_{19.8}Sn_{9.9}O_{59.8}$ (atom %) | $Zr_{9.3}Y_{1.2}Zn_{19.8}Sn_{9.9}O_{59.8}$ (atom %) | 17 nm/13 nm | A |
| 3-303 | $Zr_{9.7}Zn_{18.5}Sn_{9.7}Ga_{1.9}O_{60.2}$ (atom %) | $Zr_{9.7}Zn_{18.5}Sn_{9.7}Ga_{1.9}O_{60.2}$ (atom %) | 17 nm/13 nm | A |
| 3-304 | $Zr_{9.0}Y_{1.2}Zn_{18.2}Sn_{9.6}Ga_{1.9}O_{60.1}$ (atom %) | $Zr_{9.0}Y_{1.2}Zn_{18.2}Sn_{9.6}Ga_{1.9}O_{60.1}$ (atom %) | 17 nm/13 nm | A |
| 3-305 | $Zr_{20}Zn_{20}O_{60}$ (atom %) | $Zr_{10}Zn_{20}Sn_{10}O_{60}$ (atom %) | 15 nm/11 nm | B |
| 3-306 | $Zr_{16.7}Zn_{16.7}O_{66.6}$ (atom %) | $Zr_{10}Zn_{20}Sn_{10}O_{60}$ (atom %) | 19 nm/15 nm | B |
| 3-307 | $Zr_{18.4}Y_{2.3}Zn_{19.5}O_{59.8}$ (atom %) | $Zr_{10}Zn_{20}Sn_{10}O_{60}$ (atom %) | 15 nm/11 nm | B |
| 3-308 | $Zr_{9.3}Y_{1.2}Zn_{19.8}Sn_{9.9}O_{59.8}$ (atom %) | $Zr_{10}Zn_{20}Sn_{10}O_{60}$ (atom %) | 17 nm/13 nm | A |
| 3-309 | $Zr_{9.5}Ca_{0.6}Zn_{20.1}Sn_{10.1}O_{59.7}$ (atom %) | $Zr_{10}Zn_{20}Sn_{10}O_{60}$ (atom %) | 17 nm/13 nm | B |
| 3-310 | $Zr_{9.5}Mg_{0.6}Zn_{20.1}Sn_{10.1}O_{59.7}$ (atom %) | $Zr_{10}Zn_{20}Sn_{10}O_{60}$ (atom %) | 17 nm/13 nm | B |
| 3-311 | $Zr_{9.7}Zn_{18.5}Sn_{9.7}Ga_{1.9}O_{60.2}$ (atom %) | $Zr_{10}Zn_{20}Sn_{10}O_{60}$ (atom %) | 17 nm/13 nm | A |
| 3-312 | $Zr_{9.7}Zn_{18.5}Sn_{9.7}Al_{1.9}O_{60.2}$ (atom %) | $Zr_{10}Zn_{20}Sn_{10}O_{60}$ (atom %) | 15 nm/11 nm | B |
| 3-313 | $Zr_{9.0}Y_{1.2}Zn_{18.2}Sn_{9.6}Ga_{1.9}O_{60.1}$ (atom %) | $Zr_{10}Zn_{20}Sn_{10}O_{60}$ (atom %) | 17 nm/13 nm | A |
| 3-314 | $Zr_{10}Zn_{20}Sn_{10}O_{60}$ (atom %) | $Zr_{20}Zn_{20}O_{60}$ (atom %) | 13 nm/11 nm | B |
| 3-315 | $Zr_{10}Zn_{20}Sn_{10}O_{60}$ (atom %) | $Zr_{16.7}Zn_{16.7}O_{66.6}$ (atom %) | 19 nm/15 nm | B |
| 3-316 | $Zr_{10}Zn_{20}Sn_{10}O_{60}$ (atom %) | $Zr_{18.4}Y_{2.3}Zn_{19.5}O_{59.8}$ (atom %) | 13 nm/11 nm | B |
| 3-317 | $Zr_{10}Zn_{20}Sn_{10}O_{60}$ (atom %) | $Zr_{9.3}Y_{1.2}Zn_{19.8}Sn_{9.9}O_{59.8}$ (atom %) | 17 nm/13 nm | A |
| 3-318 | $Zr_{10}Zn_{20}Sn_{10}O_{60}$ (atom %) | $Zr_{9.5}Ca_{0.6}Zn_{20.1}Sn_{10.1}O_{59.7}$ (atom %) | 17 nm/13 nm | B |
| 3-319 | $Zr_{10}Zn_{20}Sn_{10}O_{60}$ (atom %) | $Zr_{9.5}Mg_{0.6}Zn_{20.1}Sn_{10.1}O_{59.7}$ (atom %) | 17 nm/13 nm | B |
| 3-320 | $Zr_{10}Zn_{20}Sn_{10}O_{60}$ (atom %) | $Zr_{9.7}Zn_{18.5}Sn_{9.7}Ga_{1.9}O_{60.2}$ (atom %) | 17 nm/13 nm | A |
| 3-321 | $Zr_{10}Zn_{20}Sn_{10}O_{60}$ (atom %) | $Zr_{9.7}Zn_{18.5}Sn_{9.7}Al_{1.9}O_{60.2}$ (atom %) | 15 nm/11 nm | B |
| 3-322 | $Zr_{10}Zn_{20}Sn_{10}O_{60}$ (atom %) | $Zr_{9.0}Y_{1.2}Zn_{18.2}Sn_{9.6}Ga_{1.9}O_{60.1}$ (atom %) | 17 nm/13 nm | A |
| Comparative Example 2-1 | $Zr_{3.4}Si_{3.4}In_{31.8}O_{61.4}$ (atom %) | $Zr_{6.3}Si_{6.3}In_{25.0}O_{62.4}$ (atom %) | 17 nm/13 nm | D |

TABLE 20

| Disc No. | B-side information recording medium 102 First dielectric film 21 | B-side information recording medium 102 Second dielectric film 23 |
|---|---|---|
| | Expression by mol % | |
| 3-301 | $(ZrO_2)_{25}(ZnO)_{50}(SnO_2)_{25}$ (mol %) | $(ZrO_2)_{25}(ZnO)_{50}(SnO_2)_{25}$ (mol %) |
| 3-302 | $(ZrO_2)_{23.5}(Y_2O_3)_{1.5}(ZnO)_{50}(SnO_2)_{25}$ (mol %) | $(ZrO_2)_{23.5}(Y_2O_3)_{1.5}(ZnO)_{50}(SnO_2)_{25}$ (mol %) |
| 3-303 | $(ZrO_2)_{25}(ZnO)_{47.5}(SnO_2)_{25}(Ga_2O_3)_{2.5}$ (mol %) | $(ZrO_2)_{25}(ZnO)_{47.5}(SnO_2)_{25}(Ga_2O_3)_{2.5}$ (mol %) |
| 3-304 | $(ZrO_2)_{23.5}(Y_2O_3)_{1.5}(ZnO)_{47.5}(SnO_2)_{25}(Ga_2O_3)_{2.5}$ (mol %) | $(ZrO_2)_{23.5}(Y_2O_3)_{1.5}(ZnO)_{47.5}(SnO_2)_{25}(Ga_2O_3)_{2.5}$ (mol %) |
| 3-305 | $(ZrO_2)_{50}(ZnO)_{50}$ (mol %) | $(ZrO_2)_{25}(ZnO)_{50}(SnO_2)_{25}$ (mol %) |
| 3-306 | $(ZrO_2)_{50}(SnO_2)_{50}$ (mol %) | $(ZrO_2)_{25}(ZnO)_{50}(SnO_2)_{25}$ (mol %) |
| 3-307 | $(ZrO_2)_{47}(Y_2O_3)_{3}(ZnO)_{50}$ (mol %) | $(ZrO_2)_{25}(ZnO)_{50}(SnO_2)_{25}$ (mol %) |
| 3-308 | $(ZrO_2)_{23.5}(Y_2O_3)_{1.5}(ZnO)_{50}(SnO_2)_{25}$ (mol %) | $(ZrO_2)_{25}(ZnO)_{50}(SnO_2)_{25}$ (mol %) |
| 3-309 | $(ZrO_2)_{23.5}(CaO)_{1.5}(ZnO)_{50}(SnO_2)_{25}$ (mol %) | $(ZrO_2)_{25}(ZnO)_{50}(SnO_2)_{25}$ (mol %) |
| 3-310 | $(ZrO_2)_{23.5}(MgO)_{1.5}(ZnO)_{50}(SnO_2)_{25}$ (mol %) | $(ZrO_2)_{25}(ZnO)_{50}(SnO_2)_{25}$ (mol %) |
| 3-311 | $(ZrO_2)_{25}(ZnO)_{47.5}(SnO_2)_{25}(Ga_2O_3)_{2.5}$ (mol %) | $(ZrO_2)_{25}(ZnO)_{50}(SnO_2)_{25}$ (mol %) |
| 3-312 | $(ZrO_2)_{25}(ZnO)_{47.5}(SnO_2)_{25}(Al_2O_3)_{2.5}$ (mol %) | $(ZrO_2)_{25}(ZnO)_{50}(SnO_2)_{25}$ (mol %) |
| 3-313 | $(ZrO_2)_{23.5}(Y_2O_3)_{1.5}(ZnO)_{47.5}(SnO_2)_{25}(Ga_2O_3)_{2.5}$ (mol %) | $(ZrO_2)_{25}(ZnO)_{50}(SnO_2)_{25}$ (mol %) |
| 3-314 | $(ZrO_2)_{25}(ZnO)_{50}(SnO_2)_{25}$ (mol %) | $(ZrO_2)_{50}(ZnO)_{50}$ (mol %) |
| 3-315 | $(ZrO_2)_{25}(ZnO)_{50}(SnO_2)_{25}$ (mol %) | $(ZrO_2)_{50}(SnO_2)_{50}$ (mol %) |
| 3-316 | $(ZrO_2)_{25}(ZnO)_{50}(SnO_2)_{25}$ (mol %) | $(ZrO_2)_{47}(Y_2O_3)_{3}(ZnO)_{50}$ (mol %) |
| 3-317 | $(ZrO_2)_{25}(ZnO)_{50}(SnO_2)_{25}$ (mol %) | $(ZrO_2)_{23.5}(Y_2O_3)_{1.5}(ZnO)_{50}(SnO_2)_{25}$ (mol %) |
| 3-318 | $(ZrO_2)_{25}(ZnO)_{50}(SnO_2)_{25}$ (mol %) | $(ZrO_2)_{23.5}(CaO)_{1.5}(ZnO)_{50}(SnO_2)_{25}$ (mol %) |
| 3-319 | $(ZrO_2)_{25}(ZnO)_{50}(SnO_2)_{25}$ (mol %) | $(ZrO_2)_{23.5}(MgO)_{1.5}(ZnO)_{50}(SnO_2)_{25}$ (mol %) |
| 3-320 | $(ZrO_2)_{25}(ZnO)_{50}(SnO_2)_{25}$ (mol %) | $(ZrO_2)_{25}(ZnO)_{47.5}(SnO_2)_{25}(Ga_2O_3)_{2.5}$ (mol %) |
| 3-321 | $(ZrO_2)_{25}(ZnO)_{50}(SnO_2)_{25}$ (mol %) | $(ZrO_2)_{25}(ZnO)_{47.5}(SnO_2)_{25}(Al_2O_3)_{2.5}$ (mol %) |
| 3-322 | $(ZrO_2)_{25}(ZnO)_{50}(SnO_2)_{25}$ (mol %) | $(ZrO_2)_{23.5}(Y_2O_3)_{1.5}(ZnO)_{47.5}(SnO_2)_{25}(Ga_2O_3)_{2.5}$ (mol %) |
| Comparative Example 2-1 | $(ZrO_2)_{15}(SiO_2)_{15}(In_2O_3)_{70}$ (mol %) | $(ZrO_2)_{25}(SiO_2)_{25}(In_2O_3)_{50}$ (mol %) |

In disc Nos. 3-301 to 3-322, results of very good reproduction durability were obtained in all discs, as compared with Comparative Example 2-1, and the effect of improving the reproduction durability in the information recording medium according to the embodiment of the present invention could be confirmed.

Example 7

In the present example, another example of information recording medium 100 shown in the FIGURE is described.

The following is a method for producing information recording medium 100 of the present example.

First, a configuration of A-side information recording medium 101 is described.

As substrate 1, the same substrate as in Example 1 was used.

Subsequently, L0 layer 10 was formed on substrate 1. A dielectric film of 13 nm according to the embodiment of the present invention as first dielectric film 11 using a target according to each composition described in Table 21, a film of $W_{25}Cu_{21}Ta_{21}Zn_{5}Mn_{28}$—O of 35 nm as recording film 12 using a target substantially composed of $W_{25}Cu_{21}Ta_{21}Zn_5Mn_{28}$—O, and a film of $(ZrO_2)_{25}(SiO_2)_{25}(In_2O_3)_{50}$ (mol %) of 10 nm as second dielectric film 13 using a target substantially composed of $(ZrO_2)_{25}(SiO_2)_{25}(In_2O_3)_{50}$ (mol %) were sequentially formed by a sputtering.

Formation of first dielectric film 11 was performed in an Ar atmosphere (flow rate: 12 sccm), using a pulse DC power source (3 kW). Further, formation of recording film 12 was performed in an Ar and $O_2$ mixed-gas atmosphere (flow rate: 12+30 sccm), using a pulse DC power source (5 kW). Moreover, formation of second dielectric film 13 was performed in an Ar atmosphere (flow rate: 12 sccm), using a DC power source (2 kW).

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. The configuration and production method of L1 layer 20 are the same as in Example 2.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. The configuration and production method of L2 layer 30 are the same as in Example 5.

Thereafter, an ultraviolet-curable resin was applied onto second dielectric film 33, followed by spin coating, and was then cured with ultraviolet light, to form cover layer 4 having a thickness of about 57 μm, thereby preparing A-side information recording medium 101.

Next, a configuration of B-side information recording medium 102 is described.

As substrate 1, the same substrate as in Example 1 was used.

Subsequently, L0 layer 10 was formed on substrate 1. A dielectric film of 13 nm according to the embodiment of the present invention as first dielectric film 11 using a target according to each composition described in Table 22, a film of $W_{25}Cu_{21}Ta_{21}Zn_5Mn_{28}$—O of 35 nm as recording film 12 using a target substantially composed of $W_{25}Cu_{21}Ta_{21}Zn_5Mn_{28}$—O, and a film of $(ZrO_2)_{25}(SiO_2)_{25}(In_2O_3)_{50}$ (mol %) of 10 nm as second dielectric film 13 using a target substantially composed of $(ZrO_2)_{25}(SiO_2)_{25}(In_2O_3)_{50}$ (mol %) were sequentially formed by a sputtering.

Formation of first dielectric film 11 was performed in an Ar atmosphere (flow rate: 12 sccm), using a pulse DC power source (3 kW). Further, formation of recording film 12 was performed in an Ar and $O_2$ mixed-gas atmosphere (flow rate: 12+30 sccm), using a pulse DC power source (5 kW). Moreover, formation of second dielectric film 13 was performed in an Ar atmosphere (flow rate: 12 sccm), using a DC power source (2 kW).

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. The configuration and production method of L1 layer 20 are the same as in Example 2.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. The configuration and production method of L2 layer 30 are the same as in Example 5.

Thereafter, an ultraviolet-curable resin was applied onto second dielectric film 33, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

As an example of the information recording medium 100 of the present example, information recording media 100 were prepared in which $Zr_{10}Zn_{20}Sn_{10}O_{60}$ (atom %), $Zr_{20}Zn_{20}O_{60}$ (atom %), $Zr_{16.7}Zn_{16.7}O_{66.6}$ (atom %), $Zr_{18.4}Y_{2.3}Zn_{19.5}O_{59.8}$ (atom %), $Zr_{9.3}Y_{1.2}Zn_{19.8}Sn_{9.9}O_{59.8}$ (atom %), $Zr_{9.5}Ca_{0.6}Zn_{20.1}Sn_{10.1}O_{59.7}$ (atom %), $Zr_{9.5}Mg_{0.6}Zn_{20.1}Sn_{10.1}O_{59.7}$ (atom %), $Zr_{9.7}Zn_{18.5}Sn_{9.7}Ga_{1.9}O_{60.2}$ (atom %), $Zr_{9.7}Zn_{18.5}Sn_{9.7}Al_{1.9}O_{60.2}$ (atom %), $Zr_{9.0}Y_{1.2}Zn_{18.2}Sn_{9.6}Ga_{1.9}O_{60.1}$ (atom %), $Zr_{9.0}Y_{1.2}Zn_{18.2}Sn_{9.6}Ga_{1.9}O_{60}$ (containing $ZrO_2$ and $SiO_2$) (atom %), and $Zr_5Si_5Zn_{20}Sn_{10}O_{60}$ (containing $ZrSiO_4$) (atom %) were applied to first dielectric films 11 of L0 layer 10 of A-side information recording medium 101 and B-side information recording medium 102. Nos. of these discs are defined as 4-101 to 4-112, respectively. As a comparative example, a disc No. Comparative Example 3-1 was prepared in which $Zr_{3.4}Si_{3.4}In_{31.8}O_{61.4}$ (atom %) was applied to first dielectric films 11 of A-side information recording medium 101 and B-side information recording medium 102.

In these 4-101 to 4-112 and Comparative Example 3-1, reproduction durability at octuple speed was evaluated. The evaluation of the reproduction durability was performed using an evaluation apparatus (ODU-1000) manufactured by Pulstec Industrial Co., Ltd. The evaluation was performed by the same method as in Example 2 except that power for reproduction in L0 layer 10 was changed to 3.5 mW.

Table 21 shows the results in A-side information recording medium 101.

TABLE 21

| | A-side information recording medium 101 First dielectric film 11 | | Reproduction durability |
|---|---|---|---|
| Disc No. | Expression by atom % | Expression by mol % | (Δd-MLSE) |
| 4-101 | $Zr_{10}Zn_{20}Sn_{10}O_{60}$ (atom %) | $(ZrO_2)_{25}(ZnO)_{50}(SnO_2)_{25}$ (mol %) | A |
| 4-102 | $Zr_{20}Zn_{20}O_{60}$ (atom %) | $(ZrO_2)_{50}(ZnO)_{50}$ (mol %) | B |
| 4-103 | $Zr_{16.7}Zn_{16.7}O_{66.6}$ (atom %) | $(ZrO_2)_{50}(SnO_2)_{50}$ (mol %) | B |
| 4-104 | $Zr_{18.4}Y_{2.3}Zn_{19.5}O_{59.8}$ (atom %) | $(ZrO_2)_{47}(Y_2O_3)_3(ZnO)_{50}$ (mol %) | A |
| 4-105 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) | A |
| 4-106 | $Zr_{9.5}Ca_{0.6}Zn_{20.1}Sn_{10.1}O_{59.7}$ (atom %) | $(ZrO_2)_{23.5}(CaO)_{1.5}(ZnO)_{50}(SnO_2)_{25}$ (mol %) | B |
| 4-107 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | B |
| 4-108 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) | A |
| 4-109 | $Zr_{9.7}Zn_{18.5}Sn_{9.7}Al_{1.9}O_{60.2}$ (atom %) | $(ZrO_2)_{25}(ZnO)_{47.5}(SnO_2)_{25}(Al_2O_3)_{2.5}$ (mol %) | B |
| 4-110 | $Zr_{9.0}Y_{1.2}Zn_{18.2}Sn_{9.6}Ga_{1.9}O_{60.1}$ (atom %) | $(ZrO_2)_{23.5}(Y_2O_3)_{1.5}(ZnO)_{47.5}(SnO_2)_{25}(Ga_2O_3)_{2.5}$ (mol %) | A |
| 4-111 | $Zr_5Si_5Zn_{20}Sn_{10}O_{60}$ (atom %) | $(ZrO_2)_{12.5}(SiO_2)_{12.5}(ZnO)_{50}(SnO_2)_{25}$ (mol %) | B |
| 4-112 | $Zr_5Si_5Zn_{20}Sn_{10}O_{60}$ (atom %) | $(ZrSiO_4)_{25}(ZnO)_{50}(SnO_2)_{25}$ (mol %) | B |
| Comparative Example 3-1 | $Zr_{3.4}Si_{3.4}In_{31.8}O_{61.4}$ (atom %) | $(ZrO_2)_{15}(SiO_2)_{15}(In_2O_3)_{70}$ (mol %) | D |

In disc Nos. 4-101 to 4-112, results of very good reproduction durability were obtained in all discs, as compared with Comparative Example 3-1, and the effect of improving the reproduction durability in the information recording medium according to the embodiment of the present invention could be confirmed.

Table 22 shows the results in B-side information recording medium 102.

TABLE 22

| | B-side information recording medium 102 First dielectric film 11 | | Reproduction durability |
|---|---|---|---|
| Disc No. | Expression by atom % | Expression by mol % | (Δd-MLSE) |
| 4-101 | $Zr_{10}Zn_{20}Sn_{10}O_{60}$ (atom %) | $(ZrO_2)_{25}(ZnO)_{50}(SnO_2)_{25}$ (mol %) | A |
| 4-102 | $Zr_{20}Zn_{20}O_{60}$ (atom %) | $(ZrO_2)_{50}(ZnO)_{50}$ (mol %) | B |
| 4-103 | $Zr_{16.7}Zn_{16.7}O_{66.6}$ (atom %) | $(ZrO_2)_{50}(SnO_2)_{50}$ (mol %) | B |
| 4-104 | $Zr_{18.4}Y_{2.3}Zn_{19.5}O_{59.8}$ (atom %) | $(ZrO_2)_{47}(Y_2O_3)_3(ZnO)_{50}$ (mol %) | A |
| 4-105 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) | A |
| 4-106 | $Zr_{9.5}Ca_{0.6}Zn_{20.1}Sn_{10.1}O_{59.7}$ (atom %) | $(ZrO_2)_{23.5}(CaO)_{1.5}(ZnO)_{50}(SnO_2)_{25}$ (mol %) | B |
| 4-107 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | B |
| 4-108 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) | A |
| 4-109 | $Zr_{9.7}Zn_{18.5}Sn_{9.7}Al_{1.9}O_{60.2}$ (atom %) | $(ZrO_2)_{25}(ZnO)_{47.5}(SnO_2)_{25}(Al_2O_3)_{2.5}$ (mol %) | B |
| 4-110 | $Zr_{9.0}Y_{1.2}Zn_{18.2}Sn_{9.6}Ga_{1.9}O_{60.1}$ (atom %) | $(ZrO_2)_{23.5}(Y_2O_3)_{1.5}(ZnO)_{47.5}(SnO_2)_{25}(Ga_2O_3)_{2.5}$ (mol %) | A |
| 4-111 | $Zr_5S_{15}Zn_{20}Sn_{10}O_{60}$ (atom %) | $(ZrO_2)_{12.5}(SiO_2)_{12.5}(ZnO)_{50}(SnO_2)_{25}$ (mol %) | B |
| 4-112 | $Zr_5S_{15}Zn_{20}Sn_{10}O_{60}$ (atom %) | $(ZrSiO_4)_{25}(ZnO)_{50}(SnO_2)_{25}$ (mol %) | B |
| Comparative Example 3-1 | $Zr_{3.4}Si_{3.4}In_{31.8}O_{61.4}$ (atom %) | $(ZrO_2)_{15}(SiO_2)_{15}(In_2O_3)_{70}$ (mol %) | D |

In disc Nos. 4-101 to 4-112, results of very good reproduction durability were obtained in all discs, as compared with Comparative Example 3-1, and the effect of improving the reproduction durability in the information recording medium according to the embodiment of the present invention could be confirmed.

Example 8

In the present example, another example of information recording medium 100 shown in the FIGURE is described. The following is a method for producing information recording medium 100 of the present example.

First, a configuration of A-side information recording medium 101 is described.

As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. The configuration and production method of L1 layer 20 are the same as in Example 2.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A dielectric film of 17 nm according to the embodiment of the present invention as first dielectric film 31 using a target according to each composition described in Table 23 and a film of $W_{32}Cu_{17}Ta_{22}Zn_{11}Mn_{18}$—O of 34 nm as recording film 32 using a target substantially composed of $W_{32}Cu_{17}Ta_{22}Zn_{11}Mn_{18}$—O were sequentially formed by a sputtering. In the present example, second dielectric film 33 is not formed.

Formation of first dielectric film 31 was performed in an Ar atmosphere (flow rate: 12 sccm), using a pulse DC power source (3 kW). Further, formation of recording film 32 was performed in an Ar and $O_2$ mixed-gas atmosphere (flow rate: 12+36 sccm), using a pulse DC power source (2 kW).

Thereafter, an ultraviolet-curable resin was applied onto recording film 32, followed by spin coating, and was then cured with ultraviolet light, to form cover layer 4 having a thickness of about 57 μm, thereby preparing A-side information recording medium 101.

Next, a configuration of B-side information recording medium 102 is described.

As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μn) was formed, was formed on L0 layer 10. The configuration and production method of intermediate separation layer 2 are the same as in Example 1.

Next, L1 layer 20 was formed on intermediate separation layer 2. The configuration and production method of L1 layer 20 are the same as in Example 2.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A dielectric film of 17 nm according to the embodiment of the present invention as first dielectric film 31 using a target according to each composition described in Table 24 and a film of $W_{32}Cu_{17}Ta_{22}Zn_{11}Mn_{18}$—O of 34 nm as recording film 32 using a target substantially composed of $W_{32}Cu_{17}Ta_{22}Zn_{11}Mn_{18}$—O were sequentially formed by a sputtering. In the present example, second dielectric film 33 is not formed.

Formation of first dielectric film 31 was performed in an Ar atmosphere (flow rate: 12 sccm), using a pulse DC power source (3 kW). Further, formation of recording film 32 was performed in an Ar and $O_2$ mixed-gas atmosphere (flow rate: 12+36 sccm), using a pulse DC power source (2 kW).

Thereafter, an ultraviolet-curable resin was applied onto recording film 32, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 100 were prepared in which $Zr_{10}Zn_{20}Sn_{10}O_{60}$ (atom %), $Zr_{9.3}Y_{1.2}Zn_{19.8}Sn_{9.9}O_{59.8}$ (atom %), $Zr_{9.7}Zn_{18.5}Sn_{9.7}Ga_{1.9}O_{60.2}$ (atom %), and $Zr_{9.0}Y_{1.2}Zn_{18.2}Sn_{9.6}Ga_{1.9}O_{60.1}$ (atom %) were applied to first dielectric films 31 of A-side information recording medium 101 and B-side information recording medium 102. Nos. of these discs are defined as 5-101 to 5-104, respectively.

In these 5-101 to 5-104, evaluation of reproduction durability was performed as described in Example 1.

Table 23 shows the results in A-side information recording medium 101.

TABLE 23

| | A-side information recording medium 101 First dielectric film 31 | | Reproduction durability |
|---|---|---|---|
| Disc No. | Expression by atom % | Expression by mol % | (Δd-MLSE) |
| 5-101 | $Zr_{10}Zn_{20}Sn_{10}O_{60}$ (atom %) | $(ZrO_2)_{25}(ZnO)_{50}(SnO_2)_{25}$ (mol %) | B |
| 5-102 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) | B |
| 5-103 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) | B |
| 5-104 | $Zr_{9.0}Y_{1.2}Zn_{18.2}Sn_{9.6}Ga_{1.9}O_{60.1}$ (atom %) | $(ZrO_2)_{23.5}(Y_2O_3)_{1.5}(ZnO)_{47.5}(SnO_2)_{25}(Ga_2O_3)_{2.5}$ (mol %) | B |

In disc Nos. 5-101 to 5-104, results of very good reproduction durability were obtained in all discs, and the effect of improving the reproduction durability in the information recording medium according to the embodiment of the present invention could be confirmed.

Table 24 shows the results in B-side information recording medium 102.

TABLE 24

| | B-side information recording medium 102 First dielectric film 31 | | Reproduction durability |
|---|---|---|---|
| Disc No. | Expression by atom % | Expression by mol % | (Δd-MLSE) |
| 5-101 | $Zr_{10}Zn_{20}Sn_{10}O_{60}$ (atom %) | $(ZrO_2)_{25}(ZnO)_{50}(SnO_2)_{25}$ (mol %) | B |
| 5-102 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) | B |
| 5-103 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) | B |
| 5-104 | $Zr_{9.0}Y_{1.2}Zn_{18.2}Sn_{9.6}Ga_{1.9}O_{60.1}$ (atom %) | $(ZrO_2)_{23.5}(Y_2O_3)_{1.5}(ZnO)_{47.5}(SnO_2)_{25}(Ga_2O_3)_{2.5}$ (mol %) | B |

In disc Nos. 5-101 to 5-104, results of very good reproduction durability were obtained in all discs, and the effect of improving the reproduction durability in the information recording medium according to the embodiment of the present invention could be confirmed.

Example 9

In the present example, another example of information recording medium 100 shown in the FIGURE is described. The following is a method for producing information recording medium 100 of the present example. The information recording medium 100 of the present example is an information recording medium having two information layers of L0 layer 10 and L1 layer 20 on one side.

First, a configuration of A-side information recording medium 101 is described. As substrate 1, the same substrate as in Example 1 was used.

Subsequently, L0 layer 10 is formed on substrate 1. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A dielectric film of 16 nm according to the embodiment of the present invention as first dielectric film 21 using a target according to each composition described in Table 25, a film of $W_{32}Cu_{17}Ta_{22}Zn_{11}Mn_{18}$—O of 34 nm as recording film 22 using a target substantially composed of $W_{32}Cu_{17}Ta_{22}Zn_{11}Mn_{18}$—O, and a film of $(ZrO_2)_{25}(SiO_2)_{25}(In_2O_3)_{50}$ (mol %) of 14 nm as second dielectric film 23 using a target substantially composed of $(ZrO_2)_{25}(SiO_2)_{25}(In_2O_3)_{50}$ (mol %) were sequentially formed by a sputtering.

Formation of first dielectric film 21 was performed in an Ar atmosphere (flow rate: 12 sccm), using a pulse DC power source (3 kW). Further, formation of recording film 22 was performed in an Ar and $O_2$ mixed-gas atmosphere (flow rate: 12+36 sccm), using a pulse DC power source. Moreover, formation of second dielectric film 23 was performed in an Ar atmosphere, using a DC power source (2 kW).

Thereafter, an ultraviolet-curable resin was applied onto second dielectric film 23, followed by spin coating, and was then cured with ultraviolet light, to form cover layer 4 having a thickness of about 75 μm, thereby preparing A-side information recording medium 101.

Next, a configuration of B-side information recording medium 102 is described. As substrate 1, the same substrate as in Example 1 was used.

Subsequently, L0 layer 10 is formed on substrate 1. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A dielectric film of 16 nm according to the embodiment of the present invention as first dielectric film 21 using a target according to each composition described in Table 26, a film of $W_{32}Cu_{17}Ta_{22}Zn_{11}Mn_{18}$—O of 34 nm as recording film 22 using a target substantially composed of $W_{32}Cu_{17}Ta_{22}Zn_{11}Mn_{18}$—O, and a film of $(ZrO_2)_{25}(SiO_2)_{25}(In_2O_3)_{50}$ (mol %) of 14 nm as second dielectric film 23 using a target substantially composed of $(ZrO_2)_{25}(SiO_2)_{25}(In_2O_3)_{50}$ (mol %) were sequentially formed by a sputtering.

Formation of first dielectric film 21 was performed in an Ar atmosphere (flow rate: 12 sccm), using a pulse DC power source (3 kW). Further, formation of recording film 22 was performed in an Ar and $O_2$ mixed-gas atmosphere (flow rate: 12+36 sccm), using a pulse DC power source (5 kW). Moreover, formation of second dielectric film 23 was performed in an Ar atmosphere, using a DC power source.

Thereafter, an ultraviolet-curable resin was applied onto second dielectric film 23, followed by spin coating, and was then cured with ultraviolet light, to form cover layer 4 having a thickness of about 75 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 100 were prepared in which $Zr_{10}Zn_{20}Sn_{10}O_{60}$ (atom %), $Zr_{9.3}Y_{1.2}Zn_{19.8}Sn_{9.9}O_{59.8}$ (atom %), $Zr_{9.7}Zn_{18.5}Sn_{9.7}Ga_{1.9}O_{60.2}$ (atom %), and $Zr_{9.0}Y_{1.2}Zn_{18.2}Sn_{9.6}Ga_{1.9}O_{60.1}$ (atom %) were applied to first dielectric films 21 of A-side information recording medium 101 and B-side information recording medium 102. Nos. of these discs are defined as 6-101 to 6-104, respectively.

In these 6-101 to 6-104, evaluation of reproduction durability was performed as described in Example 1.

Table 25 shows the results in A-side information recording medium 101.

TABLE 25

| | A-side information recording medium 101 First dielectric film 21 | | Reproduction durability |
|---|---|---|---|
| Disc No. | Expression by atom % | Expression by mol % | (Δd-MLSE) |
| 6-101 | $Zr_{10}Zn_{20}Sn_{10}O_{60}$ (atom %) | $(ZrO_2)_{25}(ZnO)_{50}(SnO_2)_{25}$ (mol %) | B |
| 6-102 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) | B |
| 6-103 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) | B |
| 6-104 | $Zr_{9.0}Y_{1.2}Zn_{18.2}Sn_{9.6}Ga_{1.9}O_{60.1}$ (atom %) | $(ZrO_2)_{23.5}(Y_2O_3)_{1.5}(ZnO)_{47.5}(SnO_2)_{25}(Ga_2O_3)_{2.5}$ (mol %) | B |

In disc Nos. 6-101 to 6-104, results of very good reproduction durability were obtained in all discs, and the effect of improving the reproduction durability in the information recording medium according to the embodiment of the present invention could be confirmed.

Table 26 shows the results in B-side information recording medium 102.

TABLE 26

| | B-side information recording medium 102 First dielectric film 21 | | Reproduction durability |
|---|---|---|---|
| Disc No. | Expression by atom % | Expression by mol % | (Δd-MLSE) |
| 6-101 | $Zr_{10}Zn_{20}Sn_{10}O_{60}$ (atom %) | $(ZrO_2)_{25}(ZnO)_{50}(SnO_2)_{25}$ (mol %) | B |
| 6-102 | $Zr_{9.3}Y_{1.2}Zn_{19.8}Sn_{9.9}O_{59.8}$ (atom %) | $(ZrO_2)_{23.5}(Y_2O_3)_{1.5}(ZnO)_{50}(SnO_2)_{25}$ (mol %) | B |
| 6-103 | $Zr_{9.7}Zn_{18.5}Sn_{9.7}Ga_{1.9}O_{60.2}$ (atom %) | $(ZrO_2)_{25}(ZnO)_{47.5}(SnO_2)_{25}(Ga_2O_3)_{2.5}$ (mol %) | B |
| 6-104 | $Zr_{9.0}Y_{1.2}Zn_{18.2}Sn_{9.6}Ga_{1.9}O_{60.1}$ (atom %) | $(ZrO_2)_{23.5}(Y_2O_3)_{1.5}(ZnO)_{47.5}(SnO_2)_{25}(Ga_2O_3)_{2.5}$ (mol %) | B |

In disc Nos. 6-101 to 6-104, results of very good reproduction durability were obtained in all discs, and the effect of improving the reproduction durability in the information recording medium according to the embodiment of the present invention could be confirmed.

Example 10

In the present example, another example of information recording medium 100 shown in the FIGURE is described. The following is a method for producing information recording medium 100 of the present example.

First, a configuration of A-side information recording medium 101 is described. As substrate 1, a polycarbonate substrate (diameter: 120 mm, thickness 0.5 mm) was prepared, in which a spiral guide groove (depth: 27 nm, track pitch (land-groove distance): 0.225 μm) was formed. L0 layer 10 was formed on substrate 1. A film of $(ZrO_2)_{23}(MgO)_2(ZnO)_{48.9}(SnO_2)_{25}(Ga_2O_3)_{1.1}$ (mol %) of 13 nm as first dielectric film 11 using a target substantially composed of $(ZrO_2)_{23}(MgO)_2(ZnO)_{48.9}(SnO_2)_{25}(Ga_2O_3)_{1.1}$ (mol %), a film of $W_{31}Cu_{19}Ta_{22}Zn_5Mn_{23}$—O of 34 nm as recording film 12 using a target substantially composed of $W_{31}Cu_{19}Ta_{22}Zn_5Mn_{23}$—O, and a film of $(ZrO_2)_{25}(SiO_2)_{25}(In_2O_3)_{50}$ (mol %) of 10 nm as second dielectric film 13 using a target substantially composed of $(ZrO_2)_{25}(SiO_2)_{25}(In_2O_3)_{50}$ (mol %) were sequentially formed by a sputtering.

In laser beam 6 having a wavelength of 405 nm, L0 layer 10 in the absence of L1 layer 20 and L2 layer 30 has, in an unrecorded state, a reflectance $R_g$ of nearly equal to 8.0% and a reflectance $R_l$ of nearly equal to 8.5%.

Formation of first dielectric film 11 was performed in an Ar atmosphere (flow rate: 12 sccm), using a pulse DC power source (4 kW). Formation of recording film 12 was performed in an Ar and $O_2$ mixed-gas atmosphere (flow rate: 12+30 sccm), using a pulse DC power source (5 kW). Formation of second dielectric film 13 was performed in an Ar atmosphere (flow rate: 12 sccm), using a DC power source (2 kW).

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A film of $(ZrO_2)_{23}(MgO)_2(ZnO)_{48.9}(SnO_2)_{25}(Ga_2O_3)_{1.1}$ (mol %) of 17 nm as first dielectric film 21 of L1 layer 20 using a target substantially composed of $(ZrO_2)_{23}(MgO)_2(ZnO)_{48.9}(SnO_2)_{25}(Ga_2O_3)_{1.1}$ (mol %), a film of $W_{31}Cu_{18}Ta_{16}Zn_{16}Mn_{19}$—O of 35 nm as recording film 22 using a target substantially composed of $W_{31}Cu_{18}Ta_{16}Zn_{16}Mn_{19}$—O according to the embodiment of the present invention, and a film of $(ZrO_2)_{25}(SiO_2)_{25}(In_2O_3)_{50}$ (mol %) of 13 nm as second dielectric film 23 using a target substantially composed of $(ZrO_2)_{25}(SiO_2)_{25}(In_2O_3)_{50}$ (mol %) were sequentially formed by a sputtering.

In laser beam 6 having a wavelength of 405 nm, L1 layer 20 in the absence of L2 layer 30 has, in an unrecorded state of recording film 22, a reflectance $R_g$ of nearly equal to 6.0%, a reflectance $R_l$ of nearly equal to 6.3%, and a transmittance of about 77%.

Further, formation of first dielectric film 21 was performed in an Ar atmosphere (flow rate: 12 sccm), using a pulse DC power source (4 kW). Formation of recording film 22 was performed in an Ar and $O_2$ mixed-gas atmosphere (flow rate: 12+36 sccm), using a pulse DC power source (5 kW). Formation of second dielectric film 23 was performed in an Ar atmosphere (flow rate: 12 sccm), using a DC power source (2 kW).

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A dielectric film of 15 nm according to the embodiment of the present invention of as first dielectric film 31 using a target according to each composition described in Table 27, a film of $W_{32}Cu_{17}Ta_{16}Zn_{17}Mn_{18}$—O of 34 nm as recording film 32 using a target substantially composed of $W_{32}Cu_{17}Ta_{16}Zn_{17}Mn_{18}$—O, and a film of $(ZrO_2)_{25}(SiO_2)_{25}(In_2O_3)_{50}$ (mol %) of 13 nm as second dielectric film 33 using a target substantially composed of $(ZrO_2)_{25}(SiO_2)_{25}(In_2O_3)_{50}$ (mol %) were sequentially formed by a sputtering.

In laser beam 6 having a wavelength of 405 nm, it was set that L2 layer 30 had, in an unrecorded state of recording film 32, a reflectance $R_g$ of nearly equal to 5.8%, a reflectance $R_l$ of nearly equal to 6.1%, and a transmittance of about 80%.

Further, formation of first dielectric film 31 was performed in an Ar atmosphere (flow rate: 12 sccm), using a pulse DC power source (4 kW). Formation of recording film 32 was performed in an Ar and $O_2$ mixed-gas atmosphere (flow rate: 12+36 sccm), using a pulse DC power source. Formation of second dielectric film 33 was performed in an Ar atmosphere (flow rate: 12 sccm), using a DC power source (2 kW).

Thereafter, an ultraviolet-curable resin was applied onto second dielectric film 33, followed by spin coating, and was then cured with ultraviolet light, to form cover layer 4 having a thickness of about 57 μm, thereby preparing A-side information recording medium 101.

Next, a configuration of B-side information recording medium 102 is described. As substrate 1, a polycarbonate substrate (thickness 0.5 mm) was prepared, in which a spiral guide groove (depth: 27 nm, track pitch (land-groove distance): 0.225 μm) was formed. L0 layer 10 was formed on substrate 1. The spiral rotation direction of the guide groove was opposite to that in substrate 1 of A-side information recording medium 101 described before. L0 layer 10 was formed on substrate 1. A film of $(ZrO_2)_{23}(MgO)_2(ZnO)_{48.9}$ $(SnO_2)_{25}(Ga_2O_3)_{1.1}$ (mol %) of 13 nm as first dielectric film 11 using a target substantially composed of $(ZrO_2)_{23}$ $(MgO)_2(ZnO)_{48.9}(SnO_2)_{25}(Ga_2O_3)_{1.1}$ (mol %), a film of $W_{31}Cu_{19}Ta_{22}Zn_5Mn_{23}$—O of 34 nm as recording film 12 using a target substantially composed of $W_{31}$ $Cu_{19}Ta_{22}Zn_5Mn_{23}$—O, and a film of $(ZrO_2)_{25}(SiO_2)_{25}$ $(In_2O_3)_{50}$ (mol %) of 10 nm as second dielectric film 13 using a target substantially composed of $(ZrO_2)_{25}(SiO_2)_{25}$ $(In_2O_3)_{50}$ (mol %) were sequentially formed by a sputtering.

In laser beam 6 having a wavelength of 405 nm, L0 layer 10 in the absence of L1 layer 20 and L2 layer 30 has, in an unrecorded state, a reflectance $R_g$ of nearly equal to 8.0% and a reflectance $R_l$ of nearly equal to 8.5%.

Formation of first dielectric film 11 was performed in an Ar atmosphere (flow rate: 12 sccm), using a pulse DC power source (4 kW). Formation of recording film 12 was performed in an Ar and $O_2$ mixed-gas atmosphere (flow rate: 12+30 sccm), using a pulse DC power source (5 kW). Formation of second dielectric film 13 was performed in an Ar atmosphere (flow rate: 12 sccm), using a DC power source (2 kW).

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A film of $(ZrO_2)_{23}(MgO)_2(ZnO)_{48.9}(SnO_2)_{25}$ $(Ga_2O_3)_{1.1}$ (mol %) of 17 nm as first dielectric film 21 of L1 layer 20 using a target substantially composed of $(ZrO_2)_{23}$ $(MgO)_2(ZnO)_{48.9}(SnO_2)_{25}(Ga_2O_3)_{1.1}$ (mol %), a film of $W_{31}Cu_{18}Ta_{16}Zn_{16}Mn_{19}$—O of 35 nm as recording film 22 using a target substantially composed of $W_{31}Cu_{18}$ $Ta_{16}Zn_{10}Mn_{19}$—O according to the embodiment of the present invention, and a film of $(ZrO_2)_{25}(SiO_2)_{25}(In_2O_3)_{50}$ (mol %) of 13 nm as second dielectric film 23 using a target substantially composed of $(ZrO_2)_{25}(SiO_2)_{25}(In_2O_3)_{50}$ (mol %) were sequentially formed by a sputtering.

In laser beam 6 having a wavelength of 405 nm, L1 layer 20 in the absence of L2 layer 30 has, in an unrecorded state of recording film 22, a reflectance $R_g$ of nearly equal to 6.0%, a reflectance $R_l$ of nearly equal to 6.3%, and a transmittance of about 77%.

Further, formation of first dielectric film 21 was performed in an Ar atmosphere (flow rate: 12 sccm), using a pulse DC power source (4 kW). Formation of recording film 22 was performed in an Ar and $O_2$ mixed-gas atmosphere (flow rate: 12+36 sccm), using a pulse DC power source (5 kW). Formation of second dielectric film 23 was performed in an Ar atmosphere (flow rate: 12 sccm), using a DC power source (2 kW).

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 2 are the same as in Example 1.

L2 layer 30 was formed on intermediate separation layer 3. A dielectric film of 15 nm according to the embodiment of the present invention as first dielectric film 31 using a target according to each composition described in Table 28, a film of $W_{32}Cu_{17}Ta_{16}Zn_{17}Mn_{18}$—O of 34 nm as recording film 32 using a target substantially composed of $W_{32}Cu_{17}Ta_{16}Zn_{17}Mn_{18}$—O, and a film of $(ZrO_2)_{25}(SiO_2)_{25}$ $(In_2O_3)_{50}$ (mol %) of 13 nm as second dielectric film 33 using a target substantially composed of $(ZrO_2)_{25}(SiO_2)_{25}$ $(In_2O_3)_{50}$ (mol %) were sequentially formed by a sputtering.

Film thickness of first dielectric film 31 and second dielectric film 33 was determined by calculation based on a matrix method. Specifically, it was set that, in laser beam 6 having a wavelength of 405 nm, L2 layer 30 had, in an unrecorded state of recording film 32, a reflectance $R_g$ of nearly equal to 5.8%, a reflectance $R_l$ of nearly equal to 6.1%, and a transmittance of about 80%.

Further, formation of first dielectric film 31 was performed in an Ar atmosphere (flow rate: 12 sccm), using a pulse DC power source (4 kW). Formation of recording film 32 was performed in an Ar and $O_2$ mixed-gas atmosphere (flow rate: 12+36 sccm), using a pulse DC power source (5 kW). Formation of second dielectric film 33 was performed in an Ar atmosphere (flow rate: 12 sccm), using a pulse DC power source (2 kW).

Thereafter, an ultraviolet-curable resin was applied onto second dielectric film 33, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 100 were prepared in which $Zr_{9.5}Mg_{0.6}Zn_{20.1}Sn_{10.1}O_{59.7}$ (atom %), $Zr_{9.0}Mg_{0.6}Zn_{14.4}Sn_{14.4}O_{61.6}$ (atom %), $Zr_{9.2}Mg_{0.6}$ $Zn_{18.6}Sn_{9.8}Ga_{2.0}O_{59.8}$ (atom %), $Zr_{8.8}Mg_{0.6}Zn_{13.0}$ $Sn_{14.0}Ga_{2.0}O_{61.6}$ (atom %), $Zr_{9.2}Mg_{0.8}Zn_{19.5}Sn_{10.0}$ $Ga_{0.9}O_{59.6}$ (atom %), $Zr_{8.8}Mg_{0.8}Zn_{14.0}Sn_{14.3}Ga_{0.8}O_{61.3}$ (atom %), $Zr_{13.2}Mg_{1.2}Zn_{14.0}Sn_{9.6}Ga_{0.6}O_{61.4}$ (atom %), $Zr_{7.3}Mg_{0.6}Zn_{19.4}Sn_{11.9}Ga_{0.9}O_{59.9}$ (atom %), $Zr_{11.0}Mg_{1.0}$ $Zn_{19.5}Sn_{8.0}Ga_{0.9}O_{59.6}$ (atom %), $Zr_{9.2}Ca_{0.8}Zn_{19.5}$ $Sn_{10.0}Ga_{0.9}O_{59.6}$ (atom %), and $Zr_{9.2}Mg_{0.8}Zn_{19.5}$ $Sn_{10.0}Al_{0.9}O_{59.6}$ (atom %) were applied to first dielectric films 31 of A-side information recording medium 101 and B-side information recording medium 102. Nos. of these discs are defined as 10-101 to 10-111, respectively.

In these 10-101 to 10-111 and Comparative Example 1-1, evaluation of reproduction durability at octuple speed was performed as described in Example 2.

Table 27 shows the results in A-side information recording medium 101.

TABLE 27

| Disc No. | A-side information recording medium 101 First dielectric film 31 | | Reproduction durability of L2 layer 30 |
|---|---|---|---|
| | Expression by atom % | Expression by mol % | (Δd-MLSE) |
| 10-101 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | A |
| 10-102 | $Zr_{9.0}Mg_{0.6}Zn_{14.4}Sn_{14.4}O_{61.6}$ (atom %) | $(ZrO_2)_{23.5}(MgO)_{1.5}(ZnO)_{37.5}(SnO_2)_{37.5}$ (mol %) | B |
| 10-103 | $Zr_{9.2}Mg_{0.6}Zn_{18.6}Sn_{9.8}Ga_{2.0}O_{59.8}$ (atom %) | $(ZrO_2)_{23.5}(MgO)_{1.5}(ZnO)_{47.5}(SnO_2)_{25}(Ga_2O_3)_{2.5}$ (mol %) | A |
| 10-104 | $Zr_{8.8}Mg_{0.6}Zn_{13.0}Sn_{14.0}Ga_{2.0}O_{61.6}$ (atom %) | $(ZrO_2)_{23.5}(MgO)_{1.5}(ZnO)_{35}(SnO_2)_{37.5}(Ga_2O_3)_{2.5}$ (mol %) | B |
| 10-105 | $Zr_{9.2}Mg_{0.8}Zn_{19.5}Sn_{10.0}Ga_{0.9}O_{59.6}$ (atom %) | $(ZrO_2)_{23}(MgO)_2(ZnO)_{48.9}(SnO_2)_{25}(Ga_2O_3)_{1.1}$ (mol %) | A |
| 10-106 | $Zr_{8.8}Mg_{0.8}Zn_{14.0}Sn_{14.3}Ga_{0.8}O_{61.3}$ (atom %) | $(ZrO_2)_{23}(MgO)_2(ZnO)_{36.7}(SnO_2)_{37.5}(Ga_2O_3)_{0.8}$ (mol %) | A |
| 10-107 | $Zr_{13.2}Mg_{1.2}Zn_{14.0}Sn_{9.6}Ga_{0.6}O_{61.4}$ (atom %) | $(ZrO_2)_{34.5}(MgO)_3(ZnO)_{36.7}(SnO_2)_{25}(Ga_2O_3)_{0.8}$ (mol %) | A |
| 10-108 | $Zr_{7.3}Mg_{0.6}Zn_{19.4}Sn_{11.9}Ga_{0.9}O_{59.9}$ (atom %) | $(ZrO_2)_{18.4}(MgO)_{1.6}(ZnO)_{48.9}(SnO_2)_{30}(Ga_2O_3)_{1.1}$ (mol %) | B |
| 10-109 | $Zr_{11.0}Mg_{1.0}Zn_{19.5}Sn_{8.0}Ga_{0.9}O_{59.6}$ (atom %) | $(ZrO_2)_{27.6}(MgO)_{2.4}(ZnO)_{48.9}(SnO_2)_{20}(Ga_2O_3)_{1.1}$ (mol %) | A |
| 10-110 | $Zr_{9.2}Ca_{0.8}Zn_{19.5}Sn_{10.0}Ga_{0.9}O_{59.6}$ (atom %) | $(ZrO_2)_{23}(CaO)_2(ZnO)_{48.9}(SnO_2)_{25}(Ga_2O_3)_{1.1}$ (mol %) | B |
| 10-111 | $Zr_{9.2}Mg_{0.8}Zn_{19.5}Sn_{10.0}Al_{0.9}O_{59.6}$ (atom %) | $(ZrO_2)_{23}(MgO)_2(ZnO)_{48.9}(SnO_2)_{25}(Al_2O_3)_{1.1}$ (mol %) | A |
| Comparative Example 1-1 | $Zr_{3.4}Si_{3.4}In_{31.8}O_{61.4}$ (atom %) | $(ZrO_2)_{15}(SiO_2)_{15}(In_2O_3)_{70}$ (mol %) | D |

In disc Nos. 10-101 to 10-111, results of very good reproduction durability were obtained in all discs, as compared with Comparative Example 1-1, and the effect of improving the reproduction durability in the information recording medium according to the embodiment of the present invention could be confirmed.

Table 28 shows the results in B-side information recording medium 102.

TABLE 28

| Disc No. | B-side information recording medium 102 First dielectric film 31 | | Reproduction durability of L2 layer 30 |
|---|---|---|---|
| | Expression by atom % | Expression by mol % | (Δd-MLSE) |
| 10-101 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | A |
| 10-102 | $Zr_{9.0}Mg_{0.6}Zn_{14.4}Sn_{14.4}O_{61.6}$ (atom %) | $(ZrO_2)_{23.5}(MgO)_{1.5}(ZnO)_{37.5}(SnO_2)_{37.5}$ (mol %) | B |
| 10-103 | $Zr_{9.2}Mg_{0.6}Zn_{18.6}Sn_{9.8}Ga_{2.0}O_{59.8}$ (atom %) | $(ZrO_2)_{23.5}(MgO)_{1.5}(ZnO)_{47.5}(SnO_2)_{25}(Ga_2O_3)_{2.5}$ (mol %) | A |
| 10-104 | $Zr_{8.8}Mg_{0.6}Zn_{13.0}Sn_{14.0}Ga_{2.0}O_{61.6}$ (atom %) | $(ZrO_2)_{23.5}(MgO)_{1.5}(ZnO)_{35}(SnO_2)_{37.5}(Ga_2O_3)_{2.5}$ (mol %) | B |
| 10-105 | $Zr_{9.2}Mg_{0.8}Zn_{19.5}Sn_{10.0}Ga_{0.9}O_{59.6}$ (atom %) | $(ZrO_2)_{23}(MgO)_2(ZnO)_{48.9}(SnO_2)_{25}(Ga_2O_3)_{1.1}$ (mol %) | A |
| 10-106 | $Zr_{8.8}Mg_{0.8}Zn_{14.0}Sn_{14.3}Ga_{0.8}O_{61.3}$ (atom %) | $(ZrO_2)_{23}(MgO)_2(ZnO)_{36.7}(SnO_2)_{37.5}(Ga_2O_3)_{0.8}$ (mol %) | A |
| 10-107 | $Zr_{13.2}Mg_{1.2}Zn_{14.0}Sn_{9.6}Ga_{0.6}O_{61.4}$ (atom %) | $(ZrO_2)_{34.5}(MgO)_3(ZnO)_{36.7}(SnO_2)_{25}(Ga_2O_3)_{0.8}$ (mol %) | A |
| 10-108 | $Zr_{7.3}Mg_{0.6}Zn_{19.4}Sn_{11.9}Ga_{0.9}O_{59.9}$ (atom %) | $(ZrO_2)_{18.4}(MgO)_{1.6}(ZnO)_{48.9}(SnO_2)_{30}(Ga_2O_3)_{1.1}$ (mol %) | B |
| 10-109 | $Zr_{11.0}Mg_{1.0}Zn_{19.5}Sn_{8.0}Ga_{0.9}O_{59.6}$ (atom %) | $(ZrO_2)_{27.6}(MgO)_{2.4}(ZnO)_{48.9}(SnO_2)_{20}(Ga_2O_3)_{1.1}$ (mol %) | A |
| 10-110 | $Zr_{9.2}Ca_{0.8}Zn_{19.5}Sn_{10.0}Ga_{0.9}O_{59.6}$ (atom %) | $(ZrO_2)_{23}(CaO)_2(ZnO)_{48.9}(SnO_2)_{25}(Ga_2O_3)_{1.1}$ (mol %) | B |
| 10-111 | $Zr_{9.2}Mg_{0.8}Zn_{19.5}Sn_{10.0}Al_{0.9}O_{59.6}$ (atom %) | $(ZrO_2)_{23}(MgO)_2(ZnO)_{48.9}(SnO_2)_{25}(Al_2O_3)_{1.1}$ (mol %) | A |
| Comparative Example 1-1 | $Zr_{3.4}Si_{3.4}In_{31.8}O_{61.4}$ (atom %) | $(ZrO_2)_{15}(SiO_2)_{15}(In_2O_3)_{70}$ (mol %) | D |

In disc Nos. 10-101 to 10-111, results of very good reproduction durability were obtained in all discs, as compared with Comparative Example 1-1, and the effect of improving the reproduction durability in the information recording medium according to the embodiment of the present invention could be confirmed.

Example 11

In the present example, another example of information recording medium 100 shown in the FIGURE is described. The following is a method for producing information recording medium 100 of the present example.

First, a configuration of A-side information recording medium 101 is described.

As substrate 1, the same substrate as in Example 1 was used. The configuration and production method of L0 layer 10 are the same as in Example 1.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. The configuration and production method of L1 layer 20 are the same as in Example 10.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A dielectric film of 15 nm according to the embodiment of the present invention as first dielectric film 31 using a target according to each composition described in Tables 29 and 30, a film of $W_{32}Cu_{17}Ta_{22}Zn_{11}Mn_{18}$—O of 34 nm as recording film 32 using a target substantially composed of $W_{32}Cu_{17}Ta_{22}Zn_{11}Mn_{18}$—O, and a dielectric film of 13 nm according to the embodiment of the present invention as second dielectric film 33 using a target according to each composition described in Tables 29 and 30 were sequentially formed by a sputtering.

Film thickness of first dielectric film 31 and second dielectric film 33 was determined by calculation based on a matrix method. Specifically, it was set that, in laser beam 6 having a wavelength of 405 nm, L2 layer 30 had, in an unrecorded state of recording film 32, a reflectance $R_g$ of nearly equal to 5.8%, a reflectance $R_I$ of nearly equal to 6.1%, and a transmittance of about 80%.

Further, formation of first dielectric film 31 was performed in an Ar atmosphere (flow rate: 12 sccm), using a pulse DC power source (4 kW). Formation of recording film 32 was performed in an Ar and $O_2$ mixed-gas atmosphere (flow rate: 12+36 sccm), using a pulse DC power source. Formation of second dielectric film 33 was performed in an Ar atmosphere (flow rate: 12 sccm), using a pulse DC power source (3 kW).

Thereafter, an ultraviolet-curable resin was applied onto second dielectric film 33, followed by spin coating, and was then cured with ultraviolet light, to form cover layer 4 having a thickness of about 57 μm, thereby preparing A-side information recording medium 101.

Next, a configuration of B-side information recording medium 102 is described.

As substrate 1, the same substrate as in Example 1 was used. The configuration and production method of L0 layer 10 are the same as in Example 10.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. The configuration and production method of L1 layer 20 are the same as in Example 10.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A dielectric film of 15 nm according to the embodiment of the present invention as first dielectric film 31 using a target according to each composition described in Tables 31 and 32, a film of $W_{32}Cu_{17}Ta_{22}Zn_{11}Mn_{18}$—O of 34 nm as recording film 32 using a target substantially composed of $W_{32}Cu_{17}Ta_{22}Zn_{11}Mn_{18}$—O, and a dielectric film of 11 nm according to the embodiment of the present invention as second dielectric film 33 using a target according to each composition described in Tables 31 and 32 were sequentially formed by a sputtering.

Film thickness of first dielectric film 31 and second dielectric film 33 was determined by calculation based on a matrix method. Specifically, it was set that, in laser beam 6 having a wavelength of 405 nm, L2 layer 30 had, in an unrecorded state of recording film 32, a reflectance $R_g$ of nearly equal to 5.8%, a reflectance $R_I$ of nearly equal to 6.1%, and a transmittance of about 80%.

Further, formation of first dielectric film 31 was performed in an Ar atmosphere (flow rate: 12 sccm), using a pulse DC power source (4 kW). Formation of recording film 32 was performed in an Ar and $O_2$ mixed-gas atmosphere (flow rate: 12+36 sccm), using a pulse DC power source (5 kW). Formation of second dielectric film 33 was performed in an Ar atmosphere (flow rate: 12 sccm), using a pulse DC power source (3 kW).

Thereafter, an ultraviolet-curable resin was applied onto second dielectric film 33, followed by spin coating, and was then cured with ultraviolet light, to form cover layer 4 having a thickness of about 57 μM, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 100 were prepared in which $Zr_{9.5}Mg_{0.6}Zn_{20.1}Sn_{10.1}O_{59.7}$ (atom %), $Zr_{9.0}Mg_{0.6}Zn_{14.4}Sn_{14.4}O_{61.6}$ (atom %), $Zr_{9.2}Mg_{0.6}Zn_{18.6}Sn_{9.8}Ga_{2.0}O_{59.8}$ (atom %), $Zr_{8.8}Mg_{0.6}Zn_{13.0}Zn_{14.0}Ga_{2.0}O_{61.6}$ (atom %), $Zr_{9.2}Mg_{0.8}Zn_{19.5}Sn_{10.0}Ga_{0.9}O_{59.6}$ (atom %), $Zr_{8.8}Mg_{0.8}Zn_{14.0}Sn_{14.3}Ga_{0.8}O_{61.3}$ (atom %), $Zr_{13.2}Mg_{1.2}Zn_{14.0}Sn_{9.6}Ga_{0.6}O_{61.4}$ (atom %), $Zr_{7.3}Mg_{0.6}Zn_{19.4}Sn_{11.9}Ga_{0.9}O_{59.9}$ (atom %), $Zr_{11.0}Mg_{1.0}Zn_{19.5}Sn_{8.0}Ga_{0.9}O_{59.6}$ (atom %), $Zr_{9.2}Ca_{0.8}Zn_{19.5}Sn_{10.0}Ga_{0.9}O_{59.6}$ (atom %), and $Zr_{9.2}Mg_{0.8}Zn_{19.5}Sn_{10.0}Al_{0.9}O_{59.6}$ (atom %) were applied to first dielectric films 31 and second dielectric films 33 of A-side information recording medium 101 and B-side information recording medium 102. Nos. of these discs are defined as 10-201 to 10-211, respectively.

In these 10-201 to 10-211 and Comparative Example 1-1, evaluation of reproduction durability at octuple speed was performed as described in Example 2.

Tables 29 and 30 show the results in A-side information recording medium 101.

TABLE 29

| Disc No. | A-side information recording medium 101 First dielectric film 31 Expression by atom % | A-side information recording medium 101 Second dielectric film 33 | Reproduction durability of L2 layer 30 (Δd-MLSE) |
|---|---|---|---|
| 10-201 | $Zr_{9.5}Mg_{0.6}Zn_{20.1}Sn_{10.1}O_{59.7}$ (atom %) | $Zr_{9.5}Mg_{0.6}Zn_{20.1}Sn_{10.1}O_{59.7}$ (atom %) | A |
| 10-202 | $Zr_{9.0}Mg_{0.6}Zn_{14.4}Sn_{14.4}O_{61.6}$ (atom %) | $Zr_{9.0}Mg_{0.6}Zn_{14.4}Sn_{14.4}O_{61.6}$ (atom %) | B |
| 10-203 | $Zr_{9.2}Mg_{0.6}Zn_{18.6}Sn_{9.8}Ga_{2.0}O_{59.8}$ (atom %) | $Zr_{9.2}Mg_{0.6}Zn_{18.6}Sn_{9.8}Ga_{2.0}O_{59.8}$ (atom %) | A |
| 10-204 | $Zr_{8.8}Mg_{0.6}Zn_{13.0}Sn_{14.0}Ga_{2.0}O_{61.6}$ (atom %) | $Zr_{8.8}Mg_{0.6}Zn_{13.0}Sn_{14.0}Ga_{2.0}O_{61.6}$ (atom %) | B |
| 10-205 | $Zr_{9.2}Mg_{0.8}Zn_{19.5}Sn_{10.0}Ga_{0.9}O_{59.6}$ (atom %) | $Zr_{9.2}Mg_{0.8}Zn_{19.5}Sn_{10.0}Ga_{0.9}O_{59.6}$ (atom %) | A |
| 10-206 | $Zr_{8.8}Mg_{0.8}Zn_{14.0}Sn_{14.3}Ga_{0.8}O_{61.3}$ (atom %) | $Zr_{8.8}Mg_{0.8}Zn_{14.0}Sn_{14.3}Ga_{0.8}O_{61.3}$ (atom %) | A |
| 10-207 | $Zr_{13.2}Mg_{1.2}Zn_{14.0}Sn_{9.6}Ga_{0.6}O_{61.4}$ (atom %) | $Zr_{13.2}Mg_{1.2}Zn_{14.0}Sn_{9.6}Ga_{0.6}O_{61.4}$ (atom %) | A |
| 10-208 | $Zr_{7.3}Mg_{0.6}Zn_{19.4}Sn_{11.9}Ga_{0.9}O_{59.9}$ (atom %) | $Zr_{7.3}Mg_{0.6}Zn_{19.4}Sn_{11.9}Ga_{0.9}O_{59.9}$ (atom %) | B |
| 10-209 | $Zr_{11.0}Mg_{1.0}Zn_{19.5}Sn_{8.0}Ga_{0.9}O_{59.6}$ (atom %) | $Zr_{11.0}Mg_{1.0}Zn_{19.5}Sn_{8.0}Ga_{0.9}O_{59.6}$ (atom %) | A |
| 10-210 | $Zr_{9.2}Ca_{0.8}Zn_{19.5}Sn_{10.0}Ga_{0.9}O_{59.6}$ (atom %) | $Zr_{9.2}Ca_{0.8}Zn_{19.5}Sn_{10.0}Ga_{0.9}O_{59.6}$ (atom %) | B |
| 10-211 | $Zr_{9.2}Mg_{0.8}Zn_{19.5}Sn_{10.0}Al_{0.9}O_{59.6}$ (atom %) | $Zr_{9.2}Mg_{0.8}Zn_{19.5}Sn_{10.0}Al_{0.9}O_{59.6}$ (atom %) | A |
| Comparative Example 1-1 | $Zr_{3.4}Si_{3.4}In_{31.8}O_{61.4}$ (atom %) | $Z_{6.3}Si_{6.3}In_{25}O_{62.4}$ (atom %) | D |

TABLE 30

| Disc No. | A-side information recording medium 101 First dielectric film 31 | A-side information recording medium 101 Second dielectric film 33 |
|---|---|---|
| | Expression by mol % | |
| 10-201 | $(ZrO_2)_{23.5}(MgO)_{1.5}(ZnO)_{50}(SnO_2)_{25}$ (mol %) | $(ZrO_2)_{23.5}(MgO)_{1.5}(ZnO)_{50}(SnO_2)_{25}$ (mol %) |
| 10-202 | $(ZrO_2)_{23.5}(MgO)_{1.5}(ZnO)_{37.5}(SnO_2)_{37.5}$ (mol %) | $(ZrO_2)_{23.5}(MgO)_{1.5}(ZnO)_{37.5}(SnO_2)_{37.5}$ (mol %) |
| 10-203 | $(ZrO_2)_{23.5}(MgO)_{1.5}(ZnO)_{47.5}(SnO_2)_{25}(Ga_2O_3)_{2.5}$ (mol %) | $(ZrO_2)_{23.5}(MgO)_{1.5}(ZnO)_{47.5}(SnO_2)_{25}(Ga_2O_3)_{2.5}$ (mol %) |
| 10-204 | $(ZrO_2)_{23.5}(MgO)_{1.5}(ZnO)_{35}(SnO_2)_{37.5}(Ga_2O_3)_{2.5}$ (mol %) | $(ZrO_2)_{23.5}(MgO)_{1.5}(ZnO)_{35}(SnO_2)_{37.5}(Ga_2O_3)_{2.5}$ (mol %) |
| 10-205 | $(ZrO_2)_{23}(MgO)_{2}(ZnO)_{48.9}(SnO_2)_{25}(Ga_2O_3)_{1.1}$ (mol %) | $(ZrO_2)_{23}(MgO)_{2}(ZnO)_{48.9}(SnO_2)_{25}(Ga_2O_3)_{1.1}$ (mol %) |
| 10-206 | $(ZrO_2)_{23}(MgO)_{2}(ZnO)_{36.7}(SnO_2)_{37.5}(Ga_2O_3)_{0.8}$ (mol %) | $(ZrO_2)_{23}(MgO)_{2}(ZnO)_{36.7}(SnO_2)_{37.5}(Ga_2O_3)_{0.8}$ (mol %) |
| 10-207 | $(ZrO_2)_{34.5}(MgO)_{3}(ZnO)_{36.7}(SnO_2)_{25}(Ga_2O_3)_{0.8}$ (mol %) | $(ZrO_2)_{34.5}(MgO)_{3}(ZnO)_{36.7}(SnO_2)_{25}(Ga_2O_3)_{0.8}$ (mol %) |
| 10-208 | $(ZrO_2)_{18.4}(MgO)_{1.6}(ZnO)_{48.9}(SnO_2)_{30}(Ga_2O_3)_{1.1}$ (mol %) | $(ZrO_2)_{18.4}(MgO)_{1.6}(ZnO)_{48.9}(SnO_2)_{30}(Ga_2O_3)_{1.1}$ (mol %) |
| 10-209 | $(ZrO_2)_{27.6}(MgO)_{2.4}(ZnO)_{48.9}(SnO_2)_{20}(Ga_2O_3)_{1.1}$ (mol %) | $(ZrO_2)_{27.6}(MgO)_{2.4}(ZnO)_{48.9}(SnO_2)_{20}(Ga_2O_3)_{1.1}$ (mol %) |
| 10-210 | $(ZrO_2)_{23}(CaO)_{2}(ZnO)_{48.9}(SnO_2)_{25}(Ga_2O_3)_{1.1}$ (mol %) | $(ZrO_2)_{23}(CaO)_{2}(ZnO)_{48.9}(SnO_2)_{25}(Ga_2O_3)_{1.1}$ (mol %) |
| 10-211 | $(ZrO_2)_{23}(MgO)_{2}(ZnO)_{48.9}(SnO_2)_{25}(Al_2O_3)_{1.1}$ (mol %) | $(ZrO_2)_{23}(MgO)_{2}(ZnO)_{48.9}(SnO_2)_{25}(Al_2O_3)_{1.1}$ (mol %) |
| Comparative Example 1-1 | $(ZrO_2)_{15}(SiO_2)_{15}(In_2O_3)_{70}$ (mol %) | $(ZrO_2)_{25}(SiO_2)_{25}(In_2O_3)_{50}$ (mol %) |

In disc Nos. 10-201 to 10-211, results of very good reproduction durability were obtained in all discs, as compared with Comparative Example 1-1, and the effect of improving the reproduction durability in the information recording medium according to the embodiment of the present invention could be confirmed.

Tables 31 and 32 show the results in B-side information recording medium 102.

TABLE 31

| Disc No. | B-side information recording medium 102 First dielectric film 31 | B-side information recording medium 102 Second dielectric film 33 | Reproduction durability of L2 layer 30 (Δd-MLSE) |
|---|---|---|---|
| | Expression by atom % | | |
| 10-201 | $Zr_{9.5}Mg_{0.6}Zn_{20.1}Sn_{10.1}O_{59.7}$ (atom %) | $Zr_{9.5}Mg_{0.6}Zn_{20.1}Sn_{10.1}O_{59.7}$ (atom %) | A |
| 10-202 | $Zr_{9.0}Mg_{0.6}Zn_{14.4}Sn_{14.4}O_{61.6}$ (atom %) | $Zr_{9.0}Mg_{0.6}Zn_{14.4}Sn_{14.4}O_{61.6}$ (atom %) | B |
| 10-203 | $Zr_{9.2}Mg_{0.6}Zn_{18.6}Sn_{9.8}Ga_{2.0}O_{59.8}$ (atom %) | $Zr_{9.2}Mg_{0.6}Zn_{18.6}Sn_{9.8}Ga_{2.0}O_{59.8}$ (atom %) | A |
| 10-204 | $Zr_{8.8}Mg_{0.6}Zn_{13.0}Sn_{14.0}Ga_{2.0}O_{61.6}$ (atom %) | $Zr_{8.8}Mg_{0.6}Zn_{13.0}Sn_{14.0}Ga_{2.0}O_{61.6}$ (atom %) | B |
| 10-205 | $Zr_{9.2}Mg_{0.8}Zn_{19.5}Sn_{10.0}Ga_{0.9}O_{59.6}$ (atom %) | $Zr_{9.2}Mg_{0.8}Zn_{19.5}Sn_{10.0}Ga_{0.9}O_{59.6}$ (atom %) | A |
| 10-206 | $Zr_{8.8}Mg_{0.8}Zn_{14.0}Sn_{14.3}Ga_{0.8}O_{61.3}$ (atom %) | $Zr_{8.8}Mg_{0.8}Zn_{14.0}Sn_{14.3}Ga_{0.8}O_{61.3}$ (atom %) | A |
| 10-207 | $Zr_{13.2}Mg_{1.2}Zn_{14.0}Sn_{9.6}Ga_{0.6}O_{61.4}$ (atom %) | $Zr_{13.2}Mg_{1.2}Zn_{14.0}Sn_{9.6}Ga_{0.6}O_{61.4}$ (atom %) | A |
| 10-208 | $Zr_{7.3}Mg_{0.6}Zn_{19.4}Sn_{11.9}Ga_{0.9}O_{59.9}$ (atom %) | $Zr_{7.3}Mg_{0.6}Zn_{19.4}Sn_{11.9}Ga_{0.9}O_{59.9}$ (atom %) | B |
| 10-209 | $Zr_{11.0}Mg_{1.0}Zn_{19.5}Sn_{8.0}Ga_{0.9}O_{59.6}$ (atom %) | $Zr_{11.0}Mg_{1.0}Zn_{19.5}Sn_{8.0}Ga_{0.9}O_{59.6}$ (atom %) | A |
| 10-210 | $Zr_{9.2}Ca_{0.8}Zn_{19.5}Sn_{10.0}Ga_{0.9}O_{59.6}$ (atom %) | $Zr_{9.2}Ca_{0.8}Zn_{19.5}Sn_{10.0}Ga_{0.9}O_{59.6}$ (atom %) | B |
| 10-211 | $Zr_{9.2}Mg_{0.8}Zn_{19.5}Sn_{10.0}Al_{0.9}O_{59.6}$ (atom %) | $Zr_{9.2}Mg_{0.8}Zn_{19.5}Sn_{10.0}Al_{0.9}O_{59.6}$ (atom %) | A |
| Comparative Example 1-1 | $Zr_{3.4}Si_{3.4}In_{31.8}O_{61.4}$ (atom %) | $Z_{6.3}Si_{6.3}In_{25}O_{62.4}$ (atom %) | D |

TABLE 32

| Disc No. | B-side information recording medium 102 First dielectric film 31 | B-side information recording medium 102 Second dielectric film 33 |
|---|---|---|
| | Expression by mol % | |
| 10-201 | $(ZrO_2)_{23.5}(MgO)_{1.5}(ZnO)_{50}(SnO_2)_{25}$ (mol %) | $(ZrO_2)_{23.5}(MgO)_{1.5}(ZnO)_{50}(SnO_2)_{25}$ (mol %) |
| 10-202 | $(ZrO_2)_{23.5}(MgO)_{1.5}(ZnO)_{37.5}(SnO_2)_{37.5}$ (mol %) | $(ZrO_2)_{23.5}(MgO)_{1.5}(ZnO)_{37.5}(SnO_2)_{37.5}$ (mol %) |
| 10-203 | $(ZrO_2)_{23.5}(MgO)_{1.5}(ZnO)_{47.5}(SnO_2)_{25}(Ga_2O_3)_{2.5}$ (mol %) | $(ZrO_2)_{23.5}(MgO)_{1.5}(ZnO)_{47.5}(SnO_2)_{25}(Ga_2O_3)_{2.5}$ (mol %) |
| 10-204 | $(ZrO_2)_{23.5}(MgO)_{1.5}(ZnO)_{35}(SnO_2)_{37.5}(Ga_2O_3)_{2.5}$ (mol %) | $(ZrO_2)_{23.5}(MgO)_{1.5}(ZnO)_{35}(SnO_2)_{37.5}(Ga_2O_3)_{2.5}$ (mol %) |
| 10-205 | $(ZrO_2)_{23}(MgO)_{2}(ZnO)_{48.9}(SnO_2)_{25}(Ga_2O_3)_{1.1}$ (mol %) | $(ZrO_2)_{23}(MgO)_{2}(ZnO)_{48.9}(SnO_2)_{25}(Ga_2O_3)_{1.1}$ (mol %) |
| 10-206 | $(ZrO_2)_{23}(MgO)_{2}(ZnO)_{36.7}(SnO_2)_{37.5}(Ga_2O_3)_{0.8}$ (mol %) | $(ZrO_2)_{23}(MgO)_{2}(ZnO)_{36.7}(SnO_2)_{37.5}(Ga_2O_3)_{0.8}$ (mol %) |
| 10-207 | $(ZrO_2)_{34.5}(MgO)_{3}(ZnO)_{36.7}(SnO_2)_{25}(Ga_2O_3)_{0.8}$ (mol %) | $(ZrO_2)_{34.5}(MgO)_{3}(ZnO)_{36.7}(SnO_2)_{25}(Ga_2O_3)_{0.8}$ (mol %) |
| 10-208 | $(ZrO_2)_{18.4}(MgO)_{1.6}(ZnO)_{48.9}(SnO_2)_{30}(Ga_2O_3)_{1.1}$ (mol %) | $(ZrO_2)_{18.4}(MgO)_{1.6}(ZnO)_{48.9}(SnO_2)_{30}(Ga_2O_3)_{1.1}$ (mol %) |
| 10-209 | $(ZrO_2)_{27.6}(MgO)_{2.4}(ZnO)_{48.9}(SnO_2)_{20}(Ga_2O_3)_{1.1}$ (mol %) | $(ZrO_2)_{27.6}(MgO)_{2.4}(ZnO)_{48.9}(SnO_2)_{20}(Ga_2O_3)_{1.1}$ (mol %) |
| 10-210 | $(ZrO_2)_{23}(CaO)_{2}(ZnO)_{48.9}(SnO_2)_{25}(Ga_2O_3)_{1.1}$ (mol %) | $(ZrO_2)_{23}(CaO)_{2}(ZnO)_{48.9}(SnO_2)_{25}(Ga_2O_3)_{1.1}$ (mol %) |
| 10-211 | $(ZrO_2)_{23}(MgO)_{2}(ZnO)_{48.9}(SnO_2)_{25}(Al_2O_3)_{1.1}$ (mol %) | $(ZrO_2)_{23}(MgO)_{2}(ZnO)_{48.9}(SnO_2)_{25}(Al_2O_3)_{1.1}$ (mol %) |
| Comparative Example 1-1 | $(ZrO_2)_{15}(SiO_2)_{15}(In_2O_3)_{70}$ (mol %) | $(ZrO_2)_{25}(SiO_2)_{25}(In_2O_3)_{50}$ (mol %) |

Example 12

In the present example, another example of information recording medium 100 shown in the FIGURE is described. The following is a method for producing information recording medium 100 of the present example.

As substrate 1, the same substrate as in Example 1 was used. The configuration and production method of L0 layer 10 are the same as in Example 10.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A dielectric film of 17 nm according to the embodiment of the present invention as first dielectric film 21 of L1 layer 20 using a target according to each composition described in Table 33, a film of $W_{31}Cu_{18}Ta_{16}Zn_{16}Mn_{19}$—O of 35 nm as recording film 22 using a target substantially composed of $W_{31}Cu_{18}Ta_{16}Zn_{16}Mn_{19}$—O according to the embodiment of the present invention, and a film of $(ZrO_2)_{25}(SiO_2)_{25}(In_2O_3)_{50}$ (mol %) of 13 nm as second dielectric film 23 using a target substantially composed of $(ZrO_2)_{25}(SiO_2)_{25}(In_2O_3)_{50}$ (mol %) were sequentially formed by a sputtering.

In laser beam 6 having a wavelength of 405 nm, L1 layer 20 in the absence of L2 layer 30 has, in an unrecorded state of recording film 22, a reflectance $R_g$ of nearly equal to 6.0%, a reflectance R of nearly equal to 6.3%, and a transmittance of about 77%.

Further, formation of first dielectric film 21 was performed in an Ar atmosphere (flow rate: 12 sccm), using a pulse DC power source (4 kW). Formation of recording film 22 was performed in an Ar and $O_2$ mixed-gas atmosphere (flow rate: 12+36 sccm), using a pulse DC power source (5 kW). Formation of second dielectric film 23 was performed in an Ar atmosphere (flow rate: 12 sccm), using a DC power source (2 kW).

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A film of $(ZrO_2)_{23}(MgO)_2(ZnO)_{48.9}(SnO_2)_{25}(Ga_2O_3)_{1.1}$ (mol %) of 15 nm as first dielectric film 31 using a target substantially composed of $(ZrO_2)_{23}(MgO)_2(ZnO)_{48.9}(SnO_2)_{25}(Ga_2O_3)_{1.1}$ (mol %), a film of $W_{32}Cu_{17}Ta_{16}Zn_{17}Mn_{18}$—O of 34 nm as recording film 32 using a target substantially composed of $W_{32}Cu_{17}Ta_{16}Zn_{17}Mn_{18}$—O, and a film of $(ZrO_2)_{25}(SiO_2)_{25}(In_2O_3)_{50}$ (mol %) of 13 nm as second dielectric film 33 using a target substantially composed of $(ZrO_2)_{25}(SiO_2)_{25}(In_2O_3)_{50}$ (mol %) were sequentially formed by a sputtering.

It was set that, in laser beam 6 having a wavelength of 405 nm, L2 layer 30 had, in an unrecorded state of recording film 32, a reflectance $R_g$ of nearly equal to 5.8%, a reflectance $R_l$ of nearly equal to 6.1%, and a transmittance of about 80%.

Further, formation of first dielectric film 31 was performed in an Ar atmosphere (flow rate: 12 sccm), using a pulse DC power source (4 kW). Formation of recording film 32 was performed in an Ar and $O_2$ mixed-gas atmosphere (flow rate: 12+36 sccm), using a pulse DC power source. Formation of second dielectric film 33 was performed in an Ar atmosphere (flow rate: 12 sccm), using a DC power source (2 kW).

Thereafter, an ultraviolet-curable resin was applied onto second dielectric film 33, followed by spin coating, and was then cured with ultraviolet light, to form cover layer 4 having a thickness of about 57 μm, thereby preparing A-side information recording medium 101.

Next, a configuration of B-side information recording medium 102 is described.

As substrate 1, the same substrate as in Example 1 was used. The configuration and production method of L0 layer 10 are the same as in Example 10.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A dielectric film of 17 nm according to the embodiment of the present invention as first dielectric film 21 of L1 layer 20 using a target according to each composition described in Table 34, a film of $W_{31}Cu_{18}Ta_{16}Zn_{16}Mn_{19}$—O of 35 nm as recording film 22 using a target substantially composed of $W_{31}Cu_{18}Ta_{16}Zn_{16}Mn_{19}$—O according to the embodiment of the present invention, and a film of $(ZrO_2)_{25}(SiO_2)_{25}(In_2O_3)_{50}$ (mol %) of 13 nm as second dielectric film 23 using a target substantially composed of $(ZrO_2)_{25}(SiO_2)_{25}(In_2O_3)_{50}$ (mol %) were sequentially formed by a sputtering.

In laser beam 6 having a wavelength of 405 nm, L1 layer 20 in the absence of L2 layer 30 has, in an unrecorded state of recording film 22, a reflectance $R_g$ of nearly equal to 6.0%, a reflectance $R_l$ of nearly equal to 6.3%, and a transmittance of about 77%.

Further, formation of first dielectric film 21 was performed in an Ar atmosphere (flow rate: 12 sccm), using a pulse DC power source (4 kW). Formation of recording film 22 was performed in an Ar and $O_2$ mixed-gas atmosphere (flow rate: 12+36 sccm), using a pulse DC power source (5 kW). Formation of second dielectric film 23 was performed in an Ar atmosphere (flow rate: 12 sccm), using a DC power source (2 kW).

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. A film of $(ZrO_2)_{23}(MgO)_2(ZnO)_{48.9}(SnO_2)_{25}(Ga_2O_3)_{1.1}$ (mol %) of 15 nm as first dielectric film 31 using a target substantially composed of $(ZrO_2)_{23}(MgO)_2(ZnO)_{48.9}(SnO_2)_{25}(Ga_2O_3)_{1.1}$ (mol %), a film of $W_{32}Cu_{17}Ta_{16}Zn_{17}Mn_{18}$—O of 34 nm as recording film 32 using a target substantially composed of $W_{32}Cu_{17}Ta_{16}Zn_{17}Mn_{18}$—O, and a film of $(ZrO_2)_{25}(SiO_2)_{25}(In_2O_3)_{50}$ (mol %) of 13 nm as second dielectric film 33 using a target substantially composed of $(ZrO_2)_{25}(SiO_2)_{25}(In_2O_3)_{50}$ (mol %) were sequentially formed by a sputtering.

Film thickness of first dielectric film 31 and second dielectric film 33 was determined by calculation based on a matrix method. Specifically, it was set that, in laser beam 6 having a wavelength of 405 nm, L2 layer 30 had, in an unrecorded state of recording film 32, a reflectance $R_g$ of nearly equal to 5.8%, a reflectance $R_l$ of nearly equal to 6.1%, and a transmittance of about 80%.

Further, formation of first dielectric film 31 was performed in an Ar atmosphere (flow rate: 12 sccm), using a pulse DC power source (4 kW). Formation of recording film 32 was performed in an Ar and $O_2$ mixed-gas atmosphere (flow rate: 12+36 sccm), using a pulse DC power source (5 kW). Formation of second dielectric film 33 was performed in an Ar atmosphere (flow rate: 12 sccm), using a DC power source (2 kW).

Thereafter, an ultraviolet-curable resin was applied onto second dielectric film 33, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 100 were prepared in which $Zr_{9.5}Mg_{0.6}Zn_{20.1}Sn_{10.1}O_{59.7}$ (atom %), $Zr_{9.0}Mg_{0.6}Zn_{14.4}Sn_{14.4}O_{61.6}$ (atom %), $Zr_{9.2}Mg_{0.66}Zn_{18.6}Sn_{9.8}Ga_{2.0}O_{59.8}$ (atom %), $Zr_{8.8}Mg_{0.6}Zn_{13.0}Sn_{14.0}Ga_{2.0}O_{61.6}$ (atom %), $Zr_{9.2}Mg_{0.8}Zn_{19.5}Sn_{10.0}Ga_{0.9}O_{59.6}$ (atom %), $Zr_{8.8}Mg_{0.8}Zn_{14.0}Sn_{14.3}Ga_{0.8}O_{61.3}$ (atom %), $Zr_{13.2}Mg_{1.2}Zn_{14.0}Sn_{9.6}Ga_{0.6}O_{61.4}$ (atom %), $Zr_{7.3}Mg_{0.66}Zn_{19.4}Sn_{11.9}Ga_{0.9}O_{59.9}$ (atom %), $Zr_{11.0}Mg_{1.0}Zn_{19.5}Sn_{8.0}Ga_{0.9}O_{59.6}$ (atom %), $Zr_{9.2}Ca_{0.8}Zn_{9.5}Sn_{10.0}Ga_{0.9}O_{59.6}$ (atom %), and $Zr_{9.2}Mg_{0.8}Zn_{19.5}Sn_{10.0}Al_{0.9}O_{59.6}$ (atom %) were applied to first dielectric films 21 of A-side information recording medium 101 and B-side information recording medium 102. Nos. of these discs are defined as 11-101 to 11-111, respectively.

In these 11-101 to 11-111 and Comparative Example 2-1, evaluation of reproduction durability at octuple speed was performed as described in Example 5.

Table 33 shows the results in A-side information recording medium 101.

TABLE 33

| Disc No. | A-side information recording medium 101 First dielectric film 21 | | Reproduction durability of L1 layer 20 (Δd-MLSE) |
|---|---|---|---|
| | Expression by atom % | Expression by mol % | |
| 11-101 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | A |
| 11-102 | $Zr_{9.0}Mg_{0.6}Zn_{14.4}Sn_{14.4}O_{61.6}$ (atom %) | $(ZrO_2)_{23.5}(MgO)_{1.5}(ZnO)_{37.5}(SnO_2)_{37.5}$ (mol %) | B |
| 11-103 | $Zr_{9.2}Mg_{0.6}Zn_{18.6}Sn_{9.8}Ga_{2.0}O_{59.8}$ (atom %) | $(ZrO_2)_{23.5}(MgO)_{1.5}(ZnO)_{47.5}(SnO_2)_{25}(Ga_2O_3)_{2.5}$ (mol %) | A |
| 11-104 | $Zr_{8.8}Mg_{0.6}Zn_{13.0}Sn_{14.0}Ga_{2.0}O_{61.6}$ (atom %) | $(ZrO_2)_{23.5}(MgO)_{1.5}(ZnO)_{35}(SnO_2)_{37.5}(Ga_2O_3)_{2.5}$ (mol %) | B |
| 11-105 | $Zr_{9.2}Mg_{0.8}Zn_{19.5}Sn_{10.0}Ga_{0.9}O_{59.6}$ (atom %) | $(ZrO_2)_{23}(MgO)_{2}(ZnO)_{48.9}(SnO_2)_{25}(Ga_2O_3)_{1.1}$ (mol %) | A |
| 11-106 | $Zr_{8.8}Mg_{0.8}Zn_{14.0}Sn_{14.3}Ga_{0.8}O_{61.3}$ (atom %) | $(ZrO_2)_{23}(MgO)_{2}(ZnO)_{36.7}(SnO_2)_{37.5}(Ga_2O_3)_{0.8}$ (mol %) | A |
| 11-107 | $Zr_{13.2}Mg_{1.2}Zn_{14.0}Sn_{9.6}Ga_{0.6}O_{61.4}$ (atom %) | $(ZrO_2)_{34.5}(MgO)_{3}(ZnO)_{36.7}(SnO_2)_{25}(Ga_2O_3)_{0.8}$ (mol %) | A |
| 11-108 | $Zr_{7.3}Mg_{0.6}Zn_{19.4}Sn_{11.9}Ga_{0.9}O_{59.9}$ (atom %) | $(ZrO_2)_{18.4}(MgO)_{1.6}(ZnO)_{48.9}(SnO_2)_{30}(Ga_2O_3)_{1.1}$ (mol %) | B |
| 11-109 | $Zr_{11.0}Mg_{1.0}Zn_{19.5}Sn_{8.0}Ga_{0.9}O_{59.6}$ (atom %) | $(ZrO_2)_{27.6}(MgO)_{2.4}(ZnO)_{48.9}(SnO_2)_{20}(Ga_2O_3)_{1.1}$ (mol %) | A |
| 11-110 | $Zr_{9.2}Ca_{0.8}Zn_{19.5}Sn_{10.0}Ga_{0.9}O_{59.6}$ (atom %) | $(ZrO_2)_{23}(CaO)_{2}(ZnO)_{48.9}(SnO_2)_{25}(Ga_2O_3)_{1.1}$ (mol %) | B |
| 11-111 | $Zr_{9.2}Mg_{0.8}Zn_{19.5}Sn_{10.0}Al_{0.9}O_{59.6}$ (atom %) | $(ZrO_2)_{23}(MgO)_{2}(ZnO)_{48.9}(SnO_2)_{25}(Al_2O_3)_{1.1}$ (mol %) | A |
| Comparative Example 2-1 | $Zr_{3.4}Si_{3.4}In_{31.8}O_{61.4}$ (atom %) | $(ZrO_2)_{15}(SiO_2)_{15}(In_2O_3)_{70}$ (mol %) | D |

In disc Nos. 11-101 to 11-111, results of very good reproduction durability were obtained in all discs, as compared with Comparative Example 2-1, and the effect of improving the reproduction durability in the information recording medium according to the embodiment of the present invention could be confirmed.

Table 34 shows the results in B-side information recording medium 102.

TABLE 34

| Disc No. | B-side information recording medium 102 First dielectric film 21 | | Reproduction durability of L1 layer 20 (Δd-MLSE) |
|---|---|---|---|
| | Expression by atom % | Expression by mol % | |
| 11-101 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | A |
| 11-102 | $Zr_{9.0}Mg_{0.6}Zn_{14.4}Sn_{14.4}O_{61.6}$ (atom %) | $(ZrO_2)_{23.5}(MgO)_{1.5}(ZnO)_{37.5}(SnO_2)_{37.5}$ (mol %) | B |
| 11-103 | $Zr_{9.2}Mg_{0.6}Zn_{18.6}Sn_{9.8}Ga_{2.0}O_{59.8}$ (atom %) | $(ZrO_2)_{23.5}(MgO)_{1.5}(ZnO)_{47.5}(SnO_2)_{25}(Ga_2O_3)_{2.5}$ (mol %) | A |
| 11-104 | $Zr_{8.8}Mg_{0.6}Zn_{13.0}Sn_{14.0}Ga_{2.0}O_{61.6}$ (atom %) | $(ZrO_2)_{23.5}(MgO)_{1.5}(ZnO)_{35}(SnO_2)_{37.5}(Ga_2O_3)_{2.5}$ (mol %) | B |
| 11-105 | $Zr_{9.2}Mg_{0.8}Zn_{19.5}Sn_{10.0}Ga_{0.9}O_{59.6}$ (atom %) | $(ZrO_2)_{23}(MgO)_{2}(ZnO)_{48.9}(SnO_2)_{25}(Ga_2O_3)_{1.1}$ (mol %) | A |
| 11-106 | $Zr_{8.8}Mg_{0.8}Zn_{14.0}Sn_{14.3}Ga_{0.8}O_{61.3}$ (atom %) | $(ZrO_2)_{23}(MgO)_{2}(ZnO)_{36.7}(SnO_2)_{37.5}(Ga_2O_3)_{0.8}$ (mol %) | A |
| 11-107 | $Zr_{13.2}Mg_{1.2}Zn_{14.0}Sn_{9.6}Ga_{0.6}O_{61.4}$ (atom %) | $(ZrO_2)_{34.5}(MgO)_{3}(ZnO)_{36.7}(SnO_2)_{25}(Ga_2O_3)_{0.8}$ (mol %) | A |
| 11-108 | $Zr_{7.3}Mg_{0.6}Zn_{19.4}Sn_{11.9}Ga_{0.9}O_{59.9}$ (atom %) | $(ZrO_2)_{18.4}(MgO)_{1.6}(ZnO)_{48.9}(SnO_2)_{30}(Ga_2O_3)_{1.1}$ (mol %) | B |
| 11-109 | $Zr_{11.0}Mg_{1.0}Zn_{19.5}Sn_{8.0}Ga_{0.9}O_{59.6}$ (atom %) | $(ZrO_2)_{27.6}(MgO)_{2.4}(ZnO)_{48.9}(SnO_2)_{20}(Ga_2O_3)_{1.1}$ (mol %) | A |
| 11-110 | $Zr_{9.2}Ca_{0.8}Zn_{19.5}Sn_{10.0}Ga_{0.9}O_{59.6}$ (atom %) | $(ZrO_2)_{23}(CaO)_{2}(ZnO)_{48.9}(SnO_2)_{25}(Ga_2O_3)_{1.1}$ (mol %) | B |
| 11-111 | $Zr_{9.2}Mg_{0.8}Zn_{19.5}Sn_{10.0}Al_{0.9}O_{59.6}$ (atom %) | $(ZrO_2)_{23}(MgO)_{2}(ZnO)_{48.9}(SnO_2)_{25}(Al_2O_3)_{1.1}$ (mol %) | A |
| Comparative Example 2-1 | $Zr_{3.4}Si_{3.4}In_{31.8}O_{61.4}$ (atom %) | $(ZrO_2)_{15}(SiO_2)_{15}(In_2O_3)_{70}$ (mol %) | D |

In disc Nos. 11-101 to 11-111, results of very good reproduction durability were obtained in all discs, as compared with Comparative Example 2-1, and the effect of improving the reproduction durability in the information recording medium according to the embodiment of the present invention could be confirmed.

Example 13

In the present example, another example of information recording medium 100 shown in the FIGURE is described. The following is a method for producing information recording medium 100 of the present example.

First, a configuration of A-side information recording medium 101 is described.

As substrate 1, the same substrate as in Example 1 was used. The configuration and production method of L0 layer 10 are the same as in Example 10.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A dielectric film of 17 nm according to the embodiment of the present invention as first dielectric film 21 of L1 layer 20 using a target according to each composition described in Tables 35 and 36, a film of $W_{31}Cu_{18}Ta_{16}Zn_{16}Mn_{19}$—O of 35 nm as recording film 22 using a target substantially composed of $W_{31}Cu_{18}Ta_{16}Zn_{16}Mn_{19}$—O in the embodiment of the present invention, and a dielectric film of 13 nm according to the embodiment of the present invention as first dielectric film 23 using a target according to each composition described in Tables 35 and 36 were sequentially formed by a sputtering.

In laser beam 6 having a wavelength of 405 nm, L1 layer 20 in the absence of L2 layer 30 has, in an unrecorded state of recording film 22, a reflectance $R_g$ of nearly equal to 6.0%, a reflectance $R_l$ of nearly equal to 6.3%, and a transmittance of about 77%.

Further, formation of first dielectric film 21 was performed in an Ar atmosphere (flow rate: 12 sccm), using a pulse DC power source (4 kW). Formation of recording film 22 was performed in an Ar and $O_2$ mixed-gas atmosphere (flow rate: 12+36 sccm), using a pulse DC power source (5 kW). Formation of second dielectric film 23 was performed in an Ar atmosphere (flow rate: 12 sccm), using a pulse DC power source (3 kW).

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. The configuration and production method of L2 layer 30 are the same as in Example 12.

Thereafter, an ultraviolet-curable resin was applied onto second dielectric film 33, followed by spin coating, and was then cured with ultraviolet light, to form cover layer 4 having a thickness of about 57 μm, thereby preparing A-side information recording medium 101.

Next, a configuration of B-side information recording medium 102 is described.

As substrate 1, the same substrate as in Example 1 was used. The configuration and production method of L0 layer 10 are the same as in Example 10.

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. A dielectric film of 17 nm according to the embodiment of the present invention as first dielectric film 21 of L1 layer 20 using a target according to each composition described in Tables 37 and 38, a film of $W_{31}Cu_{18}Ta_{16}Zn_{16}Mn_{19}$—O of 35 nm as recording film 22 using a target substantially composed of $W_{31}Cu_{18}Ta_{16}Zn_{16}Mn_{19}$—O in the embodiment of the present invention, and a dielectric film of 13 nm according to the embodiment of the present invention as first dielectric film 23 using a target according to each composition described in Tables 37 and 38 were sequentially formed by a sputtering.

In laser beam 6 having a wavelength of 405 nm, L1 layer 20 in the absence of L2 layer 30 has, in an unrecorded state of recording film 22, a reflectance $R_g$ of nearly equal to 6.0%, a reflectance $R_l$ of nearly equal to 6.3%, and a transmittance of about 77%.

Further, formation of first dielectric film 21 was performed in an Ar atmosphere (flow rate: 12 sccm), using a pulse DC power source (4 kW). Formation of recording film 22 was performed in an Ar and $O_2$ mixed-gas atmosphere (flow rate: 12+36 sccm), using a pulse DC power source (5 kW). Formation of second dielectric film 23 was performed in an Ar atmosphere (flow rate: 12 sccm), using a pulse DC power source (3 kW).

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. The configuration and production method of L2 layer 30 are the same as in Example 12.

Thereafter, an ultraviolet-curable resin was applied onto second dielectric film 33, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 100 were prepared in which $Zr_{9.5}Mg_{0.6}Zn_{20.1}Sn_{10.1}O_{59.7}$ (atom %), $Zr_{9.0}Mg_{0.66}Zn_{14.4}Sn_{14.4}O_{61.6}$ (atom %), $Zr_{9.2}Mg_{0.6}Zn_{18.6}Sn_{9.8}Ga_{2.0}O_{59.8}$ (atom %), $Zr_{8.8}Mg_{0.6}Zn_{13.0}Sn_{14.0}Ga_{2.0}O_{61.6}$ (atom %), $Zr_{9.2}Mg_{0.8}Zn_{19.5}Sn_{10.0}Ga_{0.9}O_{59.6}$ (atom %), $Zr_{8.8}Mg_{0.8}Zn_{14.0}Sn_{14.3}Ga_{0.8}O_{61.3}$ (atom %), $Zr_{13.2}Mg_{1.2}Zn_{14.0}Sn_{9.6}Ga_{0.6}O_{61.4}$ (atom %), $Zr_{7.3}Mg_{0.6}Zn_{19.4}Sn_{11.9}Ga_{0.9}O_{59.9}$ (atom %), $Zr_{11.0}Mg_{1.0}Zn_{19.5}Sn_{8.0}Ga_{0.9}O_{59.6}$ (atom %), $Zr_{9.2}Ca_{0.8}Zn_{19.5}Sn_{10.0}Ga_{0.9}O_{59.6}$ (atom %), and $Zr_{9.2}Mg_{0.8}Zn_{19.5}Sn_{10.0}Al_{0.9}O_{59.6}$ (atom %) were applied to first dielectric films 21 and second dielectric films 23 of A-side information recording medium 101 and B-side information recording medium 102. Nos. of these discs are defined as 11-201 to 11-211, respectively.

In these 11-201 to 11-211 and Comparative Example 2-1, evaluation of reproduction durability at octuple speed was performed as described in Example 5.

Tables 35 and 36 show the results in A-side information recording medium 101.

TABLE 35

| Disc No. | A-side information recording medium 101 First dielectric film 21 Expression by atom % | A-side information recording medium 101 Second dielectric film 23 | Reproduction durability of L1 layer 20 (Δd-MLSE) |
|---|---|---|---|
| 11-201 | $Zr_{9.5}Mg_{0.6}Zn_{20.1}Sn_{10.1}O_{59.7}$ (atom %) | $Zr_{9.5}Mg_{0.6}Zn_{20.1}Sn_{10.1}O_{59.7}$ (atom %) | A |
| 11-202 | $Zr_{9.0}Mg_{0.6}Zn_{14.4}Sn_{14.4}O_{61.6}$ (atom %) | $Zr_{9.0}Mg_{0.6}Zn_{14.4}Sn_{14.4}O_{61.6}$ (atom %) | B |
| 11-203 | $Zr_{9.2}Mg_{0.6}Zn_{18.6}Sn_{9.8}Ga_{2.0}O_{59.8}$ (atom %) | $Zr_{9.2}Mg_{0.6}Zn_{18.6}Sn_{9.8}Ga_{2.0}O_{59.8}$ (atom %) | A |
| 11-204 | $Zr_{8.8}Mg_{0.6}Zn_{13.0}Sn_{14.0}Ga_{2.0}O_{61.6}$ (atom %) | $Zr_{8.8}Mg_{0.6}Zn_{13.0}Sn_{14.0}Ga_{2.0}O_{61.6}$ (atom %) | B |
| 11-205 | $Zr_{9.2}Mg_{0.8}Zn_{19.5}Sn_{10.0}Ga_{0.9}O_{59.6}$ (atom %) | $Zr_{9.2}Mg_{0.8}Zn_{19.5}Sn_{10.0}Ga_{0.9}O_{59.6}$ (atom %) | A |
| 11-206 | $Zr_{8.8}Mg_{0.8}Zn_{14.0}Sn_{14.3}Ga_{0.8}O_{61.3}$ (atom %) | $Zr_{8.8}Mg_{0.8}Zn_{14.0}Sn_{14.3}Ga_{0.8}O_{61.3}$ (atom %) | A |
| 11-207 | $Zr_{13.2}Mg_{1.2}Zn_{14.0}Sn_{9.6}Ga_{0.6}O_{61.4}$ (atom %) | $Zr_{13.2}Mg_{1.2}Zn_{14.0}Sn_{9.6}Ga_{0.6}O_{61.4}$ (atom %) | A |
| 11-208 | $Zr_{7.3}Mg_{0.6}Zn_{19.4}Sn_{11.9}Ga_{0.9}O_{59.9}$ (atom %) | $Zr_{7.3}Mg_{0.6}Zn_{19.4}Sn_{11.9}Ga_{0.9}O_{59.9}$ (atom %) | B |
| 11-209 | $Zr_{11.0}Mg_{1.0}Zn_{19.5}Sn_{8.0}Ga_{0.9}O_{59.6}$ (atom %) | $Zr_{11.0}Mg_{1.0}Zn_{19.5}Sn_{8.0}Ga_{0.9}O_{59.6}$ (atom %) | A |
| 11-210 | $Zr_{9.2}Ca_{0.8}Zn_{19.5}Sn_{10.0}Ga_{0.9}O_{59.6}$ (atom %) | $Zr_{9.2}Ca_{0.8}Zn_{19.5}Sn_{10.0}Ga_{0.9}O_{59.6}$ (atom %) | B |
| 11-211 | $Zr_{9.2}Mg_{0.8}Zn_{19.5}Sn_{10.0}Al_{0.9}O_{59.6}$ (atom %) | $Zr_{9.2}Mg_{0.8}Zn_{19.5}Sn_{10.0}Al_{0.9}O_{59.6}$ (atom %) | A |
| Comparative Example 2-1 | $Zr_{3.4}Si_{3.4}In_{31.8}O_{61.4}$ (atom %) | $Z_{6.3}Si_{6.3}In_{25.0}O_{62.4}$ (atom %) | D |

TABLE 36

| Disc No. | A-side information recording medium 101 First dielectric film 21 Expression by mol % | A-side information recording medium 101 Second dielectric film 23 |
|---|---|---|
| 11-201 | $(ZrO_2)_{23.5}(MgO)_{1.5}(ZnO)_{50}(SnO_2)_{25}$ (mol %) | $(ZrO_2)_{23.5}(MgO)_{1.5}(ZnO)_{50}(SnO_2)_{25}$ (mol %) |
| 11-202 | $(ZrO_2)_{23.5}(MgO)_{1.5}(ZnO)_{37.5}(SnO_2)_{37.5}$ (mol %) | $(ZrO_2)_{23.5}(MgO)_{1.5}(ZnO)_{37.5}(SnO_2)_{37.5}$ (mol %) |
| 11-203 | $(ZrO_2)_{23.5}(MgO)_{1.5}(ZnO)_{47.5}(SnO_2)_{25}(Ga_2O_3)_{2.5}$ (mol %) | $(ZrO_2)_{23.5}(MgO)_{1.5}(ZnO)_{47.5}(SnO_2)_{25}(Ga_2O_3)_{2.5}$ (mol %) |
| 11-204 | $(ZrO_2)_{23.5}(MgO)_{1.5}(ZnO)_{35}(SnO_2)_{37.5}(Ga_2O_3)_{2.5}$ (mol %) | $(ZrO_2)_{23.5}(MgO)_{1.5}(ZnO)_{35}(SnO_2)_{37.5}(Ga_2O_3)_{2.5}$ (mol %) |
| 11-205 | $(ZrO_2)_{23}(MgO)_{2}(ZnO)_{48.9}(SnO_2)_{25}(Ga_2O_3)_{1.1}$ (mol %) | $(ZrO_2)_{23}(MgO)_{2}(ZnO)_{48.9}(SnO_2)_{25}(Ga_2O_3)_{1.1}$ (mol %) |
| 11-206 | $(ZrO_2)_{23}(MgO)_{2}(ZnO)_{36.7}(SnO_2)_{37.5}(Ga_2O_3)_{0.8}$ (mol %) | $(ZrO_2)_{23}(MgO)_{2}(ZnO)_{36.7}(SnO_2)_{37.5}(Ga_2O_3)_{0.8}$ (mol %) |
| 11-207 | $(ZrO_2)_{34.5}(MgO)_{3}(ZnO)_{36.7}(SnO_2)_{25}(Ga_2O_3)_{0.8}$ (mol %) | $(ZrO_2)_{34.5}(MgO)_{3}(ZnO)_{36.7}(SnO_2)_{25}(Ga_2O_3)_{0.8}$ (mol %) |
| 11-208 | $(ZrO_2)_{18.4}(MgO)_{1.6}(ZnO)_{48.9}(SnO_2)_{30}(Ga_2O_3)_{1.1}$ (mol %) | $(ZrO_2)_{18.4}(MgO)_{1.6}(ZnO)_{48.9}(SnO_2)_{30}(Ga_2O_3)_{1.1}$ (mol %) |
| 11-209 | $(ZrO_2)_{27.6}(MgO)_{2.4}(ZnO)_{48.9}(SnO_2)_{20}(Ga_2O_3)_{1.1}$ (mol %) | $(ZrO_2)_{27.6}(MgO)_{2.4}(ZnO)_{48.9}(SnO_2)_{20}(Ga_2O_3)_{1.1}$ (mol %) |
| 11-210 | $(ZrO_2)_{23}(CaO)_{2}(ZnO)_{48.9}(SnO_2)_{25}(Ga_2O_3)_{1.1}$ (mol %) | $(ZrO_2)_{23}(CaO)_{2}(ZnO)_{48.9}(SnO_2)_{25}(Ga_2O_3)_{1.1}$ (mol %) |
| 11-211 | $(ZrO_2)_{23}(MgO)_{2}(ZnO)_{48.9}(SnO_2)_{25}(Al_2O_3)_{1.1}$ (mol %) | $(ZrO_2)_{23}(MgO)_{2}(ZnO)_{48.9}(SnO_2)_{25}(Al_2O_3)_{1.1}$ (mol %) |
| Comparative Examnle 2-1 | $(ZrO_2)_{15}(SiO_2)_{15}(In_2O_3)_{70}$ (mol %) | $(ZrO_2)_{25}(SiO_2)_{25}(In_2O_3)_{50}$ (mol %) |

In disc Nos. 11-201 to 11-211, results of very good reproduction durability were obtained in all discs, as compared with Comparative Example 2-1, and the effect of improving the reproduction durability in the information recording medium according to the embodiment of the present invention could be confirmed.

Tables 37 and 38 show the results in B-side information recording medium 102.

TABLE 37

| Disc No. | B-side information recording medium 102 First dielectric film 21 Expression by atom % | B-side information recording medium 102 Second dielectric film 23 | Reproduction durability of L1 layer 20 (Δd-MLSE) |
|---|---|---|---|
| 11-201 | $Zr_{9.5}Mg_{0.6}Zn_{20.1}Sn_{10.1}O_{59.7}$ (atom %) | $Zr_{9.5}Mg_{0.6}Zn_{20.1}Sn_{10.1}O_{59.7}$ (atom %) | A |
| 11-202 | $Zr_{9.0}Mg_{0.6}Zn_{14.4}Sn_{14.4}O_{61.6}$ (atom %) | $Zr_{9.0}Mg_{0.6}Zn_{14.4}Sn_{14.4}O_{61.6}$ (atom %) | B |
| 11-203 | $Zr_{9.2}Mg_{0.6}Zn_{18.6}Sn_{9.8}Ga_{2.0}O_{59.8}$ (atom %) | $Zr_{9.2}Mg_{0.6}Zn_{18.6}Sn_{9.8}Ga_{2.0}O_{59.8}$ (atom %) | A |
| 11-204 | $Zr_{8.8}Mg_{0.6}Zn_{13.0}Sn_{14.0}Ga_{2.0}O_{61.6}$ (atom %) | $Zr_{8.8}Mg_{0.6}Zn_{13.0}Sn_{14.0}Ga_{2.0}O_{61.6}$ (atom %) | B |
| 11-205 | $Zr_{9.2}Mg_{0.8}Zn_{19.5}Sn_{10.0}Ga_{0.9}O_{59.6}$ (atom %) | $Zr_{9.2}Mg_{0.8}Zn_{19.5}Sn_{10.0}Ga_{0.9}O_{59.6}$ (atom %) | A |
| 11-206 | $Zr_{8.8}Mg_{0.8}Zn_{14.0}Sn_{14.3}Ga_{0.8}O_{61.3}$ (atom %) | $Zr_{8.8}Mg_{0.8}Zn_{14.0}Sn_{14.3}Ga_{0.8}O_{61.3}$ (atom %) | A |
| 11-207 | $Zr_{13.2}Mg_{1.2}Zn_{14.0}Sn_{9.6}Ga_{0.6}O_{61.4}$ (atom %) | $Zr_{13.2}Mg_{1.2}Zn_{14.0}Sn_{9.6}Ga_{0.6}O_{61.4}$ (atom %) | A |
| 11-208 | $Zr_{7.3}Mg_{0.6}Zn_{19.4}Sn_{11.9}Ga_{0.9}O_{59.9}$ (atom %) | $Zr_{7.3}Mg_{0.6}Zn_{19.4}Sn_{11.9}Ga_{0.9}O_{59.9}$ (atom %) | B |
| 11-209 | $Zr_{11.0}Mg_{1.0}Zn_{19.5}Sn_{8.0}Ga_{0.9}O_{59.6}$ (atom %) | $Zr_{11.0}Mg_{1.0}Zn_{19.5}Sn_{8.0}Ga_{0.9}O_{59.6}$ (atom %) | A |
| 11-210 | $Zr_{9.2}Ca_{0.8}Zn_{19.5}Sn_{10.0}Ga_{0.9}O_{59.6}$ (atom %) | $Zr_{9.2}Ca_{0.8}Zn_{19.5}Sn_{10.0}Ga_{0.9}O_{59.6}$ (atom %) | B |
| 11-211 | $Zr_{9.2}Mg_{0.8}Zn_{19.5}Sn_{10.0}Al_{0.9}O_{59.6}$ (atom %) | $Zr_{9.2}Mg_{0.8}Zn_{19.5}Sn_{10.0}Al_{0.9}O_{59.6}$ (atom %) | A |
| Comparative Example 2-1 | $Zr_{3.4}Si_{3.4}In_{31.8}O_{61.4}$ (atom %) | $Z_{6.3}Si_{6.3}In_{25.0}O_{62.4}$ (atom %) | D |

TABLE 38

| Disc No. | B-side information recording medium 102<br>First dielectric film 21 | B-side information recording medium 102<br>Second dielectric film 23 |
|---|---|---|
| | Expression by mol % | |
| 11-201 | $(ZrO_2)_{23.5}(MgO)_{1.5}(ZnO)_{50}(SnO_2)_{25}$ (mol %) | $(ZrO_2)_{23.5}(MgO)_{1.5}(ZnO)_{50}(SnO_2)_{25}$ (mol %) |
| 11-202 | $(ZrO_2)_{23.5}(MgO)_{1.5}(ZnO)_{37.5}(SnO_2)_{37.5}$ (mol %) | $(ZrO_2)_{23.5}(MgO)_{1.5}(ZnO)_{37.5}(SnO_2)_{37.5}$ (mol %) |
| 11-203 | $(ZrO_2)_{23.5}(MgO)_{1.5}(ZnO)_{47.5}(SnO_2)_{25}(Ga_2O_3)_{2.5}$ (mol %) | $(ZrO_2)_{23.5}(MgO)_{1.5}(ZnO)_{47.5}(SnO_2)_{25}(Ga_2O_3)_{2.5}$ (mol %) |
| 11-204 | $(ZrO_2)_{23.5}(MgO)_{1.5}(ZnO)_{35}(SnO_2)_{37.5}(Ga_2O_3)_{2.5}$ (mol %) | $(ZrO_2)_{23.5}(MgO)_{1.5}(ZnO)_{35}(SnO_2)_{37.5}(Ga_2O_3)_{2.5}$ (mol %) |
| 11-205 | $(ZrO_2)_{23}(MgO)_{2}(ZnO)_{48.9}(SnO_2)_{25}(Ga_2O_3)_{1.1}$ (mol %) | $(ZrO_2)_{23}(MgO)_{2}(ZnO)_{48.9}(SnO_2)_{25}(Ga_2O_3)_{1.1}$ (mol %) |
| 11-206 | $(ZrO_2)_{23}(MgO)_{2}(ZnO)_{36.7}(SnO_2)_{37.5}(Ga_2O_3)_{0.8}$ (mol %) | $(ZrO_2)_{23}(MgO)_{2}(ZnO)_{36.7}(SnO_2)_{37.5}(Ga_2O_3)_{0.8}$ (mol %) |
| 11-207 | $(ZrO_2)_{34.5}(MgO)_{3}(ZnO)_{36.7}(SnO_2)_{25}(Ga_2O_3)_{0.8}$ (mol %) | $(ZrO_2)_{34.5}(MgO)_{3}(ZnO)_{36.7}(SnO_2)_{25}(Ga_2O_3)_{0.8}$ (mol %) |
| 11-208 | $(ZrO_2)_{18.4}(MgO)_{1.6}(ZnO)_{48.9}(SnO_2)_{30}(Ga_2O_3)_{1.1}$ (mol %) | $(ZrO_2)_{18.4}(MgO)_{1.6}(ZnO)_{48.9}(SnO_2)_{30}(Ga_2O_3)_{1.1}$ (mol %) |
| 11-209 | $(ZrO_2)_{27.6}(MgO)_{2.4}(ZnO)_{48.9}(SnO_2)_{20}(Ga_2O_3)_{1.1}$ (mol %) | $(ZrO_2)_{27.6}(MgO)_{2.4}(ZnO)_{48.9}(SnO_2)_{20}(Ga_2O_3)_{1.1}$ (mol %) |
| 11-210 | $(ZrO_2)_{23}(CaO)_{2}(ZnO)_{48.9}(SnO_2)_{25}(Ga_2O_3)_{1.1}$ (mol %) | $(ZrO_2)_{23}(CaO)_{2}(ZnO)_{48.9}(SnO_2)_{25}(Ga_2O_3)_{1.1}$ (mol %) |
| 11-211 | $(ZrO_2)_{23}(MgO)_{2}(ZnO)_{48.9}(SnO_2)_{25}(Al_2O_3)_{1.1}$ (mol %) | $(ZrO_2)_{23}(MgO)_{2}(ZnO)_{48.9}(SnO_2)_{25}(Al_2O_3)_{1.1}$ (mol %) |
| Comparative Example 2-1 | $(ZrO_2)_{15}(SiO_2)_{15}(In_2O_3)_{70}$ (mol %) | $(ZrO_2)_{25}(SiO_2)_{25}(In_2O_3)_{50}$ (mol %) |

In disc Nos. 11-201 to 11-211, results of very good reproduction durability were obtained in all discs, as compared with Comparative Example 2-1, and the effect of improving the reproduction durability in the information recording medium according to the embodiment of the present invention could be confirmed.

Example 14

In the present example, another example of information recording medium 100 shown in the FIGURE is described. The following is a method for producing information recording medium 100 of the present example.

As substrate 1, the same substrate as in Example 1 was used.

L0 layer 10 was formed on substrate 1. A dielectric film of 13 nm according to the embodiment of the present invention as first dielectric film 11 using a target according to each composition described in Table 39, a film of $W_{31}Cu_{19}Ta_{22}Zn_5Mn_{23}$—O of 34 nm as recording film 12 using a target substantially composed of $W_{31}Cu_{19}Ta_{22}Zn_5Mn_{23}$—O, and a film of $(ZrO_2)_{25}(SiO_2)_{25}(In_2O_3)_{50}$ (mol %) of 10 nm as second dielectric film 13 using a target substantially composed of $(ZrO_2)_{25}(SiO_2)_{25}(In_2O_3)_{50}$ (mol %) were sequentially formed by a sputtering.

In laser beam 6 having a wavelength of 405 nm, L0 layer 10 in the absence of L1 layer 20 and L2 layer 30 has, in an unrecorded state, a reflectance $R_g$ of nearly equal to 8.0% and a reflectance $R_l$ of nearly equal to 8.5%.

Formation of first dielectric film 11 was performed in an Ar atmosphere (flow rate: 12 sccm), using a pulse DC power source (4 kW). Formation of recording film 12 was performed in an Ar and $O_2$ mixed-gas atmosphere (flow rate: 12+30 sccm), using a pulse DC power source (5 kW). Formation of second dielectric film 13 was performed in an Ar atmosphere (flow rate: 12 sccm), using a DC power source (2 kW).

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. The configuration and production method of L1 layer 20 are the same as in Example 10.

Subsequently, intermediate separation layer 3 in which a spiral guide groove (depth: 27 nm, track pitch (land-groove distance): 0.225 μn) was formed, was formed on L1 layer 20. The configuration and production method of intermediate separation layer 3 are the same as in Example 1.

L2 layer 30 was formed on intermediate separation layer 3. The configuration and production method of L2 layer 30 are the same as in Example 12.

Thereafter, an ultraviolet-curable resin was applied onto second dielectric film 33, followed by spin coating, and was then cured with ultraviolet light, to form cover layer 4 having a thickness of about 57 thereby preparing A-side information recording medium 101.

Next, a configuration of B-side information recording medium 102 is described.

As substrate 1, the same substrate as in Example 1 was used.

L0 layer 10 was formed on substrate 1. A dielectric film of 13 nm according to the embodiment of the present invention as first dielectric film 11 using a target according to each composition described in Table 40, a film of $W_{31}Cu_{19}Ta_{22}Zn_5Mn_{23}$—O of 34 nm as recording film 12 using a target substantially composed of $W_{31}Cu_{19}Ta_{22}Zn_5Mn_{23}$—O, and a film of $(ZrO_2)_{25}(SiO_2)_{25}(In_2O_3)_{50}$ (mol %) of 10 nm as second dielectric film 13 using a target substantially composed of $(ZrO_2)_{25}(SiO_2)_{25}(In_2O_3)_{50}$ (mol %) were sequentially formed by a sputtering.

In laser beam 6 having a wavelength of 405 nm, L0 layer 10 in the absence of L1 layer 20 and L2 layer 30, in an unrecorded state, a reflectance $R_g$ of nearly equal to 8.0% and a reflectance $R_l$ of nearly equal to 8.5%.

Formation of first dielectric film 11 was performed in an Ar atmosphere (flow rate: 12 sccm), using a pulse DC power source (4 kW). Formation of recording film 12 was performed in an Ar and $O_2$ mixed-gas atmosphere (flow rate: 12+30 sccm), using a pulse DC power source (5 kW). Formation of second dielectric film 13 was performed in an Ar atmosphere (flow rate: 12 sccm), using a DC power source (2 kW).

Next, L1 layer 20 was formed on intermediate separation layer 2. The configuration and production method of L1 layer 20 are the same as in Example 10.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. The configuration and production method of L2 layer 30 are the same as in Example 12.

Thereafter, an ultraviolet-curable resin was applied onto second dielectric film 33, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 100 were prepared in which $Zr_{9.5}Mg_{0.6}Zn_{20.1}Sn_{10.1}O_{59.7}$ (atom %), $Zr_{9.0}Mg_{0.6}Zn_{14.4}Sn_{14.4}O_{61.6}$ (atom %), $Zr_{9.2}Mg_{0.6}Zn_{18.6}Sn_{9.8}Ga_{2.0}O_{59.8}$ (atom %), $Zr_{8.8}Mg_{0.6}Zn_{13.0}Sn_{14.0}Ga_{2.0}O_{61.6}$ (atom %), $Zr_{9.2}Mg_{0.8}Zn_{19.5}Sn_{10.0}Ga_{0.9}O_{59.6}$ (atom %), $Zr_{8.8}Mg_{0.8}Zn_{14.0}Sn_{14.3}Ga_{0.8}O_{61.3}$ (atom %), $Zr_{13.2}Mg_{1.2}Zn_{14.0}Sn_{9.6}Ga_{0.6}O_{61.4}$ (atom %), $Zr_{7.3}Mg_{0.6}Zn_{19.4}Sn_{11.9}Ga_{0.9}O_{59.9}$ (atom %), $Zr_{11.0}Mg_{0.8}Zn_{19.5}Sn_{8.0}Ga_{0.9}O_{59.6}$ (atom %), $Zr_{9.2}Ca_{0.8}Zn_{19.5}Sn_{10.0}Ga_{0.9}O_{59.6}$ (atom %), and $Zr_{9.2}Mg_{0.8}Zn_{19.5}Sn_{10.0}Al_{0.9}O_{59.6}$ (atom %) were applied to first dielectric films 11 of A-side information recording medium 101 and B-side information recording medium 102. Nos. of these discs are defined as 12-101 to 12-111, respectively.

In these 12-101 to 12-111 and Comparative Example 3-1, evaluation of reproduction durability at octuple speed was performed as described in Example 7.

Table 39 shows the results in A-side information recording medium 101.

TABLE 39

| Disc No. | A-side information recording medium 101 First dielectric film 11 | | Reproduction durability of L0 layer 10 |
|---|---|---|---|
| | Expression by atom % | Expression by mol % | (Δd-MLSE) |
| 12-101 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | A |
| 12-102 | $Zr_{9.0}Mg_{0.6}Zn_{14.4}Sn_{14.4}O_{61.6}$ (atom %) | $(ZrO_2)_{23.5}(MgO)_{1.5}(ZnO)_{37.5}(SnO_2)_{37.5}$ (mol %) | B |
| 12-103 | $Zr_{9.2}Mg_{0.6}Zn_{18.6}Sn_{9.8}Ga_{2.0}O_{59.8}$ (atom %) | $(ZrO_2)_{23.5}(MgO)_{1.5}(ZnO)_{47.5}(SnO_2)_{25}(Ga_2O_3)_{2.5}$ (mol %) | A |
| 12-104 | $Zr_{8.8}Mg_{0.6}Zn_{13.0}Sn_{14.0}Ga_{2.0}O_{61.6}$ (atom %) | $(ZrO_2)_{23.5}(MgO)_{1.5}(ZnO)_{35}(SnO_2)_{37.5}(Ga_2O_3)_{2.5}$ (mol %) | B |
| 12-105 | $Zr_{9.2}Mg_{0.8}Zn_{19.5}Sn_{10.0}Ga_{0.9}O_{59.6}$ (atom %) | $(ZrO_2)_{23}(MgO)_2(ZnO)_{48.9}(SnO_2)_{25}(Ga_2O_3)_{1.1}$ (mol %) | A |
| 12-106 | $Zr_{8.8}Mg_{0.8}Zn_{14.0}Sn_{14.3}Ga_{0.8}O_{61.3}$ (atom %) | $(ZrO_2)_{23}(MgO)_2(ZnO)_{36.7}(SnO_2)_{37.5}(Ga_2O_3)_{0.8}$ (mol %) | B |
| 12-107 | $Zr_{13.2}Mg_{1.2}Zn_{14.0}Sn_{9.6}Ga_{0.6}O_{61.4}$ (atom %) | $(ZrO_2)_{34.5}(MgO)_3(ZnO)_{36.7}(SnO_2)_{25}(Ga_2O_3)_{0.8}$ (mol %) | A |
| 12-108 | $Zr_{7.3}Mg_{0.6}Zn_{19.4}Sn_{11.9}Ga_{0.9}O_{59.9}$ (atom %) | $(ZrO_2)_{18.4}(MgO)_{1.6}(ZnO)_{48.9}(SnO_2)_{30}(Ga_2O_3)_{1.1}$ (mol %) | B |
| 12-109 | $Zr_{11.0}Mg_{1.0}Zn_{19.5}Sn_{8.0}Ga_{0.9}O_{59.6}$ (atom %) | $(ZrO_2)_{27.6}(MgO)_{2.4}(ZnO)_{48.9}(SnO_2)_{20}(Ga_2O_3)_{1.1}$ (mol %) | A |
| 12-110 | $Zr_{9.2}Ca_{0.8}Zn_{19.5}Sn_{10.0}Ga_{0.9}O_{59.6}$ (atom %) | $(ZrO_2)_{23}(CaO)_2(ZnO)_{48.9}(SnO_2)_{25}(Ga_2O_3)_{1.1}$ (mol %) | B |
| 12-111 | $Zr_{9.2}Mg_{0.8}Zn_{19.5}Sn_{10.0}Al_{0.9}O_{59.6}$ (atom %) | $(ZrO_2)_{23}(MgO)_2(ZnO)_{48.9}(SnO_2)_{25}(Al_2O_3)_{1.1}$ (mol %) | A |
| Comparative Example 3-1 | $Zr_{3.4}Si_{3.4}In_{31.8}O_{61.4}$ (atom %) | $(ZrO_2)_{15}(SiO_2)_{15}(In_2O_3)_{70}$ (mol %) | D |

In disc Nos. 12-101 to 12-111, results of very good reproduction durability were obtained in all discs, as compared with Comparative Example 3-1, and the effect of improving the reproduction durability in the information recording medium according to the embodiment of the present invention could be confirmed.

Table 40 shows the results in B-side information recording medium 102.

TABLE 40

| Disc No. | B-side information recording medium 102 First dielectric film 11 | | Reproduction durability of L0 layer 10 |
|---|---|---|---|
| | Expression by atom % | Expression by mol % | (Δd-MLSE) |
| 12-101 | $Zr_{9.5}Mg_{0.6}Zn_{20.1}Sn_{10.1}O_{59.7}$ (atom %) | $(ZrO_2)_{23.5}(MgO)_{1.5}(ZnO)_{50}(SnO_2)_{25}$ (mol %) | A |
| 12-102 | $Zr_{9.0}Mg_{0.6}Zn_{14.4}Sn_{14.4}O_{61.6}$ (atom %) | $(ZrO_2)_{23.5}(MgO)_{1.5}(ZnO)_{37.5}(SnO_2)_{37.5}$ (mol %) | B |
| 12-103 | $Zr_{9.2}Mg_{0.6}Zn_{18.6}Sn_{9.8}Ga_{2.0}O_{59.8}$ (atom %) | $(ZrO_2)_{23.5}(MgO)_{1.5}(ZnO)_{47.5}(SnO_2)_{25}(Ga_2O_3)_{2.5}$ (mol %) | A |
| 12-104 | $Zr_{8.8}Mg_{0.6}Zn_{13.0}Sn_{14.0}Ga_{2.0}O_{61.6}$ (atom %) | $(ZrO_2)_{23.5}(MgO)_{1.5}(ZnO)_{35}(SnO_2)_{37.5}(Ga_2O_3)_{2.5}$ (mol %) | B |
| 12-105 | $Zr_{9.2}Mg_{0.8}Zn_{19.5}Sn_{10.0}Ga_{0.9}O_{59.6}$ (atom %) | $(ZrO_2)_{23}(MgO)_2(ZnO)_{48.9}(SnO_2)_{25}(Ga_2O_3)_{1.1}$ (mol %) | A |
| 12-106 | $Zr_{8.8}Mg_{0.8}Zn_{14.0}Sn_{14.3}Ga_{0.8}O_{61.3}$ (atom %) | $(ZrO_2)_{23}(MgO)_2(ZnO)_{36.7}(SnO_2)_{37.5}(Ga_2O_3)_{0.8}$ (mol %) | B |
| 12-107 | $Zr_{13.2}Mg_{1.2}Zn_{14.0}Sn_{9.6}Ga_{0.6}O_{61.4}$ (atom %) | $(ZrO_2)_{34.5}(MgO)_3(ZnO)_{36.7}(SnO_2)_{25}(Ga_2O_3)_{0.8}$ (mol %) | A |
| 12-108 | $Zr_{7.3}Mg_{0.6}Zn_{19.4}Sn_{11.9}Ga_{0.9}O_{59.9}$ (atom %) | $(ZrO_2)_{18.4}(MgO)_{1.6}(ZnO)_{48.9}(SnO_2)_{30}(Ga_2O_3)_{1.1}$ (mol %) | B |
| 12-109 | $Zr_{11.0}Mg_{1.0}Zn_{19.5}Sn_{8.0}Ga_{0.9}O_{59.6}$ (atom %) | $(ZrO_2)_{27.6}(MgO)_{2.4}(ZnO)_{48.9}(SnO_2)_{20}(Ga_2O_3)_{1.1}$ (mol %) | A |
| 12-110 | $Zr_{9.2}Ca_{0.8}Zn_{19.5}Sn_{10.0}Ga_{0.9}O_{59.6}$ (atom %) | $(ZrO_2)_{23}(CaO)_2(ZnO)_{48.9}(SnO_2)_{25}(Ga_2O_3)_{1.1}$ (mol %) | B |
| 12-111 | $Zr_{9.2}Mg_{0.8}Zn_{19.5}Sn_{10.0}Al_{0.9}O_{59.6}$ (atom %) | $(ZrO_2)_{23}(MgO)_2(ZnO)_{48.9}(SnO_2)_{25}(Al_2O_3)_{1.1}$ (mol %) | A |
| Comparative Example 3-1 | $Zr_{3.4}Si_{3.4}In_{31.8}O_{61.4}$ (atom %) | $(ZrO_2)_{15}(SiO_2)_{15}(In_{2O3})_{70}$ (mol %) | D |

In disc Nos. 12-101 to 12-111, results of very good reproduction durability were obtained in all discs, as compared with Comparative Example 3-1, and the effect of improving the reproduction durability in the information recording medium according to the embodiment of the present invention could be confirmed.

Example 15

In the present example, another example of information recording medium 100 shown in the FIGURE is described. The following is a method for producing information recording medium 100 of the present example.

First, a configuration of A-side information recording medium 101 is described.

As substrate 1, the same substrate as in Example 1 was used.

L0 layer 10 was formed on substrate 1. A dielectric film of 13 nm according to the embodiment of the present invention as first dielectric film 11 using a target according to each composition described in Tables 41 and 42, a film of $W_{31}Cu_{19}Ta_{22}Zn_5Mn_{23}$—O of 34 nm as recording film 12 using a target substantially composed of $W_{31}Cu_{19}Ta_{22}Zn_5Mn_{23}$—O, and a dielectric film of 10 nm according to the embodiment of the present invention as second dielectric film 13 using a target according to each composition described in Tables 41 and 42 were sequentially formed by a sputtering.

In laser beam 6 having a wavelength of 405 nm, L0 layer 10 in the absence of L1 layer 20 and L2 layer 30 has, in an unrecorded state, a reflectance $R_g$ of nearly equal to 8.0% and a reflectance $R_l$ of nearly equal to 8.5%.

Formation of first dielectric film 11 was performed in an Ar atmosphere (flow rate: 12 sccm), using a pulse DC power source (4 kW). Formation of recording film 12 was performed in an Ar and $O_2$ mixed-gas atmosphere (flow rate: 12+30 sccm), using a pulse DC power source (5 kW). Formation of second dielectric film 13 was performed in an Ar atmosphere (flow rate: 12 sccm), using a pulse DC power source (3 kW).

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. The configuration and production method of L1 layer 20 are the same as in Example 10.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. The configuration and production method of L2 layer 30 are the same as in Example 12.

Thereafter, an ultraviolet-curable resin was applied onto second dielectric film 33, followed by spin coating, and was then cured with ultraviolet light, to form cover layer 4 having a thickness of about 57 μm, thereby preparing A-side information recording medium 101.

Next, a configuration of B-side information recording medium 102 is described.

As substrate 1, the same substrate as in Example 1 was used.

L0 layer 10 was formed on substrate 1. A dielectric film of 13 nm according to the embodiment of the present invention as first dielectric film 11 using a target according to each composition described in Table 43, a film of $W_{31}Cu_{19}Ta_{22}Zn_5Mn_{23}$—O of 34 nm as recording film 12 using a target substantially composed of $W_{31}Cu_{19}Ta_{22}Zn_5Mn_{23}$—O, and a dielectric film of 10 nm according to the embodiment of the present invention as second dielectric film 13 using a target according to each composition described in Table 44 were sequentially formed by a sputtering.

In laser beam 6 having a wavelength of 405 nm, L0 layer 10 in the absence of L1 layer 20 and L2 layer 30 has, in an unrecorded state, a reflectance $R_g$ of nearly equal to 8.0% and a reflectance $R_l$ of nearly equal to 8.5%.

Formation of first dielectric film 11 was performed in an Ar atmosphere (flow rate: 12 sccm), using a pulse DC power source (4 kW). Formation of recording film 12 was performed in an Ar and $O_2$ mixed-gas atmosphere (flow rate: 12+30 sccm), using a pulse DC power source (5 kW). Formation of second dielectric film 13 was performed in an Ar atmosphere (flow rate: 12 sccm), using a pulse DC power source (3 kW).

Subsequently, intermediate separation layer 2 in which a spiral guide groove (depth: 27 nm, track pitch (land-groove distance): 0.225 μm) was formed, was formed on L0 layer 10. The configuration and production method of intermediate separation layer 2 are the same as in Example 1.

Next, L1 layer 20 was formed on intermediate separation layer 2. The configuration and production method of L1 layer 20 are the same as in Example 10.

Subsequently, intermediate separation layer 3 in which a spiral guide groove (depth: 27 nm, track pitch (land-groove distance): 0.225 μm) was formed, was formed on L1 layer 20. The configuration and production method of intermediate separation layer 3 are the same as in Example 1.

L2 layer 30 was formed on intermediate separation layer 3. The configuration and production method of L2 layer 30 are the same as in Example 12.

Thereafter, an ultraviolet-curable resin was applied onto second dielectric film 33, followed by spin coating, and was then cured with ultraviolet light, to form cover layer 4 having a thickness of about 57 μm, thereby preparing B-side information recording medium 102.

Lastly, an ultraviolet-curable resin was uniformly applied to a surface opposite to the guide groove-formed surface of substrate 1 in A-side information recording medium 101, and the applied resin was bonded to a surface opposite to the guide groove-formed surface of substrate 1 in B-side information recording medium 102. Then, the resin was cured with ultraviolet light to form bonding layer 5 (thickness: about 35 μm).

Therefore, information recording media 100 of the present example were prepared.

As an example of the information recording medium 100 of the present example, information recording media 100 were prepared in which $Zr_{9.5}Mg_{0.6}Zn_{20.1}Sn_{10.1}O_{59.7}$ (atom %), $Zr_{9.0}Mg_{0.66}Zn_{14.4}Sn_{14.4}O_{61.6}$ (atom %), $Zr_{9.2}Mg_{0.6}Zn_{18.6}Sn_{9.8}Ga_{2.0}O_{59.8}$ (atom %), $Zr_{8.8}Mg_{0.6}Zn_{13.0}Sn_{14.0}Ga_{2.0}O_{61.6}$ (atom %), $Zr_{9.2}Mg_{0.8}Zn_{9.5}Sn_{10.0}Ga_{0.9}O_{59.6}$ (atom %), $Zr_{8.8}Mg_{0.8}Zn_{14.0}Sn_{14.3}Ga_{0.8}O_{61.3}$ (atom %), $Zr_{13.2}Mg_{1.2}Zn_{14.0}Sn_{9.6}Ga_{0.6}O_{61.4}$ (atom %), $Zr_{7.3}Mg_{0.6}Zn_{19.4}Sn_{11.9}Ga_{0.9}O_{59.9}$ (atom %), $Zr_{11.0}Mg_{1.0}Zn_{19.5}Sn_{8.0}Ga_{0.9}O_{59.6}$ (atom %), $Zr_{9.2}Ca_{0.8}Zn_{19.5}Sn_{10.0}Ga_{0.9}O_{59.6}$ (atom %), and $Zr_{9.2}Mg_{0.8}Zn_{19.5}Sn_{10.0}Al_{0.9}O_{59.6}$ (atom %) were applied to first dielectric films 11 and second dielectric films 13 of A-side information recording medium 101 and B-side information recording medium 102. Nos. of these discs are defined as 12-201 to 12-211, respectively.

In these 12-201 to 12-211 and Comparative Example 3-1, evaluation of reproduction durability at octuple speed was performed as described in Example 7.

Tables 41 and 42 show the results in A-side information recording medium 101.

TABLE 41

| Disc No. | A-side information recording medium 101 First dielectric film 11 | A-side information recording medium 101 Second dielectric film 13 | Reproduction durability of L0 layer 10 ($\Delta$d-MLSE) |
|---|---|---|---|
| | Expression by atom % | | |
| 12-201 | $Zr_{9.5}Mg_{0.6}Zn_{20.1}Sn_{10.1}O_{59.7}$ (atom %) | $Zr_{9.5}Mg_{0.6}Zn_{20.1}Sn_{10.1}O_{59.7}$ (atom %) | A |
| 12-202 | $Zr_{9.0}Mg_{0.6}Zn_{14.4}Sn_{14.4}O_{61.6}$ (atom %) | $Zr_{9.0}Mg_{0.6}Zn_{14.4}Sn_{14.4}O_{61.6}$ (atom %) | B |
| 12-203 | $Zr_{9.2}Mg_{0.6}Zn_{18.6}Sn_{9.8}Ga_{2.0}O_{59.8}$ (atom %) | $Zr_{9.2}Mg_{0.6}Zn_{18.6}Sn_{9.8}Ga_{2.0}O_{59.8}$ (atom %) | A |
| 12-204 | $Zr_{8.8}Mg_{0.6}Zn_{13.0}Sn_{14.0}Ga_{2.0}O_{61.6}$ (atom %) | $Zr_{8.8}Mg_{0.6}Zn_{13.0}Sn_{14.0}Ga_{2.0}O_{61.6}$ (atom %) | B |
| 12-205 | $Zr_{9.2}Mg_{0.8}Zn_{19.5}Sn_{10.0}Ga_{0.9}O_{59.6}$ (atom %) | $Zr_{9.2}Mg_{0.8}Zn_{19.5}Sn_{10.0}Ga_{0.9}O_{59.6}$ (atom %) | A |
| 12-206 | $Zr_{8.8}Mg_{0.8}Zn_{14.0}Sn_{14.3}Ga_{0.8}O_{61.3}$ (atom %) | $Zr_{8.8}Mg_{0.8}Zn_{11.0}Sn_{14.3}Ga_{0.8}O_{61.3}$ (atom %) | B |
| 12-207 | $Zr_{13.2}Mg_{1.2}Zn_{14.0}Sn_{9.6}Ga_{0.6}O_{61.4}$ (atom %) | $Zr_{13.2}Mg_{1.2}Zn_{14.0}Sn_{9.6}Ga_{0.6}O_{61.4}$ (atom %) | A |
| 12-208 | $Zr_{7.3}Mg_{0.6}Zn_{19.4}Sn_{11.9}Ga_{0.9}O_{59.9}$ (atom %) | $Zr_{7.3}Mg_{0.6}Zn_{19.4}Sn_{11.9}Ga_{0.9}O_{59.9}$ (atom %) | B |
| 12-209 | $Zr_{11.0}Mg_{1.0}Zn_{19.5}Sn_{8.0}Ga_{0.9}O_{59.6}$ (atom %) | $Zr_{11.0}Mg_{1.0}Zn_{19.5}Sn_{8.0}Ga_{0.9}O_{59.6}$ (atom %) | A |
| 12-210 | $Zr_{9.2}Ca_{0.8}Zn_{19.5}Sn_{10.0}Ga_{0.9}O_{59.6}$ (atom %) | $Zr_{9.2}Ca_{0.8}Zn_{19.5}Sn_{10.0}Ga_{0.9}O_{59.6}$ (atom %) | B |
| 12-211 | $Zr_{9.2}Mg_{0.8}Zn_{19.5}Sn_{10.0}Al_{0.9}O_{59.6}$ (atom %) | $Zr_{9.2}Mg_{0.8}Zn_{19.5}Sn_{10.0}Al_{0.9}O_{59.6}$ (atom %) | A |
| Comparative Example 3-1 | $Zr_{3.4}Si_{3.4}In_{31.8}O_{61.4}$ (atom %) | $Z_{6.3}Si_{6.3}In_{25.0}O_{62.4}$ (atom %) | D |

TABLE 42

| Disc No. | A-side information recording medium 101 First dielectric film 11 | A-side information recording medium 101 Second dielectric film 13 |
|---|---|---|
| | Expression by mol % | |
| 12-201 | $(ZrO_2)_{23.5}(MgO)_{1.5}(ZnO)_{50}(SnO_2)_{25}$ (mol %) | $(ZrO_2)_{23.5}(MgO)_{1.5}(ZnO)_{50}(SnO_2)_{25}$ (mol %) |
| 12-202 | $(ZrO_2)_{23.5}(MgO)_{1.5}(ZnO)_{37.5}(SnO_2)_{37.5}$ (mol %) | $(ZrO_2)_{23.5}(MgO)_{1.5}(ZnO)_{37.5}(SnO_2)_{37.5}$ (mol %) |
| 12-203 | $(ZrO_2)_{23.5}(MgO)_{1.5}(ZnO)_{47.5}(SnO_2)_{25}(Ga_2O_3)_{2.5}$ (mol %) | $(ZrO_2)_{23.5}(MgO)_{1.5}(ZnO)_{47.5}(SnO_2)_{25}(Ga_2O_3)_{2.5}$ (mol %) |
| 12-204 | $(ZrO_2)_{23.5}(MgO)_{1.5}(ZnO)_{35}(SnO_2)_{37.5}(Ga_2O_3)_{2.5}$ (mol %) | $(ZrO_2)_{23.5}(MgO)_{1.5}(ZnO)_{35}(SnO_2)_{37.5}(Ga_2O_3)_{2.5}$ (mol %) |
| 12-205 | $(ZrO_2)_{23}(MgO)_{2}(ZnO)_{48.9}(SnO_2)_{25}(Ga_2O_3)_{1.1}$ (mol %) | $(ZrO_2)_{23}(MgO)_{2}(ZnO)_{48.9}(SnO_2)_{25}(Ga_2O_3)_{1.1}$ (mol %) |
| 12-206 | $(ZrO_2)_{23}(MgO)_{2}(ZnO)_{36.7}(SnO_2)_{37.5}(Ga_2O_3)_{0.8}$ (mol %) | $(ZrO_2)_{23}(MgO)_{2}(ZnO)_{36.7}(SnO_2)_{37.5}(Ga_2O_3)_{0.8}$ (mol %) |
| 12-207 | $(ZrO_2)_{34.5}(MgO)_{3}(ZnO)_{36.7}(SnO_2)_{25}(Ga_2O_3)_{0.8}$ (mol %) | $(ZrO_2)_{34.5}(MgO)_{3}(ZnO)_{36.7}(SnO_2)_{25}(Ga_2O_3)_{0.8}$ (mol %) |
| 12-208 | $(ZrO_2)_{18.4}(MgO)_{1.6}(ZnO)_{48.9}(SnO_2)_{30}(Ga_2O_3)_{1.1}$ (mol %) | $(ZrO_2)_{18.4}(MgO)_{1.6}(ZnO)_{48.9}(SnO_2)_{30}(Ga_2O_3)_{1.1}$ (mol %) |
| 12-209 | $(ZrO_2)_{27.6}(MgO)_{2.4}(ZnO)_{48.9}(SnO_2)_{20}(Ga_2O_3)_{1.1}$ (mol %) | $(ZrO_2)_{27.6}(MgO)_{2.4}(ZnO)_{48.9}(SnO_2)_{20}(Ga_2O_3)_{1.1}$ (mol %) |
| 12-210 | $(ZrO_2)_{23}(CaO)_{2}(ZnO)_{48.9}(SnO_2)_{25}(Ga_2O_3)_{1.1}$ (mol %) | $(ZrO_2)_{23}(CaO)_{2}(ZnO)_{48.9}(SnO_2)_{25}(Ga_2O_3)_{1.1}$ (mol %) |
| 12-211 | $(ZrO_2)_{23}(MgO)_{2}(ZnO)_{48.9}(SnO_2)_{25}(Al_2O_3)_{1.1}$ (mol %) | $(ZrO_2)_{23}(MgO)_{2}(ZnO)_{48.9}(SnO_2)_{25}(Al_2O_3)_{1.1}$ (mol %) |
| Comparative Example 3-1 | $(ZrO_2)_{15}(SiO_2)_{15}(In_2O_3)_{70}$ (mol %) | $(ZrO_2)_{25}(SiO_2)_{25}(In_2O_3)_{50}$ (mol %) |

In disc Nos. 12-201 to 12-211, results of very good reproduction durability were obtained in all discs, as compared with Comparative Example 3-1, and the effect of improving the reproduction durability in the information recording medium according to the embodiment of the present invention could be confirmed.

Tables 43 and 44 show the results in B-side information recording medium 102.

TABLE 43

| Disc No. | B-side information recording medium 102 First dielectric film 11 | B-side information recording medium 102 Second dielectric film 13 | Reproduction durability of L0 layer 10 ($\Delta$d-MLSE) |
|---|---|---|---|
| | Expression by atom % | | |
| 12-201 | $Zr_{9.5}Mg_{0.6}Zn_{20.1}Sn_{10.1}O_{59.7}$ (atom %) | $Zr_{9.5}Mg_{0.6}Zn_{20.1}Sn_{10.1}O_{59.7}$ (atom %) | A |
| 12-202 | $Zr_{9.0}Mg_{0.6}Zn_{14.4}Sn_{14.4}O_{61.6}$ (atom %) | $Zr_{9.0}Mg_{0.6}Zn_{14.4}Sn_{14.4}O_{61.6}$ (atom %) | B |
| 12-203 | $Zr_{9.2}Mg_{0.6}Zn_{18.6}Sn_{9.8}Ga_{2.0}O_{59.8}$ (atom %) | $Zr_{9.2}Mg_{0.6}Zn_{18.6}Sn_{9.8}Ga_{2.0}O_{59.8}$ (atom %) | A |
| 12-204 | $Zr_{8.8}Mg_{0.6}Zn_{13.0}Sn_{14.0}Ga_{2.0}O_{61.6}$ (atom %) | $Zr_{8.8}Mg_{0.6}Zn_{13.0}Sn_{14.0}Ga_{2.0}O_{61.6}$ (atom %) | B |
| 12-205 | $Zr_{9.2}Mg_{0.8}Zn_{19.5}Sn_{10.0}Ga_{0.9}O_{59.6}$ (atom %) | $Zr_{9.2}Mg_{0.8}Zn_{19.5}Sn_{10.0}Ga_{0.9}O_{59.6}$ (atom %) | A |
| 12-206 | $Zr_{8.8}Mg_{0.8}Zn_{14.0}Sn_{14.3}Ga_{0.8}O_{61.3}$ (atom %) | $Zr_{8.8}Mg_{0.8}Zn_{14.0}Sn_{14.3}Ga_{0.8}O_{61.3}$ (atom %) | B |
| 12-207 | $Zr_{13.2}Mg_{1.2}Zn_{14.0}Sn_{9.6}Ga_{0.6}O_{61.4}$ (atom %) | $Zr_{13.2}Mg_{1.2}Zn_{14.0}Sn_{9.6}Ga_{0.6}O_{61.4}$ (atom %) | A |
| 12-208 | $Zr_{7.3}Mg_{0.6}Zn_{19.4}Sn_{11.9}Ga_{0.9}O_{59.9}$ (atom %) | $Zr_{7.3}Mg_{0.6}Zn_{19.4}Sn_{11.9}Ga_{0.9}O_{59.9}$ (atom %) | B |
| 12-209 | $Zr_{11.0}Mg_{1.0}Zn_{19.5}Sn_{8.0}Ga_{0.9}O_{59.6}$ (atom %) | $Zr_{11.0}Mg_{1.0}Zn_{19.5}Sn_{8.0}Ga_{0.9}O_{59.6}$ (atom %) | A |
| 12-210 | $Zr_{9.2}Ca_{0.8}Zn_{19.5}Sn_{10.0}Ga_{0.9}O_{59.6}$ (atom %) | $Zr_{9.2}Ca_{0.8}Zn_{19.5}Sn_{10.0}Ga_{0.9}O_{59.6}$ (atom %) | B |
| 12-211 | $Zr_{9.2}Mg_{0.8}Zn_{19.5}Sn_{10.0}Al_{0.9}O_{59.6}$ (atom %) | $Zr_{9.2}Mg_{0.8}Zn_{19.5}Sn_{10.0}Al_{0.9}O_{59.6}$ (atom %) | A |
| Comparative Example 3-1 | $Zr_{3.4}Si_{3.4}In_{31.8}O_{61.4}$ (atom %) | $Z_{6.3}Si_{6.3}In_{25.00}O_{62.4}$ (atom %) | D |

TABLE 44

| Disc No. | B-side information recording medium 102<br>First dielectric film 11<br>Expression by mol % | B-side information recording medium 102<br>Second dielectric film 13 |
|---|---|---|
| 12-201 | $(ZrO_2)_{23.5}(MgO)_{1.5}(ZnO)_{50}(SnO_2)_{25}$ (mol %) | $(ZrO_2)_{23.5}(MgO)_{1.5}(ZnO)_{50}(SnO_2)_{25}$ (mol %) |
| 12-202 | $(ZrO_2)_{23.5}(MgO)_{1.5}(ZnO)_{37.5}(SnO_2)_{37.5}$ (mol %) | $(ZrO_2)_{23.5}(MgO)_{1.5}(ZnO)_{37.5}(SnO_2)_{37.5}$ (mol %) |
| 12-203 | $(ZrO_2)_{23.5}(MgO)_{1.5}(ZnO)_{47.5}(SnO_2)_{25}(Ga_2O_3)_{2.5}$ (mol %) | $(ZrO_2)_{23.5}(MgO)_{1.5}(ZnO)_{47.5}(SnO_2)_{25}(Ga_2O_3)_{2.5}$ (mol %) |
| 12-204 | $(ZrO_2)_{23.5}(MgO)_{1.5}(ZnO)_{35}(SnO_2)_{37.5}(Ga_2O_3)_{2.5}$ (mol %) | $(ZrO_2)_{23.5}(MgO)_{1.5}(ZnO)_{35}(SnO_2)_{37.5}(Ga_2O_3)_{2.5}$ (mol %) |
| 12-205 | $(ZrO_2)_{23}(MgO)_{2}(ZnO)_{48.9}(SnO_2)_{25}(Ga_2O_3)_{1.1}$ (mol %) | $(ZrO_2)_{23}(MgO)_{2}(ZnO)_{48.9}(SnO_2)_{25}(Ga_2O_3)_{1.1}$ (mol %) |
| 12-206 | $(ZrO_2)_{23}(MgO)_{2}(ZnO)_{36.7}(SnO_2)_{37.5}(Ga_2O_3)_{0.8}$ (mol %) | $(ZrO_2)_{23}(MgO)_{2}(ZnO)_{36.7}(SnO_2)_{37.5}(Ga_2O_3)_{0.8}$ (mol %) |
| 12-207 | $(ZrO_2)_{34.5}(MgO)_{3}(ZnO)_{36.7}(SnO_2)_{25}(Ga_2O_3)_{0.8}$ (mol %) | $(ZrO_2)_{34.5}(MgO)_{3}(ZnO)_{36.7}(SnO_2)_{25}(Ga_2O_3)_{0.8}$ (mol %) |
| 12-208 | $(ZrO_2)_{18.4}(MgO)_{1.6}(ZnO)_{48.9}(SnO_2)_{30}(Ga_2O_3)_{1.1}$ (mol %) | $(ZrO_2)_{18.4}(MgO)_{1.6}(ZnO)_{48.9}(SnO_2)_{30}(Ga_2O_3)_{1.1}$ (mol %) |
| 12-209 | $(ZrO_2)_{27.6}(MgO)_{2.4}(ZnO)_{48.9}(SnO_2)_{20}(Ga_2O_3)_{1.1}$ (mol %) | $(ZrO_2)_{27.6}(MgO)_{2.4}(ZnO)_{48.9}(SnO_2)_{20}(Ga_2O_3)_{1.1}$ (mol %) |
| 12-210 | $(ZrO_2)_{23}(CaO)_{2}(ZnO)_{48.9}(SnO_2)_{25}(Ga_2O_3)_{1.1}$ (mol %) | $(ZrO_2)_{23}(CaO)_{2}(ZnO)_{48.9}(SnO_2)_{25}(Ga_2O_3)_{1.1}$ (mol %) |
| 12-211 | $(ZrO_2)_{23}(MgO)_{2}(ZnO)_{48.9}(SnO_2)_{25}(Al_2O_3)_{1.1}$ (mol %) | $(ZrO_2)_{23}(MgO)_{2}(ZnO)_{48.9}(SnO_2)_{25}(Al_2O_3)_{1.1}$ (mol %) |
| Comparative Example 3-1 | $(ZrO_2)_{15}(SiO_2)_{15}(In_2O_3)_{70}$ (mol %) | $(ZrO_2)_{25}(SiO_2)_{25}(In_2O_3)_{50}$ (mol %) |

In disc Nos. 12-201 to 12-211, results of very good reproduction durability were obtained in all discs, as compared with Comparative Example 3-1, and the effect of improving the reproduction durability in the information recording medium according to the embodiment of the present invention could be confirmed.

In the above examples, the recording/reproduction was evaluated using a signal having a data bit length of 47.7 nm, but similar evaluation results can be performed in all the examples even if signals having different data bit lengths by 10% thereof are used.

INDUSTRIAL APPLICABILITY

The information recording medium and the method for producing the same according to the present disclosure are configured to have an information layer that exhibits a larger amount of light for reproduction, so that the medium is suitable for recording information at high recording density and is useful for an optical disc that records a large amount of contents. Specifically, the information recording medium is useful for a next-generation optical disc (for example, recording capacity: 500 GB) including three or four information layers on both sides of the disc conforming to the Archival Disc standard.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2018-150255 filed on Aug. 9, 2018, and the contents are incorporated herein by reference.

DESCRIPTION OF REFERENCE NUMERALS AND SIGNS

100: information recording medium
101: A-side information recording medium
102: B-side information recording medium
10: L0 layer
20: L1 layer
30: L2 layer
11, 21, 31: first dielectric film
12, 22, 32: recording film
13, 23, 33: second dielectric film
1: substrate
2, 3: intermediate separation layer
4: cover layer
5: bonding layer
6: laser beam

The invention claimed is:

1. An information recording medium comprising two or more information layers,
   wherein the information recording medium records or reproduces information by irradiation with a laser beam,
   wherein at least one of the two or more information layers is determined as a first information layer and the first information layer includes a first dielectric film and a recording film in this order from a farther end toward a nearer end of a laser beam-irradiated surface,
   wherein the first dielectric film contains at least Zr and oxygen and further contains at least one element D1 selected from Zn and Sn,
   wherein when the total number of atoms of Zr, oxygen and the element D1 is defined as 100 atom %, the first dielectric film contains Zr in an amount of 3 atom % or more and 26 atom or less and contains the element D1 in an amount of 10 atom % or more and 43 atom % or less, and
   wherein the recording film contains at least W, Cu, Mn, and oxygen and further contains at least one element M selected from Zn, Nb, Mo, Ta, and Ti.

2. The information recording medium according to claim 1, wherein the first dielectric film further contains at least one element D2 selected from Si, Y, Ca, and Mg.

3. The information recording medium according to claim 1, wherein the first dielectric film further contains at least one element D3 selected from Ga and Al, and when the total number of atoms of Zr, oxygen, the element D1, the element D2, and the element D3 is defined as 100 atom %, the first dielectric film contains the element D3 in an amount of 7 atom or less.

4. The information recording medium according to claim 1, wherein the first information layer contains the first dielectric film, the recording film, and a second dielectric film in this order from a farther end toward a nearer end of the laser beam-irradiated surface, and
   the second dielectric film contains at least Zr and oxygen and further contains at least one element D1 selected from Zn and Sn, and when the total number of atoms of Zr, oxygen and the element D1 is defined as 100 atom %, the second dielectric film contains Zr in an amount of 3 atom % or more and 26 atom % or less and contains the element D1 in an amount of 10 atom % or more and 43 atom % or less.

5. The information recording medium according to claim 4, wherein the second dielectric film further contains at least one element D2 selected from Si, Y, Ca, and Mg.

6. The information recording medium according to claim 4, wherein the second dielectric film further contains at least one element D3 selected from Ga and Al, and when the total number of atoms of Zr, oxygen, the element D1, the element D2, and the element D3 is defined as 100 atom %, the second dielectric film contains the element D3 in an amount of 7 atom % or less.

7. The information recording medium according to claim 1, wherein the first information layer contains the first dielectric film, the recording film, and a second dielectric film in this order from a farther end toward a nearer end of the surface irradiated with the laser beam, and the second dielectric film contains at least Zr, oxygen, and In.

8. The information recording medium according to claim 7, wherein the second dielectric film further contains at least one element D2 selected from Si, Y, Ca, and Mg.

9. The information recording medium according to claim 1, wherein W, Cu, Mn, and the element M in the recording film satisfy the following formula (1):

$$W_x Cu_y Mn_z M_{100-x-y-z} \text{ (atom \%)} \quad (1)$$

where $15 \le x < 60$, $0 < y \le 30$, $10 \le z \le 40$, and $10 \le 100-x-y-z \le 50$.

10. The information recording medium according to claim 1, wherein the element M in the recording film is at least one selected from Ta and Zn.

11. The information recording medium according to claim 1, wherein the first information layer is disposed at a position nearer to the laser beam-irradiated surface than an information layer disposed at the farthest position from the laser beam-irradiated surface.

12. The information recording medium according to claim 1, wherein the first information layer is disposed at the nearest position to the laser beam-irradiated surface.

* * * * *